(12) United States Patent
Ben Khaled et al.

(10) Patent No.: US 12,545,921 B2
(45) Date of Patent: Feb. 10, 2026

(54) METHOD FOR DECREASING ALKALOID CONTENT OF A TOBACCO PLANT

(71) Applicant: BRITISH AMERICAN TOBACCO (INVESTMENTS) LIMITED, London (GB)

(72) Inventors: Sara Ben Khaled, London (GB); Francisco Anastacio De Abreu E Lima, London (GB)

(73) Assignee: BRITISH AMERICAN TOBACCO (INVESTMENTS) LIMITED, London (GB)

( * ) Notice: Subject to any disclaimer, the term of this patent is extended or adjusted under 35 U.S.C. 154(b) by 830 days.

(21) Appl. No.: 17/595,270

(22) PCT Filed: May 14, 2020

(86) PCT No.: PCT/GB2020/051180
§ 371 (c)(1),
(2) Date: Nov. 12, 2021

(87) PCT Pub. No.: WO2020/229830
PCT Pub. Date: Nov. 19, 2020

(65) Prior Publication Data
US 2022/0170035 A1 Jun. 2, 2022

(30) Foreign Application Priority Data
May 14, 2019 (GB) ...................... 1906768

(51) Int. Cl.
*C12N 15/82* (2006.01)
*A24B 15/10* (2006.01)
*A24B 15/24* (2006.01)
*C07K 14/415* (2006.01)

(52) U.S. Cl.
CPC .......... *C12N 15/8243* (2013.01); *A24B 15/10* (2013.01); *A24B 15/243* (2013.01); *A24B 15/245* (2013.01); *C07K 14/415* (2013.01); *C12N 15/8218* (2013.01)

(58) Field of Classification Search
None
See application file for complete search history.

(56) References Cited

FOREIGN PATENT DOCUMENTS

| KR | 20200039353 A | 4/2020 |
|---|---|---|
| WO | 2013128448 A1 | 9/2013 |
| WO | 2016124932 A1 | 8/2016 |
| WO | 2020025963 A2 | 2/2020 |
| WO | 2020089645 A1 | 5/2020 |
| WO | 2020099875 A1 | 5/2020 |

OTHER PUBLICATIONS

Denance et al (2012, The Plant Journal 73: 225-239) (Year: 2012).*
Denance et 2013, The Plant Journal 73: 225-239 (Year: 2013).*
Moldoveanu et al, 2016, Contributions to Tobacco Research 27: 54-59 (Year: 2016).*
Kim et al 2016, Physiological and Molecular Plant Pathology 95: 37-43 (Year: 2016).*
Clarkson et al 2005, New Phytologist 168: 241-252 (Year: 2005).*
Uniprot Accession A0A1S4AKP8 2019, uniprot.org/uniprotkb/A0A1S4AKP8/entry (Year: 2019).*
Uniprot Accession A0A1S4CJU0 2019, uniprot.org/uniprotkb/A0A1S4CJU0/entry (Year: 2019).*
Interpro Entry IPR000620, ebi.ac.uk/interpro/entry/InterPro/IPR000620/; accessed Apr. 19, 2025. (Year: 2025).*
Denance et al., "Arabidopsis wat1 (walls are thin1)-mediated resistance to the bacterial vascular pathogen, Ralstonia solanacearum, is accompanied by cross-regulation of salicylic acid and tryptophan metabolism", The Plant Journal, vol. 73, pp. 225-239, 2013.
International Searching Authority in connection with PCT/GB2020/051180 filed May 14, 2020, "The International Search Report and The Written Opinion of the International Searching Authority, or the Declaration", 28 pages, mailed Jul. 15, 2020.
Ranocha et al. "Walls are thin 1 (WAT1), an *Arabidopsis* homolog of Medicago truncatula NODULIN21, is a tonoplast-localized protein required for secondary wall formation in fibers", The Plant Journal, vol. 63, pp. 469-483, 2010.
Ranocha et al., "*Arabidopsis* WAT1 is a Vacuolar Auxin Transport Facilitator Required for Auxin Homoeostasis", Nature Communications, pp. 1-9, 2013.
Database Uniprot, "Reference Genomes and Transcriptomes of Nicotiana Sylvestris and Nicotiana Tomentosiformis", EBI Accession No. XP_009767374.1, https://www.uniprot.org/uniprot/A0A1U7VYA5.txt, 2 pages, 2021.

* cited by examiner

*Primary Examiner* — Shubo Zhou
*Assistant Examiner* — Aleksandar Radosavljevic
(74) *Attorney, Agent, or Firm* — McKee, Voorhees & Sease, PLC

(57) ABSTRACT

The present invention relates to a method of reducing the content of at least one tobacco specific nitrosamine (TSNA) precursor in tobacco, the method comprising modulating the activity or expression of at least one gene encoding a Walls are thin 1-related (WAT1-related) protein.

7 Claims, 19 Drawing Sheets
Specification includes a Sequence Listing.

FIG. 4

Nitab4.5_0010919g0010.2 protein sequence (SEQ ID NO. 1):

MADQMFCGAFGPFLNKVKPYLAMVSLQFGYAGMYIVTMMCFKPGMSHWILVVYRHAFATLAVAPFAIV
LERKIRPKMTLRVFIKILALGFLEPVIDQNLYYVGLKSTTATYASAFVNLLPAVTFILAVIFRIEKVN
LKKKSSMAKVIGTAITVAGAMVMTLYKGPMFNLVPHSRGGSHTAAAASTPENWVAGTIELISCIVGWS
GFFIVQSMTLKEYPAELSLAAWVCVMGIVEGGIVALIMERDWNAWKIGFDARLLAAAYSGIVCSGIAY
YVQSIVNKVKGPVFVTAFSPLSMVITSVLAAIILAESVHLGSCIGAVIIVMGLYSVVWGKSKEGKGNE
TGKDQELPVVDIKERSTIVDDISDDVTTVKSKVPAEKKASILQEL

FIG. 5

Nitab4.5_0010919g0010.2 coding sequence (SEQ ID NO. 2):

ATGGCAGACCAAATGTTTTGTGGGGCATTTGGCCCATTCCTCAACAAGGTGAAGCCTTACTTGGCTAT
GGTTTCCTTGCAGTTTGGTTACGCAGGGATGTATATTGTTACAATGATGTGCTTCAAAAGGGGAATGA
GTCACTGGATTCTTGTTGTCTATCGCCATGCATTTGCCACCCTTGCTGTTGCACCCTTTGCCATTGTT
CTTGAAAGGAAAATAAGGCCAAAGATGACACTCAGGGTCTTTATTAAAATATTGGCTCTTGGTTTTCT
AGAGCCAGTTATTGATCAGAACTTGTACTATGTGGGACTGAAGAGCACAACTGCAACCTATGCATCTG
CCTTTGTCAATCTTCTCCCTGCCGTCACCTTTATTCTTGCAGTTATTTTCAGAATTGAGAAAGTAAAC
CTGAAGAAGAAATCAAGTATGGCAAAGGTGATAGGAACAGCAATAACAGTGGCGGGAGCAATGGTGAT
GACACTTTACAAAGGCCCAATGTTCAACCTGGTCCCACACTCTCGCGGCGGCAGCCACACTGCAGCCG
CCGCGTCCACCCCCGAGAACTGGGTCGCCGGAACCATTGAGCTCATCTCTTGCATTGTTGGTTGGTCC
GGTTTCTTTATTGTTCAATCGATGACATTGAAGGAGTACCCAGCAGAGCTATCTCTGGCAGCATGGGT
ATGTGTGATGGGCATAGTGGAAGGAGGAATTGTTGCTCTTATAATGGAACGTGATTGGAATGCATGGA
AAATTGGCTTCGACGCTAGGCTCCTTGCTGCTGCTTATTCTGGAATCGTTTGCTCGGGAATTGCATAT
TACGTGCAAAGTATAGTTAATAAAGTAAAGGCCCAGTGTTCGTGACAGCCTTTAGCCCTTTGAGTAT
GGTCATCACTTCTGTTCTTGCTGCTATTATCTTGGCTGAGTCAGTCCACCTTGGAAGCTGCATTGGAG
CAGTTATCATAGTCATGGGACTTTACTCTGTGGTGTGGGGAAAGAGTAAGGAGGGTAAAGGAAATGAG
ACAGGAAAAGACCAAGAATTACCAGTTGTGGACATCAAAGAAAGGTCAACCATAGTTGACGATATTAG
TGATGATGTTACGACTGTGAAATCAAAGGTTCCAGCTGAGAAGAAGGCTTCAATCTTGCAAGAGCTGT
AG

FIG. 6

Nitab4.5_0010919g0010.2 genomic sequence (SEQ ID NO. 3):

CCATATGTAATTTAATTAAACTCTTATTATTAATTAATATTCTTGGTATAGCTTTTTACCTTTTGTTT
TGTGTATAAAAGGGCACACTTCCTATATTTTGCATACCCCAGCCTAAAACTAACCCCTTCATTCTTTG
TGTGTAGAAAGAAGAGAAGGAGAGAAATGGCAGACCAAATGTTTTGTGGGGCATTTGGCCCATTCCTC
AACAAGGTGAAGCCTTACTTGGCTATGGTTTCCTTGCAGTTTGGTTACGCAGGGATGTATATTGTTAC
AATGATGTGCTTCAAAAGGGGAATGAGTCACTGGATTCTTGTTGTCTATCGCCATGCATTTGCCACCC
TTGCTGTTGCACCCTTTGCCATTGTTCTTGAAAGGTAAAATCTCTCTCCTATTCTCTTTTCCATGTAG
TTCCTTAATTACTTGGTAGAACCCTCTCTTATTCAGTCACCAAGAAATCGGACGATTTTCCCCCCTTC
CATTTCCTCTGGAAGTGCATATATGATCACTTCATATGACCTTGTTGATCCTAGTTCTCATTTATAT
TCAACCATATTCAGTGTTGAAGTGTGTAACCATCTTTTTAAAAGTTTAAGTTCTAGGTATGCAGGAT
TTTTGTCCCTTTTTTGCCATGGTATCATGTTGAAAATTTGATAATTTAATTTAAAATCTTAAGTTGT
TTGAGGGTGGTACACTAATGTTTATCTAATTATATCCTAATTTGAGAACTTATCAAAAAATTTGACGT
TTTCCATCTTGCTGAATAATCTGAATCGCACAATAGAATATAAGTTGCCTACAAGTATCTTACAGAAT
ATTTTTCTTTTTGCTTTCTTTTCTTTTGCAGGAAAATAAGGCCAAAGATGACACTCAGGGTCTTTATT
AAAATATTGGCTCTTGGTTTTCTAGAGTATGTGATTCTTTTACACACTTTATATTCTACTCAATTTA
CATGTGAACAAATTACTATAAATATATACTCCAAACTGTTTGTTCTCTCATAAAATTTAGTTGTCTAT
TCAGTCATCCAAACGTATGAGATTCTGATGTCTCTTTTTCTTATTTATCTTTACTTCATTTAATAG
TTTTCTTTTTCTGTTTTAGCCTTCATACATCATGTATCAAAACTGAATACAGAAACATTATAAGTTGC
CCGGCGTTTTCCTACAAGGTTACTCTTGCATGAAAGGGATTATATACGACAGTTAAATGTCAGATGTT
CACTATTTTTATTTTTGTCAACTATTAGGAGTCGTTTGGTACCAGGGATAACGTGGGATTAAATTTAT
ACCGCGTTTGGCTGGCGGGTATAAATTTACACGATATAAATTTAATCTCAGACTTAATCCAGAATATT

FIG. 6 (Continued)

```
TCATCTTATCTCACATTATCCCATCAAATTCGGGATTATTTTATCCCACCTCCCATATGGTATAAATT
TCGTAAGCGTACCAAACGACCCCTTAGAGCATTTGGAAGGCGACTAAAAAAAATAATGAAAATCCAAC
TTTAAAATATAATTTAGCAGCTCTATATTGAGCTCCTACTCAATTATCTATATATATTTTTACCTGAA
TTCTTTCTAACAAATGCAAGATTTAACAATCTATGACTTTGGGAATTGAGATATTTTCCATGTGCCAA
AAGATTCTCAATTTTCCATGTGCCGAAAGATTCTCAAACCCTCCTTTATTTACTTTGAAATACGCTTT
AAGAGTAATATTAACGAATGTTTAGTTAAATGATACTACTACATATAGTAGCAAAACTTTTATAGCTT
CATATCAACCGAAACCCTAACCTATGTTCCTACCCGACTTAAAAAACTTCTTCTTCTCTATTCCTGCT
GGGTTTTCTACTTTATAAACTAATTCTTTTTATTACCTTCATTCACCCACCTGTATTGGCTAGAGCC
CATATTGTCTTACATGCTTTATGCCAAGAGAAAGATGCATTTAACCAATTAATTAATGATCACATCC
AACTGAATAAATTAAATACACACTTGCAAAGTACCTTTCTAAAAATCTGTTGTTTTATGGTCTTTAG
AGAGGTACGTCTTTTATTAAAATTTTAATATGTTTGGATGATAGTGTTCCACAGTTTTCATTCATCT
TCTGAGGTTAGCTTTAATTAGTTGAAGGAAAACAATAAGCAACTTCCTATATTAGAAATATCACTAAT
CATATTATTCTTTGACGTTAAACCTGACAAATAAATCCAATGAAGAACGTCAAAAAATCCTCATTCCA
AATTAGAAAGCAAATTCATTTGTTCTATCTGTTTAATTTATTTGAAAAGTTTAAGCTACTAGATATAC
AAAAATGTTTTAAAATAAGTGAGTGCAGGGTTATAGATTCTATTGAGAAATCGACACATTGATCAAG
AATAAGGCATCTATATTAGTACTATCAAAGTATCGGAGCATACAATGATTCCAAAGAGATATCATTTC
ACGGAATAAATTTTAAGAAGTTTAGATTTATTTATTTTACAATTAAATCGAAAGATTTTTAATCCTTA
TATATGTTTGATGATATATAACTGTTGTTCTAAACGAAAGCTTTTAAATATATGGAATTTCAGGCCAG
TTATTGATCAGAACTTGTACTATGTGGGACTGAAGAGCACAACTGCAACCTATGCATCTGCCTTTGTC
AATCTTCTCCCTGCCGTCACCTTTATTCTTGCAGTTATTTTCAGGTACTCATTATTTTCCTTTTATCG
TAATTTAATTTGTAAAAATAGTACTATTACTCCTTTAAAATCAAGAAAGTACCAAAAAAGAGCAAATA
AAATGACATGGTGGATTTTGACACCCTTTCTTTATCCCATAAAAGATACACTACTAGTTCATTACACAA
GTAATAAATTATAAAAGTATGATCTCACCTAAACAAAGTTGCTGACTTGCTTCCCACTTGGAAAGCAA
TGATCTCAAAAAAGTTAGTGGTTGCTCCTGTAATATTGACATATAAGTTAAACTCCTAATTATTACTC
CGTAGTTGTTATTGTGCTAGCTTTTATTAGTGGCTGAGATATAATTTTCACCAAAAAAATTAAATAAA
TAAATTTTAAAAAAAAACAGCTAAAAAGTAATTCATCATCTAATAGTCCAATATATATATAGCTACTA
TAGAACAAAATACTGTCGAAAAAATGAAAAACCATATTATAGAAAAGAAATAGAAACTCATGAACATA
ATTTCTTCCTCTTTTAATTTAACATAATCTTTTCTGGTTCTTTATGACTAGAATTGAGAAAGTAAACC
TGAAGAAGAAATCAAGTATGGCAAAGGTGATAGGAACAGCAATAACAGTGGCGGGAGCAATGGTGATG
ACACTTTACAAAGGCCCAATGTTCAACCTGGTCCCACACTCTCGCGGCGGCAGCCACACTGCAGCCGC
CGCGTCCACCCCCGAGAACTGGGTCGCCGGAACCATTGAGCTCATCTCTTGCATTGTTGGTTGGTCCG
GTTTCTTTATTGTTCAAGTAAGTTAGTATTGTCTATTTTCAGAATTAGGAAAAATGAATATTTACTC
ATTTAAATATTGATATAAATTATTACTACATTTATTTATATAATAATTGAGCAATTTGCATATGTAT
ACATAGTCGATGACATTGAAGGAGTACCCAGCAGAGCTATCTCTGGCAGCATGGGTATGTGTGATGGG
CATAGTGGAAGGAGGAATTGTTGCTCTTATAATGGAACGTGATTGGAATGCATGGAAAATTGGCTTCG
ACGCTAGGCTCCTTGCTGCTGCTTATTCTGTAAGTTTTTCCTTATTTGCTAAATTATTGTGAAACGTA
CAATTCTCTTATTTACTAAATTCTTACCACCAAGAAGTATCATTATATAATTTACTACTATTAGCGA
CTAATTAGAGCAAGCAATTTGTGTTTGGTCAGGGAATCGTTTGCTCGGGAATTGCATATTACGTGCAA
AGTATAGTTAATAAAGTTAAAGGCCCAGTGTTCGTGACAGCCTTTAGCCCTTTGAGTATGGTCATCAC
TTCTGTTCTTGCTGCTATTATCTTGGCTGAGTCAGTCCACCTTGGAAGGTAATTAAAACTAAGTTTT
TAAATTTAAAGGACAAAAAGAAGTGTTGTTGCTTTGTCAATTTAATTAATCTAATGATTTCCTGATT
CATTTGACAAAAATTTCAGCTGCATTGGAGCAGTTATCATAGTCATGGACTTTACTCTGTGGTGTGG
GGAAAGAGTAAGGAGGGTAAAGGAAATGAGACAGGAAAAGACCAAGAATTACCAGTTGTGGACATCAA
AGAAAGGTCAACCATAGTTGACGATATTAGTGATGATGTTACGACTGTGAAATCAAAGGTTCCAGCTG
AGAAGAAGGCTTCAATCTTGCAAGAGCTGTAGCATCCAAAAATGAAGCTGTCTTTGCAATTTAATTT
TTGACTTGTTGCAATGTTTAAATTTCTAAGTGTTGCTTTGAAACAATGCACTAATGTTGCCGATTGTT
CTTGATGAAAAAATGTGTAACCTACTTTTTGTGTAAAAGTCAAGGAGTGGTCTCTCCATTTGGGAAT
GAAAAATGAAAATGTTCTAATTTACCCTTAAAATTAAATGGGT
```

FIG. 7

Nitab4.5_0001086g0030.2 protein sequence (SEQ ID NO. 4):

MADQMFSGAFGSFLNKVKPYLAMVSLQFGYAGMYIVTMMCFKRGMSHWILVVYRHAFATVAVAPFAIV
LERKIRPKMTLRVFIKILALGFLEPVIDQNLYYVGLKSTTATYASAFVNLLPAVTFILAVIFRIEKVN
LKKKSSMAKVIGTAITVVGAMVMTLYKGPMFNLVPHSRGGSHPAAAAATPENWVAGTIELISCIVGWS

FIG. 7 (Continued)

GFFIVQSMTLKEYPAELSLAAWVCVMGIVEGGIVALIMERDWNAWKIGFDARLLAAAYSGIVCSGIAY
YVQSIVNKVKGPVFVTAFSPLSMVITSVLAAIILAESVHLGSCIGAIIIVMGLYSVVWGKSKEGKGNE
TGKDQELPVVDIKERSTIVDDISDDVTTVKSKVPAEKKASILQEL

FIG. 8

Nitab4.5_0001086g0030.2 coding sequence (SEQ ID NO. 5):

ATGGCAGACCAAATGTTTAGTGGGGCATTTGGCTCATTCCTCAACAAAGTAAAGCCTTACTTGGCTAT
GGTTTCCTTGCAGTTTGGTTACGCAGGGATGTATATTGTTACAATGATGTGCTTCAAAAGGGGAATGA
GTCACTGGATTCTTGTTGTCTATCGCCATGCATTTGCCACCGTTGCTGTTGCACCCTTTGCCATTGTT
CTTGAAAGGAAAATAAGGCCAAAGATGACACTCAGGGTCTTTATTAAAATATTGGCTCTTGGTTTTCT
AGAGCCAGTTATTGATCAGAACTTGTACTATGTGGGACTGAAGAGCACAACTGCAACCTATGCATCAG
CCTTTGTCAATCTTCTCCCTGCCGTCACCTTTATTCTTGCGGTTATTTCAGAATTGAGAAAGTAAAC
CTGAAGAAGAAATCAAGTATGGCAAAGGTGATAGGAACAGCAATAACAGTGGTGGGAGCAATGGTGAT
GACACTTTACAAAGGTCCAATGTTCAACCTGGTCCCACACTCTCGCGGCGGCAGCCACCCTGCAGCCG
CCGCGGCCACCCCCGAGAACTGGGTCGCCGGGACCATTGAGCTCATCTCTTGCATTGTTGGTTGGTCC
GGTTTCTTTATTGTTCAATCGATGACATTGAAGGAGTACCCAGCAGAGCTATCTCTGGCAGCATGGGT
ATGTGTGATGGGCATAGTGGAAGGTGGAATTGTTGCTCTTATAATGGAACGTGATTGGAATGCATGGA
AAATTGGCTTCGACGCTAGGCTCCTTGCTGCTGCTTATTCTGGAATTGTTTGCTCGGGAATTGCATAT
TACGTGCAAAGTATAGTTAATAAAGTTAAAGGCCCAGTGTTCGTGACAGCCTTTAGCCCGTTGAGTAT
GGTCATTACTTCTGTTCTTGCTGCTATTATCTTGGCTGAGTCAGTCCACCTTGGAAGTTGCATTGGAG
CAATTATTATAGTCATGGGACTTTACTCTGTGGTGTGGGGAAAGAGTAAGGAGGGGAAAGGAAATGAG
ACAGGAAAAGACCAAGAATTACCAGTTGTGGACATCAAAGAAAGGTCAACCATAGTTGACGATATTAG
TGATGATGTTACGACTGTGAAATCAAAGGTTCCAGCCGAGAAGAAGGCTTCAATCTTGCAAGAGCTCT
AG

FIG. 9

Nitab4.5_0001086g0030.2 genomic sequence (SEQ ID NO. 6):

ACCCCATCCTAAAACTAACCCCTTCATTCTTTGTGTGTAGAAAGAAGAGAAGGAGATCTAGAAATGGC
AGACCAAATGTTTAGTGGGGCATTTGGCTCATTCCTCAACAAAGTAAAGCCTTACTTGGCTATGGTTT
CCTTGCAGTTTGGTTACGCAGGGATGTATATTGTTACAATGATGTGCTTCAAAAGGGGAATGAGTCAC
TGGATTCTTGTTGTCTATCGCCATGCATTTGCCACCGTTGCTGTTGCACCCTTTGCCATTGTTCTTGA
AAGGTAAAATTTCTATCCTATTTCTTTTTTCCTCGTAGTTCCTTACTCGGTAGAAACCTCTCTTATTC
GGTCACCAAGAAATCGGACGATTTTCATATGACCTTGTTTGAATCTCATTTATATTCATTAATGAAGT
GTGTGAACCATCTCTTTTAAAAGTTTAAGTTCTACGCATGCAGGATCTTTGTCTGTTTTTTGCCATGA
TATCATATTCAAATTTTTGATAATTTAATATAAAATCTTAAGTCATAAATTTTGACGTTTTCCATCTT
GCTGAATAATCTGAATCGCACAATAGAATATAAGTTGCCTACAAGTATCTTACAGAATATTTTTCTTT
TTGCTTTGTTTTGTTTGCAGGAAAATAAGGCCAAAGATGACACTCAGGGTCTTTATTAAAATATTGG
CTCTTGGTTTTCTAGAGTATGTAATTCTTTTACACACTTTTATATTCTACTCAATTTACATGTGAACA
AATTACTATAAATATATACTCCAAATGTTTGTTCTCTCATAAAATTTAGTTGTCTATTCGGTCATCC
AAACGCATGAGATTCTGATGTTTCTTTTTCTTATTTATCTTTACTTCATTTAATATTTTTCTTTT
TCTGTTTTAGCCTTCATACATCATGT
ATNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNNNNNN

FIG. 9 (Continued)

```
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
NNNNNNNNNNNNNNNNNNNNNNNNNNNNNNNNNNNNNNNNNNNNNNNNNNNNNNNNNNNNNNNN
GAATTCGGGTGAACCCCTTCCGCCCCTAAATCCGCCCCAGCTCACATTAACCTAAACCCTAACCTATG
TTCCTAAACTAAAAAGCTCCTTCTTCTCTATTCCTGCTGGGTTTTCTACTTTAAATTAATTCTTTACC
CACACCACCCACATACCACTCTCTCCCCTTCATCTCCTACATTGGCTAGAGCCCATATTGTCTTACAT
GCTTTATGCCAAGAGAAAAGATGCACTTAATCAATTAATTAATGATCACATCCAACTGAATAAATTAA
ATACACACTTGCAAAGTACCTTTCTAAAAGTCTGTTGTTTTATGGTTTTAGAGAGGTACGTTTCTT
ATTAAAATTTTAATATGTTTGGATGATAGTGTTTCCACAGTTTTCATTCATCTTCTGAGGTTAGCTTT
AATTAGTTGTAGGAAAACAATAAGCAACTTCCTATATTAGAAATATCACTAATCATATTATTCTTTGA
CGTTAAACCTGACAAATAAATCCAATGAAGAACATCAAAAAGTCCTCATTCCAAATTAGAAAGCAAAT
TCATTAGTTCTATCTGTTTAATTTATTTGAAAAGTTTAAGCTACTAGAGATACAAAAATGTTTAAAAA
TAATTAAGTGAGTGCAGTGTTGTAGATTCTATTTGAGGAATCGACACATTGATCAAGAATAAGGCATC
TATATTATTACTATCAAAATATCAGAGCATACAATGATTCCGAAGAGATATCATTTCACGGAATATAT
TTTAAAAAGTTTAGACATTTTTTTTACAATTAAATCGGAAGGCTTTTAATCCTTATATATGTTTGATG
ATATATTACTGTTGTTCTAAACGAAAGCTTTTAAATATATGGAATTTCAGGCCAGTTATTGATCAGAA
CTTGTACTATGTGGGACTGAAGAGCACAACTGCAACCTATGCATCAGCCTTTGTCAATCTTCTCCCTG
CCGTCACCTTTATTCTTGCGGTTATTTTCAGGTACTCATCATTTCCTTTTTTCCTAATTTAATTTGT
AAAAATAGTACTTTTTACTCCATTAAAATCAAGAAAATACCAAAAAAAGAGTATATAAAATGACATGG
TGGATTTTGACACCCTTTCTTTATCCCATAAAATATACTCCTTCAAAAAGATTGGCATTATTTCCTTAT
TAGTCTGTTCAAAAAGATTGGCACCTTTCAATATTTCCTTAATAAGAAGCATTTATAGCCACACAAAT
GTTATGACGGGTTTCAGATCACAAGTTTCAAAAGTTTTACAGTAACACAAATGTTATGACTTATTTGA
AACCACATATCTCAAAAATCTTACCTTAAGATAATCTTTTTTTTAAAAGAGAGTACACTACTAGTTCA
TTACACAAGTAATAAATTACAAAAGTATGATCTCACCTAAACAAAGTTGCTGACTTGCTTCCCACTTG
GAAAGCAGTGATCTCAAAAAAGTTAGTGGTTGCTCCTGTAATATTGACATATAAGTTAAACTCCATAT
TATTACTTCGTATTTGTCACTGTGCTAGCTATTATTAGTGGTTGAGATATAATTTTCACCAAAAGAAT
TTGAAAAATAAAAAAGCAAATAGCAAAACAGCTAAAGTAATTCATCATCTAATAAATGCAATTTCTA
GAAGAAGGGGATCCCCATAGCTCCACCTATAGCTACTATAGAACAAAATAATGTCAAAAAATGAAAAA
TCATATAATAGAAAAGAAATAAAAACTCATGAACATAATTTCTTCCTCTTTTATTTAACATAATCTT
TTCTGGTTCTTTATGACTAGAATTGAGAAAGTAAACCTGAAGAAGAAATCAAGTATGGCAAAGGTGAT
AGGAACAGCAATAACAGTGGTGGGAGCAATGGTGATGACACTTTACAAAGGTCCAATGTTCAACCTGG
TCCCACACTCTCGCGGCGGCAGCCACCCTGCAGCCGCCGCGGCCACCCCGAGAACTGGGTCGCCGGG
ACCATTGAGCTCATCTCTTGCATTGTTGGTTGGTCCGGTTTCTTTATTGTTCAAGTAAGTTAGTACTA
TTTTCTATTTTCGAAATTAGAAAAAAAATGAATATTTTACTCATTTAAAATAGTGATATATTTTATTA
CAATTATGTATTGATATAATTGAGCAATTTTGCATATGTATACATAGTCGATGACATTGAAGGAGTAC
CCAGCAGAGCTATCTCTGGCAGCATGGGTATGTGTGATGGGCATAGTGGAAGGTGGAATTGTTGCTCT
TATAATGGAACGTGATTGGAATGCATGGAAAATTGGCTTCGACGCTAGGCTCCTTGCTGCTGCTTATT
CTGTAAGTTTTCCTTAATGTGAAACGTACAATTCTCGTATTTAGTCTCTCTATTCACTTTTACTTAT
CCACTATTGACTTTGCACACCCGTTAAAAAATAATAAATAAAGTGCATAATTTACCACGATACTCATA
TTAATTGGTGTATAATCTTAATGAATTTGAAATGAGTAATTAATGCTAAGGGCAAAATATAAAAAATG
AATTATTTTCTCTTGATATGCGAAAGTGGACAAGTAAAAAAAATCTATTTTAGAATAGTAGATAAG
TAAAAGTAAACGGATGAAGCATTATTTTGCTACTATTAGCCACTGATTAGAGCAAATAATTTGTATTT
GGTCAGGGAATTGTTTGCTCGGGAATTGCATATTACGTGCAAAGTATAGTTAATAAAGTTAAAGGCCC
AGTGTTCGTGACAGCCTTTAGCCCGTTGAGTATGGTCATTACTTCTGTTCTTGCTGCTATTATCTTGG
CTGAGTCAGTCCACCTTGGAAGGTAATTAACAACGAAGTTTTAAATTTAAAGTACAAAAAGAAGTG
TTGCTACTTTGTCAATTTAATTAATCTAATAATTTCCTGATTCTTTTTGACAAAAATTTCAGTTGCAT
TGGAGCAATTATTATAGTCATGGGACTTTACTCTGTGGTGTGGGGAAAGAGTAAGGAGGGGAAAGGAA
```

FIG. 9 (Continued)

ATGAGACAGGAAAAGACCAAGAATTACCAGTTGTGGACATCAAAGAAAGGTCAACCATAGTTGACGAT
ATTAGTGATGATGTTACGACTGTGAAATCAAAGGTTCCAGCCGAGAAGAAGGCTTCAATCTTGCAAGA
GCTCTAGCATCCAAAAATGAAGCTGTCTTTGCAATTTTAATTTTTGACTTGTTGCAATGTTTAAATTT
CTAAGTGTTGCTTTGAAACAATGCACTAATGTTGTCAATCGTTCTTGATCAAAAAATGTGTAATCTA
CTTTTTTTTGTGTAAAAGTCAAGGAGTGGTCTCTCCATTTGGGAATGAAAAACGAAATGTTCTAAT
TTGCCCTTAAAATTAAATGGGTAGTAAAAGCTTCGCGTTCAG

FIG. 10

Nitab4.5_0003292g0030.2 protein sequence (SEQ ID NO. 7):

XXXXGCLSSFFQRAKPYIAMISLQFGYAGMNVITKVSLNGGMSHYVLVVYRHAFATAAIAPFALVLER
KLRPKMTFMMFLQIFVLGLLGPVIDQNFYYMGLKFTSPTFSCAMSNMLPAMTFVMAVLCRMEKVHIKK
LRCQAKVVGTIVTVAGAMLMTLYKGHVINLVWSNNIHTNTSNVPEPNEATDKDWLKGSILLILATFAW
ASFFILQNVTMRKYTAPLSLTALVCFMGTLQSIAVTLVMEHKTSAWAIGFDMNLLAAAYAGIVSSSLA
YYVQGLVMEKRGPVFVTAFSPLMMIIVAIMGSFILAEKIYLGGVLGAVLIVAGLYSVLWGKYKEYKEK
EIEAAIPEPVKVVTENNQMMILEDREVNDIEMQSTAVAISVSMSQPPMLAKEAPKA

FIG. 11

Nitab4.5_0003292g0030.2 coding sequence (SEQ ID NO. 8):

NNNNNNNNNNCAGGATGTTTAAGTAGTTTCTTCCAAAGGGCAAAGCCTTACATAGCAATGATCTCTTT
GCAATTTGGTTATGCAGGAATGAATGTTATTACTAAAGTTTCCCTTAATGGAGGAATGAGTCATTATG
TTTTGGTTGTTTATAGACATGCCTTTGCTACTGCAGCTATTGCTCCTTTTGCTCTTGTTCTTGAAAGA
AAACTCAGACCAAAGATGACTTTCATGATGTTCTTGCAATTTTTGTATTGGGCCTTCTAGGGCCAGT
GATTGATCAAAACTTCTACTATATGGGACTTAAGTTTACATCCCCAACATTCTCATGTGCCATGAGCA
ACATGCTTCCTGCAATGACATTTGTCATGGCTGTCCTCTGCAGAATGGAGAAGGTGCATATAAAGAAG
TTGAGATGCCAAGCAAAGGTTGTGGGTACTATAGTGACAGTGGCTGGAGCCATGTTGATGACATTGTA
CAAAGGACATGTTATTAATTTGGTTTGGTCAAATAATATCCATACAAATACTTCTAATGTTCCTGAAC
CCAATGAAGCTACTGATAAAGATTGGCTTAAAGGTTCAATCCTTCTAATTCTTGCCACTTTTGCATGG
GCTTCTTTCTTTATACTTCAGAATGTTACAATGAGGAAGTACACTGCTCCACTTTCTCTAACTGCACT
TGTTTGCTTCATGGGAACTTTGCAATCAATTGCTGTCACCTTAGTGATGGAACATAAAACTTCTGCTT
GGGCCATTGGTTTTGACATGAACCTTCTTGCTGCTGCCTATGCTGGTATTGTATCATCAAGTCTTGCA
TACTATGTTCAAGGTCTTGTAATGGAGAAAAGAGGACCTGTTTTTGTGACTGCTTTCAGTCCATTGAT
GATGATCATTGTTGCTATTATGGGCTCTTTCATTCTTGCTGAAAAATATATCTTGGAGGTGTGCTAG
GAGCAGTGCTAATTGTGGCTGGACTATACTCAGTTTATGGGGAAAATACAAGGAATATAAGGAGAAA
GAAATTGAGGCTGCAATTCCTGAACCAGTGAAAGTAGTTACAGAGAACAACCAAATGATGATTTTAGA
AGATAGAGAAGTAAATGACATAGAAATGCAAAGTACTGCAGTAGCCATTAGTGTTTCAATGTCACAGC
CTCCAATGTTGGCTAAAGAAGCACCAAAAGCTTGA

FIG. 12

Nitab4.5_0003292g0030.2 genomic sequence (SEQ ID NO. 9):

NNNNNNNNNNCAGGATGTTTAAGTAGTTTCTTCCAAAGGGCAAAGCCTTACATAGCAATGATCTCTT
TGCAATTTGGTTATGCAGGAATGAATGTTATTACTAAAGTTTCCCTTAATGGAGGAATGAGTCATTAT
GTTTTGGTTGTTTATAGACATGCCTTTGCTACTGCAGCTATTGCTCCTTTTGCTCTTGTTCTTGAAAG
GTAATATATAATTAATTGCCTACAAGAAAAGTCCTTAGCTTAGTTAAAACTTCTCTTACATTATCAA
GTTGTGAAGTAATTCAAAATGAAATGCTAACTCTTTAAATTGTCTTTGTTTTGTACAGAAAACTCAG
ACCAAAGATGACTTTCATGATGTTCTTGCAATTTTTGTATTGGGCCTTCTAGGGTGAGTGTCTCTCT
ATGTCCTATTTATGAAACTCCAATCTCGGATTTTCTATATGAGTTTAAGTTCTATACACTGACGGAAT
AAATAATATATTTATATGATATAGCCACTTCTATCCCCACAGCTGGGATAATATTAAGTATGTTGTTG
TTGTTGTTGTATAGTCACTTCTAAAGTAGTTAATGATATATGAAATAAGAGCAATCAGTATATAACCT
GATAAAAATGACAATTAATGTGCTATCACATATTAAACTATATTGGTAACGTAAAAAAATCATAAACG
ATCAGTGTATATAACTTAAACATTTTACTTATGTAAACCAAAAAAAATCTAAATCTATGATTTGATCA
AATAGGCCAGTGATTGATCAAAACTTCTACTATATGGGACTTAAGTTTACATCCCCAACATTCTCATG
TGCCATGAGCAACATGCTTCCTGCAATGACATTTGTCATGGCTGTCCTCTGCAGGTACATATATACAT

FIG. 12 (Continued)

ATATGTTCAATTTAATATTTCTTCTAATTATTATTCTACTCTTTTCCAAAATTTGGAACTAACAAATA
AAGAATGAATTCAGAATGGAGAAGGTGCATATAAAGAAGTTGAGATGCCAAGCAAAGGTTGTGGGTAC
TATAGTGACAGTGGCTGGAGCCATGTTGATGACATTGTACAAAGGACATGTTATTAATTTGGTTTGGT
CAAATAATATCCATACAAATACTTCTAATGTTCCTGAACCCAATGAAGCTACTGATAAAGATTGGCTT
AAAGGTTCAATCCTTCTAATTCTTGCCACTTTTGCATGGGCTTCTTTCTTTATACTTCAGGTATGTAA
TATATACCCTAAATTTTTTAAATTTTTGTGAAATAGTTGTTGTTGTTAATGTATTTTTATTTGATGTT
TTGTGACAGAATGTTACAATGAGGAAGTACACTGCTCCACTTTCTCTAACTGCACTTGTTTGCTTCAT
GGGAACTTTGCAATCAATTGCTGTCACCTTAGTGATGGAACATAAAACTTCTGCTTGGGCCATTGGTT
TTGACATGAACCTTCTTGCTGCTGCCTATGCTGTATGTTCTTTTTTTACTCCTCATCCCTCCTATGA
ATTCTAATAAAAGGGCAGCTTGGCGTACGAAGCATCCCGTATTCACGCAGGATTCGGAAAAGGGTCG
CACCCCGAAGGGTGTGAGGCAGCCTACCCGATGCAAGCATCAATGACTGATTCTACGGCTCGAACCCA
TGAGATAAGATAACTTTATCGTTGGCCAAAGGTCCTCTTCTTATAAATAAGGGATTCAAAAAATTGCA
ACAATATTACACCTTAGCCGGCAAATCCACCTTGCTACTTCACTAGAATATTCTCTTATCTTCCGACAA
TTCAAGAAAGGAGATTTGGAACAACGATAAAGTTATCTCCGTGTGACCTATAAGTCTCGGGTTTGAA
TCGTGAAAGCAACCACAAATGCTTGCATTACGGTAGATTGTCCACATCACACCCCTTGGGGTGCAACC
CTTCCCTCTACCCTGTGTGAATGCGAAATGCTTTGTGCATCGACCTAAAAAAGGTCAAAGGAATTCA
ATTGTTCATATATATATGTATATATAGAAGAATCTTTTAAATCTATTGGCACAGTATAACTATTCGAC
GAAGGGAATTCAATCGAACCTCATTCATGTCACGAATCTCTGACCCTTCTTCTCCTAAAACCAACAAC
CATTGATTAATGACAAAATATAATTATGGATATTGTTTTATAATATTTCAGGGTATTGTATCATCAAG
TCTTGCATACTATGTTCAAGGTCTTGTAATGGAGAAAAGAGGACCTGTTTTTGTGACTGCTTTCAGTC
CATTGATGATGATCATTGTTGCTATTATGGGCTCTTTCATTCTTGCTGAAAAAATATATCTTGGAGGG
TAAGTCAATTTCTTCTATGTCATACTCTCTTTGTTTCATTTTACATGTCCATATTTATTTTTCAGTTT
GTTCTAAAAGAAGACACTTTCTATATTTTGGGTTTAAGTGTGCTAGGAGCAGTGCTAATTGTGGCT
GGACTATACTCAGTTTTATGGGGAAAATACAAGGAATATAAGGAGAAAGAAATTGAGGCTGCAATTCC
TGAACCAGTGAAAGTAGTTACAGAGAACAACCAAATGATGATTTAGAAGATAGAGAAGTAAATGACA
TAGAAATGCAAAGTACTGCAGTAGCCATTAGTGTTTCAATGTCACAGCCTCCAATGTTGGCTAAAGAA
GCACCAAAAGCTTGAGTTATGAAAAAAGAAAGAGGAAAAAAAACACAATAAAACAGAGTTTATTAGG
TGGTTTAAGGAAGGATTAAGAAGAGGGTATTTTGCTTTATTCCCTTTTTCTGTTACGGGTAAATAATA
TATGGAGGTGCAATGTAATTTTTCGGCTTTATATAATACTTACTAGTATTTGATGCAGCAATTAATTA
ACTCCTTTTTCTGAATAATATATAAATATGGCAAGGTTTCCATCCGTTTACTGGAAT

FIG. 13

Nitab4.5_0004697g0010.2 protein sequence (SEQ ID NO. 10):

MENKAGCLSSFFQRAKPYIAMISLQFGYAGMNVITKVSLNGGMSHYVLVVYRHAFATAAIAPFALVLE
RKLRPKMTFMMFLQIFVLGLLGPVIDQNFYYMGLKFTSPTFSCAMSNMLPAMTFVMAVLCRMEKVHIK
KLRCQAKVVGTIVTVAGAMLMTLYKGHVINLVWSNNIHTNTSNVPESNEPTDKDWLKGSILLILATFA
WASFFILQNVTMRKYTAPLSLTALVCFMGTLQSIAVTLVMEHKASAWAIGFDMNLLAAAYAGIVSSSL
AYYVQGLVMEKRGPVFVTAFSPLMMIVAIMGSFILAEKIYLGGVLGAVLIVAGLYSVLWGKYKEYKE
KEIEAAIPEPVKGITENNQMMRLEDREVNDIEMQSSAVAISVPMSQPPMLAKEAPKA

FIG. 14

Nitab4.5_0004697g0010.2 coding sequence (SEQ ID NO. 11):

ATGGAGAACAAAGCAGGATGTTTAAGTAGTTTTTTCCAAAGGGCAAAGCCTTATATAGCAATGATCTC
ATTGCAATTTGGTTATGCAGGAATGAATGTTATTACTAAAGTTTCCCTTAATGGAGGAATGAGTCATT
ATGTTTTGGTTGTTTATAGACATGCCTTTGCTACTGCAGCTATTGCTCCTTTTGCTCTTGTTCTTGAA
AGAAAACTCAGACCAAAGATGACTTTCATGATGTTCTTGCAAATTTTTGTATTGGGCCTTCTAGGGCC
AGTGATTGATCAAAACTTCTACTATATGGGACTTAAGTTTACATCTCCAACATTCTCATGTGCCATGA
GCAACATGCTTCCTGCAATGACATTTGTCATGGCTGTCCTCTGCAGAATGGAGAAGGTGCATATAAAG
AAGTTGAGATGCCAAGCAAAAGTTGTGGGTACTATAGTGACAGTGGCTGGAGCCATGTTGATGACATT
GTACAAAGGACATGTTATTAATTTGGTTTGGTCAAATAATATCCATACAAATACTTCTAATGTTCCTG
AATCCAATGAACCTACTGATAAAGATTGGCTTAAAGGTTCAATCCTTCTAATTCTTGCCACTTTTGCA
TGGGCTTCTTTCTTTATACTTCAGAATGTTACAATGAGGAAATACACTGCTCCACTTTCTCTAACTGC
ACTTGTTTGCTTTATGGGAACTCTGCAATCAATTGCTGTCACCTTAGTGATGGAACATAAAGCTTCTG

FIG. 14 (Continued)

CTTGGGCTATTGGTTTTGACATGAATCTTCTTGCTGCTGCCTATGCTGGTATTGTATCATCAAGTCTT
GCATACTATGTTCAAGGTCTTGTAATGGAGAAAAGAGGACCTGTCTTTGTCACTGCTTTCAGTCCCTT
GATGATGATCATTGTTGCTATTATGGGCTCTTTCATTCTTGCTGAAAAAATCTATCTTGGAGGTGTGC
TAGGAGCAGTGCTAATTGTGGCTGGACTATACTCAGTTTTATGGGGAAAATACAAGGAATACAAGGAG
AAAGAAATTGAGGCTGCAATTCCTGAACCAGTGAAAGGAATTACAGAGAACAACCAAATGATGAGGTT
AGAAGATAGAGAAGTAAATGACATAGAAATGCAAAGCAGTGCAGTAGCGATTAGTGTTCCAATGTCAC
AGCCTCCAATGTTGGCTAAGGAAGCACCAAAAGCTTGA

FIG. 15

Nitab4.5_0004697g0010.2 genomic sequence (SEQ ID NO. 12):

ATCCTCTAAGAGTACTTCAAGTGTTCTCCTTTGAATTCTTCTTAATTCTCCTCTCTTTGAGAATACAA
TATATATATATTTAGCTGAAAGAAAACATAACAAAACAAAGATGGAGAACAAAGCAGGATGTTTAAGT
AGTTTTTTCCAAAGGGCAAAGCCTTATATAGCAATGATCTCATTGCAATTTGGTTATGCAGGAATGAA
TGTTATTACTAAAGTTTCCCTTAATGGAGGAATGAGTCATTATGTTTTGGTTGTTTATAGACATGCCT
TTGCTACTGCAGCTATTGCTCCTTTTGCTCTTGTTCTTGAAAGGTATAATATAATTGCCCACAAGAAA
ATAGTTAAAACTTCTATTACCATTCTTGATTTATCTTGCTGTAAAATGAAAATAATGCTAAGTCTTTA
AATTTCTTTGTTTTGTACAGAAAACTCAGACCAAAGATGACTTTCATGATGTTCTTGCAAATTTTTG
TATTGGGCCTTCTAGGGTGAGTGTCTCTCTCTATGTCCTATTTATGAAACTCAAATCTCAGATTTT
CTACATAAGTTTAAGTTTTATACACTGACTTGAATAAACAATATATTTATACGATCAAGTCACTTCCA
AAGTAGTTACTGATAACATGATAAAAATGATAATTAATGTGTTATCGCATGTTAAACTATACTGATAA
CGGAAAGAAATCTTAAACGATTAGTTTATATAGCTTAAATCTTTTTTTACTTATTTAAAAAAATTTA
AACCTATGATTTGATTCAATCAGGCCAGTGATTGATCAAAACTTCTACTATATGGGACTTAAGTTTAC
ATCTCCAACATTCTCATGTGCCATGAGCAACATGCTTCCTGCAATGACATTTGTCATGGCTGTCCTCT
GCAGGTACATATATACAAATATCTTCAATTTAATATTTCTTAATTATTATTCTACTCTTTTCCAAAA
TTTTGAACTAATAAACAAAGAATGAATTCAGAATGGAGAAGGTGCATATAAAGAAGTTGAGATGCCAA
GCAAAAGTTGTGGGTACTATAGTGACAGTGGCTGGAGCCATGTTGATGACATTGTACAAAGGACATGT
TATTAATTTGGTTTGGTCAAATAATATCCATACAAATACTTCTAATGTTCCTGAATCCAATGAACCTA
CTGATAAAGATTGGCTTAAAGGTTCAATCCTTCTAATTCTTGCCACTTTTGCATGGGCTTCTTTCTTT
ATACTTCAGGTATGTAATATATATACACTAATTATTATTTTAAATAGTTGTGGAATAGTTGTTGTTA
ATGTATTTTGTCTGATGTTTGTGACAGAATGTTACAATGAGGAAATACACTGCTCCACTTTCTCTA
ACTGCACTTGTTTGCTTTATGGGAACTCTGCAATCAATTGCTGTCACCTTAGTGATGGAACATAAAGC
TTCTGCTTGGGCTATTGGTTTTGACATGAATCTTCTTGCTGCTGCCTATGCTGTATGTTCCTTTCTTT
ATTCCTCATCCCTCGTATAAATTCTAATAAAAAGGACATCTCGGTACACGAAGTATCCCGCTTTCACG
CAGGGTTCGAAGGACCCTCATCCCAAGACGTGTGATGTAGACAGCCTGCTCTGATGCAAACATTGAAT
CCATGAGTCGACCCCATGACCTATAGGACACGGAGACAACTTTACTGTTGCTCCAAGAATCCCCTTTC
CGTAAATAAGGGATTCAAAAAATTGCAAGAATATTACACCTTAGTAGTAGAGCCACCTTGCCACTTCA
CTAGAATATTCTCTTATGTCAAGGGAATTCAACAATTCATATATATATATATATATATAGAAGAATTG
TCTTAACCCTATTTGGACAGTATAACCATTCGACAAAGGCGATTCAATTGAACCTCCTTCGGATCATG
TGTCTCTGCCCCTTCTCATCCTAAAACCAACAACCATTGAGAATGACAAAATATAATTATGGATATTG
TTTTACCAAATTTCAGGGTATTGTATCATCAAGTCTTGCATACTATGTTCAAGGTCTTGTAATGGAGA
AAAGAGGACCTGTCTTTGTCACTGCTTTCAGTCCCTTGATGATGATCATTGTTGCTATTATGGGCTCT
TTCATTCTTGCTGAAAAAATCTATCTTGGAGGGTAAGTTTAACTTTCTATGTCATACTCTCTCTGGTC
CATTTTACATGTCCGTATTTATTTTCAGTCTGTTCTAAAAGGAATGACATGTTTATATTTTGGGT
TTCAGTGTGCTAGGAGCAGTGCTAATTGTGGCTGGACTATACTCAGTTTTATGGGGAAAATACAAGGA
ATACAAGGAGAAAGAAATTGAGGCTGCAATTCCTGAACCAGTGAAAGGAATTACAGAGAACAACCAAA
TGATGAGGTTAGAAGATAGAGAAGTAAATGACATAGAAATGCAAAGCAGTGCAGTAGCGATTAGTGTT
CCAATGTCACAGCCTCCAATGTTGGCTAAGGAAGCACCAAAAGCTTGAGTTAAGTTGTGAAAAAGAA
AGACGAAAAAAAAACACAATAAAAACAGAGTTTATGAGGTGGTTTAAGGAAGAATTAGAAGAGGGTA
TTTTGCTTTATTCCCCTTTTCTGTTATGGGCCGGGTAAATAATGGAGGTGCTATGTAATTTTCGGCG
TTATCTTTATACTAATTCCAGAGTATTTGATGGGAAAATGTAGTCTTACTACCAAT

FIG. 16
Nitab4.5_0005998g0010.2 protein sequence (SEQ ID NO. 13):

MEGKGECGCSFFQRAKPYIAMISLQFGYAGMNIITKVSLNRGMSHYVLVVYRHAFATAVIAPFALILE
RKIRPKMSLMMFLQIFVLGLLGPVIDQNFYYAGLKYTPPTFSCAMSNMLPAMTFVMAVICRMEKVDIK
KVRCQAKVLGTIVTVAGAMLMTLYKGHVVNLLWSNHTTINSSVQETSGANSDKDWFKGSILLIFATLA
WASFFILQNIAMRKYTAPLSLTALVCFMGTLQSIAVTFVMEHKPSVWTIGFDMNLLAAAYAGIVSSSI
AYYVQGVVMEKRGPVFVTAFSPLMMIIVATMGSFILAEKIYIGGILGAVLIVAGLYSVLWGKYKEYKE
KEIEEAIIPEAVKGVNGNNQMMILPDNEAINDIEMQKNSDANKIQTPIN

FIG. 17
Nitab4.5_0005998g0010.2 coding sequence (SEQ ID NO. 14):

ATGGAAGGAAAAGGAGAATGTGGTTGCAGTTTTTTTCAAAGGGCTAAGCCTTATATAGCCATGATTTC
CTTGCAATTTGGGTATGCAGGAATGAATATTATTACAAAAGTTTCTCTTAATAGGGGAATGAGTCATT
ATGTTCTGGTTGTCTATAGGCATGCTTTTGCTACTGCAGTTATTGCTCCCTTTGCTCTTATTCTTGAA
AGAAAAATTAGGCCAAAGATGTCACTCATGATGTTCTTGCAAATATTTGTATTGGGTCTTTTGGGACC
AGTGATTGATCAAAATTTTTACTACGCTGGACTCAAATATACACCCCCAACATTTTCATGTGCTATGA
GCAACATGCTACCTGCTATGACATTTGTCATGGCAGTGATCTGCAGGATGGAGAAAGTTGACATAAAG
AAAGTTAGATGCCAAGCAAAAGTGTTGGGAACAATAGTAACAGTAGCTGGAGCCATGTTAATGACATT
GTACAAAGGCCATGTTGTTAACTTGTTATGGTCAAATCACACTACTATTAATTCTAGTGTACAAGAAA
CCAGTGGAGCTAATTCTGATAAAGATTGGTTTAAAGGTTCAATTCTCCTCATTTTTGCAACTCTTGCT
TGGGCTTCTTTCTTCATTCTTCAGAATATCGCAATGAGGAAATACACAGCTCCACTTTCTCTAACTGC
ACTTGTTTGCTTTATGGGAACCTTACAATCTATAGCAGTCACATTTGTAATGGAGCACAAGCCTTCTG
TTTGGACTATTGGATTTGACATGAATCTATTAGCTGCTGCCTATGCAGGAATAGTATCATCAAGTATA
GCATACTATGTACAAGGTGTTGTAATGGAGAAAAGAGGACCTGTTTTTGTGACTGCTTTTAGTCCTTT
AATGATGATTATTGTTGCAACTATGGGCTCTTTCATTCTTGCTGAAAAAATCTATATTGGAGGAATTC
TTGGGGCAGTGCTCATAGTGGCAGGGCTATACTCAGTTCTATGGGGAAAATACAAGGAGTACAAAGAG
AAGGAAATTGAGGAGGCAATAATTCCTGAAGCAGTGAAGGGAGTTAACGGAAATAATCAAATGATGAT
TCTTCCAGATAATGAAGCAATTAATGATATAGAAATGCAAAAAAATAGTGATGCAAACAAAATCCAAA
CTCCAATTAATTAG

FIG. 18
Nitab4.5_0005998g0010.2 genomic sequence (SEQ ID NO. 15):

CAAATCTCCTCTTATTAGAGTGTTTTCTTCGCTTTTCACTTGATCAGTTCTTTATTCTCTTCTCTTAA
ATAATTAAAAATAAAATAATGGAAGGAAAAGGAGAATGTGGTTGCAGTTTTTTTCAAAGGGCTAAGCC
TTATATAGCCATGATTTCCTTGCAATTTGGGTATGCAGGAATGAATATTATTACAAAAGTTTCTCTTA
ATAGGGGAATGAGTCATTATGTTCTGGTTGTCTATAGGCATGCTTTTGCTACTGCAGTTATTGCTCCC
TTTGCTCTTATTCTTGAAAGGTAAAATTACGCACAAAAATAAGAATTTTTGAAGCTTTTGTTACAAGT
CTTGAAAGAGTAGCAAAAACTGACAAGTCTTTAAATTTGTTGACAGAAAAATTAGGCCAAAGATGTCA
CTCATGATGTTCTTGCAAATATTTGTATTGGGTCTTTTGGGACCAGTGATTGATCAAAATTTTTACTA
CGCTGGACTCAAATATACACCCCCAACATTTTCATGTGCTATGAGCAACATGCTACCTGCTATGACAT
TTGTCATGGCAGTGATCTGCAGGTATACATAATTAATACTATATATTATTTTTCTTCTTTCTTTACT
TCTTCAAGTTTTGGACTTATTGATAAGGTTTATTTTAGGATGGAGAAAGTTGACATAAAGAAAGTTA
GATGCCAAGCAAAAGTGTTGGGAACAATAGTAACAGTAGCTGGAGCCATGTTAATGACATTGTACAAA
GGCCATGTTGTTAACTTGTTATGGTCAAATCACACTACTATTAATTCTAGTGTACAAGAAACCAGTGG
AGCTAATTCTGATAAAGATTGGTTTAAAGGTTCAATTCTCCTCATTTTTGCAACTCTTGCTTGGGCTT
CTTTCTTCATTCTTCAGGTGTGTAATAGTACACTTATGTATACTTAATTCCCATTTTTTTCATTTCT
CTTTTCAACAATTTCCAGAAAAAATCTTTTTTATTTTGGTTTCCTAAATGGTGATTTAATATTTGTG
CAGAATATCGCAATGAGGAAATACACAGCTCCACTTTCTCTAACTGCACTTGTTTGCTTTATGGGAAC
CTTACAATCTATAGCAGTCACATTTGTAATGGAGCACAAGCCTTCTGTTTGGACTATTGGATTTGACA
TGAATCTATTAGCTGCTGCCTATGCAGTAAGTTTAATTTCTTTCCTTTCAATTTGGACTACTATTGAT
TTTGTCAAAATAATATATAAGAATTAATGATGAATAACAAAATATTTAATTTTCAGGGAATAGTATCA
TCAAGTATAGCATACTATGTACAAGGTGTTGTAATGGAGAAAAGAGGACCTGTTTTTGTGACTGCTTT

FIG. 18 (Continued)

TAGTCCTTTAATGATGATTATTGTTGCAACTATGGGCTCTTTCATTCTTGCTGAAAAAATCTATATTG
GAGGGTAATTTCAATATCTCTCAACATTTTATCTTTTCTGGTTTTATTTTCATTTAGTAAACTGAATA
TTAATTATTTTCTCTTTTGGGTTCAGAATTCTTGGGGCAGTGCTCATAGTGGCAGGGCTATACTCAGT
TCTATGGGGAAAATACAAGGAGTACAAAGAGAAGGAAATTGAGGAGGCAATAATTCCTGAAGCAGTGA
AGGGAGTTAACGGAAATAATCAAATGATGATTCTTCCAGATAATGAAGCAATTAATGATATAGAAATG
CAAAAAAATAGTGATGCAAACAAAATCCAAACTCCAATTAATTAGTGTACCAATGCCACAGCCCCCCA
TGTTAGCTAGGGAAGCACCAAAAGCTTAATTTTTGGTTGAGGAATTATTAGAAGCAAAAAGAACAGA
CGAAAGATGGGAATTTTTGCCTTTT

FIG. 19

Nitab4.5_0011862g0010.2 protein sequence (SEQ ID NO. 16):

MKAVSELFIRSKPFIAVIFLQFGLAGMDILTKMALNEGMSNYVFVVYRHAVATLAIAPFAIILDKKIR
PKMTLSIFTKLVLLSILEPVIDQNLYSIGLKYTTATFAAAMCNILPAITFIMAWIFRLERVKLTSIRS
QAKIIGTVATVAGAMIMTLVRGPVIELFWTKGNSSHESQSGGLNLSHAIKGSLMITIGCFSWAAFMIL
QAITLRTYPAELSLTAWICLLGTAEGAIVAMVMERGKAAVWAIKWDTKFLAAVYSGIFCSGLAYYIQG
VIMKDRGPVFVTAFNPLSMVIVAILSSFILREQMNLGRVLGAVVIVLGLYIVLWGKSKDQKSPSADEQ
AIPTQETTHENKIDKENLSQTIIHISPSRGTTVTKDERI

FIG. 20

Nitab4.5_0011862g0010.2 coding sequence (SEQ ID NO. 17):

ATGAAGGCAGTAAGTGAACTATTCATTAGATCAAAACCCTTTATTGCTGTCATTTTTCTTCAATTTGG
GCTAGCAGGCATGGATATCCTCACCAAAATGGCATTGAATGAAGGGATGAGCAACTATGTATTTGTTG
TGTACCGCCACGCAGTAGCCACTCTGGCTATTGCTCCTTTTGCAATAATTCTAGACAAGAAAATAAGA
CCAAAGATGACTCTCTCAATATTCACTAAGTTGGTACTTCTTAGCATACTGGAGCCAGTCATCGACCA
GAATCTCTACTCTATTGGCCTGAAATACACAACAGCAACTTTTGCAGCTGCAATGTGCAACATACTTC
CCGCCATTACTTTTATAATGGCCTGGATATTCAGGCTTGAGAGGGTGAAGCTTACAAGCATTCGCAGC
CAAGCCAAAATAATCGGGACTGTCGCCACAGTTGCAGGAGCCATGATCATGACGCTGGTACGAGGTCC
AGTCATTGAACTATTTTGGACAAAAGGAAATTCCAGTCATGAATCTCAAAGTGGTGGGTTAAATCTAA
GCCATGCTATCAAAGGTTCCCTCATGATAACAATTGGGTGCTTCAGTTGGGCAGCATTCATGATTTTG
CAGGCAATCACACTGCGGACCTACCCTGCAGAGCTCTCACTCACTGCTTGGATATGCTTGTTGGGAAC
AGCTGAGGGAGCTATAGTAGCGATGGTAATGGAGAGAGGAAAAGCTGCAGTGTGGGCCATAAAATGGG
ACACTAAGTTTCTTGCAGCTGTATACAGTGGAATATTCTGTTCAGGGCTCGCGTATTACATCCAAGGA
GTAATAATGAAAGATAGGGGCCCTGTTTTCGTCACAGCTTTCAATCCATTAAGCATGGTTATTGTAGC
TATACTGAGTTCATTCATTCTACGTGAACAAATGAACCTGGGAAGGGTACTTGGTGCTGTTGTGATCG
TTTTAGGCCTTTACATTGTCCTGTGGGGTAAAAGCAAGGATCAAAAATCTCCATCAGCCGATGAACAA
GCAATACCAACACAGGAAACGACACATGAAAACAAAATTGACAAGGAAAATTTAAGTCAGACAATTAT
CCACATCAGTCCATCAAGAGGAACAACTGTTACCAAAGATGAAAGAATATAA

FIG. 21

Nitab4.5_0011862g0010.2 genomic sequence (SEQ ID NO. 18):

GTGCACACTTGTGACTTACAATAGAAGTGCTCTCAAAGAGGTTGAGTTTGTGCAAATAAACAATGAAG
GCAGTAAGTGAACTATTCATTAGATCAAAACCCTTTATTGCTGTCATTTTTCTTCAATTTGGGCTAGC
AGGCATGGATATCCTCACCAAAATGGCATTGAATGAAGGGATGAGCAACTATGTATTTGTTGTGTACC
GCCACGCAGTAGCCACTCTGGCTATTGCTCCTTTTGCAATAATTCTAGACAAGTATATATCTCTCTCT
CTTCCTCCCTCCCTATGTTCAATTGACGTGTTTGCAACCTCAATTCTAGTCTAGTTACCAGTAGGACA
AAGACATACAAAAAGTGTCTTTCTTTTTATTCCCATAATTCTAGCGAGAATGAATGACAAGCTAAATG
TTTCTTAACAGGAAAATAAGACCAAAGATGACTCTCTCAATATTCACTAAGTTGGTACTTCTTAGCAT
ACTGGAGTAAGTCTCCAACACTCAAAATTTATTTTTTCCATGGAGTCAGTATCTAACATAAACATGT
TTCTCTTGACCAATAGGCCAGTCATCGACCAGAATCTCTACTCTATTGGCCTGAAATACACAACAGCA
ACTTTTGCAGCTGCAATGTGCAACATACTTCCCGCCATTACTTTTATAATGGCCTGGATATTCAGGTA
AATTATATGCTTTTTTCATTCTACAGATATAATCACATATGAACACCAGCAAAGATAAACTGACAAGG
AAACCAACATGGATTCTCCAAAACAACCAAATGACGATATTAAATGTGTTTGCACATAATCTCTTTA

FIG. 21 (Continued)

```
TCCTAGGCTTGAGAGGGTGAAGCTTACAAGCATTCGCAGCCAAGCCAAAATAATCGGGACTGTCGCCA
CAGTTGCAGGAGCCATGATCATGACGCTGGTACGAGGTCCAGTCATTGAACTATTTTGGACAAAAGGA
AATTCCAGTCATGAATCTCAAAGTGGTGGGTTAAATCTAAGCCATGCTATCAAAGGTTCCCTCATGAT
AACAATTGGGTGCTTCAGTTGGGCAGCATTCATGATTTTGCAGGTAACGATAGAACTTAGTTAGAGAT
AAGTTACTAGGAAATAAGCCACATATCTGACTCTAGTATGATATGCATAGGCAATCACACTGCGGACC
TACCCTGCAGAGCTCTCACTCACTGCTTGGATATGCTTGTTGGGAACAGCTGAGGGAGCTATAGTAGC
GATGGTAATGGAGAGAGGAAAAGCTGCAGTGTGGGCCATAAAATGGGACACTAAGTTTCTTGCAGCTG
TATACAGTGTAAGTCAAACTTATGAGCAAGACTGAGTCGATTAAGTCTTCTTAGAACACAAGCATACA
AGAAAAATTAAAAGTAACCATTCTTTAAATGTTTATCCATCCTATGTACCATATTCTCCAATTCTGTA
CCATATTGTTTATCCATTGTATGCACCATATCGCCCAGCTCTGTGCTACTCTATGTGACAAAACTTGT
TAACTAGATGCTCTACAGCTTATGCACATCAATGTTCCTAACTACTGTAGCATGAAACTTTACTTCTG
CAACATGAGAGAAATGAGAAAACAAATGTAGACGCATAGCTTTTCCAATCACTCATGAAGTTAAGCCT
CTGCCAAAAGCTTCTCACTTTCCATGTCACAATACAGGGAATATTCTGTTCAGGGCTCGCGTATTACA
TCCAAGGAGTAATAATGAAAGATAGGGGCCCTGTTTTCGTCACAGCTTTCAATCCATTAAGCATGGTT
ATTGTAGCTATACTGAGTTCATTCATTCTACGTGAACAAATGAACCTGGGAAGGTAATTCTTAATTTC
TTATAACACCTAAAGCTCTTATAAGTTACGACCAACACAAAACTAATGTAACACTTTCTACAGGGTAC
TTGGTGCTGTTGTGATCGTTTAGGCCTTTACATTGTCCTGTGGGGTAAAAGCAAGGATCAAAAATCT
CCATCAGCCGATGAACAAGCAATACCAACACAGGAAACGACACATGAAAACAAAATTGACAAGGAAAA
TTAAGTCAGACAATTATCCACATCAGTCCATCAAGAGGAACAACTGTTACCAAAGATGAAAGAATAT
AATGATTTTCTCGTCGGGGCTATATCTTCCAAATTCCAAAAGGAAGTCGGGCTACAGAGCAACCTTTT
TATCTTAAGAAATGAGCTCCTCTTCAGCTTCATCTAAGAATTAATAGTTATTAGTTAAAGATGGTTTA
TGTATGAAGAGGAGTTTCTTTCTGCTTTAAGGCAAGGAAAAAGAATCTCAAGTCATGTGCCCAAAATT
TGGGCCAGCTAAACAACCGTTTTTGCAAACTTCTGTCAGTACTATAGAATATAACCAAACTATGTTA
AGCCAATAGGCTTTTCTTATGGTTTGTTAAACAGATATT
```

FIG. 22

Nitab4.5_0000062g0210.2 protein sequence (SEQ ID NO. 19):

```
MEGECSCSFYQRAKPYIAMISLQFGYAGMNIITKVSLNRGMSHYVLVVYRHAFATAVIAPFALILERK
IRPKMSLMMFLQIFVLGLLGPVIDQNFYYAGLKYTSPTFSCAMSNMLPAMTFVMAVLCRMEKVDLKKF
RCQAKVLGTIVTVAGAMLMTLYKGHVVNLLWSTNSNVPEVSGANSDKDWVKGSILLIFATLAWASFFI
LQAITMRKYTAPLSLTALVCFLGTLQSIAVTFVMEHEPSVWTIGFDMNLLAAAYAGIVSSSIAYYVQG
LVMEKRGPVFVTAFSPLMMIIVAIMGSFILAEKIYIGGILGAVLIVAGLYSVLWGKYKEYKEKEIEES
IIPEAVKGVIKGNNQMVILANIEGINDIEMQKSSEGKRIEATSASVAISFPMPHPQMLAREAPKGLI
```

FIG. 23

Nitab4.5_0000062g0210.2 coding sequence (SEQ ID NO. 20):

```
ATGGAGGGCGAATGTAGTTGCAGTTTTTACCAAAGGGCTAAGCCTTATATAGCCATGATTTCCTTGCA
ATTTGGCTATGCAGGAATGAATATTATTACAAAAGTTTCTCTTAATAGGGGAATGAGTCATTATGTTC
TTGTTGTGTATAGACATGCTTTTGCTACTGCAGTTATTGCTCCCTTTGCTCTTATTCTTGAAAGAAAA
ATTAGGCCAAAGATGTCACTCATGATGTTCTTGCAAATATTTGTATTGGTCTTTTGGGGCCAGTGAT
TGATCAAAATTTTTACTATGCTGGACTCAAATATACATCTCCAACATTTTCATGTGCTATGAGCAACA
TGCTACCTGCTATGACATTTGTCATGGCAGTCCTCTGCAGGATGGAGAAGGTGGACTTGAAGAAATTT
AGATGCCAAGCAAAAGTGTTGGGAACAATAGTAACTGTAGCTGGAGCCATGTTAATGACATTGTACAA
AGGCCATGTTGTTAACTTGTTATGGTCAACTAATTCTAATGTCCCTGAAGTCAGTGGAGCTAATTCTG
ATAAAGATTGGGTTAAAGGCTCAATTCTCCTCATTTTTGCAACTCTTGCTTGGGCTTCTTTCTTCATT
CTTCAGGCTATCACAATGAGGAAATATACAGCTCCATTATCTTTAACTGCACTTGTTTGCTTCCTGGG
AACCTTGCAATCTATTGCTGTCACATTTGTAATGGAGCACGAGCCTTCTGTTTGGACTATTGGTTTTG
ACATGAATCTACTAGCTGCTGCCTATGCTGGAATAGTATCATCAAGTATAGCATACTATGTACAAGGT
CTTGTAATGGAGAAAAGAGGACCAGTTTTTGTGACTGCTTTTAGTCCTTTAATGATGATTATTGTTGC
AATCATGGGCTCTTTTATTCTTGCTGAAAAAATCTATATTGGAGGAATTCTTGGTGCAGTGCTCATAG
TGGCAGGGCTATACTCAGTTCTGTGGGGAAAATACAAGGAGTATAAGGAGAAGGAAATTGAGGAGTCA
ATAATTCCTGAAGCAGTGAAGGGAGTAATTAAAGGAAACAATCAAATGGTTATTCTTGCAAACATTGA
```

FIG. 23 (Continued)

AGGAATTAATGATATAGAAATGCAGAAAAGTAGTGAAGGAAAAAGAATTGAAGCAACTTCAGCATCAG
TGGCTATCAGTTTTCCCATGCCACACCCCCAAATGTTGGCTAGGGAAGCACCAAAAGGCTTGATATAA

FIG. 24

Nitab4.5_0000062g0210.2 genomic sequence (SEQ ID NO. 21):

ATTACTTACATATATGGTTTAATAATTTGCTTGTCTATAAATATGTTGCATGTCTCATTTCTTCTCCC
TAGGAAAAACACAAATCTACTCTAAGACTCGAGTGTTTTCCTCCCTTTTTCATTTCATCAACTCTTTA
TACTACTTCTCTGTATAATTAAGACTTCAAGATTTAACTGAAGAAAAACAAAGAAAGAAAAATGGAGG
GCGAATGTAGTTGCAGTTTTTACCAAAGGGCTAAGCCTTATATAGCCATGATTTCCTTGCAATTTGGC
TATGCAGGAATGAATATTATTACAAAAGTTTCTCTTAATAGGGGAATGAGTCATTATGTTCTTGTTGT
GTATAGACATGCTTTTGCTACTGCAGTTATTGCTCCCTTTGCTCTTATTCTTGAAGGTAAATTACCC
CACAAAAATAAGAAATTTGAAGCTTTTGTTACAATTCTTGAAGAGTAGCAAAAACTGATAAGTCTT
TAAATTTGTTGACAGAAAAATTAGGCCAAAGATGTCACTCATGATGTTCTTGCAAATATTTGTATTGG
GTCTTTGGGGCCAGTGATTGATCAAAATTTTTACTATGCTGGACTCAAATATACATCTCCAACATTT
TCATGTGCTATGAGCAACATGCTACCTGCTATGACATTTGTCATGGCAGTCCTCTGCAGGTACATATA
TTGTTCAACATTTTTATCTTATAACGGTATTGTCCGGACCGGAAGGGGAGAACCTTAGCGTACCTGAT
AATGTTGTTACAATGTGACCAGGAGGTCACGGGTTTAATATAAGCCGTGAAAACAGCCTCTTGCAGAA
ATGCAGGGTAAAGCTGCGTACTATAGACCCTTGTGGTTCCGGACCTCGTATATAGCGGAAACTTAGTG
CACCAGGCGTCCCTTTTTACTGTCCGAACCAGTTTGTTCTTTTTCGGAAGTTTTGGACTAATTATAAG
GATTGTTTTTAGGATGGAGAAGGTGGACTTGAAGAAATTTAGATGCCAAGCAAAAGTGTTGGGAACAA
TAGTAACTGTAGCTGGAGCCATGTTAATGACATTGTACAAAGGCCATGTTGTTAACTTGTTATGGTCA
ACTAATTCTAATGTCCCTGAAGTCAGTGGAGCTAATTCTGATAAAGATTGGGTTAAAGGCTCAATTCT
CCTCATTTTTGCAACTCTTGCTTGGGCTTCTTTCTTCATTCTTCAGGTATATATGCTGTACATTACAA
GTTACAAAACCTTCCTTTTTCTTTTCCCCCTTTTCAGGGAATTTTTGTTTTTGTATATTTTGTATGA
TGGTTAAAAGTAGTTTAATACTATTGGTTACAGGCTATCACAATGAGGAAATATACAGCTCCATTATC
TTTAACTGCACTTGTTTGCTTCCTGGGAACCTTGCAATCTATTGCTGTCACATTTGTAATGGAGCACG
AGCCTTCTGTTTGGACTATTGGTTTTGACATGAATCTACTAGCTGCTGCCTATGCTGTAAGTTTAATT
TCTTCCTTTCAATTTGGACTATTGGTTTTGCCAAAATAAGTATATAAGAAATGATGAATAACAAATTA
TTTTAATTTTCAGGGAATAGTATCATCAAGTATAGCATACTATGTACAAGGTCTTGTAATGGAGAAAA
GAGGACCAGTTTTTGTGACTGCTTTTAGTCCTTTAATGATGATTATTGTTGCAATCATGGGCTCTTTT
ATTCTTGCTGAAAAAATCTATATTGGAGGGTAATTTCAAATCTTTTCTGGTTTTATTTTCATTTAGTA
AACTGAATATTAATTATTTTCTCTTTTGGGTTCAGAATTCTTGGTGCAGTGCTCATAGTGGCAGGGCT
ATACTCAGTTCTGTGGGGAAAATACAAGGAGTATAAGGAGAAGGAAATTGAGGAGTCAATAATTCCTG
AAGCAGTGAAGGGAGTAATTAAAGGAAACAATCAAATGGTTATTCTTGCAAACATTGAAGGAATTAAT
GATATAGAAATGCAGAAAAGTAGTGAAGGAAAAAGAATTGAAGCAACTTCAGCATCAGTGGCTATCAG
TTTTCCCATGCCACACCCCCAAATGTTGGCTAGGGAAGCACCAAAAGGCTTGATATAATAAATTACAT
ATGAGGAGATGATGGGAAAAAGAAATAGAAGGAAGAGGCAACAGACCTGCCATTTGTCCTACTTTT
TACTTTTTCCCTTTCTCTTAATTTTGATATTACAAATATGTTTAGAGTAATTTACTCTTCTCCTAAC
CTTAAGCTTGTAAAAAATAACAAGTGCTCTCTCTATTGAAAGATATAGATTTTGAAAGCTTTGATATT
GCCATATTGATATCCAGTTATCCGATACAGGTTATAAATACGTT

FIG. 25

Nitab4.5_0008142g0020.2 protein sequence (SEQ ID NO. 22):

MKAVRELFIRSKPFIAVIFLQFGLAGMDILTKMALNEGMSNYVFVVYRHAVATLAIAPFAMILDKKIR
PKMTLSIFTKLVLLSILEPVIDQNLYSIGLKYTTATFAAAMCNILPAITFIMAWIFRLERVKLTSIRS
QAKIIGTIATVAGAMIMTLVRGPVIELFWTKGNSSHESQSGGLNLSHAIKGSLLITIGCFSWAAFMIL
QAITLRTYPAELSLTAWICLLGTAEGAIVAMVMERGKAAVWAIKWDTKFLAAVYSGIFCSGLAYYIQG
VIMKDRGPVFVTAFNPLSMVIVAILSSFILREQMNLGRVLGAVVIVLGLYIVLWGKSKDQKSPSTDEQ
AIPTQETTHENKIDKENLSQTIIHISPSRGTTVTKDERI

FIG. 26
Nitab4.5_0008142g0020.2 coding sequence (SEQ ID NO. 23):

ATGAAGGCAGTACGTGAATTATTCATTAGATCAAAACCCTTTATCGCTGTCATTTTTCTCCAATTTGG
GCTAGCAGGCATGGATATCCTCACCAAAATGGCATTGAATGAAGGGATGAGCAACTATGTATTTGTTG
TGTACCGCCATGCAGTAGCCACTCTGGCTATTGCTCCTTTTGCAATGATTCTAGACAAGAAAATAAGA
CCAAAGATGACTCTCTCAATATTTACTAAGTTGGTACTTCTTAGCATACTGGAGCCAGTCATAGACCA
GAATCTCTACTCTATTGGCCTGAAATACACAACAGCAACTTTTGCAGCTGCAATGTGCAACATACTTC
CCGCCATTACTTTTATAATGGCATGGATATTCAGGCTTGAGAGGGTGAAGCTTACAAGCATTCGCAGC
CAAGCCAAAATAATTGGGACTATCGCCACAGTTGCAGGAGCCATGATCATGACGCTGGTACGAGGTCC
AGTCATTGAACTATTTTGGACAAAAGGAAATTCCAGTCATGAATCTCAAAGTGGTGGGTTAAATCTAA
GCCATGCTATCAAAGGTTCCTCTTGATAACAATTGGGTGCTTCAGTTGGGCAGCATTTATGATTTTG
CAGGCAATCACACTGCGGACCTACCCTGCAGAGCTCTCACTCACTGCTTGGATATGCTTGTTGGGAAC
AGCTGAGGGAGCTATAGTAGCGATGGTAATGGAGAGAGGAAAAGCTGCAGTGTGGGCCATAAAATGGG
ACACTAAGTTTCTTGCAGCTGTATACAGTGGAATATTCTGTTCAGGACTCGCGTATTACATCCAAGGA
GTCATAATGAAAGATAGGGGCCCTGTTTTTGTCACAGCTTTCAATCCATTAAGCATGGTTATTGTAGC
TATACTGAGTTCATTCATTCTACGTGAACAAATGAACCTGGGAAGGGTACTTGGTGCTGTTGTAATCG
TTTTAGGCCTTTACATTGTCCTGTGGGGTAAAAGCAAGGATCAAAAATCTCCATCAACCGATGAACAA
GCAATACCAACACAGGAAACAACACATGAAAACAAAATTGACAAGGAAAATTTAAGTCAGACAATTAT
CCACATCAGTCCATCAAGAGGAACAACTGTTACCAAAGATGAAAGAATATAA

FIG. 27
Nitab4.5_0008142g0020.2 genomic sequence (SEQ ID NO. 24):

AAAACATAGATTCTCATTGAATTAACCAGCGCGCAAAAACTTATGTACTTCTAATTTACATACATCTG
TTAACAAAATGTACAACCAAACGAAAGATATAATATACAGCCATAATTTCTGACAAGAATTATTAC
CAAGGATCACGGCGATAACAGAGTCATCAACTATAAGAGGCGAATAGCAAAAGGAGAAATACAGTCTC
TTTGAACCGGCCAAGTGTTCACTTTGGTTGTCAATCTGTCATATGCATAAACATAGATGTTTTTGCAA
GGAATTAGTATCCATGAATATGAGCATTGATGGGGAACAAGTATTATCTCAAAGAATAACGATACATT
TTTGAATATTCCAAAATATTAAGATATATCAGATTATATTAAACCAATTCAAGAACATTTGAGCTCA
TCAAAAGCAGACAACTAACAGAAAGTAGCAACAAATAAAAGGGGACTCAGTCCTGGTTTACTTTTCCT
AGAAGCAAGTGATGAGTAGGTCCAGGTGACTAGGCCATTTCATCTAAAAAGTGGAAGGCTTTATGAGT
AATTAATTAACAAATTCTGCACACAGATGAAATCCAACAGATTTGTCCCCATCTGCTGATCAGAAAA
TGGGTAGAGAACGAAAATTGTGTGAAAGGATTTGTCTATATATACAGAAAAGCAGCAGTTACTTGTGC
ACACTTGTGACCTTACAATAGTAGTGCTCTCAAAGAGGTTGAGTTTGTGCAAGTAAACAATGAAGGCA
GTACGTGAATTATTCATTAGATCAAAACCCTTTATCGCTGTCATTTTTCTCCAATTTGGGCTAGCAGG
CATGGATATCCTCACCAAAATGGCATTGAATGAAGGGATGAGCAACTATGTATTTGTGTACCGCC
ATGCAGTAGCCACTCTGGCTATTGCTCCTTTTGCAATGATTCTAGACAAGTATGTCTCTCTCTCTT
CCTCCCTCCCAATGTTCAATGACGTGTTTGCAACCTCAATTCTAGTCTAGTTACCAGTAGGACAAAGA
CATACAAAAAAGTGTCTTCTTCTTATTCCATAATTCAAGCGAGAATAAATGACAAGCTAAATGTTT
CTTAACAGGAAAATAAGACCAAAGATGACTCTCTCAATATTTACTAAGTTGGTACTTCTTAGCATACT
GGAGTAAGTCTCCAACACTCAAATTTATTTTTCCCATGGACTAAGTATCTAACATAAACATGTTTCT
CTTGACCAATAGGCCAGTCATAGACCAGAATCTCTACTCTATTGGCCTGAAATACACAACAGCAACTT
TTGCAGCTGCAATGTGCAACATACTTCCCGCCATTACTTTTATAATGGCATGGATATTCAGGTAAATT
ATATGCTTTTTCATTCTATAGATATAGAACCCGTTTGGATTGGCTTAAAATAAGTGGCTTTTAAGTT
AAGTGCTTAAAAGCATTTAATAAATGCTGGAACTTGTTTTATAAATAAGCAGTTACGTGATTGGATAA
AAGTGCTGAAACTGAAAAAAGCTGATGAAGTGTTTGGTAAAGAAGTGCTCAAACGGATGATTGTTAC
ATTTTGTCTTGTGTGTTTGCTATTTTTTCTGGGTTGGTAAATGGGAAGAAAGATGAGCTATTGAGC
CAATTATTTGTAAAAACTTTCCTCTTTCTCATTCCAATAAATCGACCTTTTCTTTAAACTAATAAACC
GACCACCCAAAAATAAAAAATTTAAAAACAGATCGCAACTAATTCATCTGCCCTTTAATTTTTTACCC
ACTTAGATTGATAAAAGTTATTCGAATATGTAAAAGTGTTTACTGAAAAATATGAGGGTGCGTAAA
GAAAGAAATGAAAGGAAAGAAAGGAGGGAAAATAATGAATGAAAGTGTAAAGAAAGAAATGAAAG
GAAAAGAGAGGAAAGTTACGAAGAAGACGAAGAAGAAAGCAGAGGCTGCTGTAACAAGAATGGAGAA
AAGAAAAAGATAGTATGTTGTAGGGTTTTCTACTGAGGGGTAATTTCGGGATTAAGAAAAATTATAAG
GGATAAAAATGTAATATACTTGGTCAAAGCAATATGGCTTTAAGCCAATTTTGAAAAGTTGGGTTT

FIG. 27 (Continued)

```
TCCAACTTATTGGTTTTGGCTTTTTTTAAGCAGATTTTAACTTTTTTAAGCTCTTTTTTTTGGTTGCC
AAACATTTCCACAAATTAAAAAGTGCCCATCCAAACAGGCTCATAATCACACATATGAACACCAGCAA
AGATAAACTAACAAGGAAAACCCAACATGGATTCTCCAAAACAACCAAATGACGATGTTAACTGTGTT
TGCACATAATTTCTTTATCCTAGGCTTGAGAGGGTGAAGCTTACAAGCATTCGCAGCCAAGCCAAAAT
AATTGGGACTATCGCCACAGTTGCAGGAGCCATGATCATGACGCTGGTACGAGGTCCAGTCATTGAAC
TATTTTGGACAAAAGGAAATTCCAGTCATGAATCTCAAAGTGGTGGGTTAAATCTAAGCCATGCTATC
AAAGGTTCCCTCTTGATAACAATTGGGTGCTTCAGTTGGGCAGCATTTATGATTTGCAGGTAACGAT
AGAACTTAGTTAGAGATAAGTTATTAGGAAATAAGCAGACATATCTGACTCTAGTACGATATGCATAG
GCAATCACACTGCGGACCTACCCTGCAGAGCTCTCACTCACTGCTTGGATATGCTTGTTGGGAACAGC
TGAGGGAGCTATAGTAGCGATGGTAATGGAGAGAGGAAAAGCTGCAGTGTGGGCCATAAAATGGGACA
CTAAGTTCTTGCAGCTGTATACAGTGTAAGTCAAACTTATGAGCAAGAGTAGATTAAATTTCTTAG
AACACAAGCATACAAGAAAAATTAAAAGTATCCATTCTTTAAATGTTTATCCATCCTATGTACCATAT
TGTCCAATTCTGTACCATATTGTTTATCCATTGTATGCACCATATTGCCCCGTTCTGTACTACTCTAT
GTGACAGAACTTGTTAACTAGACGTTCTACAGCTTATGCACATCATGTTTCTGCCAGCAGTATCTCTG
TATTTTTACAGTATCAGCTTGATACTGTTTTAATAAAATCTTCATCTTATAAAAAAAACAATATGT
TTCTAACTACTGTAGCATGAAACTTTACTTCTGCAACATGAGAGAAATGAGAAAACAAATGTAGACGC
ATAGCTTTTCCAATCACTCATGAAGTTAAGCCTGCCAAAAGCTTCTCACTTTCCATGTCACAATACAG
GGAATATTCTGTTCAGGACTCGCGTATTACATCCAAGGAGTCATAATGAAAGATAGGGGCCCTGTTTT
TGTCACAGCTTTCAATCCATTAAGCATGGTTATTGTAGCTATACTGAGTTCATTCATTCTACGTGAAC
AAATGAACCTGGGAAGGTAATTCTTAATTTCTTATAACACCTAAAGCTCTTATAAGTTACGACCAACA
CAAAACTAATGTAATACTTTCTACAGGGTACTTGGTGCTGTTGTAATCGTTTTAGGCCTTTACATTGT
CCTGTGGGGTAAAAGCAAGGATCAAAAATCTCCATCAACCGATGAACAAGCAATACCAACACAGGAAA
CAACACATGAAAACAAAATTGACAAGGAAAATTTAAGTCAGACAATTATCCACATCAGTCCATCAAGA
GGAACAACTGTTACCAAAGATGAAAGAATATAATGATTTTCTCTTCGGGGCTATATCTTCCAAATTCC
AAAAGGAAATCGGGCTACAGAGTAACCTCTTTATCTAAGAAATGAGCTCTTCTTCAGCTTCATCTAAG
AATTAATAGTTATTAGTTAAAGATGGTTTATGTATGAAAAGGAGTTTCTTTCTGGCATAAGGCAAGGA
AAAAGAATCTCAAGTCATGTGCCCAAAATTTGGGCCAGTTAAACAACCATTTTTGCAAACTTCTGTC
AGAACTATAGAATGACCAAACTATGTTAAGCCAACAGGCTTTTTCTTATGGTTTGTTAAACAGATATT
AACAGCAATAATCATGCCCAGATATGAAAATAAGGTGGATCCTGAACTTAAGATC
```

FIG. 28

Nitab4.5_0000062g0220.2 protein sequence (SEQ ID NO. 25):

```
MEGKGECGCSFFQRAKPYIAMISLQFGYAGMNIITKVSLNRGMSHYVLVVYRHAFATAVIAPFALILE
RKIRPKMSLMMFLQIFVLGLLGPVIDQNFYYAGLKFTSPTFSCAMSNMLPAMTFVMAVICRMEKVDIK
KVRCQAKVLGTIVTVAGAMLMTLYKGHVVNLLWSNHINSTTNSSISETSGATNSDKDWFKGSILLIFA
TFAWASFFILQNITMRKYTAPLSLTALVCFMGTLQSIAVTFVMEHKPSVWTIGFDMNLLAAAYAGIVS
SSIAYYVQGLVMEKRGPVFVTAFSPLMMIIVAIMGSFILAEKIYIGGILGAVLIVAGLYSVLWGKYKE
YKEKEIEESIIPEAVKGVIKGNNQVMILANNEAINDIEMQKTDANKIQTPVVAIGIPMPQPPMLAREE
PKA
```

FIG. 29

Nitab4.5_0000062g0220.2 coding sequence (SEQ ID NO. 26):

```
ATGGAAGGAAAGGAGAATGTGGTTGCAGCTTTTTTCAAAGGGCTAAGCCTTATATAGCCATGATTTC
CTTGCAATTTGGGTATGCAGGGATGAATATTATTACAAAAGTTTCTCTTAATAGGGGAATGAGTCATT
ATGTTCTTGTTGTGTATAGACATGCTTTTGCTACTGCAGTTATTGCTCCCTTTGCTCTTATTCTTGAA
AGAAAAATTAGGCCAAAGATGTCGCTCATGATGTTCTTGCAAATATTCGTATTGGGTCTTCTTGGGCC
GGTGATTGATCAAAATTTTTACTATGCTGGACTGAAATTCACATCCCCAACATTTTCATGTGCTATGA
GCAACATGCTACCTGCTATGACATTTGTCATGGCAGTGATCTGCAGGATGGAGAAAGTTGACATAAAG
AAAGTTAGATGCCAAGCAAAAGTGTTGGGAACAATAGTGACAGTAGCTGGAGCCATGTTAATGACATT
GTACAAAGGCCATGTTGTTAACTTGTTATGGTCAAATCACATCAATTCTACTACTAATTCTAGTATCT
CAGAAACTAGTGGAGCTACTAATTCTGATAAAGATTGGTTTAAAGGTTCCATTCTCCTAATTTTTGCA
ACTTTTGCTTGGGCTTCTTTCTTCATTCTTCAGAATATCACAATGAGGAAATACACAGCTCCACTTTC
TTTAACTGCACTTGTTTGCTTTATGGGAACCTTGCAATCTATAGCAGTCACATTTGTAATGGAGCACA
```

FIG. 29 (Continued)

```
AACCTTCTGTTTGGACTATTGGTTTTGACATGAATCTACTAGCTGCTGCCTATGCTGGAATAGTATCA
TCAAGTATAGCATACTATGTACAAGGTCTTGTAATGGAGAAAAGAGGACCTGTTTTTGTGACTGCTTT
TAGTCCTTTAATGATGATTATTGTTGCAATCATGGGCTCTTTTATTCTTGCTGAAAAAATCTATATTG
GAGGAATTCTTGGTGCAGTGCTCATAGTGGCAGGGCTATACTCAGTTCTGTGGGGAAAATACAAGGAG
TATAAGGAGAAGGAAATTGAGGAGTCAATAATTCCTGAAGCAGTGAAGGGAGTAATTAAAGGAAACAA
TCAAGTGATGATTCTTGCAAATAATGAAGCAATTAATGATATAGAAATGCAAAAAACTGATGCAAACA
AAATCCAAACTCCAGTAGTAGCCATCGGTATACCAATGCCACAGCCCCCATGTTAGCTAGGGAAGAA
CCAAAAGCTTAA
```

FIG. 30

Nitab4.5_0000062g0220.2 genomic sequence (SEQ ID NO. 27):

```
TCTATAAATATGTTGCATGTCTCACTTCTTTTCCTTAGGAAAAACACAAATCTCCTCTTATTAGAGTT
TTTTCCTCGCTTTTCACTTGATCACTTCTTTAATCTCTTCTCTTAAAGACTTTAACATTCAGCTAAAA
GAATTACAAAAAAAAAAAAAAAAAATGGAAGGAAAAGGAGAATGTGGTTGCAGCTTTTTCAAAGGG
CTAAGCCTTATATAGCCATGATTTCCTTGCAATTGGGTATGCAGGGATGAATATTATTACAAAAGTT
TCTCTTAATAGGGGAATGAGTCATTATGTTCTTGTTGTGTATAGACATGCTTTTGCTACTGCAGTTAT
TGCTCCCTTTGCTCTTATTCTTGAAAGGTAAATTACCCCACAAAAATAAGAAATTTTGAAGCTTTAGT
TACAATTCTTGAAAGATCAGCAAAAGCAGATAAATCTTTAAATTTTTTGACAGAAAAATTAGGCCAAA
GATGTCGCTCATGATGTTCTTGCAAATATTCGTATTGGGTCTTCTTGGGTGAGTCTCTTTTTCTATAT
ATATCCTATAAGTATAACTTTATACTTTTTCCACAAATTGGAAAAGTGAAAAATTGTACTAATAATCA
TTTCAATTTAAACAGGCCGGTGATTGATCAAAATTTTTACTATGCTGGACTGAAATTCACATCCCCAA
CATTTCATGTGCTATGAGCAACATGCTACCTGCTATGACATTGTCATGGCAGTGATCTGCAGGTAT
ACATATTAATACTATATATTATTTTTCTTCTTTCTCTACTTCTTCAAGTTTTGGACTAATTTATAAA
GGGTTAATTTTAGGATGGAGAAAGTTGACATAAAGAAAGTTAGATGCCAAGCAAAAGTGTTGGGAACA
ATAGTGACAGTAGCTGGAGCCATGTTAATGACATTGTACAAAGGCCATGTTGTTAACTTGTTATGGTC
AAATCACATCAATTCTACTACTAATTCTAGTATCTCAGAAACTAGTGGAGCTACTAATTCTGATAAAG
ATTGGTTTAAAGGTTCCATTCTCCTAATTTTTGCAACTTTTGCTTGGGCTTCTTTCTTCATTCTTCAG
GTGTGTAATAGTACACTTATACTTCCCTTTTTTTTTCATTCTCTTTTCAAGAATATCCAAGAAAAAA
TCTTCTTTTTGTTTTGTTTTGTTTCCTAAATGGTGATGTAATATTTGTGCAGAATATCACAATGAG
GAAATACACAGCTCCACTTTCTTTAACTGCACTTGTTTGCTTTATGGGAACCTTGCAATCTATAGCAG
TCACATTTGTAATGGAGCACAAACCTTCTGTTTGGACTATTGGTTTTGACATGAATCTACTAGCTGCT
GCCTATGCTGTAAGTTTAATTTCTTCTTTTCAATTTGGGTTATTGGTTTTGCCAAGATGATATATACG
AAAATAATGATTAACAAATTATTTAATTTTCAGGGAATAGTATCATCAAGTATAGCATACTATGTACA
AGGTCTTGTAATGGAGAAAAGAGGACCTGTTTTTGTGACTGCTTTTAGTCCTTTAATGATGATTATTG
TTGCAATCATGGGCTCTTTTATTCTTGCTGAAAAAATCTATATTGGAGGGTAATTTCAAATCTTTTCT
GGTTTTATTTTCATTTAGTAAACTGAATATTAATTATTTTCTCTTTTGGGTTCAGAATTCTTGGTGCA
GTGCTCATAGTGGCAGGGCTATACTCAGTTCTGTGGGGAAAATACAAGGAGTATAAGGAGAAGGAAAT
TGAGGAGTCAATAATTCCTGAAGCAGTGAAGGGAGTAATTAAAGGAAACAATCAAGTGATGATTCTTG
CAAATAATGAAGCAATTAATGATATAGAAATGCAAAAAACTGATGCAAACAAAATCCAAACTCCAGTA
GTAGCCATCGGTATACCAATGCCACAGCCCCCATGTTAGCTAGGGAAGAACCAAAAGCTTAATTTTT
GGTTGATAAATTAGTAGCAAATTAAAAAGAGCAGAAGAAAGAGAGGCATTTTGCCTTTTACATTTA
AATTTCTTTTCCTGTTCTTCTTCTTCTTCCTTTTTTTT
```

FIG. 31

Nitab4.5_0001674g0010.2 protein sequence (SEQ ID NO. 28):

```
MSTRERLLKFVKEAQPYLAVILLQFGYAGSAIIAKSALNHGMSHFTFAVYRNAFATLVFAPFAIVLER
KIRPNMTVSIFLKIMLLGLLEPVIDQNLYYTGLRYTTATFATAMCNVLPALTFMLAWILRLEKVNVRR
LSSQAKIVGTTVTFGGAMIMTLIGGPTIGLPWTRHLLSTTTATSTSLTELQPIKGALFIAAGCICWAC
FYNLQAITLKTYPAALSLTCLICSAGAVQGTALTLVAERGNTSIWSIHFDTKLLSYVYSGMVTSGVGY
YVSGLIMKDKGPVFVTAFNPLNMVIVAILSSFILSEQLNLGRVLGGAIIVIGLYLIIWGKSKDQKLSK
YSSTDDVEVEPVGKETSTTKSLNQTKAGDEAV
```

FIG. 32

Nitab4.5_0001674g0010.2 coding sequence (SEQ ID NO. 29):

ATGTCAACAAGGGAAAGGCTATTGAAGTTTGTGAAGGAAGCACAGCCATATTTGGCAGTGATATTGTT
GCAGTTTGGATATGCAGGATCAGCTATAATAGCTAAGTCTGCTCTAAATCATGGCATGAGCCATTTCA
CCTTTGCCGTCTACAGAAATGCTTTTGCCACTCTTGTCTTTGCTCCTTTTGCCATAGTCTTGGAAAGG
AAAATAAGGCCAAACATGACTGTATCCATTTTCTTGAAGATTATGTTGCTGGGCTTACTGGAGCCAGT
CATCGACCAGAACTTGTACTACACAGGGTTGAGATACACTACTGCAACTTTTGCAACGGCAATGTGCA
ATGTGCTTCCTGCCCTCACCTTTATGTTGGCTTGGATCCTAAGGCTTGAGAAGGTGAACGTAAGGAGA
TTATCAAGCCAAGCAAAATAGTGGGAACAACAGTGACATTTGTGGTGCCATGATTATGACACTAAT
TGGAGGACCTACAATTGGATTGCCCTGGACCAGACATCTCCTTCTACTACAACTGCTACTAGCACTT
CTCTGACTGAGCTACAACCCATTAAGGGTGCTCTCTTCATCGCAGCAGGTTGTATCTGTTGGGCCTGC
TTTTACAACCTTCAGGCAATTACCTTGAAGACATACCCTGCGGCATTATCGCTCACTTGTTTGATTTG
CTCGGCGGGAGCGGTGCAAGGCACAGCTCTGACCCTTGTGGCTGAAAGGGGAAATACATCAATCTGGT
CCATCCACTTCGACACTAAACTCTTATCTTACGTTTATAGTGGAATGGTCACTTCTGGAGTGGGCTAT
TATGTTTCTGGATTGATAATGAAGGATAAAGGGCCTGTTTTCGTCACTGCTTTTAATCCTCTAAACAT
GGTAATAGTCGCAATTTTGGGTTCATTCATTTTATCCGAGCAGCTAAACTTGGGAAGGGTTTTGGGAG
GGGCAATCATTGTAATTGGACTGTATTTAATAATATGGGGCAAGAGCAAGGACCAAAAATTGTCTAAG
TACAGCAGCACTGACGATGTTGAAGTCGAACCTGTTGGTAAAGAAACATCTACAACGAAGTCTTTAAA
TCAGACAAAAGCTGGAGACGAAGCTGTTTAA

FIG. 33

Nitab4.5_0001674g0010.2 genomic sequence (SEQ ID NO. 30):

CGCAAGATGGGGTTTGTGAGTTACAAAGCATTGCTTACCCAATACTTTATCTAGCTAGTTGTAATATT
AAAAAAGGAAAAGAAAGCTACTGTTCAGTAAAGAAAAAGAAGCATGTCAACAAGGGAAAGGCTATTG
AAGTTTGTGAAGGAAGCACAGCCATATTTGGCAGTGATATTGTTGCAGTTTGGATATGCAGGATCAGC
TATAATAGCTAAGTCTGCTCTAAATCATGGCATGAGCCATTTCACCTTTGCCGTCTACAGAAATGCTT
TTGCCACTCTTGTCTTTGCTCCTTTTGCCATAGTCTTGGAAAGGTCTTTAACATATTCATGCTGTGCA
ACTCTCTTTTTTACTTAGATGAAGTTATTTTGGTTTTAAAAAAAAATGATTCTCTGGTTTCTCTGGT
TGTTTAACACACAGGAAAATAAGGCCAAACATGACTGTATCCATTTTCTTGAAGATTATGTTGCTGGG
CTTACTGGAGTAAACATCTCTGACATTAATAAATTAGCAATTTTTTCCACTGAAAACAAAAGCTGCCT
TTTTTGCAGATTGTCTGATATTACACTGAAAACATAAGCTGCCTTTTTTTTATTGCAGGCCAGTCATC
GACCAGAACTTGTACTACACAGGGTTGAGATACACTACTGCAACTTTTGCAACGGCAATGTGCAATGT
GCTTCCTGCCCTCACCTTTATGTTGGCTTGGATCCTAAGGTATTATTTACCTATCTTGTCTGCAACTT
ATTTTGTCACATGCACGTTCATATTCAACGTTTAAAAGGAGAAAAAAATTGATAACTACGATCGAT
GTATTTAACTCAACTATTGGATCAGCAAAAAGAACCAAAAAAGTATCAGCAAATATGGGTGTCGTGT
AACAAAAGAGTCCATGGGAGTTTTGAGCCGTCTTATCGTCCAAAATGTTCCCTTTGTTAGTAATGAC
TAGAAAGTACGGGTTGATATAAACCCCTGTACAGCTTAAAATACAATTATTAATGCATCAACTCAACA
AAATAAGTACTCCCTCAATTTCTATATATGATACTCTTTCTTGTTTAATTTGTTCTAAAAAATATG
ACAATTCTCAATATTTGGAAACTTTTTAATTTAAACATTCATTTATCATAACTAACATGCTCTTATA
TCCAAAGAATTATGCTAGATATTTTTAAGAAAATAGTTACTCCCTCATTTTAATTTATGTGAACCTA
TATCCTTTTTAATCCGTACAAAAAGAATGACATCTTTTCCTATTTGGAAACAATTTACCTTTATGCA
ATGTTTTATAGCCACACAAAATATATGTCTCATTTTATACAAGTTCAAAAGTTTTCTCTCTTTTCTTA
AATTTCGTGCCCAGTCAAATAGGTTCGCATAAATTGAAACAGAGAGAGTATATCAAATAGTATCATAT
GAAATAAATGAGGTAATACGATTTAAAGTTCGGATATTCAAATAGTATATTTAATTTCTACTATTAGA
AATTATTTAAAATTACCCTCTGTTATATTATTTGATCAAAACAATCTCTGCCATCTTACTATTCAAAC
AACAGATATATCCCTAACTTGACGGACTGGACACTTGGCACGCATCCAAGGGTGTTAGTCCATTTGGT
CTTAAATTAGACCCGACTTATCCCATTACCCAGTACCCGATCCATTAAATTTGACCCGCCAAATACAG
ATTACTCTTTTCATTCAAAAAATCAGAGAGGCCCATTTTGTCTTCTTCAAAGTTCTCAAAATCCTCAT
AATGGTGTTTCTAGTTTCCTTAGCAAATCAATATTTCAATGTTGTAATCACAATTATAGACTCAAAA
CAGTAACAATAAATGAATTTACCAATATATTTCGACTTCTTTTTAGATCTAGATTCAAAACCAAAG
ATTCAACATATCATATATGGTGAGTTTCGACTTTTACCATCAACTTCTTCCAACAAACAACAATATAA
TTTAGATCTAAGCACAAGAAACAATACAAAATCAGATTTCAATAATATAAACCCCAAGTCAGTCATTG
AACCAAAGGACCCATTTGAACCCATACTTGGAAATGAGCTTCGAAACCCTTCAATGGAGGTGCAGCTT

FIG. 33 (Continued)

```
TCCAATTCTTCAAATCAAGACACTGATGTACCATTTCAAAAAGGTTTAAGCTCTGTTCCATTAGCTTC
AATTGATTTCAACACAAAATGCATTAGATTTATTTTCTACTGAATGAGAGATAGAGAAGAACAACAG
ATTATAGTGCTTATCTGAACTCAGTCTCTTCTGGGTACCGGGTAATAGGGCGGGTCGGGTCGGGTCTA
ATTTATGACCAAGTGGACCAACAACCTTAGATGCGTGCCATGTGTCCAGTCCGTCAAGTTAGGGGTAT
ATGTGTTTGAATAGTAAGACGGCAGGGGTTCTTTTGATCCAATAGTATAACAGAGGATAATTTATAC
AATTTCTAATAATTCGGTTTAAAGTTGGTTACATGAGTAGGTAAATGTGGGGAATAATAGGTAACTCC
AACGTGTAGGCTTGAGAAGGTGAACGTAAGGAGATTATCAAGCCAAGCAAAAATAGTGGGAACAACAG
TGACATTTGGTGGTGCCATGATTATGACACTAATTGGAGGACCTACAATTGGATTGCCCTGGACCAGA
CATCTCCTTCTACTACAACTGCTACTAGCACTTCTCTGACTGAGCTACAACCCATTAAGGGTGCTCT
CTTCATCGCAGCAGGTTGTATCTGTTGGGCCTGCTTTTACAACCTTCAGGTACTATCCTTAATCATTC
TTAAAAACTTAAGTTATTAAATGATTCACTATAGATGACAATGTTGAGACCAGCAGGATAATCTACGT
AGTTTTTATTTTCGTTAACATTGTTATTTTTTCTTATTTTATGTTTGTTTGTTCTACAAACAGGCAA
TTACCTTGAAGACATACCCTGCGGCATTATCGCTCACTTGTTTGATTTGCTCGGCGGGAGCGGTGCAA
GGCACAGCTCTGACCCTTGTGGCTGAAAGGGGAAATACATCAATCTGGTCCATCCACTTCGACACTAA
ACTCTTATCTTACGTTTATAGTGTAAGCATGAACATTGTCTAGTATGTGCCATTATTCATCTTTATAT
TTATCACCTATTAGTCACGACTTTCCTAGAGCTTACTTTAGTTCGCGCAAAACAAATTTCACGGATG
CAGGGAATGGTCACTTCTGGAGTGGGCTATTATGTTTCTGGATTGATAATGAAGGATAAAGGGCCTGT
TTTCGTCACTGCTTTTAATCCTCTAAACATGGTAATAGTCGCAATTTTGGGTTCATTCATTTTATCCG
AGCAGCTAAACTTGGGAAGGTATGTACATGCTTATTACTTTATTAATATTATTATTATTATTATTAT
TATTATTATTATTATTATTATTATTTATTTTTATTTTTATTTTTATTTTTTGGGAATGAACAAT
TGATTATCGCGATATCATTAATGATTTTTATTTCAAGTAGTAACGTTGCGTGCAGAGGAGGTTGTCTA
ATATGGTGCCGGATGAATATATAGGGTTTTGGGAGGGGCAATCATTGTAATTGGACTGTATTTAATAA
TATGGGGCAAGAGCAAGGACCAAAAATTGTCTAAGTACAGCAGCACTGACGATGTTGAAGTCGAACCT
GTTGGTAAAGAAACATCTACAACGAAGTCTTTAAATCAGACAAAAGCTGGAGACGAAGCTGTTTAAGA
AGAAATGGCGAGGATTTAAGTTAGGGGGATATGTAGAAATAATAACTCCTTTTTAATGGTTGGGTTTT
AGATAATGCTCAAGTTCCCCGCACAGAGGGATGTTGCTTTTGCATTTCTTATTAAAGAGAATTGGAAA
AATGACAAAGTGCGTTTAGCATCCGCGAAGCATTTGTCAATTTAGTCTTCTGATGAAATGGACGTCCG
ATTTATTGCAAAT
```

FIG. 34

*Arabidopsis thaliana* WAT1 protein sequence (SEQ ID NO. 31):

MADNTDNRRSLWGVPEKLQLHIAMLTLQFGYAGFHVVSRAALNMGISKLVFPVYRNIIALLLLPFAY
FLEKKERPAITLNFLIQFFFLALIGITANQGFYLLGLDNTSPTFASSMQNSVPAITFLMAALLRIEKV
RINRRDGISKILGTALCVAGASVITLYKGPTIYTPASHLHAHLLTTNSAVLAPLGNAAPKNWTLGCIY
LIGHCLSWSGWLVFQAPVLKSYPARLSVTSYTCFFGIIQFLIIAAFCERDSQAWVFHSGWELFTILYA
GIVASGIAFAVQIWCIDRGGPVFVAVYQPVQTLVVAIMASIALGEEFYLGGIIGAVLIIAGLYFVLYG
KSEERKFAALEKAAIQSSAEHGIERAPVSRNSIKSSITTPLLHQSTDNV

FIG. 35

First EamA domain from *Arabidopsis thaliana* WAT1 protein (residues 32-161) (SEQ ID NO. 32):

AGFHVVSRAALNMGISKLVFPVYRNIIALLLLPFAYFLEKKERPAITLNFLIQFFFLALIGITANQG
FYLLGLDNTSPTFASSMQNSVPAITFLMAALLRIEKVRINRRDGISKILGTALCVAGASVIT

FIG. 36

Second EamA domain from *Arabidopsis thaliana* WAT1 protein (residues 210-339) (SEQ ID NO. 33):

LSWSGWLVFQAPVLKSYPARLSVTSYTCFFGIIQFLIIAAFCERDSQAWVFHSGWELFTILYAGIVAS
GIAFAVQIWCIDRGGPVFVAVYQPVQTLVVAIMASIALGEEFYLGGIIGAVLIIAGLYFVLY

FIG. 37

First EamA domain from Nitab4.5_0010919g0010.2 protein (residues 31-160) (SEQ ID NO. 34):

AGMYIVTMMCFKRGMSHWILVVYRHAFATLAVAPFAIVLERKIRPKMTLRVFIKILALGFLEPVIDQN
LYYVGLKSTTATYASAFVNLLPAVTFILAVIFRIEKVNLKKKSSMAKVIGTAITVAGAMVMT

FIG. 38

Second EamA domain from Nitab4.5_0010919g0010.2 protein (residues 196-329) (SEQ ID NO. 35):

LISCIVGWSGFFIVQSMTLKEYPAELSLAAWVCVMGIVEGGIVALIMERDWNAWKIGFDARLLAAAYS
GIVCSGIAYYVQSIVNKVKGPVFVTAFSPLSMVITSVLAAIILAESVHLGSCIGAVIIVMGLYSVV

FIG. 39

Artificial miRNA sequence (SEQ ID NO. 36):

ACAAACACACGCTCGGACGCATATTACACATGTTCATACACTTAATACTCGCTGTTTTGAATTGATGT
TTAGGAATATATATGTAGATAATATTTTAATAAAGACCCATTCACAGGTCGTGATATGATTCAATTA
GCTTCCGACTCATTCATCCAAATACCGAGTCGCCAAAATTCAAACTAGACTCGTTAAATGAATGAATG
ATGCGGTAGACAAATTGGATCATTGATTCTCTTTGATGGTCTTTAGTAAAATATTACACTCTCTCTTT
TGTATTCCAATTTTCTTGATTAATCTTTCCTGCACAAAAACATGCTTGATCCACTAAGTGACATATAT
GCTGCCTTCGTATATATAGTTCTGGTAAAATTAACATTTGGGTTTATCTTTATTTAAGGCATCGCCA
TG

METHOD FOR DECREASING ALKALOID CONTENT OF A TOBACCO PLANT

CROSS REFERENCE TO RELATED APPLICATIONS

This is a U.S. National Phase application claiming priority to PCT/GB2020/051180, filed May 14, 2020, the entire contents of which are hereby expressly incorporated by reference in its entirety including, without limitation, the specification, claims, and abstract, as well as any figures, tables, or drawings thereof.

FIELD OF THE INVENTION

The present invention relates to methods of modulating the alkaloid content e.g. pseudooxynicotine content of a plant or part thereof. The invention also extends to methods of modulating the expression and/or activity of polypeptides which modulate alkaloid content within plants. Alternatively, the invention provides methods of modulating the expression and/or activity of genes which encode polypeptides which modulate alkaloid content within plants. The invention also extends to constructs, which can be used to modulate the polypeptides. The invention further relates to plant cells and plants modified to achieve a modulation in alkaloid content. The invention also relates to a processed and harvested leaf from such modulated plants and use thereof in a delivery system, including combustible smoking articles.

BACKGROUND

Alkaloids are a group of naturally occurring compounds which mostly contain basic nitrogen atoms and are produced by a large variety of organisms including bacteria, fungi, plants and animals.

Alkaloids may be classified according to the similarity of the carbon skeleton e.g. indole-, isoquinoline- and pyridine-like. Pyridine derivatives are one class of monomeric alkaloids; this class includes simple derivatives of pyridine, polycyclic condensed and noncondensing pyridine derivatives and sesquiterpene pyridine derivatives. Examples are nicotine, nornicotine, pseudooxynicotine, anabasine, myosmine and anatabine.

Most of the known biological functions of alkaloids are related to protection. Neuroactive molecules, such as caffeine, cocaine, morphine, and nicotine, act as defence compounds against invading predators. The accumulation of these alkaloids is the result of signal transduction cascades that monitor gene expression, enzyme activities, and alkaloid concentrations. The fine-tuning of alkaloid content in the plant involves negative feedback loops and degradative pathways.

Nicotine occurs naturally in several varieties of plants but is found at the highest level in the tobacco plant. Cultivated tobacco produces 2-4% alkaloids of total dry weight. Nicotine is produced in wild and cultivated *Nicotiana* species and plays an important role in plant defence against herbivores and insects (Voelckel et al. (2001) Oecologia 127(2): 274-280, incorporated herein by reference). It accounts for ~90% of the total alkaloid content. The remaining 10% of the alkaloid pool is mostly constituted by the structurally related compounds nornicotine, anatabine, anabasine and pseudooxynicotine (PON).

The regulation of alkaloid content in tobacco is complex. Several factors including genotype, environment, fertilization and agronomic practices (e.g. topping) affect alkaloid levels in tobacco plants. Some key regulators of nicotine biosynthesis are well characterized, for example putrescine N-methyltransferase (PMT), which plays a pivotal role in this pathway, is activated by members of the ethylene responsive factor (ERF) superfamily, the largest transcription factor family in the tobacco genome (Rushton et al. (2008) Plant Physiol. 147(1): 280-295 incorporated herein by reference). Other transcription factors that induce alkaloid biosynthesis belong to the MYC2-like basic helix-loop-helix (bHLH) family. MYC2-like bHLHs regulate alkaloid levels directly, through the Gbox-mediated binding and activation of alkaloid structural genes, and indirectly, through the activation of ERFs.

Tobacco pyridine alkaloids are precursors of tobacco-specific nitrosamines (TSNAs) that form during the post-harvest leaf curing. The four primary TSNAs found in cured tobacco leaves are N'-nitrosonornicotine (NNN), N'nitrosoanatabine (NAT), N'-nitrosoanabasine (NAB) and 4-(methylnitrosamino)-1-(3-pyridyl)-1-butanone (NNK). During the post-harvest leaf curing, reactions between pyridine alkaloids and nitrosating species leads to the formation of tobacco-specific nitrosamines (TSNAs). PON is likely to function as the direct precursor in the synthesis of the TSNA NNK (Bush et al., 2001 incorporated herein by reference). Reducing the production and accumulation of nornicotine and PON is of high importance. The CYP82E family of nicotine demethylase genes is one of the primary regulators of nicotine to nornicotine conversion, and altering their activity or accumulation may result in a decrease in NNN levels. However, no enzymes or genes responsible for producing PON have been identified thus far.

As described in the Examples, the inventors sought to investigate genes responsible for alkaloid and/or TSNA precursor synthesis, with the aim of modulating alkaloid content in plants, e.g. decreasing pseudooxynicotine content in tobacco plants.

SUMMARY OF THE INVENTION

It has been surprisingly found that by modulating the activity or expression of a gene encoding a Walls are thin 1-related (WAT1-related) protein the alkaloid content and/or TSNA content or precursor of TSNA content of plants can be modulated. The WAT1-related gene(s) as taught herein, for example Nitab4.5_0010919g0010.2, is a regulator of alkaloid and TSNA precursor content in cultivated tobacco. In particular the WAT1-related gene(s) as taught herein, for example Nitab4.5_0010919g0010.2, is a regulator of PON in cultivated tobacco. Nitab4.5_0010919g0010.2 encodes a WAT1-related protein according to the present invention. Nitab4.5_0001086g0030.2, Nitab4.5_0003292g0030.2, Nitab4.5_0004697g0010.2, Nitab4.5_0005998g0010.2, Nitab4.5_0011862g0010.2, Nitab4.5_0000062g0210.2, Nitab4.5_0008142g0020.2, Nitab4.5_0000062g0220.2 and Nitab4.5_0001674g0010.2 are homologues of Nitab4.5_0010919g0010.2 according to the present invention. WAT1-related proteins according to the present invention contain a conserved domain termed an EamA domain.

According to the present invention, tobacco products with modulated alkaloid content and commercially desirable traits sought after by consumers of tobacco products can be produced.

In some instances, consumers may desire a product with low levels of alkaloid content e.g. low levels of TSNA precursors.

The present invention may be particularly useful in the field of plant molecular farming, where plants (such as tobacco and other *Nicotiana* spp.) are used for the production of proteins, peptides, and metabolites e.g. for the production of therapeutics and pharmaceuticals such as antibiotics, virus like particles, or neutraceuticals or small molecules. Tobacco has been used for the development of an HIV-neutralising antibody in an EU-funded project called PharmPlant and *Medicago* Inc., Canada have worked on a tobacco-based platform for the production of virus-like particles for flu vaccine manufacture.

Thus, a plant according to the present invention may be used for molecular farming to reduce or eliminate the presence of PON, and/or other nicotinic alkaloids. The use of a low nicotine (or a low alkaloid, such as low PON) plant or rootsock is beneficial in molecular farming and would reduce downstream processing costs associated with purification.

The present inventors have surprisingly determined a method for modulating the alkaloid content, e.g. pseudooxynicotine content, of a plant (e.g. a tobacco plant) by modulating the activity or expression of a gene encoding a WAT1-related protein. The alkaloid content (e.g. the content of one or more of PON, nicotine, nornicotine, anabasine, myosmine or anatabine) of a plant (e.g. tobacco plant) may be decreased by decreasing the activity or expression of a gene encoding a WAT1-related protein or may be increased by increasing the activity or expression of gene encoding a WAT1-related protein. Prior to the present invention it had not been known that modulation of the activity or expression of a gene encoding a WAT1-related protein as described herein could be used to modulate alkaloid content or modulate PON content in particular.

In one aspect, there is provided a method of modulating (e.g. decreasing) the alkaloid content of a plant or a part thereof, or a cell or cell culture, the method comprising modifying said plant or a cell (or cell culture) by modulating the activity or expression of at least one gene encoding a WAT1-related protein.

In one aspect, there is provided a method of modulating (e.g. decreasing) the alkaloid content of a plant or a part thereof, or a cell or cell culture, the method comprising modifying said plant or a cell or cell culture by modulating the activity or expression of at least one WAT1-related protein.

In another aspect, there is provided a method of modulating (e.g. decreasing) the content of a tobacco specific nitrosamine (TSNA) precursor in a tobacco plant or plant part thereof, or cell or cell culture the method comprising modifying said plant or a cell culture by modulating the activity or expression of at least one gene encoding a WAT1-related protein.

In another aspect, there is provided a method of modulating (e.g. decreasing) the content of a tobacco specific nitrosamine (TSNA) precursor in a tobacco plant or plant part thereof, or cell or cell culture the method comprising modifying said plant or a cell or cell culture by modulating the activity or expression of at least one WAT1-related protein.

In a further aspect there is provided the use of at least one gene encoding a WAT1-related protein for modulating alkaloid content of a cell or plant or part thereof or a cell culture.

In yet another aspect, there is provided a method for producing a plant or part thereof, a cell culture, a plant propagation material, a leaf, a cut harvested leaf, a processed leaf or a cut and processed leaf which has modulated (e.g. decreased) alkaloid content, the method comprising modifying said plant or cell culture to modulate the activity or expression of at least one gene encoding a WAT1-related protein.

In a further aspect there is provided the use of at least one gene encoding a WAT1-related protein for modulating alkaloid content of a cell or plant or part thereof or a cell culture.

In yet another aspect, there is provided a method for producing a plant or part thereof, a cell culture, a plant propagation material, a leaf, a cut harvested leaf, a processed leaf or a cut and processed leaf which has modulated (e.g. decreased) alkaloid content, the method comprising modifying said plant or cell culture to modulate the activity or expression of at least one WAT1-related protein.

Suitably the cell may be a plant cell. Suitably, the cell may be a tobacco plant cell. Suitably, the alkaloid content may be modulated (e.g. decreased) in comparison to a plant or cell culture which has not been modified to modulate the activity or expression of the at least one gene encoding a WAT1-related protein.

In a further aspect, there is provided a plant or part thereof or a cell culture which has been modified to achieve a modulation (e.g. decrease) in alkaloid content in comparison to an unmodified plant or unmodified cell culture, wherein the modification is the reduction of the activity or expression of at least one gene encoding a WAT1-related protein.

In a further aspect, there is provided a plant propagation material obtainable from a plant according to the present invention or from a plant or cell culture produced by the method according to the present invention.

In a further aspect, there is provided a method or use according to the present invention, or a plant or part thereof or a cell culture according to the present invention, or a plant propagation material according to the present invention, wherein the alkaloid content of the plant is decreased in comparison to a plant or cell culture which has not been modified to modulate the activity or expression of at least one gene encoding a WAT1-related protein.

Suitably, the activity or expression of at least one gene encoding a WAT1-related protein may be decreased in comparison to a plant or cell culture which has not been modified to modulate the activity or expression of the at least one gene encoding a WAT1-related protein.

Suitably, the plant may be modified to decrease the activity or expression of at least one gene encoding a WAT1-related protein and the plant or cell culture exhibits decreased alkaloid content in comparison to a plant or cell culture which has not been modified to modulate the activity or expression of the at least one gene encoding a WAT1-related protein.

Suitably, the alkaloid content of the plant or cell culture may be increased in comparison to a plant which has not been modified to modulate the activity or expression of the at least one gene encoding a WAT1-related protein.

Suitably, the plant may be modified to increase the activity or expression of at least one gene encoding a WAT1-related protein and the plant or cell culture exhibits increased alkaloid content in comparison to a plant or cell culture which has not been modified to modulate the activity or expression of the at least one gene encoding a WAT1-related protein.

Suitably, the total alkaloid content of the plant or cell culture may be modulated (e.g. decreased). Suitably, the content of one or more alkaloids may be selected from PON, nicotine, nornicotine, anabasine, myosmine and anatabine is modulated (e.g. decreased); preferably the content of PON, nicotine and/or nornicotine is modulated (e.g. decreased); preferably the content of PON is modulated (e.g. decreased).

In some embodiments two or more (or three or more) alkaloids selected from nicotine, nornicotine, PON, anabasine, myosmine and anatabine is modulated (e.g. decreased).

In one aspect, the plant or plant cell is from the Solanaceae family.

Suitably, the plant or plant cell may be from the *Nicotiana* genus.

Suitably, the PON content may be modulated. Suitably, the PON content may be decreased.

In one aspect there is provided a method or use according to the present invention, a plant or part thereof or a cell culture according to the present invention, or a plant propagation material according to the present invention wherein the at least one gene encoding a WAT1-related protein encodes a polypeptide which comprises an amino acid sequence as set out in SEQ ID NO. 1, 4, 7, 10, 13, 16, 19, 22, 25 or 28 or a functional variant or functional fragment or orthologue thereof; or
wherein the at least one gene encoding a WAT1-related protein encodes a polypeptide which comprises an amino acid sequence which has at least 80% identity to SEQ ID NO. 1, 4, 7, 10, 13, 16, 19, 22, 25 or 28; or
wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30 or a functional variant or functional fragment or orthologue thereof; or
wherein the at least one gene encoding a WAT1-related protein comprises a nucleotide sequence which has at least 80% identity to SEQ ID NO. 2, 3, 5, 6, 8, 9, 11, 12, 14, 15, 17, 18, 20, 21, 23, 24, 26, 27, 29 or 30.

In a further aspect there is provided a method or use according to the present invention, a plant or part thereof or cell culture according to the present invention, or a plant propagation material according to the present invention wherein an additional gene encoding a WAT1-related protein is also modulated, wherein the additional gene encodes a polypeptide which comprises an amino acid sequence as set out in SEQ ID NO. 1, 4, 7, 10, 13, 16, 19, 22, 25 or 28 or a functional variant or functional fragment or orthologue thereof; or
wherein the additional gene encodes a polypeptide which comprises an amino acid sequence which has at least 80% identity to SEQ ID NO. 1, 4, 7, 10, 13, 16, 19, 22, 25 or 28; or
wherein the additional gene comprises a nucleotide sequence as set out in SEQ ID NO. 2, 3, 5, 6, 8, 9, 11, 12, 14, 15, 17, 18, 20, 21, 23, 24, 26, 27, 29 or 30 or a functional variant or functional fragment or orthologue thereof; or
wherein the additional gene comprises a nucleotide sequence which has at least 80% identity to SEQ ID No. 2, 3, 5, 6, 8, 9, 11, 12, 14, 15, 17, 18, 20, 21, 23, 24, 26, 27, 29 or 30.

In one aspect there is provided the use of a plant or part thereof or cell culture according to the present invention, or of a plant produced by the method according to the present invention to breed a plant.

In another aspect there is provided the use of a plant or part thereof or a cell culture according to the present invention, or of a plant produced by the method according to the present invention for production of a product.

In yet another aspect there is provided the use of a plant or part thereof according to the present invention, or of a plant produced by the method according to the present invention to grow a crop.

In another aspect there is provided the use of a plant or part thereof according to the present invention, or of a plant produced by the method according to the present invention to produce a leaf.

In another aspect there is provided a harvested leaf of a plant according to the present invention, or obtainable from a plant propagated from a propagation material according to the present invention, or obtainable from a plant obtained by a use according to the present invention, or obtainable from a plant produced by the method according to the present invention.

Suitably, the harvested may be a cut harvested leaf.

In another aspect there is provided a processed leaf, preferably a processed tobacco leaf, preferably a non-viable processed tobacco leaf:
  obtainable from a plant obtainable from a use according to the present invention;
  obtainable by processing a plant according to the present invention;
  obtainable from a plant propagated from a plant propagation material according to the present invention; or
  obtainable by processing a harvested leaf of a plant according to the present invention; or
  obtainable from a plant produced by the method according to the present invention.

Suitably, the leaf may be processed by curing, fermenting, pasteurising or a combination thereof.

Suitably, the content of one or more TSNAs selected from NNK, NNN, NAT and NAB may be decreased in the processed leaf, preferably the content of NNK is decreased. Suitably, the content of NNK may be decreased in relation to a process leaf from a comparable plant which has not been modified in accordance with the invention.

Suitably, the processed leaf may be a cut processed leaf.

In another aspect there is provided cured tobacco material made from a plant or a part thereof according to the present invention or an extract thereof.

In another aspect there is provided a tobacco blend comprising said cured tobacco material according to the present invention.

In another aspect there is provided a delivery system prepared from:
  a tobacco plant according to the present invention, or a part thereof or a tobacco cell culture according to the present invention;
  a tobacco plant or part thereof propagated from a tobacco plant propagation material according to the present invention;
  a harvested leaf of a plant according to the present invention, wherein the plant is tobacco;
  a processed leaf according to the present invention, wherein the plant is tobacco; or
  a plant produced by the method according to the present invention.

Suitably, the tobacco product may be a combustible smoking article.

Suitably, the tobacco product may be a smokeless tobacco product.

Suitably, the tobacco product may be a non-combustible aerosol provision system such as a tobacco heating device or an aerosol-generating device.

In one aspect there is provided the use of a tobacco cell according to the present invention for modulating alkaloid content in cell cultures.

In another aspect there is provided a combustible smoking article, non-combustible aerosol provisioning system, smokeless tobacco product or tobacco heating device comprising a plant or a part thereof according to the present invention or an extract (e.g. a tobacco extract) thereof or a tobacco cell culture according to the present invention; or a cured tobacco material according to the present invention; or a tobacco blend according to the present invention.

In one aspect there is provided the use of a nucleotide sequence of at least one gene encoding a WAT1-related protein to select a plant having modulated (e.g. decreased) alkaloid content and/or modulated (e.g. decreased) content of tobacco specific nitrosamine (TSNA) precursor, preferably wherein the sequence of the WAT1-related protein is selected from SEQ ID NO. 1, 4, 7, 10, 13, 16, 19, 22, 25 or 28 or a functional variant or functional fragment or orthologue thereof; or wherein the sequence of the WAT1-related protein is a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30 or a functional variant or functional fragment or orthologue thereof; or wherein the at least one gene encoding a WAT1-related protein comprises a nucleotide sequence which has at least 80% identity to SEQ ID NO. 2, 3, 5, 6, 8, 9, 11, 12, 14, 15, 17, 18, 20, 21, 23, 24, 26, 27, 29 or 30.

In another aspect there is provided a mutant of a plant carrying a heritable mutation in a nucleotide sequence of at least one gene encoding a WAT1-related protein, preferably wherein the gene is selected from SEQ ID NO. 2, 3, 5, 6, 8, 9, 11, 12, 14, 15, 17, 18, 20, 21, 23, 24, 26, 27, 29 or 30 or a functional variant or functional fragment or orthologue thereof; or wherein the gene is selected from a sequence which has at least 80% identity to SEQ ID NO. 2, 3, 5, 6, 8, 9, 11, 12, 14, 15, 17, 18, 20, 21, 23, 24, 26, 27, 29 or 30; wherein said heritable mutation modulates (e.g. decreases) the activity or expression of the at least one gene encoding a WAT1-related protein and wherein the mutant plant has modulated (e.g. decreased) alkaloid content and/or modulated content of a tobacco specific nitrosamine (TSNA) precursor relative to a comparable plant which does not carry said heritable mutation.

In another aspect there is provided progeny or seed of a mutant plant which carries the heritable mutation according to the present invention.

In another aspect there is provided a harvested leaf, a processed leaf or cured tobacco material produced from a plant comprising a modification in a nucleotide sequence of at least one gene encoding a WAT1-related protein, wherein the at least one gene is selected from SEQ ID NO. 2, 3, 5, 6, 8, 9, 11, 12, 14, 15, 17, 18, 20, 21, 23, 24, 26, 27, 29 or 30 or a functional variant or functional fragment or orthologue thereof; or wherein the at least one gene is selected from a sequence which has at least 80% identity to SEQ ID NO. 2, 3, 5, 6, 8, 9, 11, 12, 14, 15, 17, 18, 20, 21, 23, 24, 26, 27, 29 or 30; wherein said modification modulates (e.g. decreases) the activity or expression of the at least one gene encoding a WAT1-related protein and wherein said plant has modulated (e.g. decreased) alkaloid content and/or modulated content of a tobacco specific nitrosamine (TSNA) precursor relative to a comparable plant which does not carry said modification in the at least one gene encoding a WAT1-related protein.

In another aspect there is provided a method, a leaf, a plant, a plant propagation material, a harvested leaf, a processed tobacco, a tobacco product, a use or a combination thereof as described herein with reference to the description and drawings.

BRIEF DESCRIPTION OF THE DRAWINGS

Embodiments of the invention will now be described, by way of example only, with reference to the accompanying drawings, in which:

FIG. 4 shows the amino acid sequence of Nitab4.5_0010919g0010.2—SEQ ID NO. 1—a WAT1-related protein from *Nicotiana tabacum* according to the present invention.

FIG. 5 shows the coding sequence of Nitab4.5_0010919g0010.2—SEQ ID NO. 2—encoding a WAT1-related protein from *Nicotiana tabacum* according to the present invention.

FIG. 6 shows the genomic sequence of Nitab4.5_0010919g0010.2—SEQ ID NO. 3—encoding a WAT1-related protein from *Nicotiana tabacum* according to the present invention.

FIG. 7 shows the amino acid sequence of Nitab4.5_0001086g0030.2—SEQ ID NO. 4—a WAT1-related protein from *Nicotiana tabacum* according to the present invention.

FIG. 8 shows the coding sequence of Nitab4.5_0001086g0030.2—SEQ ID NO. 5—encoding a WAT1-related protein from *Nicotiana tabacum* according to the present invention.

FIG. 9 shows the genomic sequence of Nitab4.5_0001086g0030.2—SEQ ID NO. 6—encoding a WAT1-related protein from *Nicotiana tabacum* according to the present invention.

FIG. 10 shows the amino acid sequence of Nitab4.5_0003292g0030.2—SEQ ID NO. 7—a WAT1-related protein from *Nicotiana tabacum* according to the present invention.

FIG. 11 shows the coding sequence of Nitab4.5_0003292g0030.2—SEQ ID NO. 8—encoding a WAT1-related protein from *Nicotiana tabacum* according to the present invention.

FIG. 12 shows the genomic sequence of Nitab4.5_0003292g0030.2—SEQ ID NO. 9—encoding a WAT1-related protein from *Nicotiana tabacum* according to the present invention.

FIG. 13 shows the amino acid sequence of Nitab4.5_0004697g0010.2—SEQ ID NO. 10—a WAT1-related protein from *Nicotiana tabacum* according to the present invention.

FIG. 14 shows the coding sequence of Nitab4.5_0004697g0010.2—SEQ ID NO. 11—encoding a WAT1-related protein from *Nicotiana tabacum* according to the present invention.

FIG. 15 shows the genomic sequence of Nitab4.5_0004697g0010.2—SEQ ID NO. 12—encoding a WAT1-related protein from *Nicotiana tabacum* according to the present invention.

FIG. 16 shows the amino acid sequence of Nitab4.5_0005998g0010.2—SEQ ID NO. 13—a WAT1-related protein from *Nicotiana tabacum* according to the present invention.

FIG. 17 shows the coding sequence of Nitab4.5_0005998g0010.2—SEQ ID NO. 14—encoding a WAT1-related protein from *Nicotiana tabacum* according to the present invention.

FIG. 18 shows the genomic sequence of Nitab4.5_0005998g0010.2—SEQ ID NO. 15—encoding a WAT1-related protein from *Nicotiana tabacum* according to the present invention.

FIG. 19 shows the amino acid sequence of Nitab4.5_0011862g0010.2—SEQ ID NO. 16—a WAT1-related protein from *Nicotiana tabacum* according to the present invention.

FIG. 20 shows the coding sequence of Nitab4.5_0011862g0010.2—SEQ ID NO. 17—encoding a WAT1-related protein from *Nicotiana tabacum* according to the present invention.

FIG. 21 shows the genomic sequence of Nitab4.5_0011862g0010.2—SEQ ID NO. 18—encoding a WAT1-related protein from *Nicotiana tabacum* according to the present invention.

FIG. 22 shows the amino acid sequence of Nitab4.5_0000062g0210.2—SEQ ID NO. 19—a WAT1-related protein from *Nicotiana tabacum* according to the present invention.

FIG. 23 shows the coding sequence of Nitab4.5_0000062g0210.2—SEQ ID NO. 20—encoding a WAT1-related protein from *Nicotiana tabacum* according to the present invention.

FIG. 24 shows the genomic sequence of Nitab4.5_0000062g0210.2—SEQ ID NO. 21—encoding a WAT1-related protein from *Nicotiana tabacum* according to the present invention.

FIG. 25 shows the amino acid sequence of Nitab4.5_0008142g0020.2—SEQ ID NO. 22—a WAT1-related protein from *Nicotiana tabacum* according to the present invention.

FIG. 26 shows the coding sequence of Nitab4.5_0008142g0020.2—SEQ ID NO. 23—encoding a WAT1-related protein from *Nicotiana tabacum* according to the present invention.

FIG. 27 shows the coding sequence of Nitab4.5_0008142g0020.2—SEQ ID NO. 24—encoding a WAT1-related protein from *Nicotiana tabacum* according to the present invention.

FIG. 28 shows the amino acid sequence of Nitab4.5_0000062g0220.2—SEQ ID NO. 25—a WAT1-related protein from *Nicotiana tabacum* according to the present invention.

FIG. 29 shows the coding sequence of Nitab4.5_0000062g0220.2—SEQ ID NO. 26—encoding a WAT1-related protein from *Nicotiana tabacum* according to the present invention.

FIG. 30 shows the coding sequence of Nitab4.5_0000062g0220.2—SEQ ID NO. 27—encoding a WAT1-related protein from *Nicotiana tabacum* according to the present invention.

FIG. 31 shows the amino acid sequence of Nitab4.5_0001674g0010.2—SEQ ID NO. 28—a WAT1-related protein from *Nicotiana tabacum* according to the present invention.

FIG. 32 shows the coding sequence of Nitab4.5_0001674g0010.2—SEQ ID NO. 29—encoding a WAT1-related protein from *Nicotiana tabacum* according to the present invention.

FIG. 33 shows the coding sequence of Nitab4.5_0001674g0010.2—SEQ ID NO. 30—encoding a WAT1-related protein from *Nicotiana tabacum* according to the present invention.

FIG. 34 shows the amino acid sequence of *Arabidopsis thaliana* WAT1—SEQ ID NO. 31.

FIG. 35 shows SEQ ID NO. 32, the amino acid sequence of the first EamA domain of *Arabidopsis thaliana* WAT1 (residues 32-161 of SEQ ID NO. 31).

FIG. 36 shows SEQ ID NO. 33, the amino acid sequence of the second EamA domain of *Arabidopsis thaliana* WAT1 (residues 210-339 of SEQ ID NO. 31).

FIG. 37 shows SEQ ID NO. 34, the amino acid sequence of the first EamA domain of Nitab4.5_0010919g0010.2 (residues 31-160 of SEQ ID NO. 1).

FIG. 38 shows SEQ ID NO. 35, the amino acid sequence of the second EamA domain of Nitab4.5_0010919g0010.2 (residues 196-329 of SEQ ID NO. 1).

FIG. 39 shows SEQ ID NO. 36, an artificial miRNA sequence targeting Nitab4.5_0010919g0010.2 used in Example 3.

SEQUENCE LISTING

Figure 1:
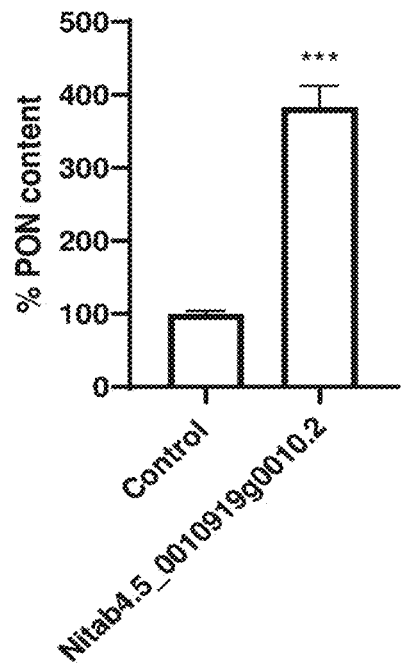
FIG. 1 shows the PON content of 5-week-old TN90 leaves overexpressing Nitab4.5_0010919g0010.2 (SEQ ID NO. 3). PON content is represented relative to a control and comprises two biological replicates analysed by t-test. Values are shown as means±SEM. Asterisks indicate statistical significance of P value≤0.001.

A summary of sequence identifiers used throughout the subject specification and the corresponding sequence listing is provided wherein:

SEQ ID NO. 1 corresponds to the amino acid sequence of Nitab4.5_0010919g0010.2.

SEQ ID NO. 2 corresponds to the coding sequence of Nitab4.5_0010919g0010.2.

SEQ ID NO. 3 corresponds to the genomic sequence of Nitab4.5_0010919g0010.2.

SEQ ID NO. 4 corresponds to the amino acid sequence of Nitab4.5_0001086g0030.2.

SEQ ID NO. 5 corresponds to the coding sequence of Nitab4.5_0001086g0030.2.

SEQ ID NO. 6 corresponds to the genomic sequence of Nitab4.5_0001086g0030.2.

SEQ ID NO. 7 corresponds to the amino acid sequence of Nitab4.5_0003292g0030.2.

SEQ ID NO. 8 corresponds to the coding sequence of Nitab4.5_0003292g0030.2.

SEQ ID NO. 9 corresponds to the genomic sequence of Nitab4.5_0003292g0030.2.

SEQ ID NO. 10 corresponds to the amino acid sequence of Nitab4.5_0004697g0010.2.

SEQ ID NO. 11 corresponds to the coding sequence of Nitab4.5_0004697g0010.2.

SEQ ID NO. 12 corresponds to the genomic sequence of Nitab4.5_0004697g0010.2.

SEQ ID NO. 13 corresponds to the amino acid sequence of Nitab4.5_0005998g0010.2.

SEQ ID NO. 14 corresponds to the coding sequence of Nitab4.5_0005998g0010.2.

SEQ ID NO. 15 corresponds to the genomic sequence of Nitab4.5_0005998g0010.2.

SEQ ID NO. 16 corresponds to the amino acid sequence of Nitab4.5_0011862g0010.2.

SEQ ID NO. 17 corresponds to the coding sequence of Nitab4.5_0011862g0010.2.

SEQ ID NO. 18 corresponds to the genomic sequence of Nitab4.5_0011862g0010.2.

SEQ ID NO. 19 corresponds to the amino acid sequence of Nitab4.5_0000062g0210.2.

SEQ ID NO. 20 corresponds to the coding sequence of Nitab4.5_0000062g0210.2.

SEQ ID NO. 21 corresponds to the genomic sequence of Nitab4.5_0000062g0210.2.

SEQ ID NO. 22 corresponds to the amino acid sequence of Nitab4.5_0008142g0020.2.

SEQ ID NO. 23 corresponds to the coding sequence of Nitab4.5_0008142g0020.2.

SEQ ID NO. 24 corresponds to the genomic sequence of Nitab4.5_0008142g0020.2.

SEQ ID NO. 25 corresponds to the amino acid sequence of Nitab4.5_0000062g0220.2.

SEQ ID NO. 26 corresponds to the coding sequence of Nitab4.5_0000062g0220.2.

SEQ ID NO. 27 corresponds to the genomic sequence of Nitab4.5_0000062g0220.2.

SEQ ID NO. 28 corresponds to the amino acid sequence of Nitab4.5_0001674g0010.2.

SEQ ID NO. 29 corresponds to the coding sequence of Nitab4.5_0001674g0010.2.

SEQ ID NO. 30 corresponds to the genomic sequence of Nitab4.5_0001674g0010.2.

SEQ ID NO. 31 corresponds to the amino acid sequence of WAT1 protein from *Arabidopsis thaliana*.

SEQ ID NO. 32 corresponds to the amino acid sequence of the first EamA domain of *Arabidopsis thaliana* WAT1 (residues 32-161 of SEQ ID NO. 31).

SEQ ID NO. 33 corresponds to the amino acid sequence of the first EamA domain of *Arabidopsis thaliana* WAT1 (residues 210-339 of SEQ ID NO. 31).

SEQ ID NO. 34 corresponds to the amino acid sequence of the first EamA domain of Nitab4.5_0010919g0010.2 (residues 31-160 of SEQ ID NO. 1).

SEQ ID NO. 35 corresponds to the amino acid sequence of the second EamA domain of Nitab4.5_0010919g0010.2 (residues 196-329 of SEQ ID NO. 1).

SEQ ID NO. 36 is an artificial miRNA sequence targeting Nitab4.5_0010919g0010.2 used in Example 3.

Some sequences disclosed herein contain "X" or "N" in nucleotide sequences. "X" or "N" can be any nucleotide or a deletion or insertion of one or more nucleotides. For example, in some cases a string of "X"s or "N"s are shown. The number of "X"s or "N"s does not necessarily correlate with the actual number of nucleotides at that position. There may be more or fewer nucleotides than shown as "X" or "N" in the sequence.

DETAILED DESCRIPTION

For the first time the present inventors have shown that by modulating the activity or expression of at least one gene encoding a WAT1-related protein in a plant (e.g. a tobacco plant), the alkaloid and/or TSNA precursor content of the plant (or processed plant) can be modulated.

The present invention provides a method of modulating (e.g. decreasing) the alkaloid content of a plant or a part thereof, the method comprising modifying said plant by modulating (e.g. decreasing) the activity or expression of at least one gene encoding a WAT1-related protein.

Also provided is a method of modulating (e.g. decreasing) the content of a tobacco specific nitrosamine (TSNA) precursor in a tobacco plant or plant part thereof, the method comprising modifying said plant by modulating (e.g. decreasing) the activity or expression of at least one gene encoding a WAT1-related protein.

The at least one gene encoding a WAT1-related protein may be selected from at least one gene encoding a WAT1-related protein which comprises an amino acid sequence as set out in SEQ ID NO. 1, 4, 7, 10, 13, 16, 19, 22, 25 or 28, or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID No. 2, 3, 5, 6, 8, 9, 11, 12, 14, 15, 17, 18, 20, 21, 23, 24, 27 or 30 or a functional variant or functional fragment or orthologue of SEQ ID NO. 2, 3, 5, 6, 8, 9, 11, 12, 14, 15, 17, 18, 20, 21, 23, 24, 27 or 30 or a nucleic acid sequence which has at least 80% identity to SEQ ID NO. 2, 3, 5, 6, 8, 9, 11, 12, 14, 15, 17, 18, 20, 21, 23, 24, 27 or 30. Suitably, the WAT1-related protein may comprise one or more EamA domains. Suitably, the WAT1-related protein may comprise two EamA domains.

Suitably, more than one WAT1-related proteins may be modified. In one embodiment at least one WAT1-related protein gene is modified selected from the group comprising genes encoding polypeptides comprising an amino acid sequence as set out in SEQ ID NO. 1, 4, 7, 10, 13, 16, 19, 22, 25 or 28 or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 27 or 30 or a functional variant or functional fragment or orthologue of SEQ ID NO. 2, 3, 5, 6, 8, 9, 11, 12, 14, 15, 17, 18, 20, 21, 23, 24, 27 or 30 or a nucleic acid sequence which has at least 80% identity to SEQ ID NO. 2, 3, 5, 6, 8, 9, 11, 12, 14, 15, 17, 18, 20, 21, 23, 24, 27 or 30.

In one embodiment at least two WAT1-related protein genes are modified selected from the group comprising genes encoding polypeptides comprising an amino acid sequence as set out in SEQ ID NO. 1, 4, 7, 10, 13, 16, 19, 22, 25 or 28 or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 27 or 30 or a functional variant or functional fragment or orthologue of SEQ ID NO. 2, 3, 5, 6, 8, 9, 11, 12, 14, 15, 17, 18, 20, 21, 23, 24, 27 or 30 or a nucleic acid sequence which has at least 80% identity to SEQ ID NO. 2, 3, 5, 6, 8, 9, 11, 12, 14, 15, 17, 18, 20, 21, 23, 24, 27 or 30.

In one embodiment at least three, such as at least four, such as at least five, such as at least six, such as at least seven, such as at least eight, such as at least nine, such as ten WAT1-related protein genes are modified selected from the group comprising genes encoding polypeptides comprising an amino acid sequence as set out in SEQ ID NO. 1, 4, 7, 10, 13, 16, 19, 22, 25 or 28 or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID No. 2, 3, 5, 6, 8, 9, 11, 12, 14, 15, 17, 18, 20, 21, 23, 24, 27 or 30 or a functional variant or functional fragment or orthologue of SEQ ID NO. 2, 3, 5, 6, 8, 9, 11, 12, 14, 15, 17, 18, 20, 21, 23, 24, 27 or 30 or a nucleic acid sequence which has at least 80% identity to SEQ ID NO. 2, 3, 5, 6, 8, 9, 11, 12, 14, 15, 17, 18, 20, 21, 23, 24, 27 or 30. Suitably, the WAT1-related protein may comprise one or more EamA domains. Suitably, the WAT1-related protein may comprise two EamA domains.

In one aspect, the at least one WAT1-related protein gene encodes a polypeptide which comprises an amino acid sequence as set out in: SEQ ID NO. 1 or a functional variant or functional fragment or orthologue thereof, or a sequence which has at least 80% identity to SEQ ID NO. 1; or wherein the at least one gene encoding a WAT1-related protein comprises a nucleotide sequence as set out in SEQ ID NO. 2 or 3 or a functional variant or functional fragment or orthologue of SEQ ID NO. 2 or 3; or a nucleic acid sequence which has at least 80% identity to SEQ ID NO. 2 or 3. Suitably, the WAT1-related protein may comprise one or more EamA domains. Suitably, the WAT1-related protein may comprise two EamA domains.

In one aspect, the activity or expression of at least one further gene is modulated. Suitably, at least two (or at least three or at least four or at least five or at least six or at least seven or at least eight or at least nine) additional genes selected from SEQ ID NO. 2, 3, 5, 6, 8, 9, 11, 12, 14, 15, 17, 18, 20, 21, 23, 24, 27 or 30 or a functional variant or functional fragment or orthologue of SEQ ID NO. 2, 3, 5, 6, 8, 9, 11, 12, 14, 15, 17, 18, 20, 21, 23, 24, 27 or 30 or a nucleic acid sequence which has at least 80% identity to SEQ ID NO. 2, 3, 5, 6, 8, 9, 11, 12, 14, 15, 17, 18, 20, 21, 23, 24, 27 or 30 may also be modulated. Suitably, the WAT1-related protein may comprise one or more EamA domains. Suitably, the WAT1-related protein may comprise two EamA domains.

The "expression" of a gene encoding a WAT1-related protein may refer to the level of transcription, translation i.e. protein expression.

Measurement of the level or amount of a gene product may be carried out by any suitable method, for example comparison of mRNA transcript levels, protein or peptide levels, and/or phenotype of a plant, between a modified plant and comparable plant which has not been modified according to the present invention.

The term "a comparable product" as defined herein would be one derived from a plant (e.g. a tobacco plant) which had not been modified according to the present invention, but in which all other relevant features were the same (e.g. plant species, growing conditions, method of processing the plant, e.g. tobacco, etc.). The comparable product according to the present invention may mean a plant (e.g. a tobacco plant) or a part thereof, such as a leaf (e.g. a tobacco leaf), a harvested leaf (e.g. a harvested tobacco leaf), a cut harvested leaf (e.g. a cut harvested tobacco leaf), a processed leaf (e.g. a processed tobacco leaf) or plant propagation material (e.g. tobacco plant propagation material), or a product comprising said plant or part therefore, e.g. a tobacco product or combinations thereof obtainable or obtained from a plant which has not been modified in accordance with the present invention, e.g. to modulate the activity or expression of gene encoding a WAT1-related protein. In one embodiment a comparable product is one which does not comprise gene encoding a WAT1-related protein whose activity or expression has been modulated.

The term "modifying" or "modified" as used herein means a plant (e.g. a tobacco plant) or nucleic acid sequence that has been altered or changed. The present invention comprises the modification of plants using techniques for genetic modification of plants or non-genetic modification of plants. Such methods are well known in the art and examples of genetic modification techniques include transformation, transgenics, cisgenics, and gene editing methods. Examples of non-genetic modification techniques include fast-neutron mutagenesis, chemical mutagenesis e.g. ethyl methanesulfonate (EMS) mutagenesis and modern population analysis approaches.

In one embodiment a natural variant which has a modified WAT-1 gene is selected and that trait or gene is bred into a second plant which may have commercially desirable traits.

In one embodiment the plant according to the present invention is a transgenic plant. In one embodiment the plant according to the invention is a non-transgenic plant.

The term "unmodified plant" as defined herein would be a plant (e.g. a tobacco plant) which had not been modified according to the present invention, e.g. to modulate the activity or expression of a gene encoding a WAT1-related protein or to modify the nucleic acid sequence of at least one gene encoding a WAT1-related protein; and in which all other relevant features were the same (e.g. plant species, growing conditions, method of processing tobacco, etc.). In one embodiment an unmodified plant is one which does not comprise a gene encoding a WAT1-related protein whose activity or expression has been modulated. In one embodiment, an unmodified plant is one which does not comprise a modified nucleic acid sequence which encodes at least one gene encoding a WAT1-related protein.

WAT1-Related Protein

A "WAT1-related protein" as used herein has its usual meaning in the art and refers to a protein encoded by a gene that is a homologue of *Arabidopsis thaliana* gene walls are thin 1 (WAT1). An illustrative sequence of the *Arabidopsis thaliana* WAT1 protein (i.e. the protein encoded by the WAT1 gene) is provided by UniProtKB database entry Q94AP3-1, presented in FIG. 34 as SEQ ID NO. 31).

*Arabidopsis thaliana* WAT1 protein is a predicted integral membrane protein, with 10 predicted transmembrane domains, and is a member of the plant drug/metabolite exporter (P-DME) family (transporter classification number: TC 2.A.7.4). WAT1 protein is ubiquitously expressed but associates preferentially with vascular tissues, such as developing xylem vessels and fibres. At the cellular level, WAT1 protein localises to the tonoplast (the membrane bounding the main vacuole). WAT1 is involved in cell wall formation (Ranocha et al. (2010) The Plant Journal 63, 469-483) and exports auxin from the vacuole (Ranocha et al. (2013) Nature Communications 4: 2625).

*Arabidopsis thaliana* WAT1 comprises two EamA domains, specifically at residues 32-161 and 210-339 of SEQ ID NO. 31. The sequences of the first and second EamA domains from WAT1 are presented as SEQ ID NO. 32 and SEQ ID NO. 33 in FIGS. 35 and 36 respectively. EamA domains are found in a wide range of proteins in bacteria and plants, many of which are predicted integral membrane proteins and have two copies of the EamA domain. The EamA domain was previously known as DUF6 (domain unknown function 6). Each EamA domain in WAT1 spans 5 predicted transmembrane domains.

A WAT1-related protein may be identified by comparing the protein in question to *Arabidopsis thaliana* WAT1 protein. The amino acid sequences of the proteins may be compared, wherein a degree of sequence identity or similarity with the *Arabidopsis thaliana* WAT1 amino acid sequence (SEQ ID NO. 31) would indicate that the protein is a WAT1-related protein. Alternatively or additionally, the domain structure of the proteins may be compared. Domains within the amino acid sequence of a protein may be identified using domain prediction software known in the art. Domains are also described in protein databases such as UniprotKB. A protein with a similar domain structure to WAT1 would be considered a WAT1-related protein. In particular, WAT1 comprises two EamA domains. A protein comprising two predicted EamA domains in a similar configuration to those found in WAT1 may be considered a WAT1-related protein.

An example of a WAT1-related protein is the protein encoded by the *Nicotiana tabacum* gene Nitab4.5_0010919g0010.2. The Nitab4.5_0010919g0010.2 protein, coding and gene sequences are presented in FIGS. 4, 5 and 6 as SEQ ID NO. 1, 2 and 3 respectively. The Nitab4.5_0010919g0010.2 protein comprises two EamA domains, the first at residues 31-160 of SEQ ID NO. 1 and the second at residues 196-329 of SEQ ID NO. 1. The sequences of the first and second EamA domains from Nitab4.5_0010919g0010.2 WAT1-related protein are presented as SEQ ID NO. 34 and SEQ ID NO. 35 in FIGS. 37 and 38 respectively.

In an embodiment the WAT1-related protein comprises one or more EamA domains. Suitably, the WAT1-related protein comprises two EamA domains. As used herein the term "EamA domain" refers to a conserved domain. An EamA domain comprises one or more transmembrane domains, such as two or more transmembrane domains, such as three or more transmembrane domains. An EamA domain may be identified by comparison of the sequence and/or predicted structure of part of the amino acid sequence of a protein with the first and second EamA domains of WAT1 and/or Nitab4.5_0010919g0010.2 protein (SEQ ID NO. 32, 33, 34 or 35). In an embodiment an EamA domain comprises an amino acid sequence shown as SEQ ID NO. 32, 33, 34 or 35, or a sequence which has at least 80% identity to SEQ ID NO. 32, 33, 34 or 35.

In an embodiment the WAT1-related protein is a predicted integral membrane protein comprising five or more transmembrane domains. Suitably the WAT1-related protein may comprise ten transmembrane domains.

In an embodiment the WAT1-related protein is a transporter. The term "transporter" as used herein refers to an integral membrane protein that facilitates transport of molecules, such as metabolites or phytohormones, across the membrane. In an embodiment the WAT1-related protein is an auxin transporter. In an embodiment the WAT1-related protein is a member of the P-DME family.

Without wishing to be bound by theory, it is hypothesized that modulating content of a WAT1-related protein in a plant cell or modulating activity, such as transporter activity, of a WAT1-related protein in a plant would modulate transport of molecules, such as metabolites, between particular compartments of the cell and thereby alter the distribution of metabolites within cells. These alterations to metabolite distribution alter the metabolic pathways producing alkaloids and TSNA precursors such as PON, resulting in modulated alkaloid content.

In one embodiment a WAT1-related protein comprises an amino acid sequence shown as SEQ ID NO. 1 or a sequence which has at least 80% identity thereto, or a homologue thereof. Suitably, the WAT1-related protein comprises one or more EamA domains. Suitably, the WAT1-related protein comprises two EamA domains. Suitably, a homologue of SEQ ID NO. 1 may be selected from the group comprising: SEQ ID NO. 4, 7, 10, 13, 16, 19, 22 25 or 28, or a sequence which has at least 80% identity thereto. Suitably, a homologue of SEQ ID NO. 1 may be selected from the group comprising: SEQ ID NO. 4, 7, 10, 13, 16, 19, 22, 25 or 28, wherein said sequence comprises one or more EamA domains, such as two EamA domains, or a sequence which has at least 80% identity to SEQ ID NO. 4, 7, 10, 13, 16, 19, 22, 25 or 28 and comprises one or more EamA domains, such as two EamA domains.

In one embodiment a WAT1-related protein comprises an amino acid sequence shown as SEQ ID NO. 1, 4, 7, 10, 13, 16, 19, 22 25 or 28, or a sequence which has at least 80% identity thereto (preferably at least 85%, at least 90%, at least 95%, at least 96%, at least 97%, at least 98%, or at least 99% identity thereto). In one embodiment a WAT1-related protein comprises an amino acid sequence shown as SEQ ID NO. 1, 4, 7, 10, 13, 16, 19, 22 25 or 28, or a sequence which has at least 80% identity thereto (preferably at least 85%, at least 90%, at least 95%, at least 96%, at least 97%, at least 98%, or at least 99% identity thereto) and comprises one or more EamA domains, such as two EamA domains.

Suitably, a WAT1-related protein according to the present invention may comprise an amino acid sequence shown as SEQ ID NO. 1, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 4, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 7, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 10, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 13, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 16, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 19, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 22, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 25, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

Suitably, a WAT1-related protein according to the present invention may comprise an amino acid sequence shown as SEQ ID NO. 28, or a sequence which has at least 80% identity thereto (preferably at least 85%, preferably at least 90%, preferably at least 93%, preferably at least 95%, at least 96%, at least 97%, at least 98%, or at least 99% identity thereto). Suitably, the WAT1-related protein comprises one or more EamA domains. Suitably, the WAT1-related protein comprises two EamA domains.

In one embodiment the WAT1-related protein according to the present invention comprises or consists of an amino acid sequence selected from: SEQ ID NO. 1, 4, 7, 10, 13, 16, 19, 22, 25 or 28.

Suitably, the protein may be from *Nicotiana tabacum*.

In one embodiment the WAT1-related protein is encoded by a polynucleotide sequence wherein the gene (prior to mutation) comprises the sequence shown as SEQ ID NO. 2, 3, 5, 6, 8, 9, 11, 12, 14, 15, 17, 18, 20, 21, 23, 24, 26, 27, 29 or 30; or a sequence which has at least 80% sequence identity thereto. Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 2, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 3, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 5, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 6, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 8, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 9, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domain. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 11, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1- related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 12, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 14, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 15, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 17, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 18, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 20, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1- related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 21, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 23, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 24, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 26, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 27, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 29, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1- related protein comprises one or more EamA domains. Suitably, the WAT1-related protein comprises two EamA domains.

Suitably, the WAT1-related protein for use according to the present invention may be encoded by a polynucleotide sequence wherein the gene (prior to mutation) comprises the sequence shown as SEQ ID NO. 30, or a sequence which has at least 80% sequence identity thereto (preferably at least 85%, preferably at least 90%, preferably at least 93%, preferably at least 95%, at least, 96%, at least 97%, at least 98%, or at least 99% identity thereto). Suitably, the WAT1-related protein comprises one or more EamA domains. Suitably, the WAT1-related protein comprises two EamA domains.

In one embodiment the WAT1-related protein is encoded by a polynucleotide sequence wherein the gene (prior to mutation) is selected from: SEQ ID NO. 2, 3, 5, 6, 8, 9, 11, 12, 14, 15, 17, 18, 20, 21, 23, 24, 26, 27, 29 or 30.

Suitably, the protein for use according to the present invention may be encoded by a polynucleotide sequence from *Nicotiana tabacum*.

In one aspect the present invention provides a method of decreasing the alkaloid content of a plant or part thereof or cell (e.g. plant cell), the method comprising modifying said plant by decreasing or inhibiting the activity or expression of at least one gene encoding a WAT1-related protein.

In one aspect the present invention provides a method of decreasing the alkaloid content of a plant or part thereof or plant cell, the method comprising modifying said plant by decreasing or inhibiting the activity or expression of at least one gene encoding a WAT1-related protein comprising the amino acid sequence shown as SEQ ID NO. 1, 4, 7, 10, 13, 16, 19, 22, 25 or 28, or a sequence which has at least 80% identity thereto or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30. Suitably, the WAT1-related protein comprises one or more EamA domains. Suitably, the WAT1-related protein comprises two EamA domains.

In one aspect the present invention provides a method of decreasing the content of a tobacco specific nitrosamine (TSNA) precursor in a plant or part thereof (e.g. leaf), the method comprising modifying said plant by decreasing or inhibiting the activity or expression of at least one gene encoding a WAT1-related protein.

In one aspect the present invention provides a method of decreasing the content of a tobacco specific nitrosamine (TSNA) precursor in a plant or part thereof (e.g. leaf), the method comprising modifying said plant by decreasing or inhibiting the activity or expression of at least one gene encoding a WAT1-related protein comprising the amino acid sequence shown as SEQ ID NO. 2, 3, 5, 6, 8, 9, 11, 12, 14, 15, 17, 18, 20, 21, 23, 24, 26, 27, 29 or 30, or a sequence which has at least 80% identity thereto, or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30.

In one aspect the present invention provides a method of decreasing the content of a TSNA in a processed leaf, such as a cured leaf, the method comprising:
modifying a plant by decreasing or inhibiting the activity or expression of at least one gene encoding a WAT1-related protein;
harvesting a leaf from said plant;
and curing said harvested leaf.

Suitably, the method of decreasing the content of a TSNA in a processed leaf may comprise: modifying said plant by decreasing or inhibiting the activity or expression of at least one gene encoding a WAT1-related protein comprising the amino acid sequence shown as SEQ ID NO. 2, 3, 5, 6, 8, 9, 11, 12, 14, 15, 17, 18, 20, 21, 23, 24, 26, 27, 29 or 30, or a sequence which has at least 80% identity thereto, or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30.

The term "decreasing" or "inhibiting" (e.g. inhibiting the activity or expression of gene encoding a WAT1-related protein) as used herein means that the activity or expression of the gene encoding the WAT1-related protein is lower or decreased compared with the activity or expression of the gene in a comparable product.

In one aspect the present invention provides a method of increasing the alkaloid content of a plant or part thereof or cell (e.g. plant cell), the method comprising modifying said plant by increasing or enhancing the activity or expression of at least one gene encoding a WAT1-related protein.

In one aspect the present invention provides a method of increasing the alkaloid content of a plant or part thereof or plant cell, the method comprising modifying said plant by increasing or enhancing the activity or expression of at least one gene encoding a WAT1-related protein comprising the amino acid sequence shown as SEQ ID NO. 1, 4, 7, 10, 13, 16, 19, 22, 25 or 28, or a sequence which has at least 80% identity thereto or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30. Suitably, the WAT1-related protein comprises one or more EamA domains. Suitably, the WAT1-related protein comprises two EamA domains.

In one aspect the present invention provides a method of increasing the content of a tobacco specific nitrosamine (TSNA) precursor in a plant or part thereof (e.g. leaf), the method comprising modifying said plant by increasing or enhancing the activity or expression of at least one gene encoding a WAT1-related protein.

In one aspect the present invention provides a method of increasing the content of a tobacco specific nitrosamine (TSNA) precursor in a plant or part thereof (e.g. leaf), the method comprising modifying said plant by increasing or enhancing the activity or expression of at least one gene encoding a WAT1-related protein comprising the amino acid sequence shown as SEQ ID NO. 2, 3, 5, 6, 8, 9, 11, 12, 14, 15, 17, 18, 20, 21, 23, 24, 26, 27, 29 or 30, or a sequence which has at least 80% identity thereto, or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30.

The term "increasing" or "enhancing" (e.g. increasing the activity or expression of gene encoding a WAT1-related protein) as used herein means that the activity or expression of the gene encoding the WAT1-related protein is higher or increased compared with the activity or expression of the gene in a comparable product.

According to the present invention, the activity or expression of a gene encoding a WAT1-related protein is modulated.

In one aspect the present invention provides a method of modulating (i.e. increasing or decreasing) the alkaloid content of a plant or part thereof or cell (e.g. plant cell), the method comprising modifying said plant by modulating (i.e. increasing or decreasing) the activity of at least one gene encoding a WAT1-related protein.

The term "activity" refers to any functionality of the WAT1-related protein encoded by the at least one gene. Examples of activity include enzymatic activity or localization of the WAT1-related protein.

Suitably, the activity may be the ability of the WAT1-related protein to interact with another molecule or molecules. In some embodiments the invention provides a method of modulating (i.e. increasing or decreasing) the alkaloid content of a plant or part thereof or cell (e.g. plant cell), the method comprising modifying said plant by modulating (i.e. increasing or decreasing) the ability of a WAT1-related protein to interact with another molecule.

Suitably, the ability of the WAT1-related protein to interact with the other molecule is the ability to bind the other molecule. The other molecule may be a protein. Suitably, the other molecule is more than one molecule, such as one or more molecules, such as two or more molecules, such as three or more molecules. Where the other molecule is more than one molecule, the other molecules may be the same molecule or may be different molecules.

Suitably, the activity is the ability of the WAT1-related protein to transport another molecule or molecules across a membrane. In some embodiments the invention provides a method of modulating (i.e. increasing or decreasing) the alkaloid content of a plant or part thereof or cell (e.g. plant cell), the method comprising modifying said plant by modulating (i.e. increasing or decreasing) the ability of a WAT1-related protein to transport another molecule across a membrane. The other molecule may be a protein. The other molecule may be a metabolite. The other molecule may be a phytohormone. Suitably the other molecule may be auxin. Suitably, the other molecule is more than one molecule, such as one or more molecules, such as two or more molecules, such as three or more molecules. Where the other molecule is more than one molecule, the other molecules may be the same molecule or may be different molecules. Suitably the membrane across which the other molecule is to be transported is the tonoplast. Modulation of the activity of a gene encoding a WAT1-related protein may entail increasing or decreasing the activity of the WAT1-related protein.

Increasing the activity of a WAT1-related protein refers to enhancing or improving the ability of the WAT1-related protein to carry out a particular function in comparison to a WAT1-related protein in a plant that has not been modified in accordance with the invention.

Decreasing the activity of a WAT1-related protein refers to reducing, inhibiting or disrupting the ability of the WAT1-related protein to carry out a particular function in comparison to a WAT1-related protein in a plant that has not been modified in accordance with the invention. The activity of a WAT1-related protein may be reduced to such an extent that the activity is prevented or eliminated.

In some embodiments the activity of a WAT1-related protein may be modulated (i.e. increased or decreased) by at least about 10% 20% 30%, or 40%, suitably at least about 50%, 60%, 70%, more suitably at least about 80%, 90%, 95% or 100% in comparison to the activity of a gene encoding a WAT1-related protein in a plant (e.g. a tobacco plant) which has not been modified in accordance with the present invention.

In some embodiments the modulated WAT1-related protein exhibits increased or decreased activity compared to an unmodified WAT1-related protein. The modulated WAT1-related protein may exhibit at least about 1%, at least about 3%, at least about 5%, at least about 10%, at least about 20%, at least about 30%, at least about 40%, at least about 50%, at least about 60%, at least about 70%, at least about 80% or at least about 90% increased or decreased activity compared to an unmodified WAT1-related protein.

Suitably, the modulation of activity is an increase or decrease in the ability of the WAT1-related protein to interact with (such as bind) another molecule or molecules.

Suitably, the modulation of activity is an increase or decrease in the ability of the WAT1-related protein to transport another molecule or molecules across a membrane. For example, the ability of the WAT-1 related protein to transport another molecule or molecules across a membrane may be modified by disruption of one or more transmembrane domains. The transmembrane domain(s) may be disrupted by deletion or by mutation. Suitably, the mutation in the transmembrane domain may not prevent the protein from spanning the domain but prevents transport through the protein. Suitably, the mutation in the transmembrane domain may prevent the protein from spanning the membrane.

Techniques are known in the art for measuring protein activities. For example, assays are known for measuring the enzymatic activity of a protein and the localization of a protein can be identified using microscopy techniques.

In particular, the ability of a WAT1-related protein to bind another molecule may be measured using techniques known in the art. Examples of such techniques include immuno-precipitation, isothermal calorimetry, surface plasmon resonance and microscale thermophoresis. For example, the ability of a modulated or mutated WAT1-related protein to bind other molecules may be determined for example by performing co-immunoprecipitation experiments using a modulated or mutated WAT1-related protein and a corresponding unmodified or unmutated WAT1-related protein. If the modulation or mutation in the WAT1-related protein reduces, inhibits or eliminates the ability of the WAT1-related protein bind other molecules, the co-immunoprecipitation will show that the modulated or mutated WAT1-related protein binds fewer other molecules.

The ability of a WAT-1 related protein to transport another molecule or molecules across a membrane may be measured using techniques known in the art. Examples of such techniques include techniques such as surface plasmon resonance, plasmon-waveguide resonance, combined chip-spectrometric assays, fluorometry, scintillation proximity assay, electrophysiological assay, or stopped-flow assay. According to the present invention, the activity or expression of a WAT1-related protein is modulated.

In one aspect the present invention provides a method of modulating (i.e. increasing or decreasing) the alkaloid content of a plant or part thereof or cell (e.g. plant cell), the method comprising modifying said plant by modulating (i.e. increasing or decreasing) the expression of at least one gene encoding a WAT1-related protein.

The "expression" of a gene refers to the degree to which the information encoded in the gene is converted to a functionality. The level of expression of a gene may be equated with the amount of the product of that gene present in a cell or organism. A modification that modulates (i.e. increases or decreases) the expression of a gene is one that increases the amount of the product of that gene in a plant or cell in comparison to an unmodified plant or cell.

In some embodiments the expression of a WAT1-related protein is modulated (i.e. increased or decreased) in comparison to the expression of a gene encoding a WAT1-related protein in a plant (e.g. a tobacco plant) which has not been modified in accordance with the present invention.

In some embodiments the expression of a WAT1-related protein may be modulated (i.e. increased or decreased) by at least about 10% 20% 30%, or 40%, suitably at least about 50%, 60%, 70%, more suitably at least about 80%, 90%, 95% or 100% in comparison to the expression of a gene encoding a WAT1-related protein in a plant (e.g. a tobacco plant) which has not been modified in accordance with the present invention.

In some embodiments the modulated WAT1-related protein exhibits increased or decreased expression compared to an unmodified WAT1-related protein. The modulated WAT1-related protein may exhibit at least about 1%, at least about 3%, at least about 5%, at least about 10%, at least about 20%, at least about 30%, at least about 40%, at least about 50%, at least about 60%, at least about 70%, at least about 80% or at least about 90% increased or decreased expression compared to an unmodified WAT1-related protein.

Typically, genes are transcribed to mRNA, which is translated to protein, the final gene product. Proteins may be sequestered in cellular stores and/or degraded. The expression of a gene may be modulated by modulating any or all of these steps. Accordingly, in some embodiments the modification modulates expression of at least one WAT1-related protein gene in one of the following ways:
  modulating transcription from the at least one WAT1-related protein gene;
  modulating translation of the mRNA from the at least one WAT1-related protein gene;
  modulating release of the WAT1-related protein from intracellular stores; and/or
  modulating the rate of degradation of the WAT1-related protein.

The expression of specific genes encoding WAT1-related proteins can be measured by measuring transcription and/or translation of the gene. Methods for measuring transcription are well known in the art and include, amongst others, northern blot, RNA-Seq, in situ hybridization, DNA microarrays and RT-PCR. Alternatively, the expression of a gene may be measured indirectly by measuring the level of the gene product for example the protein encoded by said gene. For example, the expression of a WAT1-related protein may be determined by measuring the presence of the protein using an antibody specific for the WAT1-related protein (for example antibodies specific for an EamA domain) by western blot.

Modifying

The plant or cell may be modified in any way that modulates activity or expression of at least one gene encoding a WAT1-related protein. Types of modifications to plants and cells that modulate activity or expression of genes, as well as techniques to achieve those modifications, are known in the art.

In some embodiments the present invention provides a method of decreasing the alkaloid content of a plant or part thereof or cell (e.g. plant cell), the method comprising modifying said plant by decreasing or inhibiting the activity or expression of at least one gene encoding a WAT1-related protein.

In some embodiments the present invention provides a method of decreasing the content of a tobacco specific nitrosamine (TSNA) or a precursor of a TSNA in a tobacco plant or plant part thereof, the method comprising modifying said plant or a cell culture by decreasing the activity or expression of at least one gene encoding a WAT1-related protein.

Any method known in the art for decreasing or inhibiting the activity or expression of a gene may be used in the methods according to the present invention.

Suitably, the activity or expression of the WAT1-related protein gene may be reduced, partly inactivated, inhibited, eliminated, knocked out or lost such that the protein activity, expression or function of the WAT1-related protein gene is not detectable.

In one aspect, the at least one WAT1-related protein gene is knocked out. In other words, the WAT1-related protein has been rendered completely inoperative.

By way of example, the present method may comprise:
  providing a mutation in a nucleic acid sequence which encodes a protein comprising the amino acid sequence shown as SEQ ID NO. 1, 4, 7, 10, 13, 16, 19, 22, 25 or 28, or an amino acid sequence which has at least 80% sequence identity thereto;
  providing a mutation in a regulatory region (e.g. a promoter or an enhancer) which contributes to controlling the expression of a protein comprising the amino acid sequence shown as SEQ ID NO. 1, 4, 7, 10, 13, 16, 19, 22, 25 or 28, or an amino acid sequence which has at least 80% sequence identity thereto;
  providing an antisense RNA, siRNA or miRNA which reduces the level of nucleic acid sequence encoding a protein comprising the amino acid sequence shown as SEQ ID NO. 1, 4, 7, 10, 13, 16, 19, 22, 25 or 28, or an amino acid sequence which has at least 80% sequence identity thereto.

Each of the above approaches results in the reduction or prevention of activity or expression of a protein comprising the amino acid sequence shown as SEQ ID NO. 1, 4, 7, 10, 13, 16, 19, 22, 25 or 28, or an amino acid sequence which has at least 80% sequence identity thereto or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID No. 2, 3, 5, 6, 8, 9, 11, 12, 14, 15, 17, 18, 20, 21, 23, 24, 26, 27, 29 or 30, or a nucleic acid sequence which has at least 80% identity to SEQ ID No. 2, 3, 5, 6, 8, 9, 11, 12, 14, 15, 17, 18, 20, 21, 23, 24, 26, 27, 29 or 30.

As used herein, the term "mutation" encompasses a natural genetic variant or an engineered variant. In particular, the term "mutation" refers to a variation in the nucleotide sequence encoding the amino acid sequence or in the amino acid sequence compared to the sequence shown as SEQ ID NO. 1, 4, 7, 10, 13, 16, 19, 22, 25 or 28, or an amino acid sequence which has at least 80% (preferably at least 85%, preferably at least 90%, preferably at least 93%, preferably at least 95%, preferably at least 98%, preferably at least 99%) sequence identity thereto.

In one embodiment the mutation decreases the alkaloid content of a plant. In another embodiment, the mutation decreases the content of at least one TSNA precursor in a plant or part thereof, or leaf such as a harvested or processed leaf. In one embodiment the mutation decreases the content of one or more TSNAs selected from NNK, NNN, NAT, NAB, preferably NNK content is decreased in a processed leaf. Suitably, the TSNA content is reduced in relation to a comparable product.

In one embodiment, a method according to the present invention may comprise providing a nucleic acid sequence to a plant or part thereof or plant cell, wherein said nucleic acid results in the reduction or elimination of the activity or expression of at least one gene encoding a WAT1-related protein.

In one embodiment, a method according to the present invention may comprise providing a nucleic acid sequence to a plant or part thereof or plant cell, wherein said nucleic acid results in the modification of the nucleic acid sequence of at least one gene encoding a WAT1-related protein.

Suitably said nucleic acid sequence may be introduced to the plant or part thereof or cell. Suitably an endogenous nucleic acid sequence in the plant or part thereof or cell may be modified to encode the polypeptide according to the present invention (e.g. by gene editing). For example, an endogenous nucleotide sequence may be modified to decrease the activity or expression of at least one gene encoding a WAT1-related protein.

In a preferred embodiment, each copy of a nucleic acid sequence encoding a protein comprising a sequence shown as SEQ ID NO. 1, 4, 7, 10, 13, 16, 19, 22, 25 or 28, or a sequence which has at least 80% sequence identity thereto or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30 or a functional variant or functional fragment or orthologue of SEQ ID NO. 2, 3, 5, 6, 8, 9, 11, 12, 14, 15, 17, 18, 20, 21, 23, 24, 26, 27, 29 or 30 or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30 which is present in the plant is modified e.g. mutated as defined herein (e.g. each genomic copy of a gene encoding said protein in a plant is mutated). For example, each copy of the gene in the allotetraploid genome of *Nicotiana tabacum* may be mutated.

In a preferred embodiment, some or all of the homologues of the WAT1-related protein described herein are modified e.g. inhibited or mutated. Suitably, some or all of SEQ ID No. 1, 4, 7, 10, 13, 16, 19, 22, 25 or 28, or corresponding sequences which have at least 80% sequence identity thereto are modified e.g. inhibited or mutated.

In some embodiments the plant or plant cell according to the present invention is homozygous. Suitably, the plant or plant cell may be homozygous for the modification e.g. inhibition or mutation.

In some embodiments the plant or plant cell according to the present invention expresses only the modified e.g. mutated nucleic acid encoding the WAT1-related protein. In other words, in some embodiments no endogenous (or endogenous and functional protein) is present in the plant according to the present invention. In other words, if any endogenous protein is present it is preferably in an inactive form.

In one embodiment the present method may comprise providing a mutation in the nucleic acid sequence shown as SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity thereto.

The mutation may alter the plant genome such that a nucleic acid sequence encoding a protein comprising the amino acid sequence shown as SEQ ID NO. 1, 4, 7, 10, 13, 16, 19, 22, 25 or 28, or an amino acid sequence which has at least 80% sequence identity thereto is completely or partially deleted or otherwise modified to inhibit or eliminate the ability of the WAT1-related protein to transport other molecules across a membrane in comparison with a protein shown as SEQ ID NO. 1, 4, 7, 10, 13, 16, 19, 22, 25 or 28, or a sequence which has at least 80% sequence identity thereto. In some embodiments the mutation does not alter the level or expression of the protein but reduces inhibits or eliminates the ability of the WAT1-related protein to transport other molecules across a membrane in comparison with a protein shown as SEQ ID NO. 1, 4, 7, 10, 13, 16, 19, 22, 25 or 28, or a sequence which has at least 80% sequence identity thereto. Suitably, the mutation inhibits or eliminates the ability of the WAT1-related protein to transport auxin across a membrane. The expression "inhibits or eliminates" means that the amount of the other molecule moved across a membrane by the WAT1-related protein is reduced, suitably to the extent that none of the other molecule is moved across the membrane.

Suitably, the mutation may be in a transmembrane domain of the WAT1-related protein. Suitably, the WAT1-related protein may comprise multiple mutations, each in a different transmembrane domain. Suitably, the WAT1-related protein comprises mutations in at least two transmembrane domains, such as at least three transmembrane domains, such as at least four transmembrane domains, such as at least five transmembrane domains, such as at least six transmembrane domains, such as at least seven transmembrane domains, such as at least eight transmembrane domains, such as at least nine transmembrane domains, such as ten transmembrane domains. In some embodiments, the mutation in the transmembrane domain modifies the ability of the WAT1-related protein to localise to a membrane. Suitably, the mutation prevents the WAT1-related protein from localising to a membrane. For example, transmembrane domains typically comprise hydrophobic amino acids suitable to the hydrophobic environment of the membrane. Replacement of hydrophobic amino acids with hydrophilic amino acids means the transmembrane domain cannot sit within the hydrophobic environment of the membrane therefore the ability of the WAT1-related protein to localise to the membrane is reduced. Suitably, the mutation comprises replacement of hydrophobic acids in the transmembrane domain with hydrophilic amino acids. Suitably, the mutation comprises deletion of one or more transmembrane domains.

The mutation may be in one or more EamA domains of the WAT1-related protein, such as in two EamA domains. In some embodiments, one or more EamA domains, such as two EamA domains, may be mutated thereby modifying the ability of the WAT1-related protein to localise to a membrane. In some embodiments, one or more EamA domains, such as two EamA domains, are deleted from the WAT1-related protein.

The mutation may interrupt the nucleic acid sequence which encodes a protein comprising the amino acid sequence shown as SEQ ID NO. 1, 4, 7, 10, 13, 16, 19, 22, 25 or 28, or an amino acid sequence which has at least 80% sequence identity thereto.

The interruption may cause the nucleic acid sequence to not be transcribed and/or translated. The nucleic acid sequence may be interrupted, for example, by deleting or otherwise modifying the ATG start codon of the nucleic acid sequence such that translation of the protein is reduced or prevented.

The nucleic acid sequence may comprise one or more nucleotide change(s) that reduce or prevent expression of the protein or affect protein trafficking. For example, expression of the protein may be reduced or prevented by introduction of one or more pre-mature stop codons, a frame shift, a splice mutation or a non-tolerated amino acid substitution in the open reading frame.

A premature stop codon refers to a mutation which introduces a stop codon into the open reading frame and prevents translation of the entire amino acid sequence. The premature stop codon may be a TAG ("amber"), TAA ("ochre"), or TGA ("opal" or "umber") codon.

A frame-shift mutation (also called a framing error or a reading frame shift) is a mutation caused by indels (insertions or deletions) of a number of nucleotides in a nucleic acid sequence that is not divisible by three. Due to the triplet nature of gene expression by codons, the insertion or deletion can change the reading frame, resulting in a completely different translation from the original. A frameshift mutation will often cause the reading of the codons after the mutation to code for different amino acids. The frameshift mutation will commonly result in the introduction of a premature stop codon.

A splice mutation inserts, deletes or changes a number of nucleotides in the specific site at which splicing takes place during the processing of precursor messenger RNA into mature messenger RNA. The deletion of the splicing site results in one or more introns remaining in mature mRNA and may lead to the production of abnormal proteins.

A non-tolerated amino acid substitution refers to a mutation which causes a non-synonymous amino acid substitution in the protein which results in reduced or ablated function of the protein. Any method known in the art for providing a mutation in a nucleic acid sequence may be used in the method according to the present invention. For example, homologous recombination may be used, in which a vector is created in which the relevant nucleic acid sequence(s) are mutated and used to transform plants or plant cells. Recombinant plants or plant cells expressing the mutated sequence may then be selected.

In one embodiment the mutation introduces a non-tolerated amino acid substitution in a protein comprising an amino acid sequence shown as SEQ ID NO. 1, 4, 7, 10, 13, 16, 19, 22, 25 or 28, or a sequence which has at least 80% sequence identity thereto.

In some embodiments, the EamA domain may contain a mutation which decreases the expression of the at least one gene encoding a WAT1-related protein.

The mutation may be a deletion, a splice mutant or codon encoding a non-tolerated amino acid substitution.

In one embodiment, the nucleic acid sequence encoding the WAT1-related protein may be wholly or partially deleted. The deletion may be continuous, or may comprise a plurality of sections of sequence. The deletion preferably removes a sufficient amount of nucleotide sequence such that the nucleic acid sequence no longer encodes a functional WAT1-related protein. The deletion may be total, in which case 100% of the coding portion of the nucleic acid sequence is absent, when compared to the corresponding genome of a comparable unmodified plant. The deletion may, for example, remove at least 50, 60, 70, 80 or 90% of the coding portion of the nucleic acid sequence. Suitably, at least part of the protein may be deleted. The deletion may, for example, remove at least 10, 20, 30, 40, 50, 60, 70, 80 or 90% of the coding portion of the protein.

The deletion may remove at least part of one or more EamA domains, such as of two EamA domains. The deletion may, for example, remove at least 10, 20, 30, 40, 50, 60, 70, 80 or 90% of one or more EamA domains, such as of two EamA domains. Suitably, the deletion may remove at least 5 amino acids, at least 10 amino acids, at least 15, at least 20, at least 25, at least 30 amino acids of one or more EamA domains, such as of two EamA domains. Suitably, the deletion may remove at least 5 amino acids, at least 10 amino acids, at least 15, at least 20, at least 25, at least 30 amino acids of one or more EamA domains, such as of two EamA domains.

Methods for deletion of nucleic acid sequences in plants are known in the art. For example, homologous recombination may be used, in which a vector is created in which the relevant nucleic acid sequence(s) are missing and used to transform plants or plant cells. Recombinant plants or plant cells expressing the new portion of sequence may then be selected.

Plant cells transformed with a vector as described herein may be grown and maintained in accordance with well-known tissue culturing methods such as by culturing the cells in a suitable culture medium supplied with the necessary growth factors such as amino acids, plant hormones, vitamins, etc.

Modification of the nucleic acid sequence may be performed using targeted mutagenesis methods (also referred to as targeted nucleotide exchange (TNE) or oligo-directed mutagenesis (ODM)). Targeted mutagenesis methods include, without limitation, those employing zinc finger nucleases, TALENs (see WO2011/072246 and WO2010/079430), Cas9-like, Cas9/crRNA/tracrRNA, Cas9/gRNA, or other CRISPR systems (see WO 2014/071006 and WO2014/093622), meganucleases (see WO2007/047859 and WO2009/059195), or targeted mutagenesis methods employing mutagenic oligonucleotides, possibly containing chemically modified nucleotides for enhancing mutagenesis with sequence complementarity to the gene, into plant protoplasts (e.g., KeyBase® or TALENs).

Alternatively, mutagenesis systems such as TILLING (Targeting Induced Local Lesions IN Genomics; McCallum et al. (2000) Nat. Biotech. 18:455, and McCallum et al. (2000) Plant Physiol. 123, 439-442, both incorporated herein by reference) may be used to generate plant lines which comprise a gene encoding a protein having a mutation. TILLING uses traditional chemical mutagenesis (e.g. ethyl methanesulfonate (EMS) mutagenesis, which produces random mutations) followed by high-throughput screening for mutations. Thus, plants, seeds, cells and tissues comprising a gene having the desired mutation may be obtained.

The method may comprise the steps of mutagenizing plant seeds (e.g. EMS mutagenesis), pooling of plant individuals or DNA, PCR amplification of a region of interest, heteroduplex formation and high-throughput detection, identification of the mutant plant, sequencing of the mutant PCR product. It is understood that other mutagenesis and selection methods may equally be used to generate such modified plants. Seeds may, for example, be radiated or chemically treated and the plants may be screened for a modified phenotype.

Fast neutron deletion mutagenesis may be used in a reverse genetics sense (i.e. with PCR) to identify plant lines carrying a deletion in the endogenous gene. See for example Ohshima et al. (1998) Virology 213:472-481; Okubara et al. (1994) Genetics 137:867-874; and Quesada et al. (2000) Genetics 154:421-4315 which are incorporated herein by reference.

In another approach, dominant mutants may be used to trigger RNA silencing due to gene inversion and recombination of a duplicated gene locus. See for example Kusaba et al. (2003) Plant Cell 15:1455-1467 (incorporated herein by reference).

Modified plants may be distinguished from non-modified plants, i.e., wild type plants, by molecular methods, such as the mutation(s) present in the DNA, and by the modified phenotypic characteristics. The modified plants may be homozygous or heterozygous for the modification. Preferably modified plants are homozygous for the modification.

In one embodiment the method of reducing or preventing the activity or expression of a protein comprising the amino acid sequence shown as SEQ ID NO. 1, 4, 7, 10, 13, 16, 19, 22, 25 or 28, or an amino acid sequence which has at least 80% sequence identity thereto does not comprise treating the plant with a chemical (e.g. an agrochemical).

Other ways of reducing or preventing the expression will be apparent to one skilled in the art and include the use of virus-induced gene silencing (VIGs), micro RNA silencing, RNAi, antisense, tDNA insertions, or dominant negative constructs (or antimorphic mutations).

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by virus-induced gene silencing.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by microRNAs.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by RNAi.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by antisense suppression.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by sense suppression.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by tDNA insertions.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by dominant negative constructs (or antimorphic mutations).

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by a targeted mutagenesis based system.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by CRISPR based system.

In one embodiment the expression of a protein comprising the amino acid sequence shown as SEQ ID NO. 1, 4, 7, 10, 13, 16, 19, 22, 25 or 28, or an amino acid sequence which has at least 80% sequence identity thereto may be reduced or eliminated by zinc finger nuclease, TALENs, meganucleases, mutagenic oligonucleotides or TILLING.

In some embodiments the present invention provides a method of increasing the alkaloid content of a plant or part thereof or cell (e.g. plant cell), the method comprising modifying said plant by increasing or enhancing the activity or expression of at least one gene encoding a WAT1-related protein.

Any method known in the art for increasing or enhancing the activity or expression of a gene may be used in the methods according to the present invention.

In some embodiments the method may comprise overexpressing at least one gene encoding a WAT1-related protein. Suitably the method may comprise expressing one or more additional copies of the at least one gene encoding a WAT1-related protein in the plant or cell. Suitably the method may comprise modifying the endogenous copy of the at least one gene encoding a WAT1-related protein such that its expression is increased. The method may comprise mutating the coding sequence of the at least one gene encoding a WAT1-related protein. The method may comprise mutating a regulatory sequence that regulates expression of the at least one gene encoding a WAT1-related protein.

Suitably the method may comprise transforming a cell of a plant (e.g. a tobacco plant) with a genetic construct which encodes at least one WAT1-related protein comprising an amino acid sequence as set out in SEQ ID NO. 1, 4, 7, 10, 13, 16, 19, 22, 25 or 28, or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30 or a functional variant or functional fragment or orthologue of SEQ ID NO. 2, 3, 5, 6, 8, 9, 11, 12, 14, 15, 17, 18, 20, 21, 23, 24, 26, 27, 29 or 30 or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30; or which comprises a nucleotide sequence which encodes a protein which is capable of promoting or augmenting at least one endogenous WAT1-related protein gene. It will be appreciated that each of these options would result in an increased activity and expression of the polypeptide encoded by the at least one WAT1-related protein gene. The method may comprise regenerating the plant from the transformed cell. There is provided use of genetic construct which is capable of increasing the activity and/or expression of a polypeptide encoded by at least one WAT1-related protein gene for increasing the alkaloid content (e.g. nicotine content) in a plant or part there of or cell transformed with the construct.

The genetic construct may encode a polypeptide comprising the amino acid SEQ ID NO. 1, 4, 7, 10, 13, 16, 19, 22, 25 or 28, or a functional variant or functional fragment or orthologue thereof, or a sequence which has at least 80% identity to SEQ ID NO. 1, 4, 7, 10, 13, 16, 19, 22, 25 or 28;

or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30.

In another embodiment, the invention relates to a method of increasing the alkaloid content of a plant or part thereof in a plant or plant part thereof, comprising modifying said plant by increasing the activity of at least one gene encoding a WAT1-related protein.

In one embodiment the activity of at least one gene encoding a WAT1-related protein may be increased by introducing (or providing) a mutation to at least one gene encoding an EamA domain.

Suitably, the activity of at least one gene encoding a WAT1-related protein may be increased by introducing a mutation to at least one gene encoding a WAT1-related protein which comprises an amino acid sequence as set out in SEQ ID NO. 1, 4, 7, 10, 13, 16, 19, 22, 25 or 28; or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30, or a nucleic acid sequence which has at least 80% identity to SEQ ID No. 2, 3, 5, 6, 8, 9, 11, 12, 14, 15, 17, 18, 20, 21, 23, 24, 26, 27, 29 or 30.

In some embodiments a modification which increases the activity or expression of at least one WAT1-related protein gene and thereby increases alkaloid content by one of the following:
  modulating transcription from the at least one WAT1-related protein gene;
  modulating translation of the mRNA from the at least one WAT1-related protein gene;
  modulating release of the WAT1-related protein from intracellular stores; and/or
  modulating the rate of degradation of the WAT1-related protein.

Alkaloid Content

In one embodiment the present invention provides a method of modulating the alkaloid content of a plant (e.g. a tobacco plant) or a part thereof, the method comprising modifying said plant by modulating the activity or expression of at least one gene encoding a WAT1-related protein.

The term "modulating" is used herein to mean either increasing or decreasing.

The term "increasing alkaloid content" is used herein to mean that the alkaloid content in the product of the present invention (e.g. plant, part thereof (e.g. leaf), processed leaf or a product made from the plant (e.g. a tobacco product)) is higher compared with a comparable product which has not been modified in accordance with the present invention.

The term "decreasing alkaloid content" is used herein to mean that alkaloid content in the product of the present invention (e.g. plant, part thereof (e.g. leaf), processed leaf or a product made from the plant (e.g. a tobacco product)) is lower compared with a comparable product which has not be modified in accordance with the present invention.

In some embodiments, the modulation of alkaloid content refers to an increase in alkaloid content wherein the activity or expression of at least one WAT1-related protein gene is increased (or in other words the protein is overexpressed).

In some embodiments, the modulation of alkaloid content refers to a decrease in alkaloid content wherein the expression of at least one gene encoding a WAT1-related protein is decreased or inhibited or eliminated.

In a further aspect, the alkaloid content is measured from leaves. In one aspect the alkaloid content is measured from green leaves. In a further aspect, the alkaloid content is measured from cured leaves, e.g. air-cured, flue-cured, fire-cured or sun-cured leaves. In a further aspect, the alkaloid content is measured from flue-cured leaves. In a further aspect, the alkaloid content is measured from air-cured leaves.

The term "alkaloid content" is used herein to mean the concentration and/or total amount of the entire group of compounds classified as alkaloids or the concentration and/or total amount of one or more compounds classified as alkaloids. Alkaloids typically present in tobacco include nicotine, nornicotine, PON, anatabine, anabasine and myosmine. In some embodiments the content of one or more alkaloids, such as two or more alkaloids, such as three or more alkaloids, such as four or more alkaloids, such as five or more alkaloids, such as all six alkaloids, selected from nicotine, nornicotine, PON, anatabine, anabasine and myosmine is modulated. In some embodiments the content of one or more alkaloids, such as two or more alkaloids, such as three or more alkaloids, such as four or more alkaloids, such as five or more alkaloids, such as all six alkaloids, selected from nicotine, nornicotine, PON, anatabine, anabasine and myosmine is increased. In some embodiments the content of one or more alkaloids, such as two or more alkaloids, such as three or more alkaloids, such as four or more alkaloids, such as five or more alkaloids, such as all six alkaloids, selected from nicotine, nornicotine, PON, anatabine, anabasine and myosmine is decreased. In some embodiments the total alkaloid content of the plant or cell is modulated. In some embodiments the total alkaloid content is increased. In some embodiments the total alkaloid content is increased.

In one embodiment the nicotine content is not modulated but the content of one or more alkaloids selected from PON, nornicotine, anatabine, anabasine and myosmine is modulated. Suitably the nicotine content may not be modulated but the content of PON is modulated. Suitably the nicotine content may not be modulated but the content of PON is decreased.

Any method known in the art for determining the concentration and/or total content of alkaloids may be used. One preferred method for analysing alkaloid content involves the analysis by gas chromatography-flame ionization detection method (GC-FID) or by reversed phase high performance liquid chromatography with tandem mass spectrometry (LC-MS/MS).

In one embodiment there is provided a method for producing a plant (e.g. a tobacco plant) or part thereof, a plant propagation material (e.g. a tobacco plant propagation material), a cell (e.g. a tobacco cell), a leaf (e.g. a tobacco leaf), a harvested leaf (e.g. a harvested tobacco leaf), a cut harvested leaf (e.g. a cut harvested tobacco leaf), a processed leaf (e.g. a processed tobacco leaf), a cut and processed leaf (e.g. a cut and processed tobacco leaf), a product comprising said plant or part thereof (e.g. a tobacco product) or combinations thereof obtainable or obtained by a plant of the invention which has modulated alkaloid content, the method comprising modifying said plant to modulate the activity or expression of a gene encoding an WAT1-related protein. The modulated alkaloid content may be determined by comparing the alkaloid content in the plant (e.g. tobacco plant) or part thereof, plant propagation material (e.g. tobacco plant propagation material), a cell (e.g. a tobacco cell), leaf (e.g. tobacco leaf), harvested leaf (e.g. a harvested tobacco leaf), cut harvested leaf (e.g. a cut harvested tobacco leaf), processed leaf (e.g. processed tobacco leaf), cut and processed leaf (e.g. cut and processed tobacco leaf), a product comprising a plant or part thereof of the present invention, e.g. a tobacco product, or combinations thereof with a comparable product.

Suitably the alkaloid content may be modulated in a plant, e.g. a tobacco plant e.g. modified tobacco plant. Suitably the alkaloid content may be modulated in a leaf (e.g. a tobacco leaf e.g. a tobacco leaf from a modified tobacco plant). Suitably the alkaloid content may be modulated in a harvested leaf (e.g. a harvested tobacco leaf from a modified tobacco plant). Suitably the alkaloid content may be modulated in a cut harvested leaf (e.g. a cut harvested tobacco leaf from a modified tobacco plant). Suitably the alkaloid content may be modulated in a processed leaf (e.g. a processed tobacco leaf e.g. a processed tobacco leaf from a modified tobacco plant). Suitably the alkaloid content may be modulated in a cut and processed leaf (e.g. a cut and processed tobacco leaf e.g. a cut and processed tobacco leaf from a modified tobacco plant). Suitably the alkaloid content may be modulated in a cured leaf (e.g. cured a tobacco leaf from a modified tobacco plant). Suitably the alkaloid content may be modulated in an extract of a green leaf (e.g. a green tobacco leaf from a modified tobacco plant). Suitably the alkaloid content may be modulated in a product comprising the plant of the present invention or part thereof (e.g. a tobacco product, for example a tobacco product produced from a modified tobacco plant or part thereof). Suitably the alkaloid content may be modulated in any one of the above products or combinations thereof. Suitably the modulation of alkaloid content described above may be an increase in alkaloid content. Suitably the modulation of alkaloid content described above may be a decrease in alkaloid content (e.g. a decrease in PON content).

In one embodiment the content of one or more alkaloids selected from nicotine, nornicotine, PON, anatabine, anabasine and myosmine is increased. In one embodiment the content of one or more alkaloids selected from nicotine, nornicotine, PON, anatabine and anabasine is decreased. In one embodiment the content of PON is decreased.

Suitably the modulation of alkaloid content described above may be a decrease in nicotine content. Suitably the modulation of alkaloid content described above may be a decrease in the content of one or more alkaloids selected from nornicotine, PON, anatabine, anabasine and myosmine but not a decrease in the content of nicotine. Suitably the modulation of alkaloid content described above may be a decrease in the content of one or more alkaloids selected from nornicotine, PON, anatabine and anabasine but not a decrease in the content of nicotine.

In one embodiment the nicotine content of a modified plant (e.g. tobacco plant), plant propagation material (e.g. tobacco plant propagation material), leaf (e.g. tobacco leaf), harvested leaf (e.g. harvested tobacco leaf), cut harvested leaf (e.g. cut harvested tobacco leaf), processed leaf (e.g. processed tobacco leaf), cut and processed leaf (e.g. cut and processed tobacco leaf) or tobacco product from a modified tobacco plant is decreased.

In one embodiment the alkaloid content of a plant (e.g. tobacco plant) or part thereof may be modulated by at least 0.5, 1.5, 2, 3 or 4 fold when compared to the alkaloid content of a plant (e.g. tobacco plant) or part thereof, respectively, which has not been modified to modulate the activity or expression of at least one gene encoding a WAT1-related protein and which has been grown under similar growth conditions. Suitably the alkaloid content may be modulated by about 0.5 fold to about 4 fold. Suitably the alkaloid content may be modulated by about 4 fold. Suitably the modification may be an increase or a decrease in alkaloid content. Suitably the modulation may be of one or more alkaloids selected from nicotine, nornicotine, PON, anatabine, anabasine and myosmine. Suitably the modulation may be of one or more alkaloids selected from nicotine, nornicotine, PON, anatabine and anabasine. Suitably, the PON content is modulated.

In one embodiment of the invention the alkaloid content of a plant (e.g. a tobacco plant) or part thereof may be modulated by at least 1%, 2%, 5%, 8%, 10%, 12%, 15%, 20%, 25%, 30%, 40%, 50%, 60%, 70%, 80%, 90% or 100% in comparison to a plant (e.g. a tobacco plant) or part thereof which has not been modified according to the present invention. In one embodiment the alkaloid content may be modulated by at least 30% in comparison to an unmodified plant or part thereof. In one embodiment the alkaloid content may be modulated by at least 40% in comparison to an unmodified plant or part thereof. In one embodiment the alkaloid content may be modulated by at least 50% in comparison to an unmodified plant or part thereof. In one embodiment the alkaloid content may be modulated by at least 60% in comparison to an unmodified plant or part thereof. The modulation may be an increase or a decrease in alkaloid content when compared to an unmodified plant (e.g. a tobacco plant) or part thereof. Suitably the modulation may be of total alkaloid content. Suitably the modulation may be of one or more alkaloids selected from nicotine, nornicotine, PON, anatabine, anabasine and myosmine. Suitably the modulation may be of one or more alkaloids selected from nicotine, nornicotine, PON, anatabine and anabasine. Suitably the modulation is of nicotine content, such as decrease in nicotine content. Suitably the modulation is of nornicotine content, such as decrease in nornicotine content. Suitably the modulation is of anabasine content, such as decrease in anabasine content. Suitably the modulation is of PON content, such as decrease in PON content. Suitably the modulation is of anatabine content, such as decrease in anatabine content. Suitably the modulation is of more than one alkaloid, such as two or more alkaloids, such as three or more alkaloids, such as four or more alkaloids, such as five or more alkaloids, such as all six alkaloids, selected from nicotine, nornicotine, PON, anatabine, anabasine and myosmine.

In some embodiments the alkaloid content of the plant may be modulated by between about 5% and about 100%, by between about 10% and about 90%, by between about 20% and about 80%, by between about 30% and about 70%, by between about 40% and 60%, by between about 40% and 50%, or by between about 50% and 60%.

Tobacco-Specific Nitrosamine (TSNA) Content

In one embodiment the present invention provides a method of decreasing the content of at least one tobacco-specific nitrosamine (TSNA) precursor in a plant (e.g. a tobacco plant) or a part thereof. Suitably, the method may comprise modifying said plant by modulating the activity or expression of at least one gene encoding a WAT1-related protein. In one embodiment, the present invention provides a method of producing a processed leaf with decreased TSNA content (e.g. relative to a comparable product). The method of producing a processed leaf with decreased TSNA content may comprise:

modifying a plant by decreasing or inhibiting the activity or expression of at least one gene encoding a WAT1-related protein;
harvesting a leaf from said plant;
and curing said harvested leaf.

The TSNA may be measured in a processed tobacco, e.g. cured tobacco or reconstituted tobacco. In one embodiment the TSNA content is measured and/or modified (e.g. reduced) in a cured tobacco plant or part thereof (e.g. in cured tobacco leaf).

The term "tobacco-specific nitrosamine" or "TSNA" as used herein has its usual meaning in the art, namely a nitrosamine which is found only in tobacco products or other nicotine-containing products. Suitably the at least one tobacco-specific nitrosamine may be 4-(methylnitrosamino)-1-(3-pyridyl)-1-butanone (NNK), N'-nitrosonornicotine (NNN), N'-nitrosoanatabine (NAT) or N-nitrosoanabasine (NAB).

The term "precursor thereto" when used in relation to at least one tobacco-specific nitrosamine refers to one or more chemicals or compounds of a tobacco plant that give rise to the formation of a tobacco-specific nitrosamine or are involved in the nitrosation reaction leading to tobacco-specific nitrosamine production. Suitably the term "precursor thereto" may refer to nitrate, nitrite or nitric oxide.

In one embodiment the TSNA is 4-(methylnitrosamino)-1-(3-pyridyl)-1-butanone (NNK) and/or the precursor is PON.

In one embodiment the TSNA is N'nitrosonornicotine (NNN) and/or the precursor is nornicotine. In one embodiment the TSNA may be one or more of group selected from: N'-nitrosonornicotine (NNN), N'nitrosoanatabine (NAT), N'-nitrosoanabasine (NAB) and 4-(methyl nitrosamino)-1-(3-pyridyl)-1-butanone (NNK). Suitably the at least one tobacco-specific nitrosamine may be NNK or NNN. In one embodiment the tobacco-specific nitrosamine is NNK.

In one embodiment the precursor of the TSNA is one or more of the group selected from nornicotine, anabasine, anatabine, and an oxidised derivative of nicotine such as pseudooxynicotine (PON).

In one embodiment, the precursor of the TSNA may be PON. The precursor of the TSNA (e.g. NNK, NNN, NAB and/or NAT) may be measured in green tobacco leaf, e.g. prior to processing, e.g. prior to curing. In one embodiment the precursor of the TSNA (e.g. NNK, NNN, NAB and/or NAT) is measured and/or modified (e.g. reduced) in a green tobacco leaf, e.g. prior to processing, e.g. prior to curing.

In one embodiment carrying out a method and or use of the invention results in a reduction of at least one TSNA or a precursor thereto in the modified tobacco plant (or part thereof) when compared to a tobacco plant (or part thereof) which has not been modified in accordance with the present invention.

The terms "reducing at least one TSNA or precursor thereto" or "reduction of at least one TSNA or precursor thereto" are used herein to mean that the concentration and/or total content of the at least one TSNA or precursor thereto in the product, method or use of the invention is lower in relation to a comparable product, method or use. For example, a comparable delivery system would be derived from a tobacco plant which had not been modified according to the present invention, but in which all other relevant features were the same (e.g. plant species, growing conditions, method of processing tobacco, etc.).

Any method known in the art for determining the concentration and/or levels of at least one TSNA or precursor thereto may be used. In particular a method such may comprise the addition of deuterium labelled internal standard, an aqueous extraction and filtration, followed by analysis using reversed phase high performance liquid chromatography with tandem mass spectrometry (LC-MS/MS) may be used. Other examples for determining the concentration and/or level of a precursor to a tobacco-specific nitrosamine include a method such as the one detailed in CORESTA recommended method CRM-72: Determination of Tobacco Specific Nitrosamines in Tobacco and Tobacco Products by LC-MS/MS; CRM being developed into ISO/DIS 21766 or Wagner et al. (2005) Analytical Chemistry 77(4), 1001-1006 all of which are incorporated herein by reference.

Suitably the concentration and/or total content of the at least one tobacco-specific nitrosamine or precursor thereto may be reduced by carrying out a method and/or use of the present invention. Suitably the concentration and/or level of the at least one tobacco-specific nitrosamine or precursor thereto may be reduced in a tobacco plant of the invention (e.g. obtainable or obtained by a method and/or use of the invention) when compared to the concentration and/or level of the at least one tobacco-specific nitrosamine(s) or precursor thereto in a tobacco plant which has not been modified in accordance with present invention.

The concentration and/or total content of the at least one tobacco-specific nitrosamine(s) or precursor thereto may be reduced in a tobacco leaf, harvested leaf, processed tobacco leaf, delivery system or combinations thereof obtainable or obtained from a tobacco plant (or part of a tobacco plant or a tobacco cell culture) of the invention when compared with a tobacco leaf, harvested leaf, processed tobacco leaf, delivery system or combinations thereof obtainable or obtained from a tobacco plant (or part of a tobacco plant or a tobacco cell culture) which has not been modified in accordance with the present invention.

Suitably the concentration and/or total content of the at least one tobacco-specific nitrosamine or precursor thereto may be reduced in a processed tobacco leaf.

Suitably the concentration and/or level of the at least one tobacco-specific nitrosamine or precursor thereto may be reduced in a delivery system.

In one embodiment the at least one tobacco-specific nitrosamine or precursor thereto may be reduced by at least about 1%, at least about 3%, at least about 5%, at least about 10%, at least about 20%, at least about 30%, at least about 40% or at least about 50%. In some embodiments the at least one tobacco-specific nitrosamine or precursor thereto may be reduced by between about 5% and about 50%, by between about 10% and about 50%, by between about 20% and about 50%, by between about 30% and about 50%, or by between about 40% and 50%.

In relation to processed (e.g. cured) tobacco leaf (e.g. cured or reconstituted), the at least one tobacco-specific nitrosamine or precursor thereto may be reduced by between about 5000 ng/g and about 50 ng/g, by between about 4000 ng/g and about 100 ng/g, by between about 3000 ng/g and 500 ng/g or by between 2000 ng/g and 1000 ng/g. In some embodiments the at least one tobacco-specific nitrosamine or precursor thereto may be reduced by at least about 5000 ng/g, at least about 4000 ng/g, at least about 3000 ng/g, at least about 2000 ng/g, at least about 1000 ng/g, at least about 500 ng/g, at least about 100 ng/g or at least about 50 ng/g.

Biomass Production

In some instances, it may be desirable to produce plants or biomass with high alkaloid levels e.g. high levels of nicotine content so that nicotine may be purified to produce a pure nicotine product for example for use in devices which utilize liquid containing nicotine (e.g. e-cigarettes) or within tobacco heating devices. For example, the production of nicotine in this way could reduce costs of nicotine extraction for the production of e-liquids for e-cigarettes.

In one aspect, the present invention provides a method of producing a biomass comprising: growing a cell which has been engineered to modulate (e.g. increase) the activity or expression of a gene encoding a WAT1-related protein under conditions to produce a biomass.

In one embodiment, the present invention provides a method of producing a biomass having modified (e.g. increased) concentration and/or total content of nicotine, comprising growing a cell which has been engineered to decrease the activity or expression of at least one gene encoding a WAT1-related protein comprising an amino acid sequence as set out in SEQ ID NO. 1, 4, 7, 10, 13, 16, 19, 22, 25 or 28, or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30, or a functional variant or functional fragment or orthologue of SEQ ID NO. 2, 3, 5, 6, 8, 9, 11, 12, 14, 15, 17, 18, 20, 21, 23, 24, 26, 27, 29 or 30 or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30.

The cell may be engineered by any method known in the art to modify the activity or expression of at least one gene encoding a WAT1-related protein. Suitably, the cell may be engineered to express an exogenous gene encoding a WAT1-related protein. Suitably, the cell may be engineered to overexpress a gene encoding a WAT1-related protein. Suitably, the cell may be engineered to decrease the activity or expression of a gene encoding a WAT1-related protein. Suitably, the biomass may contain a lower concentration and/or total content of nicotine compared with the biomass produced by a comparable cell which has not been modified in accordance with the present invention.

Suitably the cell for use in biomass production may be a plant cell, such as a tobacco cell. Suitably the cell for use in biomass production may be a yeast cell.

In one embodiment the cell (e.g. yeast cell) may be further modified to comprise one or more sequences that increases nicotinic alkaloid biosynthesis. Suitably these one or more sequences may be incorporated into a nucleic acid construct that is suitable for cell (e.g. yeast cell) transformation. The one or more sequences may be overexpressed in the cell (e.g. yeast cell). The sequences may be selected from one or more of the following genes: MPO (or Methylputrescine Oxidase or MPO1 or MPO2); A622 (or Isoflavone reductase-like protein or Isoflavone reductase homolog or Isoflavone reductase-like protein); BBL (or Berberine bridge enzyme or Berberine bridge enzyme-like or BBE or NBB1); PMT (or Putrescine N-Methyltransferase or putrescine methyltransferase or S-adenosyl-L-methionine:putrescine N-methyltransferase or PMT or PMT1 or PMT2 or PMT3 or PMT4) and QPT (or quinolinate phosphoribosyltransferase). In one embodiment the sequences may be selected from one or more of the following genes: BBL, A622, PMT and MPO (MPO1 or MPO2). Genes suitable for modification in this way may be taught in US2016032299 for example, which is incorporated herein by reference.

Commercially Desirable Traits

In one embodiment the plants of the present invention have modified (i.e. increased or decreased) total alkaloid content and/or modified (i.e. increased or decreased) content of one or more alkaloids, whilst the flavour characteristics and/or other commercially desirable traits are at least maintained. In one embodiment the plants of the present invention produce leaves of a similar grade and/or quality to plants which have not been modified according to the invention. In one embodiment the plants of the present invention have reduced PON content without a significant change in the flavour characteristics of the plant (e.g. compared with the same plant which has not been modified in accordance with the present invention).

In one embodiment the plants of the present invention have decreased TSNA precursor content without a significant change (e.g. decrease) in other commercially desirable traits of the plant (e.g. compared with the same plant which has not been modified in accordance with the present invention). In particular the yield of the modified plant is preferably not reduced compared with the same plant which has not been modified in accordance with the present invention.

Therefore in one embodiment the methods and uses of the present invention relate to decreasing TSNA precursor content whilst maintaining the flavour characteristics and/or other commercially desirable traits (e.g. yield).

The term "commercially desirable traits" as used herein will include traits such as yield, mature plant height, harvestable leaf number, average node length, cutter leaf length, cutter leaf width, quality (e.g. leaf quality, suitably cured leaf quality), abiotic (for instance drought) stress tolerance, herbicide tolerance and/or biotic (for instance insect, bacteria or fungus) stress tolerance.

Leaf quality may be measured based on colour, texture and aroma of the cured leaf, for example according to United States Department of Agriculture (USDA) grades and standards.

Tobacco grades are evaluated based on factors including, but not limited to, the leaf stalk position, leaf size, leaf colour, leaf uniformity and integrity, ripeness, texture, elasticity, sheen (related with the intensity and the depth of coloration of the leaf as well as the shine), hygroscopicity (the faculty of the tobacco leaves to absorb and to retain the ambient moisture), and green nuance or cast.

Leaf grade can be determined using standard methods known in the art, for example, using an Official Standard Grade published by the Agricultural Marketing Service of the US Department of Agriculture (7 U.S.C. § 511). See, e.g., Official Standard Grades for Burley Tobacco (U.S. Type 31 and Foreign Type 93), effective Nov. 5, 1990 (55 F.R. 40645); Official Standard Grades for Flue-Cured Tobacco (U.S. Types 11, 12, 13, 14 and Foreign Type 92), effective Mar. 27, 1989 (54 F.R. 7925); Official Standard Grades for Pennsylvania Seedleaf Tobacco (U.S. Type 41), effective Jan. 8, 1965 (29 F.R. 16854); Official Standard Grades for Ohio Cigar-Leaf Tobacco (U.S. Types 42, 43, and 44), effective Dec. 8, 1963 (28 F.R. 11719 and 28 F.R. 11926); Official Standard Grades for Wisconsin Cigar-Binder Tobacco (U.S. Types 54 and 55), effective Nov. 20, 1969 (34 F.R. 17061); Official Standard Grades for Wisconsin Cigar-Binder Tobacco (U.S. Types 54 and 55), effective Nov. 20, 1969 (34 F.R. 17061); Official Standard Grades for Georgia and Florida ShadeGrown Cigar-Wrapper Tobacco (U.S. Type 62), Effective April 1971. A USDA grade index value can be determined according to an industry accepted grade index. See e.g. Bowman et al. (1988) Tobacco Science, 32:39-40; Legacy Tobacco Document Library (Bates Document #523267826-523267833, Jul. 1, 1988, Memorandum on the Proposed Burley Tobacco Grade Index); and Miller et al. (1990) Tobacco Intern., 192:55-57 (all foregoing references are incorporated herein in their entirety).

In one aspect, a USDA grade index is a 0-100 numerical representation of federal grade received and is a weighted average of all stalk positions. A higher grade index indicates higher quality. Alternatively, leaf grade may be determined via hyper-spectral imaging. See e.g. WO 2011/027315 (which is incorporated herein by reference).

In one embodiment, a tobacco plant of the present invention provides tobacco of commercially acceptable grade.

Suitably, the tobacco plant of the present invention provides cured tobacco of commercially acceptable grade.

In one embodiment, a tobacco plant of the present invention is capable of producing leaves having a USDA grade index value of at least about 70% of the USDA grade index value of leaves of a comparable plant when grown in similar growth conditions. Suitably, tobacco plants disclosed herein may be capable of producing leaves having a USDA grade index value of at least about 65%, at least about 70%, at least about 75%, at least about 80%, at least about 85%, at least about 90%, at least about 95%, or at least about 98% of the USDA grade index value of a control plant when grown in similar growth conditions. Suitably, tobacco plants disclosed herein may be capable of producing leaves having a USDA grade index value of between 65% and 130%, between 70% and 130%, between 75% and 130%, between 80% and 130%, between 85% and 130%, between 90% and 130%, between 95% and 130%, between 100% and 130%, between 105% and 130%, between 110% and 130%, between 115% and 130%, or between 120% and 130% of the USDA grade index value of a comparable plant.

In one aspect, the tobacco plant of the present invention is capable of producing leaves having a USDA grade index value of at least 50. Suitably, tobacco plants disclosed herein may be capable of producing leaves having a USDA grade index value of 55 or more, 60 or more, 65 or more, 70 or more, 75 or more, 80 or more, 85 or more, 90 or more, and 95 or more.

Unless specified otherwise, used herein, tobacco yield refers to cured leaf yield which is calculated based on the weight of cured tobacco leaves per acre under standard field conditions following standard agronomic and curing practice.

In one aspect, a plant (e.g. a tobacco plant) of the present invention has a yield between 50% and 150%, between 55% and 145%, between 60% and 140%, between 65% and 135%, between 70% and 130%, between 75% and 125%, between 80% and 120%, between 85% and 115%, between 90% and 110%, between 95% and 105%, between 50% and 100%, between 55% and 100%, between 60% and 100%, between 65% and 100%, between 70% and 100%, between 75% and 100%, between 80% and 100%, between 85% and 100%, between 90% and 100%, between 95% and 100%, between 100% and 150%, between 105% and 150%, between 110% and 150%, between 115% and 150%, between 120% and 150%, between 125% and 150%, between 130% and 150%, between 135% and 150%, between 140% and 150%, or between 145% and 150% of the yield of a comparable plant when grown in similar field conditions.

In another aspect, the plant (e.g. a tobacco plant) yield of the present invention is approximately 1.5, 1.6, 1.7, 1.8, 1.9, 2.0, 2.1, 2.2, 2.3, 2.4, 2.5, 2.6, 2.7, 2.8, 2.9, or 3.0 times of the yield of a comparable plant when grown in similar field conditions.

In another aspect, the yield of a tobacco plant of the present invention is comparable to the yield of the flue cured comparable plant when grown in similar field conditions.

In one aspect, a tobacco plant of the present invention provides a yield selected from the group consisting of about between 1200 and 3500, between 1300 and 3400, between 1400 and 3300, between 1500 and 3200, between 1600 and 3100, between 1700 and 3000, between 1800 and 2900, between 1900 and 2800, between 2000 and 2700, between 2100 and 2600, between 2200 and 2500, and between 2300 and 2400 lbs/acre.

In another aspect, a tobacco plant of the present invention provides a yield selected from the group consisting of about between 1200 and 3500, between 1300 and 3500, between 1400 and 3500, between 1500 and 3500, between 1600 and 3500, between 1700 and 3500, between 1800 and 3500, between 1900 and 3500, between 2000 and 3500, between 2100 and 3500, between 2200 and 3500, between 2300 and 3500, between 2400 and 3500, between 2500 and 3500, between 2600 and 3500, between 2700 and 3500, between 2800 and 3500, between 2900 and 3500, between 3000 and 3500, and between 3100 and 3500 lbs/acre.

In a further aspect, a tobacco plant of the present invention provides a yield selected from the group consisting of about between 1200 and 3500, between 1200 and 3400, between 1200 and 3300, between 1200 and 3200, between 1200 and 3100, between 1200 and 3000, between 1200 and 2900, between 1200 and 2800, between 1200 and 2700, between 1200 and 2600, between 1200 and 2500, between 1200 and 2400, between 1200 and 2300, between 1200 and 2200, between 1200 and 2100, between 1200 and 2000, between 1200 and 1900, between 1200 and 1800, between 1200 and 1700, between 1200 and 1600, between 1200 and 1500, and between 1200 and 1400 lbs/acre.

Plant Breeding

In one embodiment the present invention provides a method of producing a plant having a modified alkaloid content and/or modified content of a tobacco specific nitrosamine (TSNA) precursor comprising:

a. crossing a donor plant having modified nicotine content and/or modified content of a tobacco specific nitrosamine (TSNA) precursor and wherein the activity or expression of at least one gene encoding a WAT1-related protein according to the present invention has been modulated in the donor plant in accordance with the present invention with a recipient tobacco plant that does not have modified nicotine content or modified content of a tobacco specific nitrosamine (TSNA) precursor and possesses commercially desirable traits;

b. isolating genetic material from a progeny of said donor plant crossed with said recipient plant; and c. performing molecular marker-assisted selection with a molecular marker comprising:
   i. identifying an introgressed region comprising a mutation in a polynucleotide sequence encoding a protein defined in a.

Suitably, the activity or expression of a protein comprising an amino acid sequence as set out in SEQ ID NO. 1, 4, 7, 10, 13, 16, 19, 22, 25 or 28, or a functional variant or functional fragment or orthologue thereof, or a sequence which has at least 80% identity to SEQ ID NO. 2, 3, 5, 6, 8, 9, 11, 12, 14, 15, 17, 18, 20, 21, 23, 24, 26, 27, 29 or 30; or a protein encoded by a nucleotide sequence as set out in SEQ ID NO. 2, 3, 5, 6, 8, 9, 11, 12, 14, 15, 17, 18, 20, 21, 23, 24, 26, 27, 29 or 30 or a functional variant or functional fragment or orthologue of SEQ ID NO. 2, 3, 5, 6, 8, 9, 11, 12, 14, 15, 17, 18, 20, 21, 23, 24, 26, 27, 29 or 30 or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30 is modulated in the donor plant when compared to a comparable plant.

The molecular marker assisted selection may comprise performing PCR to identify an introgressed nucleic acid sequence comprising a mutation which modulates the activity or expression of a protein comprising the amino acid sequence shown as SEQ ID NO. 1, 4, 7, 10, 13, 16, 19, 22, 25 or 28 or an amino acid sequence which has at least 80% identity thereto.

Plants

Suitable plants according to the invention include the Solanaceae family of plants which include, for example jimson weed, eggplant, mandrake, deadly nightshade (*belladonna*), *capsicum* (paprika, chilli pepper), potato and tobacco.

In one embodiment a suitable genus of Solanaceae is *Nicotiana*, e.g. *Nicotiana tabacum* or *Nicotiana rustica*.

A suitable species of *Nicotiana* may be *Nicotiana tabacum*. Species of *Nicotiana* may be referred to herein as a tobacco plant, or simply tobacco.

Tobacco Plants

The present invention provides methods, uses directed to plants (e.g. tobacco plants) as well as a cell (e.g. a tobacco cell), a plant (e.g. a tobacco plant) and a plant propagation material.

The term "tobacco plant" as used herein refers to a plant in the genus *Nicotiana* that is used in the production of tobacco products. Non-limiting examples of suitable "tobacco" plants include *N. tabacum* and *N. rustica* (for example, *N. tabacum* L., LA B21, LN KY171, TI 1406, Basma, *Galpao*, Perique, Beinhart 1000-1, and Petico).

In one aspect, the tobacco plant according to the present invention is a non-naturally occurring tobacco plant. Suitably, the tobacco plant may be a mutant, non-naturally occurring tobacco plant. Suitably, the tobacco plant may be a transgenic tobacco plant.

In one aspect, the tobacco plant according to the present invention comprises a non-naturally occurring mutation which modulates (e.g. decreases) the activity or expression of at least one encoding a Walls are thin 1-related (WAT1-related) protein. Suitably, the tobacco plant may comprise a mutation which has been introduced.

The tobacco material can be derived or obtained from varieties of *Nicotiana tabacum* types, commonly known as Burley varieties, flue or bright varieties and dark varieties. In some embodiments, the tobacco material is derived from a Burley, Virginia or a dark tobacco plant.

The tobacco plant may be selected from Burley tobacco, rare tobacco, specialty tobacco, expanded tobacco or the like.

The use of tobacco cultivars and elite tobacco cultivars is also contemplated herein. The tobacco plant for use herein may therefore be a tobacco variety or elite tobacco cultivar. Particularly useful *Nicotiana tabacum* varieties include Flue-cured Virginia type, Burley type, and Oriental type.

In some embodiments, the tobacco plant may be, for example, selected from one or more of the following varieties: L. cultivar T.I. 1068, AA 37-1, B 13P, Xanthi (Mitchell-Mor), KT D #3 Hybrid 107, Bel-W3, 79-615, Samsun Holmes NN, F4 from cross BU21 x Hoja Parado, line 97, KTRDC #2 Hybrid 49, KTRDC #4 Hybrid 1 10, Burley 21, PM016, KTRDC #5 KY 160 SI, KTRDC #7 FCA, KTRDC #6 TN 86 SI, PMO21, K 149, K 326, K 346, K 358, K 394, K 399, K 730, KY 10, KY 14, KY 160, KY 17, KY 8959, KY 9, KY 907, MD 609, McNair 373, NC 2000, PG 01, PG 04, P01, P02, P03, RG 11, RG 17, RG 8, Speight G-28, TN 86, TN 90, VA 509, AS44, Banket A1, Basma Drama B84/31, Basma I Zichna ZP4/B, Basma Xanthi BX 2A, Batek, Besuki Jember, C104, Coker 319, Coker 347, Criollo Misionero, PM092, Delcrest, Djebel 81, DVH 405, *Galpao* Comum, HB04P, Hicks Broadleaf, Kabakulak Elassona, PM102, Kutsage E1, KY 14 x L8, KY 171, LA BU 21, McNair 944, NC 2326, NC 71, NC 297, NC 3, PVH 03, PVH 09, PVH 19, PVH 21 10, Red Russian, Samsun, Saplak, Simmaba, Talgar 28, PM132, Wislica, Yayaldag, NC 4, TR Madole, Prilep HC-72, Prilep P23, Prilep PB 156/1, Prilep P12-2/1, Yaka JK-48, Yaka JB 125/3, TI-1068, KDH-960, TI-1070, TW136, PM204, PM205, Basma, TKF 4028, L8, TKF 2002, TN 90, GR141, Basma xanthi, GR149, GR153, and Petit Havana.

Non-limiting examples of varieties or cultivars are: BD 64, CC 101, CC 200, CC 27, CC 301, CC 400, CC 500, CC 600, CC 700, CC 800, CC 900, Coker 176, Coker 319, Coker 371 Gold, Coker 48, CD 263, DF91 1, DT 538 LC, *Galpao* tobacco, GL 26H, GL 350, GL 600, GL 737, GL 939, GL 973, HB 04P, HB 04P LC, HB3307PLC, Hybrid 403LC, Hybrid 404LC, Hybrid 501 LC, K 149, K 326, K 346, K 358, K394, K 399, K 730, KDH 959, KT200, KT204LC, KY10, KY14, KY 160, KY 17, KY 171, KY 907, KY907LC, KTY14xL8 LC, Little Crittenden, McNair 373, McNair 944, msKY 14xL8, Narrow Leaf Madole, Narrow Leaf Madole LC, NBH 98, N-126, N-777LC, N-7371 LC, NC 100, NC 102, NC 2000, NC 291, NC 297, NC 299, NC 3, NC 4, NC 5, NC 6, NC7, NC 606, NC 71, NC 72, NC 810, NC BH 129, NC 2002, Neal Smith Madole, OXFORD 207, PD 7302 LC, PD 7309 LC, PD 7312 LC 'Periq'e' tobacco, PVHO3, PVH09, PVH19, PVH50, PVH51, R 610, R 630, R 7-1 1, R 7-12, RG 17, RG 81, RG H51, RGH 4, RGH 51, RS 1410, Speight 168, Speight 172, Speight 179, Speight 210, Speight 220, Speight 225, Speight 227, Speight 234, Speight G-28, Speight G-70, Speight H-6, Speight H20, Speight NF3, TI 1406, TI 1269, TN 86, TN86LC, TN 90, TN 97, TN97LC, TN D94, TN D950, TR (Tom Rosson) Madole, VA 309, VA359, AA 37-1, B 13P, Xanthi (Mitchell-Mor), Bel-W3, 79-615, Samsun Holmes NN, KTRDC number 2 Hybrid 49, Burley 21, KY 8959, KY 9, MD 609, PG 01, PG 04, P01, P02, P03, RG 1 1, RG 8, VA 509, AS44, Banket A1, Basma Drama B84/31, Basma I Zichna ZP4/B, Basma Xanthi BX 2A, Batek, Besuki Jember, C104, Coker 347, Criollo Misionero, Delcrest, Djebel 81, DVH 405, *Galpao* Comum, HB04P, Hicks Broadleaf, Kabakulak Elassona, Kutsage E1, LA BU 21, NC 2326, NC 297, PVH 21 10, Red Russian, Samsun, Saplak, Simmaba, Talgar 28, Wislica, Yayaldag, Prilep HC-72, Prilep P23, Prilep PB 156/1, Prilep P12-2/1, Yaka JK-48, Yaka JB 125/3, TI-1068, KDH-960, TI-1070, TW136, Basma, TKF 4028, L8, TKF 2002, GR141, Basma xanthi, GR149, GR153, Petit Havana. Low converter subvarieties of the above, even if not specifically identified herein, are also contemplated.

The tobacco plant may be a Burley, Flue-cured Virginia, or Oriental.

In one embodiment the plant propagation material may be obtainable from a plant (e.g. a tobacco plant) of the invention.

A "plant propagation material" as used herein refers to any plant matter taken from a plant from which further plants may be produced. Suitably, a plant propagation material may be selected from a seed, plant calli and plant clumps. Suitably the plant propagation material may be a seed.

Suitably, the plant propagation material may be plant calli. Suitably the plant propagation material may be plant clumps.

In one embodiment the cell (e.g. tobacco cell), tobacco plant and/or plant propagation material may be obtainable (e.g. obtained) by a method according to the invention.

Suitably a tobacco plant according to the present invention may have modulated (e.g. decreased) nicotine content when compared to an unmodified tobacco plant, wherein the tobacco plant has been modified to modulate (e.g. decrease) the activity or expression of at least on one gene encoding a WAT1-related protein.

Suitably a tobacco plant according to the present invention may have modulated (e.g. reduced) content of a tobacco specific nitrosamine (TSNA) precursor when compared to an unmodified tobacco plant, wherein the tobacco plant has been modified to modulate (e.g. increase) the activity or expression of at least on one gene encoding a WAT1-related protein.

In one embodiment the tobacco plant in accordance with the present invention comprises a tobacco cell of the invention.

In another embodiment the plant propagation material may be obtainable (e.g. obtained) from a tobacco plant of the invention.

In one embodiment there is provided the use of a tobacco plant as described herein to breed a tobacco plant.

The present invention also provides in another embodiment the use of a tobacco plant of the foregoing embodiments for the production of a delivery system.

In another embodiment there is provided the use of a tobacco plant of the invention to grow a crop.

In one embodiment there is provided a cell such as a plant cell, such as a tobacco plant cell having modulated (e.g. decreased) activity or expression of at least one gene encoding a Walls are thin 1-related (WAT1-related) protein. Suitably, the cell may be a non-naturally occurring cell. Suitably, the cell may be a mutant cell. Suitably, the cell may be a non-naturally occurring mutant cell. For example the cell may comprise a non-naturally occurring mutation which modulated (e.g. decreased) activity or expression of at least one gene encoding a Walls are thin 1-related (WAT1-related) protein.

In one embodiment there is provided the use of a cell as provided for in the foregoing embodiments for production of a delivery system.

In one embodiment the present invention provides a cell culture (e.g. in in vitro culture). "Cell culture" as used herein refers to a plurality of cells.

For example a cell culture according to the present invention comprises a plurality of cells according to the present invention. Suitably the cell culture may comprise a plurality of tobacco cells according to the present invention.

The cell culture may be a cell suspension culture. These cells cultured in vitro may be incorporated into a delivery system, e.g. as a substitute for conventional tobacco particles, shreds, fine cut or long cut tobacco lamina, as an additive ingredient or as both a substitute and an additive. Suitably, the cell culture may produce nicotine.

In one embodiment there is provided the use of a cell or cell culture, e.g. a harvested and/or processed cell or cell culture according to the present invention for the production of a delivery system.

The tobacco cells harvested from an in vitro culture may be dried, e.g. freeze-dried, for example to produce a powder.

In one embodiment, the cell or cell culture is a tobacco cell or cell culture. The skilled person will be aware of known methods for establishing in vitro cultures of tobacco cells. By way of example only, the following method may be used: collecting seeds form a tobacco plant of interest and sterilising their exterior to eliminate unwanted organisms, planting said seeds to grown a tobacco plant of interest, removing tissue from the tobacco plant (for example, from the tobacco stem) for use as an explant, establishing a callus culture form the tobacco explant, establishing a cell suspension culture from the callus culture, and harvesting culture material (e.g. including tobacco cells) to produce a tobacco cell culture.

The tobacco cells can be harvested by various methods, including filtration, e.g. vacuum filtration. The sample may be washed in the filter by adding water and the remaining liquid removed with the filtration, e.g. vacuum filtration.

The harvested tobacco cell culture may be further processed, e.g. dried, such as air-dried and/or freeze-dried. The harvested tobacco cell culture or dried harvested tobacco cell culture or an extract therefrom may be incorporated into delivery systems according to the present invention.

In one embodiment, the present invention provides a plant (e.g. tobacco plant) or part thereof for use in molecular farming. Suitably, a plant or part thereof modified in accordance with the present invention may be used in the manufacture of proteins such as therapeutics e.g. antibiotics, virus like particles, neutraceuticals or small molecules.

In one embodiment, the present invention provides a method for the production of proteins (e.g. therapeutic proteins), the method comprising modifying a plant or part thereof capable of producing said protein (e.g. therapeutic protein) by modulating the activity or expression of at least one WAT1-related protein gene encoding an amino acid sequence as set out in SEQ ID NO. 1, 4, 7, 10, 13, 16, 19, 22, 25 or 28 or a functional variant or functional fragment or orthologue thereof, or a sequence which has at least 80% identity to SEQ ID NO. 1, 4, 7, 10, 13, 16, 19, 22, 25 or 28; or wherein the at least one gene encoding a WAT1-related protein comprises a nucleotide sequence as set out in SEQ ID NO. 2, 3, 5, 6, 8, 9, 11, 12, 14, 15, 17, 18, 20, 21, 23, 24, 26, 27, 29 or 30 or a functional variant or functional fragment or orthologue of SEQ ID NO. 2, 3, 5, 6, 8, 9, 11, 12, 14, 15, 17, 18, 20, 21, 23, 24, 26, 27, 29 or 30 or a nucleic acid sequence which has at least 80% identity to SEQ ID NO. 2, 3, 5, 6, 8, 9, 11, 12, 14, 15, 17, 18, 20, 21, 23, 24, 26, 27, 29 or 30; and culturing the plant under conditions sufficient to allow the production of said protein (e.g. therapeutic protein).

Products

The present invention also provides for products obtainable or obtained from plants according to the present invention. Products are provided which are obtainable or obtained from a plant in which the activity or expression of gene encoding a WAT1-related protein has been modulated. In one embodiment, the product may comprise a construct of the invention which modulates the activity or expression of at least one gene encoding a WAT1-related protein as defined herein. In one embodiment, the product may comprise a construct of the invention which modifies the nucleic acid sequence of at least one gene encoding a WAT1-related protein as defined herein. The present invention also provides for products obtainable or obtained from tobacco according to the present invention.

In one embodiment there is provided the use of a tobacco plant of the invention to produce a tobacco leaf.

Suitably the tobacco leaf may be subjected to downstream applications such as processing.

Thus in one embodiment the use of the foregoing embodiment may provide a processed tobacco leaf. Suitably the tobacco leaf may be subjected to curing, fermenting, pasteurising or combinations thereof. In another embodiment the tobacco leaf may be cut. In some embodiments the tobacco leaf may be cut before or after being subjected to curing, fermenting, pasteurising or combinations thereof.

In one embodiment the present invention provides a harvested leaf of a tobacco plant of the invention.

In a further embodiment the harvested leaf may be obtainable (e.g. obtained) from a tobacco plant propagated from a propagation material of the present invention.

In another embodiment there is provided a harvest leaf obtainable from a method or use of the present invention.

Suitably the harvested leaf may be a cut harvested leaf.

In some embodiments the harvested leaf may comprise viable tobacco cells. In other embodiments the harvested leaf may be subjected to further processing.

There is also provided a processed tobacco leaf.

The processed tobacco leaf may be obtainable from a tobacco plant of the invention. Suitably the processed tobacco leaf may be obtainable from a tobacco plant obtained in accordance with any of the methods and/or uses of the present invention.

In another embodiment the processed tobacco leaf may be obtainable from a tobacco plant propagated form a tobacco plant propagation material according to the present invention.

The processed tobacco leaf of the present invention may be obtainable by processing a harvested leaf of the invention.

The term "processed tobacco leaf" as used herein refers to a tobacco leaf that has undergone one or more processing steps to which tobacco is subjected to in the art. A "processed tobacco leaf" comprises no or substantially no viable cells.

The term "viable cells" refers to cells which are able to grow and/or are metabolically active.

Thus, if a cell is said to not be viable, also referred to as "non-viable" then a cell does not display the characteristics of a viable cell.

The term "substantially no viable cells" means that less than about 5% of the total cells are viable. Preferably, less than about 3%, more preferably less than about 1%, even more preferably less than about 0.1% of the total cells are viable.

In one embodiment the processed tobacco leaf may be processed by one or more of: curing, fermenting and/or pasteurising.

Suitably the processed tobacco leaf may be processed by curing.

Tobacco leaf may be cured by any method known in the art. In one embodiment tobacco leaf may be cured by one or more of the curing methods selected from the group consisting of: air curing, fire curing, flue curing and sun curing.

Suitably the tobacco leaf may be air cured.

Typically air curing is achieved by hanging tobacco leaf in well-ventilated barns and allowing to dry. This is usually carried out over a period of four to eight weeks. Air curing is especially suitable for burley tobacco.

Suitably the tobacco leaf may be fire cured. Fire curing is typically achieved by hanging tobacco leaf in large barns where fires of hardwoods are kept on continuous or intermittent low smolder and usually takes between three days and ten weeks, depending on the process and the tobacco.

In another embodiment the tobacco leaf may be flue cured. Flue curing may comprise stringing tobacco leaves onto tobacco sticks and hanging them from tier-poles in curing barns. The barns usually have a flue which runs from externally fed fire boxes. Typically this results in tobacco that has been heat-cured without being exposed to smoke. Usually the temperature will be raised slowly over the course of the curing with the whole process taking approximately 1 week.

Suitably the tobacco leaf may be sun cured. This method typically involves exposure of uncovered tobacco to the sun.

Suitably the processed tobacco leaf may be processed by fermenting.

Fermentation can be carried out in any manner known in the art. Typically during fermentation, the tobacco leaves are piled into stacks (a bulk) of cured tobacco covered in e.g. burlap to retain moisture. The combination of the remaining water inside the leaf and the weight of the tobacco generates a natural heat which ripens the tobacco. The temperature in the centre of the bulk is monitored daily. In some methods every week, the entire bulk is opened. The leaves are then removed to be shaken and moistened and the bulk is rotated so that the inside leaves go outside and the bottom leaves are placed on the top of the bulk. This ensures even fermentation throughout the bulk. The additional moisture on the leaves, plus the actual rotation of the leaves themselves, generates heat, releasing the tobacco's natural ammonia and reducing nicotine, while also deepening the colour and improving the tobacco's aroma. Typically the fermentation process continues for up to 6 months, depending on the variety of tobacco, stalk position on the leaf, thickness and intended use of leaf.

Suitably the processed tobacco leaf may be processed by pasteurising. Pasteurising may be particularly preferred when the tobacco leaf will be used to make a smokeless delivery system, most preferably snus.

Tobacco leaf pasteurisation may be carried out by any method known in the art. For example pasteurisation may be carried out as detailed in J Foulds, L Ramstrom, M Burke, K Fagerstrom. Effect of smokeless tobacco (snus) on smoking and public health in Sweden Tobacco Control (2003) 12: 349-359, the teaching of which is incorporated herein by reference.

During the production of snus, pasteurisation is typically carried out by a process in which the tobacco is heat treated with steam for 24-36 hours (reaching temperatures of approximately 100° C.). This results in an almost sterile product and without wishing to be bound by theory one of the consequences of this is believed to be a limitation of further TSNA formation.

In one embodiment the pasteurisation may be steam pasteurisation.

In some embodiments the processed tobacco leaf may be cut. The processed tobacco leaf may be cut before or after processing. Suitably, the processed tobacco leaf may be cut after processing.

In one embodiment, the use of the foregoing embodiment may provide reconstituted tobacco.

In one embodiment, there is provided reconstituted tobacco.

"Reconstituted" as used herein may also be referred to as recon, recycled or homogenized sheet tobacco and refers to tobacco material generated from remnants of tobacco leaf after processing. Reconstituted tobacco allows the production of a consistent, high quality blend and allows the adjustment of the ratio of individual components.

Reconstituted tobacco may be nano fibre recon (nanofibers can be extracted in solid or liquid form), paper making recon (which uses stems, scraps, and midribs, etc. as the raw material) or slurry type recon (which uses a mixture of fines and tobacco stems, ground to power, mixed with water and vegetable binding agent; the soluble residue is formed to sheets by extracting the water).

Any method known in the art may be used for making reconstituted tobacco, for example see CORESTA Congress, Sapporo, 2012, Smoke Science/Product Technology Groups, SSPT 12 (incorporated herein by reference).

In some embodiments the tobacco plant, harvested leaf of a tobacco plant and/or processed tobacco leaf may be used to extract nicotine. The extraction of nicotine can be achieved using any method known in the art. For example a method for extracting nicotine from tobacco is taught in U.S. Pat. No. 2,162,738 which is incorporated herein by reference.

In one aspect, the present invention provides cured tobacco material made from a tobacco plant or part thereof according to the invention.

In another aspect, the present invention provides a tobacco blend comprising tobacco material made from a tobacco plant or part thereof according to the present invention, or from a tobacco cell or cell culture according to the present invention. In one aspect, the present invention provides a tobacco blend comprising cured tobacco material according to the present invention. Suitably, the tobacco blend according to the present invention may comprise approximately 10%, 20%, 30%, 40%, 50%, 60%, 70%, 80% or 90% tobacco from a tobacco plant or part thereof according to the present invention, or from a tobacco cell or cell culture according to the present invention. Suitably, the tobacco blend may comprise approximately 10% tobacco from a tobacco plant or part thereof according to the present invention, or from a tobacco cell or cell culture according to the present invention. Suitably, the tobacco blend may comprise approximately 20% tobacco from a tobacco plant or part thereof according to the present invention, or from a tobacco cell or cell culture according to the present invention. Suitably, the tobacco blend may comprise approximately 30% tobacco from a tobacco plant or part thereof according to the present invention, or from a tobacco cell or cell culture according to the present invention. Suitably, the tobacco blend may comprise approximately 40% tobacco from a tobacco plant or part thereof according to the present invention, or from a tobacco cell or cell culture according to the present invention. Suitably, the tobacco blend may comprise approximately 50% tobacco from a tobacco plant or part thereof according to the present invention, or from a tobacco cell or cell culture according to the present invention. Suitably, the tobacco blend may comprise approximately 60% tobacco from a tobacco plant or part thereof according to the present invention, or from a tobacco cell or cell culture according to the present invention. Suitably, the tobacco blend may comprise approximately 70% tobacco from a tobacco plant or part thereof according to the present invention, or from a tobacco cell or cell culture according to the present invention. Suitably, the tobacco blend may comprise approximately 80% tobacco from a tobacco plant or part thereof according to the present invention, or from a tobacco cell or cell culture according to the present invention. Suitably, the tobacco blend may comprise approximately 90% tobacco from a tobacco plant or part thereof according to the present invention, or from a tobacco cell or cell culture according to the present invention.

In one aspect, a tobacco blend product of the present invention comprises at least about 5, 10, 20, 30, 40, 50, 60, 70, 80, 90, or 95 percent by dry weight of tobacco cured from a tobacco plant or part thereof according to the present invention, or a tobacco cell or culture according to the present invention.

Suitably, the cured tobacco material may be air cured.
Suitably, the cured tobacco material may be flue cured.
Suitably, the cured tobacco material may be sun cured.
Suitably, the cured tobacco material may be fire cured.

A delivery system or smoking article according to the present invention may comprise the tobacco material (e.g. cured tobacco material or reconstituted tobacco material) according to the present invention.

In another aspect the present invention provides a delivery system.

In one embodiment the delivery system according to the present invention may be a blended delivery system. Suitably, the tobacco blend may comprise cured tobacco material according to the present invention.

In one embodiment the delivery system may be prepared from a tobacco plant of the invention or a part thereof.

Suitably the tobacco plant or part thereof may be propagated from a tobacco plant propagation material according to the present invention.

The term "part thereof" as used herein in the context of a tobacco plant refers to a portion of the tobacco plant. Suitably, the "part thereof" may be a leaf, root or stem of a tobacco plant or the flowers. Suitably, the "part thereof" may be a leaf, root or stem of a tobacco plant.

Delivery System

As used herein, the term "delivery system" is intended to encompass systems that deliver at least one substance to a user, and includes:

combustible aerosol provision systems, such as cigarettes, cigarillos, cigars, and tobacco for pipes or for roll-your-own or for make-your-own cigarettes (whether based on tobacco, tobacco derivatives, expanded tobacco, reconstituted tobacco, tobacco substitutes or other smokable material);

non-combustible aerosol provision systems that release compounds from an aerosol-generating material without combusting the aerosol-generating material, such as electronic cigarettes, tobacco heating products, and hybrid systems to generate aerosol using a combination of aerosol-generating materials; and aerosol-free delivery systems that deliver the at least one substance to a user orally, nasally, transdermally or in another way without forming an aerosol, including but not limited to, lozenges, gums, patches, articles comprising inhalable powders, and oral products such as oral tobacco which includes snus or moist snuff, wherein the at least one substance may or may not comprise nicotine.

According to the present disclosure, a "combustible" aerosol provision system is one where a constituent aerosol-generating material of the aerosol provision system (or component thereof) is combusted or burned during use in order to facilitate delivery of at least one substance to a user.

In some embodiments, the delivery system is a combustible aerosol provision system, such as a system selected from the group consisting of a cigarette, a cigarillo and a cigar.

In some embodiments, the disclosure relates to a component for use in a combustible aerosol provision system, such as a filter, a filter rod, a filter segment, a tobacco rod, a spill, an aerosol-modifying agent release component such as a capsule, a thread, or a bead, or a paper such as a plug wrap, a tipping paper or a cigarette paper.

According to the present disclosure, a "non-combustible" aerosol provision system is one where a constituent aerosol-generating material of the aerosol provision system (or component thereof) is not combusted or burned in order to facilitate delivery of at least one substance to a user.

In some embodiments, the delivery system is a non-combustible aerosol provision system, such as a powered non-combustible aerosol provision system.

In some embodiments, the non-combustible aerosol provision system is an electronic cigarette, also known as a vaping device or electronic nicotine delivery system (END), although it is noted that the presence of nicotine in the aerosol-generating material is not a requirement.

In some embodiments, the non-combustible aerosol provision system is an aerosol-generating material heating system, also known as a heat-not-burn system. An example of such a system is a tobacco heating system.

In some embodiments, the non-combustible aerosol provision system is a hybrid system to generate aerosol using a combination of aerosol-generating materials, one or a plurality of which may be heated. Each of the aerosol-generating materials may be, for example, in the form of a solid, liquid or gel and may or may not contain nicotine. In some embodiments, the hybrid system comprises a liquid or gel aerosol-generating material and a solid aerosol-generating material. The solid aerosol-generating material may comprise, for example, tobacco or a non-tobacco product.

Typically, the non-combustible aerosol provision system may comprise a non-combustible aerosol provision device and a consumable for use with the non-combustible aerosol provision device.

In some embodiments, the disclosure relates to consumables comprising aerosol-generating material and configured to be used with non-combustible aerosol provision devices. These consumables are sometimes referred to as articles throughout the disclosure.

In some embodiments, the non-combustible aerosol provision system, such as a non-combustible aerosol provision device thereof, may comprise a power source and a controller. The power source may, for example, be an electric power source or an exothermic power source. In some embodiments, the exothermic power source comprises a carbon substrate which may be energised so as to distribute power in the form of heat to an aerosol-generating material or to a heat transfer material in proximity to the exothermic power source.

In some embodiments, the non-combustible aerosol provision system may comprise an area for receiving the consumable, an aerosol generator, an aerosol generation area, a housing, a mouthpiece, a filter and/or an aerosol-modifying agent.

In some embodiments, the consumable for use with the non-combustible aerosol provision device may comprise aerosol-generating material, an aerosol-generating material storage area, an aerosol-generating material transfer component, an aerosol generator, an aerosol generation area, a housing, a wrapper, a filter, a mouthpiece, and/or an aerosol-modifying agent.

Suitably, the delivery system may be prepared from (e.g. may comprise) a tobacco plant or a part thereof according to the present invention.

Suitably, the delivery system may be prepared from a tobacco cell culture according to the present invention.

Suitably, the delivery system may be prepared from (e.g. may comprise) a tobacco plant or part thereof propagated from a tobacco plant propagation material according to the present invention.

Suitably, the delivery system may be prepared from (e.g. may comprise) a harvested leaf of a tobacco plant according to the present invention.

Suitably, the delivery system may be prepared from (e.g. may comprise) a processed tobacco leaf according to the present invention.

Suitably, the delivery system may be prepared from (e.g. may comprise) a cured tobacco material according to the present invention.

Suitably, the delivery system may be prepared from (e.g. may comprise) a tobacco blend according to the present invention.

In one embodiment, the delivery system is a combustible smoking article, selected from the group consisting of a cigarette, a cigarillo and a cigar.

In one embodiment, the delivery system comprises one or more components of a combustible smoking article, such as a filter, a filter rod, a filter rod segments, tobacco, a tobacco rod, a tobacco rod segment, a spill, an additive release component such as a capsule, a thread, beads, a paper such as a plug wrap, a tipping paper or a cigarette paper.

In one embodiment, the delivery system is a non-combustible aerosol provision system.

In one embodiment, the delivery system comprises one or more components of a non-combustible aerosol provision system, such as a heater and an aerosolizable substrate.

In one embodiment, the aerosol provision system is an electronic cigarette also known as a vaping device.

In one embodiment the electronic cigarette comprises a heater, a power supply capable of supplying power to the heater, an aerosolizable substrate such as a liquid or gel, a housing and optionally a mouthpiece.

In one embodiment the aerosolizable substrate is contained in a substrate container. In one embodiment the substrate container is combined with or comprises the heater.

In one embodiment, the delivery system is a heating product which releases one or more compounds by heating, but not burning, a substrate material. The substrate material is an aerosolizable material which may be for example tobacco or other non-delivery systems, which may or may not contain nicotine. In one embodiment, the heating product is a tobacco heating product.

In one embodiment, the heating product is an electronic device.

In one embodiment, the tobacco heating product comprises a heater, a power supply capable of supplying power to the heater, an aerosolizable substrate such as a solid or gel material.

In one embodiment the heating product is a non-electronic article.

In one embodiment the heating product comprises an aerosolizable substrate such as a solid or gel material and a heat source which is capable of supplying heat energy to the aerosolizable substrate without any electronic means, such as by burning a combustion material, such as charcoal.

In one embodiment the heating product also comprises a filter capable of filtering the aerosol generated by heating the aerosolizable substrate.

In some embodiments the aerosolizable substrate material may comprise a vapour or aerosol generating agent or a humectant, such as glycerol, propylene glycol, triacetin or diethylene glycol.

In one embodiment, the delivery system is a hybrid system to generate aerosol by heating, but not burning, a combination of substrate materials. The substrate materials may comprise for example solid, liquid or gel which may or may not contain nicotine. In one embodiment, the hybrid system comprises a liquid or gel substrate and a solid substrate. The solid substrate may be for example tobacco or other non-delivery systems, which may or may not contain nicotine. In one embodiment, the hybrid system comprises a liquid or gel substrate and tobacco.

In another embodiment, the product may comprise a construct of the invention which modulates activity or expression of at least one WAT-1 related protein and thereby decreases alkaloid content (e.g. PON content) when expressed in a plant (e.g. tobacco plant).

Polynucleotides/Polypeptides/Constructs

In certain embodiments of the present invention, constructs which modulate activity or expression at least gene encoding a WAT1-related protein may be transformed into plant cells, suitably under the direction of a promoter.

In certain embodiments of the present invention, constructs which decrease (i.e. inhibit) the activity or expression of at least one gene encoding a WAT1-related protein may be transformed into plant cells under the direction of a promoter. For example, the genetic construct may be a gene editing construct or may comprise an RNAi molecule, which may comprise a small interfering RNA (siRNA) molecule, or a short hairpin loop (shRNA) molecule.

In certain embodiments of the present invention, constructs which increase activity or expression of gene encoding a WAT1-related protein may be transformed into plant cells, suitably under the direction of a promoter e.g. constructs which encode a gene encoding a WAT1-related protein such as an endogenous WAT1-related protein.

Constructs may be introduced into plants according to the present invention by means of suitable vector, e.g. plant transformation vectors. A plant transformation vector may comprise an expression cassette comprising 5'-3' in the direction of transcription, a promoter sequence, a construct sequence targeting gene encoding a WAT1-related protein and, optionally a 3' untranslated, terminator sequence including a stop signal for RNA polymerase and a polyadenylation signal for polyadenylase. The promoter sequence may be present in one or more copies, and such copies may be identical or variants of a promoter sequence as described above. The terminator sequence may be obtained from plant, bacterial or viral genes. Suitable terminator sequences are the pea rbcS E9 terminator sequence, the nos terminator sequence derived from the nopaline synthase gene of *Agrobacterium tumefaciens* and the 35S terminator sequence from cauliflower mosaic virus, for example. A person skilled in the art will be readily aware of other suitable terminator sequences.

The construct of the present invention may also comprise a gene expression enhancing mechanism to increase the strength of the promoter. An example of such an enhancer element is one derived from a portion of the promoter of the pea plastocyanin gene, and which is the subject of International Patent Application No. WO 97/20056 which is incorporated herein by reference. Suitable enhancer elements may be the nos enhancer element derived from the nopaline synthase gene of *Agrobacterium tumefaciens* and the 35S enhancer element from cauliflower mosaic virus, for example.

These regulatory regions may be derived from the same gene as the promoter DNA sequence or may be derived from different genes, from *Nicotiana tabacum* or other organisms, for example from a plant of the family Solanaceae, or from the subfamily Cestroideae. All of the regulatory regions should be capable of operating in cells of the tissue to be transformed.

The promoter DNA sequence may be derived from the same gene as the gene of interest, e.g. the gene the promoter is going to direct, for instance a gene encoding a WAT1-related protein according to the invention, a coding sequence used in the present invention or may be derived from a different gene, from *Nicotiana tabacum*, or another organism, for example from a plant of the family Solanaceae, or from the subfamily Cestroideae.

The expression cassette may be incorporated into a basic plant transformation vector, such as pBIN 19 Plus, pBl 101, pKYLX71:35S2, pCAMBIA2300 or other suitable plant transformation vectors known in the art. In addition to the expression cassette, the plant transformation vector will contain such sequences as are necessary for the transformation process. These may include the *Agrobacterium* vir genes, one or more T-DNA border sequences, and a selectable marker or other means of identifying transgenic plant cells.

The term "expression vector or plant transformation vector" means a construct capable of in vivo or in vitro expression. Preferably, the expression vector is incorporated in the genome of the organism. In one embodiment the vector of the present invention expresses a protein e.g. a WAT1-related protein as described herein. The term "incorporated" preferably covers stable incorporation into the genome.

Techniques for transforming plants are well known within the art and include *Agrobacterium*-mediated transformation, for example. The basic principle in the construction of genetically modified plants is to insert genetic information in the plant genome so as to obtain a stable maintenance of the inserted genetic material. A review of the general techniques may be found in articles by Potrykus (*Annu Rev Plant Physiol Plant Mol Biol* [1991]42:205-225) and Christon (AgroFood-Industry Hi-Tech March/April 1994 17-27), which are incorporated herein by reference.

Typically, in *Agrobacterium*-mediated transformation a binary vector carrying a foreign DNA of interest, i.e. a construct according to the present invention, is transferred from an appropriate *Agrobacterium* strain to a target plant by the co-cultivation of the *Agrobacterium* with explants from the target plant. Transformed plant tissue is then regenerated on selection media, which selection media comprises a selectable marker and plant growth hormones. An alternative is the floral dip method (Clough & Bent, 1998 Plant J. 1998 December; 16(6):735-43, which is incorporated herein by reference) whereby floral buds of an intact plant are brought into contact with a suspension of the *Agrobacterium* strain containing the chimeric gene, and following seed set, transformed individuals are germinated and identified by growth on selective media. Direct infection of plant tissues by *Agrobacterium* is a simple technique which has been widely employed and which is described in Butcher et al. (1980) Tissue Culture Methods for Plant Pathologists, eds.: D. S. Ingrams and J. P. Helgeson, 203-208 which is incorporated herein by reference.

Further suitable transformation methods include direct gene transfer into protoplasts using polyethylene glycol or electroporation techniques, particle bombardment, microinjection and the use of silicon carbide fibres for example. Transforming plants using ballistic transformation and production of fertile transgenic maize plants by silicon carbide whisker-mediated transformation is taught in Frame et al.

(1994) The Plant Journal 6(6): 941-948, which is incorporated herein by reference, and viral transformation techniques is taught in, for example, Meyer et al. (1992) Mol. Gen. Genet. 231(3): 345-352, which is incorporated herein by reference. The use of cassava mosaic virus as a vector system for plants is taught in Meyer et al. (1992) Gene 110: 213-217, which is incorporated herein by reference. Further teachings on plant transformation may be found in EP-A-0449375, incorporated herein by reference.

In a further aspect, the present invention relates to a vector system which carries a construct and introducing it into the genome of an organism, such as a plant, suitably a tobacco plant. The vector system may comprise one vector, but it may comprise two vectors. In the case of two vectors, the vector system is normally referred to as a binary vector system. Binary vector systems are described in further detail in Gynheung et al. (1980) Binary Vectors, Plant Molecular Biology Manual A3, 1-19, which is incorporated herein by reference.

One extensively employed system for transformation of plant cells uses the Ti plasmid from *Agrobacterium tumefaciens* or a Ri plasmid from *Agrobacterium rhizogenes* described by An et al. (1986) Plant Physiol. 81, 301-305 and Butcher et al. (1980) Tissue Culture Methods for Plant Pathologists eds.: D. S. Ingrams and J. P. Helgeson, 203-208 which are incorporated herein by reference. After each introduction method of the desired exogenous gene according to the present invention in the plants, the presence and/or insertion of further DNA sequences may be necessary. The use of T-DNA for the transformation of plant cells has been intensively studied and is described in EP-A-120516; Hoekema (1985) The Binary Plant Vector System, Offset-drukkerij Kanters B. B., Amsterdam Chapter V; Fraley et al. Crit. Rev. Plant Sci. 4:1-46; and An et al. (1985) EMBO J 4: 277-284, all incorporated herein by reference.

Plant cells transformed with construct(s) which modulate the activity or expression of at least one gene encoding a WAT1-related protein may be grown and maintained in accordance with well-known tissue culturing methods such as by culturing the cells in a suitable culture medium supplied with the necessary growth factors such as amino acids, plant hormones, vitamins, etc. The term "transgenic plant" in relation to the present invention includes any plant that comprises a construct which modulates the activity or expression of at least one gene encoding a WAT1-related protein according to the invention. Accordingly a transgenic plant is a plant which has been transformed with a construct according to the invention. Preferably the transgenic plant exhibits modulated alkaloid content and/or modulated TSNA content (or precursor thereof) according to the present invention. The term "transgenic plant" does not cover native nucleotide coding sequences in their natural environment when they are under the control of their native promoter which is also in its natural environment.

In one aspect, a gene encoding a WAT1-related protein, a construct, a plant transformation vector or a plant cell according to the present invention is in an isolated form. The term "isolated" means that the sequence is at least substantially free from at least one other component with which the sequence is naturally associated in nature and as found in nature.

In one aspect, a gene encoding a WAT1-related protein, a construct, plant transformation vector or a plant cell according to the invention is in a purified form. The term "purified" means in a relatively pure state, e.g. at least about 90% pure, or at least about 95% pure or at least about 98% pure.

The term "nucleotide sequence" as used herein refers to an oligonucleotide sequence or polynucleotide sequence, and variant, homologues, fragments and derivatives thereof (such as portions thereof). The nucleotide sequence may be of genomic or synthetic or recombinant origin, which may be double-stranded or single-stranded whether representing the sense or antisense strand.

The term "nucleotide sequence" in relation to the present invention includes genomic DNA, cDNA, synthetic DNA, and RNA. Preferably it means DNA, more preferably cDNA sequence coding for the present invention.

In a preferred embodiment, the nucleotide sequence when relating to and when encompassed by the per se scope of the present invention, i.e. the gene encoding a WAT1-related protein, includes the native nucleotide sequence when in its natural environment and when it is linked to its naturally associated sequence(s) that is/are also in its/their natural environment. For ease of reference, we shall call this preferred embodiment the "native nucleotide sequence". In this regard, the term "native nucleotide sequence" means an entire nucleotide sequence that is in its native environment and when operatively linked to an entire promoter with which it is naturally associated, which promoter is also in its native environment.

The nucleotide sequence for use in the present invention may be present in a vector in which the nucleotide sequence is operably linked to regulatory sequences capable of providing for the expression of the nucleotide sequence by a suitable host organism. The constructs for use in the present invention may be transformed into a suitable host cell as described herein to provide for expression of a polypeptide of the present invention. The choice of vector e.g. a plasmid, cosmid, or phage vector will often depend on the host cell into which it is to be introduced. Vectors may be used in vitro, for example for the production of RNA or used to transfect, transform, transduce or infect a host cell.

In some applications, the nucleotide sequence for use in the present invention is operably linked to a regulatory sequence which is capable of providing for the expression of the nucleotide sequence, such as by the chosen host cell. By way of example, the present invention covers a vector comprising the nucleotide sequence of gene encoding a WAT1-related protein as described herein operably linked to such a regulatory sequence, i.e. the vector is an expression vector.

The term "operably linked" refers to a juxtaposition wherein the components described are in a relationship permitting them to function in their intended manner. A regulatory sequence "operably linked" to a coding sequence is ligated in such a way that expression of the coding sequence is achieved under conditions compatible with the control sequences.

The term "regulatory sequences" includes promoters and enhancers and other expression regulation signals. The term "promoter" is used in the normal sense of the art, e.g. an RNA polymerase binding site. The nucleotide sequence within a construct which encodes gene encoding a WAT1-related protein may be operably linked to at least a promoter.

The term "construct"—which is synonymous with terms such as "cassette" or "vector"—includes a nucleotide sequence for use according to the present invention directly or indirectly attached to a promoter.

An example of an indirect attachment is the provision of a suitable spacer group such as an intron sequence, such as the Sh1-intron or the ADH intron, intermediate the promoter and the nucleotide sequence of the present invention. The same is true for the term "fused" in relation to the present invention which includes direct or indirect attachment. In some cases, the terms do not cover the natural combination of the nucleotide sequence coding for the protein ordinarily associated with the wild type gene promoter and when they are both in their natural environment.

The construct may even contain or express a marker, which allows for the selection of the genetic construct.

In some embodiments, a promoter may be operably linked to nucleotide sequence in a construct or vector which is used to modulate the concentration and/or total content of nicotine in a cell or cell culture or tobacco plant or part thereof.

In some embodiments the promoter may be selected from the group consisting of: a constitutive promoter, a tissue-specific promoter, a developmentally-regulated promoter and an inducible promoter.

In one embodiment the promoter may be a constitutive promoter.

A constitutive promoter directs the expression of a gene throughout the various parts of a plant continuously during plant development, although the gene may not be expressed at the same level in all cell types. Examples of known constitutive promoters include those associated with the cauliflower mosaic virus 35S transcript (Odell J T, Nagy F, Chua N H. (1985). Identification of DNA sequences required for activity of the cauliflower mosaic virus 35S promoter. Nature. 313 810-2), the rice actin 1 gene (Zhang W, McElroy D, Wu R. (1991). Analysis of rice Act1 5' region activity in transgenic rice plants. Plant Cell 3 1155-65) and the maize ubiquitin 1 gene (Cornejo M J, Luth D, Blankenship K M, Anderson O D, Blechl A E. (1993). Activity of a maize ubiquitin promoter in transgenic rice. Plant Molec. Biol. 23 567-81). Constitutive promoters such as the Carnation Etched Ring Virus (CERV) promoter (Hull R, Sadler J, Longstaff M (1986) (CaMV/35S), figwort mosaic virus 35S promoter. The sequence of carnation etched ring virus DNA: comparison with cauliflower mosaic virus and retroviruses. EMBO Journal, 5(2):3083-3090).

The constitutive promoter may be selected from a: a carnation etched ring virus (CERV) promoter, a cauliflower mosaic virus (CaMV 35S promoter), a promoter from the rice actin 1 gene or the maize ubiquitin 1 gene.

The promoter may be a tissue specific promoter. A tissue-specific promoter is one which directs the expression of a gene in one (or a few) parts of a plant, usually throughout the lifetime of those plant parts. The category of tissue-specific promoter commonly also includes promoters whose specificity is not absolute, i.e. they may also direct expression at a lower level in tissues other than the preferred tissue. Tissue specific promoters include the phaseolin-promoter, legumin b4-promoter, usp-promoter, sbp-promoter, ST-LS1 promoter, B33 (patatin class I promoter).

In another embodiment the promoter may be a developmentally-regulated promoter.

A developmentally-regulated promoter directs a change in the expression of a gene in one or more parts of a plant at a specific time during plant development. The gene may be expressed in that plant part at other times at a different (usually lower) level, and may also be expressed in other plant parts.

In one embodiment the promoter may be an inducible promoter.

An inducible promoter is capable of directing the expression of a gene in response to an inducer. In the absence of the inducer the gene will not be expressed. The inducer may act directly upon the promoter sequence, or may act by counteracting the effect of a repressor molecule. The inducer may be a chemical agent such as a metabolite, a protein, a growth regulator (such as auxin and salicylic acid which activate the OCS promoter), or a toxic element, a physiological stress such as heat, light (such as the soybean SSU promoter), wounding (e.g. the nos, nopaline synthase promoter), or osmotic pressure, or an indirect consequence of the action of a pathogen or pest. A developmentally-regulated promoter might be described as a specific type of inducible promoter responding to an endogenous inducer produced by the plant or to an environmental stimulus at a particular point in the life cycle of the plant. Examples of known inducible promoters include those associated with wound response, such as described by Warner S A, Scott R, Draper J. ((1993) Plant J. 3 191-201), temperature response as disclosed by Benfey & Chua (1989) (Benfey, P. N., and Chua, N-H. ((1989) Science 244 174-181), and chemically induced, as described by Gatz ((1995) Methods in Cell Biol. 50 411-424).

A nucleotide sequence encoding either a protein which has the specific properties as gene encoding a WAT1-related protein as defined herein or a protein which is suitable for modification may be identified and/or isolated and/or purified from any cell or organism producing said protein.

Various methods are well known within the art for the identification and/or isolation and/or purification of nucleotide sequences. By way of example, PCR amplification techniques to prepare more of a sequence may be used once a suitable sequence has been identified and/or isolated and/or purified.

In a yet further alternative, the nucleotide sequence encoding the WAT1-related protein may be prepared synthetically by established standard methods, e.g. the phosphoroamidite method described by Beucage et al. (1981) Tetrahedron Letters 22, 1859-1869 which is incorporated herein by reference, or the method described by Matthes et al. (1984) EMBO J. 3, 801-805 which is incorporated herein by reference. In the phosphoroamidite method, oligonucleotides are synthesised, e.g. in an automatic DNA synthesiser, purified, annealed, ligated and cloned in appropriate vectors.

As used herein, the term "amino acid sequence" is synonymous with the term "polypeptide" and/or the term "protein". In some instances, the term "amino acid sequence" is synonymous with the term "peptide". In some instances, the term "amino acid sequence" is synonymous with the term "enzyme".

The present invention also encompasses the use of sequences having a degree of sequence identity or sequence homology with amino acid sequence(s) of a polypeptide having the specific properties defined herein or of any nucleotide sequence i.e. a WAT1-related protein gene encoding such a polypeptide (hereinafter referred to as a "homologous sequence(s)"). Here, the term "homologue" means an entity having a certain homology with the subject amino acid sequences and the subject nucleotide sequences. Here, the term "homology" can be equated with "identity".

The homologous amino acid sequence and/or nucleotide sequence and/or fragments should provide and/or encode a polypeptide which retains the functional activity and/or enhances the activity of the WAT1-related protein gene. Typically, the homologous sequences will comprise the same active sites etc. as the subject amino acid sequence for instance or will encode the same active sites. Although homology can also be considered in terms of similarity (i.e. amino acid residues having similar chemical properties/functions), in the context of the present invention it is preferred to express homology in terms of sequence identity. Homologous sequences typically retain functional domains or motifs.

In one embodiment, a homologous sequence is taken to include an amino acid sequence or nucleotide sequence which has one, two or several additions, deletions and/or substitutions compared with the subject sequence.

Sequence Identity

Sequence identity comparisons can be conducted by eye, or more usually, with the aid of readily available sequence comparison programs. These commercially available computer programs can calculate % homology between two or more sequences. % homology or % identity may be calculated over contiguous sequences, i.e. one sequence is aligned with the other sequence and each amino acid in one sequence is directly compared with the corresponding amino acid in the other sequence, one residue at a time. This is called an "ungapped" alignment. Typically, such ungapped alignments are performed only over a relatively short number of residues. Although this is a very simple and consistent method, it fails to take into consideration that, for example, in an otherwise identical pair of sequences, one insertion or deletion will cause the following amino acid residues to be put out of alignment, thus potentially resulting in a large reduction in % homology when a global alignment is performed. Consequently, most sequence comparison methods are designed to produce optimal alignments that take into consideration possible insertions and deletions without penalising unduly the overall homology score. This is achieved by inserting "gaps" in the sequence alignment to try to maximise local homology. However, these more complex methods assign "gap penalties" to each gap that occurs in the alignment so that, for the same number of identical amino acids, a sequence alignment with as few gaps as possible—reflecting higher relatedness between the two compared sequences—will achieve a higher score than one with many gaps. "Affine gap costs" are typically used that charge a relatively high cost for the existence of a gap and a smaller penalty for each subsequent residue in the gap. This is the most commonly used gap scoring system. High gap penalties will of course produce optimised alignments with fewer gaps. Most alignment programs allow the gap penalties to be modified. However, it is preferred to use the default values when using such software for sequence comparisons.

Calculation of maximum % homology therefore firstly requires the production of an optimal alignment, taking into consideration gap penalties. A suitable computer program for carrying out such an alignment is the Vector NTI (Invitrogen Corp.). Examples of software that can perform sequence comparisons include, but are not limited to, the BLAST package (see Ausubel et al. (1999) Short Protocols in Molecular Biology, 4th Ed—Chapter 18), BLAST 2 (see FEMS Microbiol Lett 1999 174(2): 247-50; FEMS Microbiol Lett 1999 177(1): 187-8 and tatiana@ncbi.nlm.nih.qov), FASTA (Altschul et al. 1990 J. Mol. Biol. 403-410) and AlignX for example. At least BLAST, BLAST 2 and FASTA are available for offline and online searching (see Ausubel et al. 1999, pages 7-58 to 7-60).

Although the final % homology can be measured in terms of identity, the alignment process itself is typically not based on an all-or-nothing pair comparison. Instead, a scaled similarity score matrix is generally used that assigns scores to each pairwise comparison based on chemical similarity or evolutionary distance. An example of such a matrix commonly used is the BLOSUM62 matrix—the default matrix for the BLAST suite of programs. Vector NTI programs generally use either the public default values or a custom symbol comparison table if supplied (see user manual for further details). For some applications, it is preferred to use the default values for the Vector NTI package.

Alternatively, percentage homologies may be calculated using the multiple alignment feature in Vector NTI (Invitrogen Corp.), based on an algorithm, analogous to CLUSTAL (Higgins D G & Sharp P M (1988), Gene 73(1), 237-244). Once the software has produced an optimal alignment, it is possible to calculate % homology, preferably % sequence identity. The software typically does this as part of the sequence comparison and generates a numerical result.

Should gap penalties be used when determining sequence identity, then preferably the following parameters are used for pairwise alignment:

| FOR BLAST | |
|---|---|
| GAP OPEN | 0 |
| GAP EXTENSION | 0 |

| FOR CLUSTAL | DNA | PROTEIN | |
|---|---|---|---|
| WORD SIZE | 2 | 1 | K triple |
| GAP PENALTY | 15 | 10 | |
| GAP EXTENSION | 6.66 | 0.1 | |

In one embodiment, CLUSTAL may be used with the gap penalty and gap extension set as defined above. In some embodiments the gap penalties used for BLAST or CLUSTAL alignment may be different to those detailed above. The skilled person will appreciate that the standard parameters for performing BLAST and CLUSTAL alignments may change periodically and will be able to select appropriate parameters based on the standard parameters detailed for BLAST or CLUSTAL alignment algorithms at the time.

Suitably, the degree of identity with regard to a nucleotide sequence is determined over at least 50 contiguous nucleotides, preferably over at least 60 contiguous nucleotides, preferably over at least 70 contiguous nucleotides, preferably over at least 80 contiguous nucleotides, preferably over at least 90 contiguous nucleotides, preferably over at least 100 contiguous nucleotides, preferably over at least 150 contiguous nucleotides, preferably over at least 200 contiguous nucleotides, preferably over at least 250 contiguous nucleotides, preferably over at least 300 contiguous nucleotides, preferably over at least 350 contiguous nucleotides, preferably over at least 400 contiguous nucleotides, preferably over at least 450 contiguous nucleotides, preferably over at least 500 contiguous nucleotides, preferably over at least 550 contiguous nucleotides, preferably over at least 600 contiguous nucleotides, preferably over at least 650 contiguous nucleotides, or preferably over at least 700 contiguous nucleotides.

Suitably, the degree of identity with regard to a nucleotide, cDNA, cds or amino acid sequence may be determined over the whole sequence.

The sequences may also have deletions, insertions or substitutions of amino acid residues which produce a silent change and result in a functionally equivalent substance. Deliberate amino acid substitutions may be made on the basis of similarity in polarity, charge, solubility, hydrophobicity, hydrophilicity, and/or the amphipathic nature of the residues as long as the secondary binding activity of the substance is retained. For example, negatively charged amino acids include aspartic acid and glutamic acid; positively charged amino acids include lysine and arginine; and amino acids with uncharged polar head groups having similar hydrophilicity values include leucine, isoleucine, valine, glycine, alanine, asparagine, glutamine, serine, threonine, phenylalanine, and tyrosine.

Conservative substitutions may be made, for example according to the Table below. Amino acids in the same block in the second column and preferably in the same line in the third column may be substituted for each other:

| ALIPHATIC | Non-polar | G A P |
| --- | --- | --- |
| | | I L V |
| | Polar-uncharged | C S T M |
| | | N Q |
| | Polar-charged | D E |
| | | K R |
| AROMATIC | | H F W Y |

The present invention also encompasses homologous substitution (substitution and replacement are both used herein to mean the interchange of an existing amino acid residue, with an alternative residue) that may occur i.e. like-for-like substitution such as basic for basic, acidic for acidic, polar for polar etc. Non-homologous substitution may also occur i.e. from one class of residue to another or alternatively involving the inclusion of unnatural amino acids such as ornithine (hereinafter referred to as Z), diaminobutyric acid ornithine (hereinafter referred to as B), norleucine ornithine (hereinafter referred to as O), pyriylalanine, thienylalanine, naphthylalanine and phenylglycine.

Replacements may also be made by unnatural amino acids include; alpha* and alpha-disubstituted* amino acids, N-alkyl amino acids*, lactic acid*, halide derivatives of natural amino acids such as trifluorotyrosine*, p-Cl-phenylalanine*, p-Br-phenylalanine*, p-I-phenylalanine*, L-allyl-glycine*, β-alanine*, L-α-amino butyric acid*, L-γ-amino butyric acid*, L-α-amino isobutyric acid*, L-ε-amino caproic acid #, 7-amino heptanoic acid*, L-methionine sulfone#*, L-norleucine*, L-norvaline*, p-nitro-L-phenylalanine*, L-hydroxyproline #, L-thioproline*, methyl derivatives of phenylalanine (Phe) such as 4-methyl-Phe*, pentamethyl-Phe*, L-Phe (4-amino) #, L-Tyr (methyl)*, L-Phe (4-isopropyl)*, L-Tic (1,2,3,4-tetrahydroisoquinoline-3-carboxyl acid)*, L-diaminopropionic acid# and L-Phe (4-benzyl)*. The notation * has been utilised for the purpose of the discussion above (relating to homologous or non-homologous substitution), to indicate the hydrophobic nature of the derivative whereas # has been utilised to indicate the hydrophilic nature of the derivative, #* indicates amphipathic characteristics.

Variant amino acid sequences may include suitable spacer groups that may be inserted between any two amino acid residues of the sequence including alkyl groups such as methyl, ethyl or propyl groups in addition to amino acid spacers such as glycine or β-alanine residues. A further form of variation, involves the presence of one or more amino acid residues in peptoid form, which will be well understood by those skilled in the art. For the avoidance of doubt, "the peptoid form" is used to refer to variant amino acid residues wherein the α-carbon substituent group is on the residue's nitrogen atom rather than the α-carbon. Processes for preparing peptides in the peptoid form are known in the art, for example Simon et al. (1992) PNAS 89(20), 9367-9371 and Horwell (1995) Trends Biotechnol. 13(4), 132-134.

The nucleotide sequences for use in the present invention may include within them synthetic or modified nucleotides. A number of different types of modification to oligonucleotides are known in the art. These include methylphosphonate and phosphorothioate backbones and/or the addition of acridine or polylysine chains at the 3' and/or 5' ends of the molecule. For the purposes of the present invention, it is to be understood that the nucleotide sequences described herein may be modified by any method available in the art. Such modifications may be carried out in order to enhance the in vivo activity or life span of nucleotide sequences of the present invention. The present invention also encompasses sequences that are complementary to the nucleic acid sequences of the present invention or sequences that are capable of hybridising either to the sequences of the present invention or to sequences that are complementary thereto. The term "hybridisation" as used herein shall include "the process by which a strand of nucleic acid joins with a complementary strand through base pairing" as well as the process of amplification as carried out in polymerase chain reaction (PCR) technologies.

The present invention also relates to nucleotide sequences that can hybridise to the nucleotide sequences of the present invention (including complementary sequences of those presented herein). Preferably, hybridisation is determined under stringency conditions (e.g. 50° C. and 0.2×SSC {1×SSC=0.15 M NaCl, 0.015 M Nascitrate pH 7.0}). More preferably, hybridisation is determined under high stringency conditions (e.g. 65° C. and 0.1×SSC {1×SSC=0.15 M NaCl, 0.015 M Nascitrate pH 7.0}).

A review of the general techniques used for transforming plants may be found in articles such as Potrykus et al. (1991) Annu Rev Plant Physiol. Plant Mol. Biol. 42:205-225 and Christou et al. (1994) Agro-Food-Industry Hi-Tech March/April 17-27, which are incorporated herein by reference. Further teachings on plant transformation may be found in EP-A-0449375, incorporated herein by reference.

Unless defined otherwise, all technical and scientific terms used herein have the same meaning as commonly understood by one of ordinary skill in the art to which this disclosure belongs. Singleton, et al., DICTIONARY OF MICROBIOLOGY AND MOLECULAR BIOLOGY, 20 ED., John Wiley and Sons, New York (1994), and Hale & Marham, THE HARPER COLLINS DICTIONARY OF BIOLOGY, Harper Perennial, NY (1991) provide one of skill with a general dictionary of many of the terms used in this disclosure.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range. Unless otherwise indicated, any nucleic acid sequences are written left to right in 5' to 3' orientation; amino acid sequences are written left to right in amino to carboxy orientation, respectively.

The headings provided herein are not limitations of the various aspects or embodiments of this disclosure which can be had by reference to the specification as a whole. Accordingly, the terms defined immediately below are more fully defined by reference to the specification as a whole.

Amino acids are referred to herein using the name of the amino acid, the three letter abbreviation or the single letter abbreviation. The term "protein", as used herein, includes proteins, polypeptides, and peptides. As used herein, the term "amino acid sequence" is synonymous with the term "polypeptide" and/or the term "protein". In some instances, the term "amino acid sequence" is synonymous with the term "peptide". In some instances, the term "amino acid sequence" is synonymous with the term "enzyme".

In the present disclosure and claims, the conventional one-letter and three-letter codes for amino acid residues may be used. The 3-letter code for amino acids as defined in conformity with the IUPACIUB Joint Commission on Biochemical Nomenclature (JCBN). It is also understood that a polypeptide may be coded for by more than one nucleotide sequence due to the degeneracy of the genetic code.

Other definitions of terms may appear throughout the specification. Before the exemplary embodiments are described in more detail, it is to understand that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

It must be noted that as used herein and in the appended claims, the singular forms "a", "an", and "the" include plural referents unless the context clearly dictates otherwise. Thus, for example, reference to "an enzyme" or "a nitrate reductase" includes a plurality of such candidate agents and equivalents thereof known to those skilled in the art, and so forth.

Advantages

It has been surprisingly found that by modulating the activity or expression of at least one gene encoding a WAT1-related protein as taught herein which acts as a positive regulator of PON in tobacco, TSNA precursor content of plants can be modulated. Thereby tobacco products with modulated alkaloid (e.g. PON) content or total alkaloid content) and/or TSNA precursor content and commercially desirable traits sought after by consumers of tobacco products can be produced.

The present inventors have surprisingly determined a method for modulating the PON content or total alkaloid content, and/or TSNA precursor content of a plant (e.g. tobacco plant) by modulating the activity or expression of a gene encoding a WAT1-related protein. Alkaloid (e.g. PON) or TSNA precursor content of a plant (e.g. tobacco plant) may be decreased by decreasing or inhibiting the activity or expression of a gene encoding a WAT1-related protein. Prior to the present invention it had not been known that modulation of the activity or expression of a gene encoding a WAT1-related protein as described herein could be used to modulate alkaloid (e.g. PON content or total alkaloid content) and/or TSNA precursor content of a plant (e.g. a tobacco plant).

The publications discussed herein are provided solely for their disclosure prior to the filing date of the present application. Nothing herein is to be construed as an admission that such publications constitute prior art to the claims appended hereto.

EXAMPLES

Example 1—Transient Overexpression of a WAT1-Related Protein Increases Alkaloid Content in Leaves Methods and Materials Cloning WAT1-Related Protein Expression Vector The Nitab4.5_0010919g0010.2 WAT1-related protein gene sequence (SEQ ID NO. 3) was amplified from a Gateway™ compatible cDNA library using primers located outside restriction sites flanking the gene sequence.

The resulting plasmid was sequenced and transformed into *Agrobacterium tumefaciens* GV3101pMP90 by heat shock and transiently expressed in TN90 leaves.

Transient Gene Expression

*Agrobacterium tumefaciens* GV3101 strains carrying the construct of interest were grown overnight in Luria-Bertani (LB) medium supplemented with appropriate antibiotics. Cultures were spun down and re-suspended in buffer containing 10 mM $MgCl_2$, 10 mM MES pH 5.6 and 100 μM acetosyringone to OD600=0.6 and incubated for one hour at room temperature. Infiltration was performed with a needleless syringe into TN90 leaves. Samples are taken 5 days post-infiltration.

Tests were performed in two biological replicates.

Alkaloid Measurement

Relative content of PON was determined by reversed phase high performance liquid chromatography with tandem mass spectrometry (LC-MS/MS). Chromatographic separation was achieved using a Gemini-NX column (100 mm×3.0 mm, particle size 3 μm, Phenomenex) and gradient chromatographic separation using 6.5 mM ammonium acetate buffer (aq) (pH10) and Methanol.

Mass Spectrometer operates in electrospray (ESI) positive mode using scheduled MRM data acquisition. Two MRM transitions were monitored for each analyte and one for the isotope labelled internal standard.

| Analyte | Precursor Ion | Daughter Ion (quant/confirm) |
|---------|---------------|------------------------------|
| PON     | 176.1         | 106.0/148                    |
| PON d4  | 183.1         | 110.0                        |

Results

PON content of 5-week-old TN90 leaves expressing the Nitab4.5_0010919g0010.2 construct is shown in FIG. 1. PON content is represented relative to control and comprises two biological replicates analysed by one-way t-test. Values are shown as means±SEM. Asterisks indicate statistical significance of P value≤0.001.

Overexpression of Nitab4.5_0010919g0010.2 leads to a significant increase in PON content in leaves.

Conclusions

Nitab4.5_0010919g0010.2 is a positive regulator of alkaloid content, in particular PON content in leaves and is a regulator of pyridine alkaloids in tobacco.

Example 2—Transient Expression of Antisense RNA Targeting Nitab4.5_0010919q0010.2 Decreases Alkaloid Content in Leaves

Materials and Methods

The Nitab4.5_0010919g0010.2 coding sequence was cloned in reverse orientation into a plant expression vector driven by the CERV promoter.

Results

Figure 2:
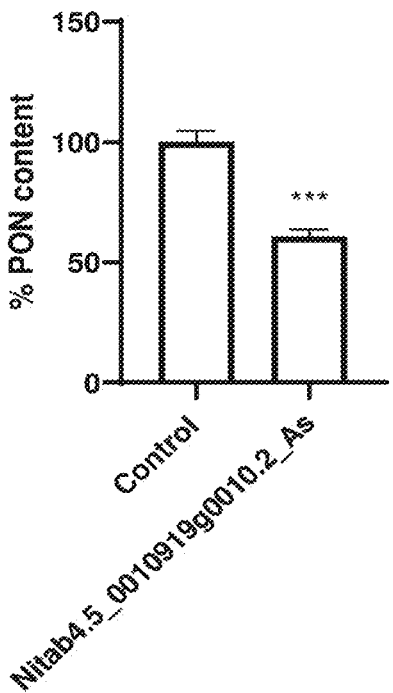
FIG. 2 shows the PON content of 5-week-old TN90 leaves expressing antisense RNA targeting Nitab4.5_0010919g0010.2 (SEQ ID NO. 3). PON content is represented relative to control and comprises two biological replicates analysed by t-test. Values are shown as means±SEM. Asterisks indicate statistical significance of P value≤0.001.

PON content of 5-week-old TN90 leaves expressing Nitab4.5_0010919g0010.2 antisense RNA is shown in FIG. 2. PON content is represented relative to control and comprises two biological replicates analysed by t-test. Values are shown as means±SEM. Asterisks indicate statistical significance of P value≤0.001 Suppressing Nitab4.5_0013616g0010.2 expression using antisense RNA leads to a decrease in PON content in leaves.

Conclusions

Nitab4.5_0010919g0010.2 is a positive regulator of alkaloid content, in particular PON content, in leaves and is a regulator of pyridine alkaloids in tobacco.

Example 3—Transient Expression of Artificial miRNA Targeting Nitab4.5_0010919q0010.2 Decreases Alkaloid Content in Leaves

Materials and Methods

Nitab4.5_0010919g0010.2 silencing was performed using a specific artificial microRNA designed based on the method and script described in the microRNA designers (http://wmd3.weigelworld.org and http://p-sams.carringtonlab.org) then verified against *N. tabacum* transcripts to check for off-targets.

SEQ ID NO. 36 was synthesized and cloned into a plant expression vector driven by the CERV promoter. The sequence of the miRNA targeting Nitab4.5_0010919g0010.2 (SEQ ID NO. 36) is shown in FIG. 39.

Results

Figure 3:
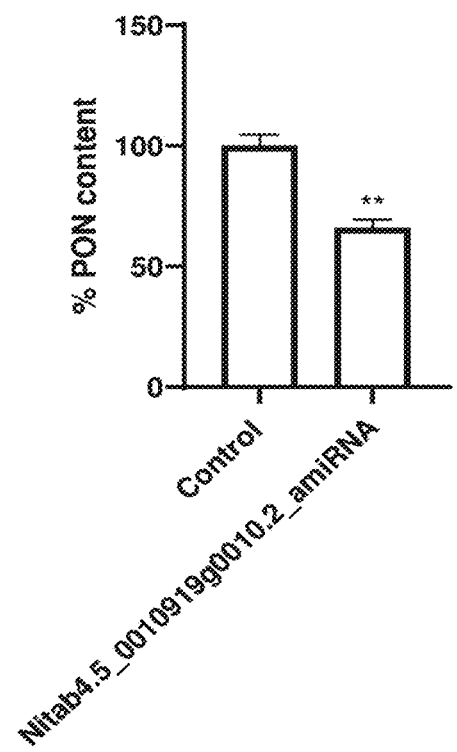
FIG. 3 shows the PON content of 5-week-old TN90 leaves expressing an artificial miRNA (SEQ ID NO. 31) targeting Nitab4.5_0010919g0010.2 (SEQ ID NO. 3). PON content is represented relative to control and comprises two biological replicates analysed by t-test. Values are shown as means±SEM. Asterisks indicate statistical significance of P value≤0.001

PON content of 5-week-old TN90 leaves expressing artificial miRNA targeting Nitab4.5_0010919g0010.2 is shown in FIG. 3. PON content is represented relative to control and comprises two biological replicates analysed by t-test. Values are shown as means±SEM. Asterisks indicate statistical significance of P value≤0.001

Suppressing Nitab4.5_0013616g0010.2 expression using miRNA leads to a decrease in PON content in leaves.

Conclusions

Nitab4.5_0010919g0010.2 is a positive regulator of alkaloid content, in particular PON content, in leaves and is a regulator of pyridine alkaloids in tobacco.

---

The invention claimed is:

1. A method of decreasing the alkaloid content of a tobacco plant or a part thereof, or a tobacco plant cell or cell culture, the method comprising modifying said plant or plant cell by reducing the activity or expression of at least one gene encoding a Walls are thin 1-related (WAT1-related) protein,
wherein
i) the alkaloid content that is decreased is pseudooxynicotine (PON);
ii) the at least one gene encoding a WAT1-related protein encodes a polypeptide which comprises an amino acid sequence as set out in SEQ ID NO: 1, 4, 7, 10, 13, 16, 19, 22, 25 or 28 or a functional variant which comprises two or more EamA domains, or a sequence which has at least 95% identity to SEQ ID NO: 1, 4, 7, 10, 13, 16, 19, 22, 25 or 28 and which comprises two or more EamA domains; or
the at least one gene encoding a WAT1-related protein comprises a nucleotide sequence as set out in SEQ ID NO: 2, 3, 5, 6, 8, 9, 11, 12, 14, 15, 17, 18, 20, 21, 23, 24, 26, 27, 29 or 30 or a functional variant which encodes two or more EamA domains, or a sequence which has at least 95% identity to SEQ ID NO: 2, 3, 5, 6, 8, 9, 11, 12, 14, 15, 17, 18, 20, 21, 23, 24, 26, 27, 29 or 30 and which encodes two or more EamA domains;
wherein each EamA domain comprises an amino acid sequence shown as SEQ ID NO. 32, 33, 34 or 35, or a sequence which has at least 80% identity to SEQ ID NO. 32, 33, 34 or 35; and
iii) the alkaloid content is decreased in comparison to a plant or cell which has not been modified to reduce the activity or expression of the at least one gene encoding the WAT1-related protein.

2. A tobacco plant or part thereof or tobacco plant propagation material obtained therefrom or tobacco cell or cell culture which has been modified to achieve a decrease in alkaloid content in comparison to an unmodified plant or unmodified cell, wherein the modification is reduction of the activity or expression of at least one gene encoding a WAT1-related protein,
wherein
i) said plant or part thereof or plant propagation material obtained therefrom or cell or cell culture has said modification;
ii) the alkaloid content that is decreased is pseudooxynicotine (PON);
iii) the at least one gene encoding a WAT1-related protein encodes a polypeptide which comprises an amino acid sequence as set out in SEQ ID NO: 1, 4, 7, 10, 13, 16, 19, 22, 25 or 28 or a functional variant thereof which comprises two or more EamA domains, or a sequence which has at least 90% identity to SEQ ID NO: 1, 4, 7, 10, 13, 16, 19, 22, 25 or 28 and which comprises two or more EamA domains; or
the at least one gene encoding a WAT1-related protein comprises a nucleotide sequence as set out in SEQ ID NO: 2, 3, 5, 6, 8, 9, 11, 12, 14, 15, 17, 18, 20, 21, 23, 24, 26, 27, 29 or 30 or a functional variant which encodes two or more EamA domains, or a sequence which has at least 95% identity to SEQ ID NO: 2, 3, 5, 6, 8, 9, 11, 12, 14, 15, 17, 18, 20, 21, 23, 24, 26, 27, 29 or 30 and which encodes two or more EamA domains;
wherein each EamA domain comprises an amino acid sequence shown as SEQ ID NO. 32, 33, 34 or 35, or a sequence which has at least 80% identity to SEQ ID NO. 32, 33, 34 or 35; and
iv) the alkaloid content is decreased in comparison to a plant or plant cell which has not been modified to reduce the activity or expression of the at least one gene encoding a WAT1-related protein.

3. The plant or part thereof or plant propagation material obtained therefrom or cell or cell culture according to claim 2, wherein the activity or expression of at least one gene encoding a WAT1-related protein is decreased in comparison to a plant or cell which has not been modified to reduce the activity or expression of the at least one gene encoding a WAT1-related protein.

4. The plant or part thereof or plant propagation material obtained therefrom or cell or cell culture according to claim 2, wherein one or more additional gene encoding a WAT1-related protein is also modulated, wherein the additional gene encodes a polypeptide which comprises an amino acid sequence as set out in SEQ ID NO: 1, 4, 7, 10, 13, 16, 19, 22, 25 or 28, or a sequence which has at least 95% identity to SEQ ID NO: 1, 4, 7, 10, 13, 16, 19, 22, 25 or 28 and which comprises two or more EamA domains; or
  the additional gene comprises a nucleotide sequence as set out in SEQ ID NO: 2, 3, 5, 6, 8, 9, 11, 12, 14, 15, 17, 18, 20, 21, 23, 24, 26, 27, 29 or 30, or a sequence which has at least 95% identity to SEQ ID NO: 2, 3, 5, 6, 8, 9, 11, 12, 14, 15, 17, 18, 20, 21, 23, 24, 26, 27, 29 or 30 and which encodes two or more EamA domains,
  wherein each EamA domain comprises an amino acid sequence shown as SEQ ID NO. 32, 33, 34 or 35, or a sequence which has at least 80% identity to SEQ ID NO. 32, 33, 34 or 35.

5. A harvested leaf, a cut harvested leaf, a processed leaf, a processed tobacco leaf, a non-viable processed tobacco leaf, or a cut-processed leaf of the plant according to claim 2, or a plant obtained from the plant propagation material according to claim 2, wherein said harvested leaf, cut harvested leaf, processed leaf, processed tobacco leaf, non-viable processed tobacco leaf, or cut processed leaf has a modification of the activity or expression of at least one gene encoding a WAT1-related protein to achieve a decrease in alkaloid content in comparison to an unmodified harvested leaf, cut harvested leaf, processed leaf, processed tobacco leaf, non-viable processed tobacco leaf, or cut processed leaf, wherein the modification is as defined in claim 2.

6. The harvested leaf, cut harvested leaf, processed leaf, processed tobacco leaf, non-viable processed tobacco leaf, or cut-processed leaf according to claim 5, wherein the leaf is processed by curing, fermenting, pasteurising or a combination thereof.

7. A combustible smoking article, non-combustible aerosol provisioning system, smokeless tobacco product or tobacco heating device comprising the plant or part thereof or cell or cell culture according to claim 2 or a tobacco extract of the plant or part thereof or cell or cell culture according to claim 2.

* * * * *

SEQUENCE LISTING

```
<160> NUMBER OF SEQ ID NOS: 36

<210> SEQ ID NO 1
<211> LENGTH: 385
<212> TYPE: PRT
<213> ORGANISM: Nicotiana tabacum

<400> SEQUENCE: 1

Met Ala Asp Gln Met Phe Cys Gly Ala Phe Gly Pro Phe Leu Asn Lys
1               5                   10                  15

Val Lys Pro Tyr Leu Ala Met Val Ser Leu Gln Phe Gly Tyr Ala Gly
            20                  25                  30

Met Tyr Ile Val Thr Met Met Cys Phe Lys Arg Gly Met Ser His Trp
        35                  40                  45

Ile Leu Val Val Tyr Arg His Ala Phe Ala Thr Leu Ala Val Ala Pro
    50                  55                  60

Phe Ala Ile Val Leu Glu Arg Lys Ile Arg Pro Lys Met Thr Leu Arg
65                  70                  75                  80

Val Phe Ile Lys Ile Leu Ala Leu Gly Phe Leu Glu Pro Val Ile Asp
                85                  90                  95

Gln Asn Leu Tyr Tyr Val Gly Leu Lys Ser Thr Thr Ala Thr Tyr Ala
            100                 105                 110

Ser Ala Phe Val Asn Leu Leu Pro Ala Val Thr Phe Ile Leu Ala Val
        115                 120                 125

Ile Phe Arg Ile Glu Lys Val Asn Leu Lys Lys Lys Ser Ser Met Ala
    130                 135                 140

Lys Val Ile Gly Thr Ala Ile Thr Val Ala Gly Ala Met Val Met Thr
145                 150                 155                 160
```

```
Leu Tyr Lys Gly Pro Met Phe Asn Leu Val Pro His Ser Arg Gly Gly
            165                 170                 175

Ser His Thr Ala Ala Ala Ser Thr Pro Glu Asn Trp Val Ala Gly
        180                 185                 190

Thr Ile Glu Leu Ile Ser Cys Ile Val Gly Trp Ser Gly Phe Phe Ile
            195                 200                 205

Val Gln Ser Met Thr Leu Lys Glu Tyr Pro Ala Glu Leu Ser Leu Ala
        210                 215                 220

Ala Trp Val Cys Val Met Gly Ile Val Glu Gly Ile Val Ala Leu
225                 230                 235                 240

Ile Met Glu Arg Asp Trp Asn Ala Trp Lys Ile Gly Phe Asp Ala Arg
            245                 250                 255

Leu Leu Ala Ala Ala Tyr Ser Gly Ile Val Cys Ser Gly Ile Ala Tyr
            260                 265                 270

Tyr Val Gln Ser Ile Val Asn Lys Val Lys Gly Pro Val Phe Val Thr
        275                 280                 285

Ala Phe Ser Pro Leu Ser Met Val Ile Thr Ser Val Leu Ala Ala Ile
        290                 295                 300

Ile Leu Ala Glu Ser Val His Leu Gly Ser Cys Ile Gly Ala Val Ile
305                 310                 315                 320

Ile Val Met Gly Leu Tyr Ser Val Val Trp Gly Lys Ser Lys Glu Gly
            325                 330                 335

Lys Gly Asn Glu Thr Gly Lys Asp Gln Glu Leu Pro Val Val Asp Ile
            340                 345                 350

Lys Glu Arg Ser Thr Ile Val Asp Asp Ile Ser Asp Asp Val Thr Thr
            355                 360                 365

Val Lys Ser Lys Val Pro Ala Glu Lys Lys Ala Ser Ile Leu Gln Glu
        370                 375                 380

Leu
385

<210> SEQ ID NO 2
<211> LENGTH: 1158
<212> TYPE: DNA
<213> ORGANISM: Nicotiana tabacum

<400> SEQUENCE: 2
atggcagacc aaatgttttg tggggcattt ggcccattcc tcaacaaggt gaagccttac      60
ttggctatgg tttccttgca gtttggttac gcagggatgt atattgttac aatgatgtgc     120
ttcaaaaggg gaatgagtca ctggattctt gttgtctatc gccatgcatt tgccacccct     180
gctgttgcac ccttttgccat tgttcttgaa aggaaaataa ggccaaagat gacactcagg     240
gtctttatta aatattggc tcttggtttt ctagagccag ttattgatca gaacttgtac     300
tatgtgggac tgaagagcac aactgcaacc tatgcatctg cctttgtcaa tcttctccct     360
gccgtcacct ttattcttgc agttatttc agaattgaga agtaaacct gaagaagaaa      420 tcaagtatgg caaggtgat aggaacagca ataacagtgg cgggagcaat ggtgatgaca     480
ctttacaaag gcccaatgtt caacctggtc ccacactctc gcggcggcag ccacactgca     540
gccgccgcgt ccaccccga gaactgggtc gccggaacca ttgagctcat ctcttgcatt     600
gttggttggt ccggtttctt tattgttcaa tcgatgacat tgaaggagta cccagcagag     660
ctatctctgg cagcatgggt atgtgtgatg ggcatagtgg aaggaggaat tgttgctctt     720
ataatggaac gtgattggaa tgcatggaaa attggcttcg acgctaggct ccttgctgct     780
```

```
gcttattctg gaatcgtttg ctcgggaatt gcatattacg tgcaaagtat agttaataaa    840
gttaaaggcc cagtgttcgt gacagccttt agccctttga gtatggtcat cacttctgtt    900
cttgctgcta ttatcttggc tgagtcagtc caccttggaa gctgcattgg agcagttatc    960
atagtcatgg gactttactc tgtggtgtgg ggaaagagta aggagggtaa aggaaatgag   1020
acaggaaaag accaagaatt accagttgtg gacatcaaag aaaggtcaac catagttgac   1080
gatattagtg atgatgttac gactgtgaaa tcaaaggttc cagctgagaa gaaggcttca   1140
atcttgcaag agctgtag                                                 1158
```

<210> SEQ ID NO 3
<211> LENGTH: 4599
<212> TYPE: DNA
<213> ORGANISM: Nicotiana tabacum

<400> SEQUENCE: 3

```
ccatatgtaa tttaattaaa ctcttattat taattaatat tcttggtata gcttttacc     60 ttttgttttg tgtataaaag ggcacacttc ctatattttg catacccag cctaaaacta    120 accccttcat tctttgtgtg tagaaagaag agaaggagag aaatggcaga ccaaatgttt    180
tgtggggcat ttgcccatt cctcaacaag gtgaagcctt acttggctat ggtttccttg    240
cagtttggtt acgcagggat gtatattgtt acaatgatgt gcttcaaaag gggaatgagt    300
cactggattc ttgttgtcta tcgccatgca tttgccaccc ttgctgttgc acccttgcc    360 attgttcttg aaaggtaaaa tctctctcct attctctttt ccatgtagtt ccttaattac    420
ttggtagaac cctctcttat tcagtcacca agaaatcgga cgattttccc cccttccatt    480
tcctctggaa gtgcatatat gatcacttca tatgaccttg tttgatccta gttctcattt    540
atattcaacc atattcagtg ttgaagtgtg taaccatctt ttttaaaagt ttaagttcta    600
ggtatgcagg attttgtcc cttttttgcc atggtatcat gttgaaaatt ttgataattt    660
aatttaaaat cttaagttgt tgagggtgg tacactaatg tttatctaat tatatcctaa    720
tttgagaact tatcaaaaaa tttgacgttt tccatcttgc tgaataatct gaatcgcaca    780
atagaatata agttgcctac aagtatctta cagaatattt ttctttttgc tttcttttct    840
tttgcaggaa aataaggcca agatgacac tcagggtctt tattaaaata ttggctcttg    900
gttttctaga gtatgtgatt cttttacaca cttttatatt ctactcaatt tacatgtgaa    960
caaattacta taaatatata ctccaaactg tttgttctct cataaaattt agttgtctat   1020
tcagtcatcc aaacgtatga gattctgatg tctcttttt cttatttatc ttttacttca   1080
tttaatagtt ttcttttttct gttttagcct tcatacatca tgtatcaaaa ctgaatacag   1140
aaacattata agttgcccgg cgttttccta caaggttact cttgcatgaa agggattata   1200
tacgacagtt aaatgtcaga tgttcactat ttttattttt gtcaactatt aggagtcgtt   1260
tggtaccagg gataacgtgg gattaaattt ataccgcgtt tggctggcgg gtataaattt   1320
acacgatata aatttaatct cagacttaat ccagaatatt tcatcttatc tcacattatc   1380
ccatcaaatt cgggattatt ttatcccacc tcccatatgg tataaatttc gtaagcgtac   1440
caaacgaccc cttagagcat ttggaaggcg actaaaaaaa ataatgaaaa tccaacttta   1500
aaatataatt tagcagctct atattgagct cctactcaat tatctatata tattttttacc   1560 tgaattcttt ctaacaaatg caagatttaa caatctatga ctttgggaat tgagatattt   1620
tccatgtgcc aaaagattct caattttcca tgtgccgaaa gattctcaaa ccctccttta   1680
```

```
tttactttga aatacgcttt aagagtaata ttaacgaatg tttagttaaa tgatactact    1740
acatatagta gcaaaacttt tatagcttca tatcaaccga aaccctaacc tatgttccta    1800
cccgacttaa aaaacttctt cttctctatt cctgctgggt tttctacttt ataaactaat    1860
tcttttttat taccttcatt cacccacctg tattggctag agcccatatt gtcttacatg    1920
ctttatgcca agagaaaaga tgcatttaac caattaatta atgatcacat ccaactgaat    1980
aaattaaata cacacttgca aagtaccttt ctaaaaatct gttgttttta tggtctttag    2040
agaggtacgt cttttattaa aatttttaata tgtttggatg atagtgtttc cacagttttc    2100
attcatcttc tgaggttagc tttaattagt tgaaggaaaa caataagcaa cttcctatat    2160
tagaaatatc actaatcata ttattctttg acgttaaacc tgacaaataa atccaatgaa    2220
gaacgtcaaa aaatcctcat tccaaattag aaagcaaatt catttgttct atctgtttaa    2280
tttatttgaa aagtttaagc tactagatat acaaaaatgt tttaaaataa gtgagtgcag    2340
ggttatagat tctatttgag aaatcgacac attgatcaag aataaggcat ctatattagt    2400
actatcaaag tatcggagca tacaatgatt ccaagagat atcatttcac ggaataaatt    2460
ttaagaagtt tagatttatt tattttacaa ttaaatcgaa agattttaa tccttatata    2520 tgtttgatga tatataactg ttgttctaaa cgaaagcttt taaatatatg gaatttcagg    2580
ccagttattg atcagaactt gtactatgtg ggactgaaga gcacaactgc aacctatgca    2640
tctgcctttg tcaatcttct ccctgccgtc acctttattc ttgcagttat tttcaggtac    2700
tcattatttt cctttatcg taatttaatt tgtaaaaata gtactattac tcctttaaaa    2760
tcaagaaagt accaaaaaag agcaaataaa atgacatggt ggattttgac acctttcttt    2820
atcccataaa agatacacta ctagttcatt acacaagtaa taaattataa agtatgatc    2880 tcacctaaac aaagttgctg acttgcttcc cacttggaaa gcaatgatct caaaaaagtt    2940
agtggttgct cctgtaatat tgacatataa gttaaactcc taattattac tccgtagttg    3000
ttattgtgct agcttttatt agtggctgag atataatttt caccaaaaaa attaaataaa    3060
taaattttaa aaaaaaacag ctaaaaagta attcatcatc taatagtcca atatatatat    3120
agctactata gaacaaaata ctgtcgaaaa aatgaaaaac catattatag aaaagaaata    3180
gaaactcatg aacataattt cttcctctctt taatttaaca taatcttttc tggttcttta    3240
tgactagaat tgagaaagta aacctgaaga agaaatcaag tatggcaaag gtgataggaa    3300
cagcaataac agtggcggga gcaatggtga tgacacttta caaaggccca atgttcaacc    3360
tggtcccaca ctctcgcggc ggcagccaca ctgcagccgc cgcgtccacc cccgagaact    3420
gggtcgccgg aaccattgag ctcatctctt gcattgttgg ttggtccggt ttctttattg    3480
ttcaagtaag ttagtattgt ctattttcag aattaggaaa aatgaatatt ttactcattt    3540
aaatattgat ataaattatt actacattta tttatataat aattgagcaa ttttgcatat    3600
gtatacatag tcgatgacat tgaaggagta cccagcagag ctatctctgg cagcatgggt    3660
atgtgtgatg ggcatagtgg aaggaggaat tgttgctctt ataatggaac gtgattggaa    3720
tgcatggaaa attggcttcg acgctaggct ccttgctgct gcttattctg taagttttc    3780 cttatttgct aaattattgt gaaacgtaca attctcttat ttactaaatt cttaccacca    3840
agaagtatca ttatataatt ttactactat tagcgactaa ttagagcaag caatttgtgt    3900
ttggtcaggg aatcgtttgc tcgggaattg catattacgt gcaaagtata gttaataaag    3960
ttaaaggccc agtgttcgtg acagccttta gcccttgag tatggtcatc acttctgttc    4020
ttgctgctat tatcttggct gagtcagtcc accttggaag gtaattaaaa actaagtttt    4080
```

```
taaatttaaa ggacaaaaaa gaagtgttgt tgctttgtca atttaattaa tctaatgatt    4140
tcctgattca tttgacaaaa atttcagctg cattggagca gttatcatag tcatgggact    4200
ttactctgtg gtgtggggaa agagtaagga gggtaaagga aatgagacag gaaaagacca    4260
agaattacca gttgtggaca tcaaagaaag gtcaaccata gttgacgata ttagtgatga    4320
tgttacgact gtgaaatcaa aggttccagc tgagaagaag gcttcaatct gcaagagct     4380 gtagcatcca aaaatgaagc tgtctttgca atttttaattt ttgacttgtt gcaatgttta   4440
aatttctaag tgttgctttg aaacaatgca ctaatgttgc cgattgttct tgatgaaaaa    4500
aatgtgtaac ctacttttg tgtaaaagtc aaggagtggt ctctccattt gggaatgaaa     4560
aatgaaaatg ttctaattta cccttaaaat taaatgggt                           4599
```

<210> SEQ ID NO 4
<211> LENGTH: 385
<212> TYPE: PRT
<213> ORGANISM: Nicotiana tabacum

<400> SEQUENCE: 4

```
Met Ala Asp Gln Met Phe Ser Gly Ala Phe Gly Ser Phe Leu Asn Lys
 1               5                  10                  15

Val Lys Pro Tyr Leu Ala Met Val Ser Leu Gln Phe Gly Tyr Ala Gly
            20                  25                  30

Met Tyr Ile Val Thr Met Met Cys Phe Lys Arg Gly Met Ser His Trp
        35                  40                  45

Ile Leu Val Val Tyr Arg His Ala Phe Ala Thr Val Ala Val Ala Pro
    50                  55                  60

Phe Ala Ile Val Leu Glu Arg Lys Ile Arg Pro Lys Met Thr Leu Arg
65                  70                  75                  80

Val Phe Ile Lys Ile Leu Ala Leu Gly Phe Leu Glu Pro Val Ile Asp
                85                  90                  95

Gln Asn Leu Tyr Tyr Val Gly Leu Lys Ser Thr Thr Ala Thr Tyr Ala
            100                 105                 110

Ser Ala Phe Val Asn Leu Leu Pro Ala Val Thr Phe Ile Leu Ala Val
        115                 120                 125

Ile Phe Arg Ile Glu Lys Val Asn Leu Lys Lys Lys Ser Ser Met Ala
    130                 135                 140

Lys Val Ile Gly Thr Ala Ile Thr Val Val Gly Ala Met Val Met Thr
145                 150                 155                 160

Leu Tyr Lys Gly Pro Met Phe Asn Leu Val Pro His Ser Arg Gly Gly
                165                 170                 175

Ser His Pro Ala Ala Ala Ala Thr Pro Glu Asn Trp Val Ala Gly
            180                 185                 190

Thr Ile Glu Leu Ile Ser Cys Ile Val Gly Trp Ser Gly Phe Phe Ile
        195                 200                 205

Val Gln Ser Met Thr Leu Lys Glu Tyr Pro Ala Glu Leu Ser Leu Ala
    210                 215                 220

Ala Trp Val Cys Val Met Gly Ile Val Glu Gly Gly Ile Val Ala Leu
225                 230                 235                 240

Ile Met Glu Arg Asp Trp Asn Ala Trp Lys Ile Gly Phe Asp Ala Arg
                245                 250                 255

Leu Leu Ala Ala Ala Tyr Ser Gly Ile Val Cys Ser Gly Ile Ala Tyr
            260                 265                 270

Tyr Val Gln Ser Ile Val Asn Lys Val Lys Gly Pro Val Phe Val Thr
```

```
                275                 280                 285
Ala Phe Ser Pro Leu Ser Met Val Ile Thr Ser Val Leu Ala Ala Ile
            290                 295                 300
Ile Leu Ala Glu Ser Val His Leu Gly Ser Cys Ile Gly Ala Ile Ile
305                 310                 315                 320
Ile Val Met Gly Leu Tyr Ser Val Val Trp Gly Lys Ser Lys Glu Gly
                325                 330                 335
Lys Gly Asn Glu Thr Gly Lys Asp Gln Glu Leu Pro Val Val Asp Ile
            340                 345                 350
Lys Glu Arg Ser Thr Ile Val Asp Asp Ile Ser Asp Asp Val Thr Thr
        355                 360                 365
Val Lys Ser Lys Val Pro Ala Glu Lys Lys Ala Ser Ile Leu Gln Glu
    370                 375                 380
Leu
385

<210> SEQ ID NO 5
<211> LENGTH: 1158
<212> TYPE: DNA
<213> ORGANISM: Nicotiana tabacum

<400> SEQUENCE: 5
atggcagacc aaatgtttag tggggcattt ggctcattcc tcaacaaagt aaagccttac      60
ttggctatgg tttccttgca gtttggttac gcagggatgt atattgttac aatgatgtgc     120
ttcaaaaggg gaatgagtca ctggattctt gttgtctatc gccatgcatt tgccaccgtt     180
gctgttgcac ccttttgccat tgttcttgaa aggaaaataa ggccaaagat gacactcagg     240
gtctttatta aaatattggc tcttggtttt ctagagccag ttattgatca gaacttgtac     300
tatgtgggac tgaagagcac aactgcaacc tatgcatcag cctttgtcaa tcttctccct     360
gccgtcacct ttattcttgc ggttattttc agaattgaga agtaaaacct gaagaagaaa     420
tcaagtatgg caaggtgat aggaacagca ataacagtgg tgggagcaat ggtgatgaca     480
ctttacaaag gtccaatgtt caacctggtc ccacactctc gcggcggcag ccaccctgca     540
gccgccgcgg ccacccccga gaactgggtc gccgggacca ttgagctcat ctcttgcatt     600
gttggttggt ccggttttctt tattgttcaa tcgatgacat tgaaggagta cccagcagag     660
ctatctctgg cagcatgggt atgtgtgatg gcatagtgg aagtggaat tgttgctctt      720 ataatggaac gtgattggaa tgcatggaaa attggcttcg acgctaggct ccttgctgct     780
gcttattctg gaattgtttg ctcgggaatt gcatattacg tgcaaagtat agttaataaa     840
gttaaaggcc cagtgttcgt gacagccttt agcccgttga gtatggtcat tacttctgtt     900
cttgctgcta ttatccttggc tgagtcagtc caccttggaa gttgcattgg agcaattatt     960
atagtcatgg gactttactc tgtggtgtgg ggaaagagta aggagggaa aggaaatgag    1020 acaggaaaag accaagaatt accagttgtg gacatcaaag aaaggtcaac catagttgac    1080
gatattagtg atgatgttac gactgtgaaa tcaaaggttc cagccgagaa gaaggcttca    1140
atcttgcaag agctctag                                                 1158

<210> SEQ ID NO 6
<211> LENGTH: 5916
<212> TYPE: DNA
<213> ORGANISM: Nicotiana tabacum
<220> FEATURE:
<221> NAME/KEY: misc_feature
<222> LOCATION: (913)..(2542)
```

<223> OTHER INFORMATION: n is a, c, g, or t

<400> SEQUENCE: 6

```
accccatcct aaaactaacc ccttcattct ttgtgtgtag aaagaagaga aggagatcta      60
gaaatggcag accaaatgtt tagtggggca tttggctcat tcctcaacaa agtaaagcct     120
tacttggcta tggtttcctt gcagtttggt tacgcaggga tgtatattgt tacaatgatg     180
tgcttcaaaa ggggaatgag tcactggatt cttgttgtct atcgccatgc atttgccacc     240
gttgctgttg caccctttgc cattgttctt gaaaggtaaa atttctatcc tatttctttt     300
ttcctcgtag ttccttactc ggtagaaacc tctcttattc ggtcaccaag aaatcggacg     360
attttcatat gaccttgttt gaatctcatt tatattcatt aatgaagtgt gtgaaccatc     420
tcttttaaaa gtttaagttc tacgcatgca ggatctttgt ctgttttttg ccatgatatc     480
atattcaaat ttttgataat ttaatataaa atcttaagtc ataaattttg acgttttcca     540
tcttgctgaa taatctgaat cgcacaatag aatataagtt gcctacaagt atcttacaga     600
atattttttct ttttgctttg ttttgttttg caggaaaata aggccaaaga tgacactcag     660
ggtctttatt aaaatattgg ctcttggttt tctagagtat gtaattcttt tacacacttt     720
tatattctac tcaatttaca tgtgaacaaa ttactataaa tatatactcc aaaatgtttg     780
ttctctcata aaatttagtt gtctattcgg tcatccaaac gcatgagatt ctgatgtttc     840
ttttttctta tttatctttt acttcattta atattttttc tttttctgtt ttagccttca     900
tacatcatgt atnnnnnnnn nnnnnnnnnn nnnnnnnnnn nnnnnnnnnn nnnnnnnnnn     960
nnnnnnnnnn nnnnnnnnnn nnnnnnnnnn nnnnnnnnnn nnnnnnnnnn nnnnnnnnnn    1020
nnnnnnnnnn nnnnnnnnnn nnnnnnnnnn nnnnnnnnnn nnnnnnnnnn nnnnnnnnnn    1080
nnnnnnnnnn nnnnnnnnnn nnnnnnnnnn nnnnnnnnnn nnnnnnnnnn nnnnnnnnnn    1140
nnnnnnnnnn nnnnnnnnnn nnnnnnnnnn nnnnnnnnnn nnnnnnnnnn nnnnnnnnnn    1200
nnnnnnnnnn nnnnnnnnnn nnnnnnnnnn nnnnnnnnnn nnnnnnnnnn nnnnnnnnnn    1260
nnnnnnnnnn nnnnnnnnnn nnnnnnnnnn nnnnnnnnnn nnnnnnnnnn nnnnnnnnnn    1320
nnnnnnnnnn nnnnnnnnnn nnnnnnnnnn nnnnnnnnnn nnnnnnnnnn nnnnnnnnnn    1380
nnnnnnnnnn nnnnnnnnnn nnnnnnnnnn nnnnnnnnnn nnnnnnnnnn nnnnnnnnnn    1440
nnnnnnnnnn nnnnnnnnnn nnnnnnnnnn nnnnnnnnnn nnnnnnnnnn nnnnnnnnnn    1500
nnnnnnnnnn nnnnnnnnnn nnnnnnnnnn nnnnnnnnnn nnnnnnnnnn nnnnnnnnnn    1560
nnnnnnnnnn nnnnnnnnnn nnnnnnnnnn nnnnnnnnnn nnnnnnnnnn nnnnnnnnnn    1620
nnnnnnnnnn nnnnnnnnnn nnnnnnnnnn nnnnnnnnnn nnnnnnnnnn nnnnnnnnnn    1680
nnnnnnnnnn nnnnnnnnnn nnnnnnnnnn nnnnnnnnnn nnnnnnnnnn nnnnnnnnnn    1740
nnnnnnnnnn nnnnnnnnnn nnnnnnnnnn nnnnnnnnnn nnnnnnnnnn nnnnnnnnnn    1800
nnnnnnnnnn nnnnnnnnnn nnnnnnnnnn nnnnnnnnnn nnnnnnnnnn nnnnnnnnnn    1860
nnnnnnnnnn nnnnnnnnnn nnnnnnnnnn nnnnnnnnnn nnnnnnnnnn nnnnnnnnnn    1920
nnnnnnnnnn nnnnnnnnnn nnnnnnnnnn nnnnnnnnnn nnnnnnnnnn nnnnnnnnnn    1980
nnnnnnnnnn nnnnnnnnnn nnnnnnnnnn nnnnnnnnnn nnnnnnnnnn nnnnnnnnnn    2040
nnnnnnnnnn nnnnnnnnnn nnnnnnnnnn nnnnnnnnnn nnnnnnnnnn nnnnnnnnnn    2100
nnnnnnnnnn nnnnnnnnnn nnnnnnnnnn nnnnnnnnnn nnnnnnnnnn nnnnnnnnnn    2160
nnnnnnnnnn nnnnnnnnnn nnnnnnnnnn nnnnnnnnnn nnnnnnnnnn nnnnnnnnnn    2220
nnnnnnnnnn nnnnnnnnnn nnnnnnnnnn nnnnnnnnnn nnnnnnnnnn nnnnnnnnnn    2280
```

```
nnnnnnnnnn nnnnnnnnnn nnnnnnnnnn nnnnnnnnnn nnnnnnnnnn nnnnnnnnnn    2340
nnnnnnnnnn nnnnnnnnnn nnnnnnnnnn nnnnnnnnnn nnnnnnnnnn nnnnnnnnnn    2400
nnnnnnnnnn nnnnnnnnnn nnnnnnnnnn nnnnnnnnnn nnnnnnnnnn nnnnnnnnnn    2460
nnnnnnnnnn nnnnnnnnnn nnnnnnnnnn nnnnnnnnnn nnnnnnnnnn nnnnnnnnnn    2520
nnnnnnnnnn nnnnnnnnnn nngaattcgg gtgaacccct tccgcccta aatccgcccc      2580 agctcacatt aacctaaacc ctaacctatg ttcctaaact aaaaagctcc ttcttctcta    2640
ttcctgctgg ttttctact ttaaattaat tctttaccca caccacccac ataccactct    2700
ctccccttca tctcctacat tggctagagc ccatattgtc ttacatgctt tatgccaaga   2760
gaaaagatgc acttaatcaa ttaattaatg atcacatcca actgaataaa ttaaatacac   2820
acttgcaaag tacctttcta aaagtctgtt gtttttatgg tttttagaga ggtacgtttc   2880
ttattaaaat tttaatatgt ttggatgata gtgtttccac agttttcatt catcttctga   2940
ggttagcttt aattagttgt aggaaaacaa taagcaactt cctatattag aaatatcact   3000
aatcatatta ttctttgacg ttaaacctga caaataaatc caatgaagaa catcaaaaag   3060
tcctcattcc aaattagaaa gcaaattcat tagttctatc tgtttaattt atttgaaaag   3120
tttaagctac tagagataca aaaatgttta aaaataatta agtgagtgca gtgttgtaga   3180
ttctatttga ggaatcgaca cattgatcaa gaataaggca tctatattat tactatcaaa   3240
atatcagagc atacaatgat tccgaagaga tatcatttca cggaatatat tttaaaaagt   3300 ttagacatttt tttttacaat taaatcggaa ggcttttaat ccttatatat gtttgatgat   3360
atattactgt tgttctaaac gaaagctttt aaatatatgg aatttcaggc cagttattga   3420
tcagaacttg tactatgtgg gactgaagag cacaactgca acctatgcat cagcctttgt   3480
caatcttctc cctgccgtca cctttattct tgcggttatt tcaggtact catcattttc    3540 cttttttcct aatttaattt gtaaaaatag tacttttttac tccattaaaa tcaagaaaat   3600
accaaaaaaa gagtatataa aatgacatgg tggattttga caccttttctt tatcccataa    3660 aatatactcc ttcaaaaaga ttggcattat ttccttatta gtctgttcaa aaagattggc    3720
acctttcaat atttccttaa taagaagcat ttatagccac acaaatgtta tgacgggttt     3780
cagatcacaa gttcaaaaag ttttacagta acacaaatgt tatgacttat ttgaaaccac    3840
atatctcaaa aatcttacct taagataatc tttttttttaa aagagagtac actactagtt    3900
cattacacaa gtaataaatt acaaaagtat gatctcacct aaacaaagtt gctgacttgc    3960
ttcccacttg gaaagcagtg atctcaaaaa agttagtggt tgctcctgta atattgacat    4020
ataagttaaa ctccatatta ttacttcgta tttgtcactg tgctagctat tattagtggt   4080
tgagatataa ttttcaccaa aagaatttga aaaataaaaa agcaaatagc aaaacagcta   4140
aagtaattca tcatctaata aatgcaattt tctagaagaa ggggatcccc atagctccac   4200
ctatagctac tatagaacaa aataatgtca aaaaatgaaa aatcatataa tagaaaagaa   4260
ataaaaactc atgaacataa tttcttcctc tttttatttta acataatctt ttctggttct    4320
ttatgactag aattgagaaa gtaaacctga agaagaaatc aagtatggca aaggtgatag    4380
gaacagcaat aacagtggtg ggagcaatgg tgatgacact ttacaaaggt ccaatgttca    4440
acctggtccc acactctcgc ggcggcagcc accctgcagc cgccgcggcc accccgaga    4500 actgggtcgc cggaccatt gagctcatct cttgcattgt tggttggtcc ggttctttta    4560
ttgttcaagt aagttagtac tattttctat tttcgaaatt agaaaaaaaa atgaatattt   4620
```

```
tactcattta aatagtgata tattttatta caattatgta ttgatataat tgagcaattt    4680
tgcatatgta tacatagtcg atgacattga aggagtaccc agcagagcta tctctggcag    4740
catgggtatg tgtgatgggc atagtggaag gtggaattgt tgctcttata atggaacgtg    4800
attggaatgc atggaaaatt ggcttcgacg ctaggctcct tgctgctgct tattctgtaa    4860
gttttccctt aatgtgaaac gtacaattct cgtatttagt ctctctattc acttttactt    4920
atccactatt gactttgcac acccgttaaa aaataataaa taaagtgcat aatttaccac    4980
gatactcata ttaattggtg tataatctta atgaatttga aatgagtaat taatgctaag    5040
ggcaaaatat aaaaaatgaa ttatttttct cttgatatgc gaaagtggac aagtaaaaaa    5100
aatctatttt tagaatagta gataagtaaa agtaaacgga tgaagcatta ttttgctact    5160
attagccact gattagagca aataatttgt atttggtcag ggaattgttt gctcgggaat    5220
tgcatattac gtgcaaagta tagttaataa agttaaaggc ccagtgttcg tgacagcctt    5280
tagcccgttg agtatggtca ttacttctgt tcttgctgct attatcttgg ctgagtcagt    5340
ccaccttgga aggtaattaa caacgaagtt tttaaattta aagtacaaaa aagaagtgtt    5400
gctactttgt caatttaatt aatctaataa tttcctgatt cttttttgaca aaaatttcag   5460 ttgcattgga gcaattatta tagtcatggg actttactct gtggtgtggg aaagagtaa    5520 ggagggaaa ggaaatgaga caggaaaaga ccaagaatta ccagttgtgg acatcaaaga    5580
aaggtcaacc atagttgacg atattagtga tgatgttacg actgtgaaat caaaggttcc    5640
agccgagaag aaggcttcaa tcttgcaaga gctctagcat ccaaaaatga agctgtcttt    5700
gcaattttaa ttttttgactt gttgcaatgt ttaaatttct aagtgttgct ttgaaacaat    5760
gcactaatgt tgtcaatcgt tcttgatcaa aaaaatgtgt aatctacttt ttttttgtgt    5820
aaaagtcaag gagtggtctc tccatttggg aatgaaaaac gaaaatgttc taatttgccc    5880
ttaaaattaa atgggtagta aaagcttcgc gttcag    5916
```

<210> SEQ ID NO 7
<211> LENGTH: 396
<212> TYPE: PRT
<213> ORGANISM: Nicotiana tabacum
<220> FEATURE:
<221> NAME/KEY: misc_feature
<222> LOCATION: (1)..(4)
<223> OTHER INFORMATION: Xaa can be any naturally occurring amino acid

<400> SEQUENCE: 7

```
Xaa Xaa Xaa Xaa Gly Cys Leu Ser Ser Phe Phe Gln Arg Ala Lys Pro
1               5                   10                  15

Tyr Ile Ala Met Ile Ser Leu Gln Phe Gly Tyr Ala Gly Met Asn Val
            20                  25                  30

Ile Thr Lys Val Ser Leu Asn Gly Gly Met Ser His Tyr Val Leu Val
        35                  40                  45

Val Tyr Arg His Ala Phe Ala Thr Ala Ala Ile Ala Pro Phe Ala Leu
    50                  55                  60

Val Leu Glu Arg Lys Leu Arg Pro Lys Met Thr Phe Met Met Phe Leu
65                  70                  75                  80

Gln Ile Phe Val Leu Gly Leu Leu Gly Pro Val Ile Asp Gln Asn Phe
                85                  90                  95

Tyr Tyr Met Gly Leu Lys Phe Thr Ser Pro Thr Phe Ser Cys Ala Met
            100                 105                 110

Ser Asn Met Leu Pro Ala Met Thr Phe Val Met Ala Val Leu Cys Arg
        115                 120                 125
```

```
Met Glu Lys Val His Ile Lys Lys Leu Arg Cys Gln Ala Lys Val Val
    130                 135                 140

Gly Thr Ile Val Thr Val Ala Gly Ala Met Leu Met Thr Leu Tyr Lys
145                 150                 155                 160

Gly His Val Ile Asn Leu Val Trp Ser Asn Asn Ile His Thr Asn Thr
                165                 170                 175

Ser Asn Val Pro Glu Pro Asn Glu Ala Thr Asp Lys Asp Trp Leu Lys
                180                 185                 190

Gly Ser Ile Leu Leu Ile Leu Ala Thr Phe Ala Trp Ala Ser Phe Phe
        195                 200                 205

Ile Leu Gln Asn Val Thr Met Arg Lys Tyr Thr Ala Pro Leu Ser Leu
    210                 215                 220

Thr Ala Leu Val Cys Phe Met Gly Thr Leu Gln Ser Ile Ala Val Thr
225                 230                 235                 240

Leu Val Met Glu His Lys Thr Ser Ala Trp Ala Ile Gly Phe Asp Met
                245                 250                 255

Asn Leu Leu Ala Ala Ala Tyr Ala Gly Ile Val Ser Ser Leu Ala
                260                 265                 270

Tyr Tyr Val Gln Gly Leu Val Met Glu Lys Arg Gly Pro Val Phe Val
        275                 280                 285

Thr Ala Phe Ser Pro Leu Met Met Ile Ile Val Ala Ile Met Gly Ser
290                 295                 300

Phe Ile Leu Ala Glu Lys Ile Tyr Leu Gly Gly Val Leu Gly Ala Val
305                 310                 315                 320

Leu Ile Val Ala Gly Leu Tyr Ser Val Leu Trp Gly Lys Tyr Lys Glu
                325                 330                 335

Tyr Lys Glu Lys Glu Ile Glu Ala Ala Ile Pro Glu Pro Val Lys Val
                340                 345                 350

Val Thr Glu Asn Asn Gln Met Met Ile Leu Glu Asp Arg Glu Val Asn
        355                 360                 365

Asp Ile Glu Met Gln Ser Thr Ala Val Ala Ile Ser Val Ser Met Ser
    370                 375                 380

Gln Pro Pro Met Leu Ala Lys Glu Ala Pro Lys Ala
385                 390                 395
```

<210> SEQ ID NO 8
<211> LENGTH: 1191
<212> TYPE: DNA
<213> ORGANISM: Nicotiana tabacum
<220> FEATURE:
<221> NAME/KEY: misc_feature
<222> LOCATION: (1)..(10)
<223> OTHER INFORMATION: n is a, c, g, or t

<400> SEQUENCE: 8

```
nnnnnnnnnn caggatgttt aagtagtttc ttccaaaggg caaagcctta catagcaatg      60
atctctttgc aatttggtta tgcaggaatg aatgttatta ctaaagtttc ccttaatgga     120
ggaatgagtc attatgtttt ggttgtttat agacatgcct ttgctactgc agctattgct     180
ccttttgctc ttgttcttga agaaaactc agaccaaaga tgactttcat gatgttcttg     240
caaatttttg tattgggcct tctagggcca gtgattgatc aaaacttcta ctatatggga     300
cttaagttta catccccaac attctcatgt gccatgagca acatgcttcc tgcaatgaca     360
tttgtcatgg ctgtcctctg cagaatggag aaggtgcata taagaagtt gagatgccaa     420 gcaaaggttg tgggtactat agtgacagtg gctggagcca tgttgatgac attgtacaaa     480
```

```
ggacatgtta ttaatttggt ttggtcaaat aatatccata caaatacttc taatgttcct    540
gaacccaatg aagctactga taaagattgg cttaaaggtt caatccttct aattcttgcc    600
acttttgcat gggcttcttt ctttatactt cagaatgtta caatgaggaa gtacactgct    660
ccactttctc taactgcact tgtttgcttc atgggaactt tgcaatcaat tgctgtcacc    720
ttagtgatgg aacataaaac ttctgcttgg gccattggtt ttgacatgaa ccttcttgct    780
gctgcctatg ctggtattgt atcatcaagt cttgcatact atgttcaagg tcttgtaatg    840
gagaaaagag gacctgtttt tgtgactgct ttcagtccat tgatgatgat cattgttgct    900
attatgggct ctttcattct tgctgaaaaa atatatcttg gaggtgtgct aggagcagtg    960
ctaattgtgg ctggactata ctcagtttta tggggaaaat acaaggaata taaggagaaa   1020
gaaattgagg ctgcaattcc tgaaccagtg aaagtagtta cagagaacaa ccaaatgatg   1080
attttagaag atagagaagt aaatgacata gaaatgcaaa gtactgcagt agccattagt   1140
gtttcaatgt cacagcctcc aatgttggct aaagaagcac caaaagcttg a            1191
```

<210> SEQ ID NO 9
<211> LENGTH: 2913
<212> TYPE: DNA
<213> ORGANISM: Nicotiana tabacum
<220> FEATURE:
<221> NAME/KEY: misc_feature
<222> LOCATION: (1)..(11)
<223> OTHER INFORMATION: n is a, c, g, or t

<400> SEQUENCE: 9

```
nnnnnnnnnn ncaggatgtt taagtagttt cttccaaagg gcaaagcctt acatagcaat     60
gatctctttg caatttggtt atgcaggaat gaatgttatt actaaagttt cccttaatgg    120
aggaatgagt cattatgttt tggttgttta tagacatgcc tttgctactg cagctattgc    180 tcctttttgct cttgttcttg aaaggtaata tataattaat tgcctacaag aaaaagtcct    240
tagcttagtt aaaacttctc ttacattatc aagttgtgaa gtaattcaaa atgaaaatgc    300 taactctttta aattgtctttt gttttgtaca gaaaactcag accaaagatg actttcatga    360
tgttcttgca aatttttgta ttgggccttc tagggtgagt gtctctctat gtcctattta    420
tgaaactcca atctcggatt ttctatatga gtttaagttc tatacactga cggaataaat    480
aatatattta tatgatatag ccacttctat ccccacagct gggataatat taagtatgtt    540
gttgttgttg ttgtatagtc acttctaaag tagttaatga tatatgaaat aagagcaatc    600
agtatataac ctgataaaaa tgacaattaa tgtgctatca catattaaac tatattggta    660
acgtaaaaaa atcataaacg atcagtgtat ataacttaaa cattttactt atgtaaacca    720
aaaaaaatct aaatctatga tttgatcaaa taggccagtg attgatcaaa acttctacta    780
tatgggactt aagtttacat ccccaacatt ctcatgtgcc atgagcaaca tgcttcctgc    840
aatgacattt gtcatggctg tcctctgcag gtacatatat acatatatgt tcaatttaat    900
atttcttcta attattattc tactcttttc caaaatttgg aactaacaaa taagaatga     960 attcagaatg gagaaggtgc atataaagaa gttgagatgc caagcaaagg ttgtgggtac   1020
tatagtgaca gtggctggag ccatgttgat gacattgtac aaaggacatg ttattaattt   1080
ggtttggtca ataatatcc atacaaatac ttctaatgtt cctgaaccca atgaagctac   1140
tgataaagat tggcttaaag gttcaatcct tctaattctt gccactttttg catgggcttc   1200 tttctttata cttcaggtat gtaatatata ccctaaattt tttaaatttt tgtgaaatag   1260
```

-continued

```
ttgttgttgt taatgtattt ttatttgatg ttttgtgaca gaatgttaca atgaggaagt      1320
acactgctcc actttctcta actgcacttg tttgcttcat gggaactttg caatcaattg      1380
ctgtcacctt agtgatggaa cataaaactt ctgcttgggc cattggtttt gacatgaacc      1440
ttcttgctgc tgcctatgct gtatgttctt ttttttactc ctcatccctc ctatgaattc      1500
taataaaaag ggcagcttgg cgtacgaagc atcccgtatt cacgcaggat tcggaaaagg      1560
gtcgcacccc gaagggtgtg aggcagccta cccgatgcaa gcatcaatga ctgattctac      1620
ggctcgaacc catgagataa gataacttta tcgttggcca aaggtcctct tcttataaat      1680
aagggattca aaaaattgca agaatattac accttagcgg caaatccacc ttgctacttc      1740
actagaatat tctcttatgt tgcgagaatt caagaaaagg agatttggaa caacgataaa      1800
gttatctccg tgtgacctat aagtctcggg tttgaatcgt gaaagcaacc acaaatgctt      1860
gcattacggt agattgtcca catcacaccc cttggggtgc aacccttccc tctaccctgt      1920
gtgaatgcga aatgctttgt gcatcgacct aaaaaaaggt caaaggaatt caattgttca      1980
tatatatatg tatatataga agaatctttt aaatctattg gcacagtata actattcgac      2040
gaagggaatt caatcgaacc tcattcatgt cacgaatctc tgacccttct tctcctaaaa      2100
ccaacaacca ttgattaatg acaaaatata attatggata ttgttttata atatttcagg      2160
gtattgtatc atcaagtctt gcatactatg ttcaaggtct tgtaatggag aaaagaggac      2220 ctgttttgt gactgctttc agtccattga tgatgatcat tgttgctatt atgggctctt      2280
tcattcttgc tgaaaaaata tatcttggag ggtaagtcaa tttcttctat gtcatactct      2340
ctttgtttca ttttacatgt ccatatttat ttttcagttt gttctaaaaa gaagacactt      2400
tctatatttt tgggtttaag tgtgctagga gcagtgctaa ttgtggctgg actatactca      2460
gttttatggg gaaatacaa ggaatataag gagaaagaaa ttgaggctgc aattcctgaa      2520
ccagtgaaag tagttacaga gaacaaccaa atgatgattt tagaagatag agaagtaaat      2580
gacatagaaa tgcaaagtac tgcagtagcc attagtgttt caatgtcaca gcctccaatg      2640
ttggctaaag aagcaccaaa agcttgagtt atgaaaaaaa gaaagaggaa aaaaaacaca      2700
ataaaacaga gttttattagg tggtttaagg aaggattaag aagagggtat tttgctttat      2760 tcccttttc tgttacgggt aaataatata tggaggtgca atgtaatttt tcggctttat      2820 ataactta ctagtatttg atgcagcaat taattaactc cttttctga ataatatata      2880 aatatggcaa ggtttccatc cgtttactgg aat                                  2913
```

<210> SEQ ID NO 10
<211> LENGTH: 397
<212> TYPE: PRT
<213> ORGANISM: Nicotiana tabacum

<400> SEQUENCE: 10

```
Met Glu Asn Lys Ala Gly Cys Leu Ser Ser Phe Phe Gln Arg Ala Lys
1               5                   10                  15

Pro Tyr Ile Ala Met Ile Ser Leu Gln Phe Gly Tyr Ala Gly Met Asn
            20                  25                  30

Val Ile Thr Lys Val Ser Leu Asn Gly Gly Met Ser His Tyr Val Leu
        35                  40                  45

Val Val Tyr Arg His Ala Phe Ala Thr Ala Ala Ile Ala Pro Phe Ala
    50                  55                  60

Leu Val Leu Glu Arg Lys Leu Arg Pro Lys Met Thr Phe Met Met Phe
65                  70                  75                  80
```

```
Leu Gln Ile Phe Val Leu Gly Leu Gly Pro Val Ile Asp Gln Asn
                85                  90                  95

Phe Tyr Tyr Met Gly Leu Lys Phe Thr Ser Pro Thr Phe Ser Cys Ala
            100                 105                 110

Met Ser Asn Met Leu Pro Ala Met Thr Phe Val Met Ala Val Leu Cys
            115                 120                 125

Arg Met Glu Lys Val His Ile Lys Lys Leu Arg Cys Gln Ala Lys Val
            130                 135                 140

Val Gly Thr Ile Val Thr Val Ala Gly Ala Met Leu Met Thr Leu Tyr
145                 150                 155                 160

Lys Gly His Val Ile Asn Leu Val Trp Ser Asn Asn Ile His Thr Asn
                165                 170                 175

Thr Ser Asn Val Pro Glu Ser Asn Glu Pro Thr Asp Lys Asp Trp Leu
            180                 185                 190

Lys Gly Ser Ile Leu Leu Ile Leu Ala Thr Phe Ala Trp Ala Ser Phe
            195                 200                 205

Phe Ile Leu Gln Asn Val Thr Met Arg Lys Tyr Thr Ala Pro Leu Ser
            210                 215                 220

Leu Thr Ala Leu Val Cys Phe Met Gly Thr Leu Gln Ser Ile Ala Val
225                 230                 235                 240

Thr Leu Val Met Glu His Lys Ala Ser Ala Trp Ala Ile Gly Phe Asp
                245                 250                 255

Met Asn Leu Leu Ala Ala Ala Tyr Ala Gly Ile Val Ser Ser Leu
            260                 265                 270

Ala Tyr Tyr Val Gln Gly Leu Val Met Glu Lys Arg Gly Pro Val Phe
            275                 280                 285

Val Thr Ala Phe Ser Pro Leu Met Met Ile Ile Val Ala Ile Met Gly
290                 295                 300

Ser Phe Ile Leu Ala Glu Lys Ile Tyr Leu Gly Gly Val Leu Gly Ala
305                 310                 315                 320

Val Leu Ile Val Ala Gly Leu Tyr Ser Val Leu Trp Gly Lys Tyr Lys
                325                 330                 335

Glu Tyr Lys Glu Lys Glu Ile Glu Ala Ala Ile Pro Glu Pro Val Lys
            340                 345                 350

Gly Ile Thr Glu Asn Asn Gln Met Met Arg Leu Glu Asp Arg Glu Val
            355                 360                 365

Asn Asp Ile Glu Met Gln Ser Ser Ala Val Ala Ile Ser Val Pro Met
            370                 375                 380

Ser Gln Pro Pro Met Leu Ala Lys Glu Ala Pro Lys Ala
385                 390                 395

<210> SEQ ID NO 11
<211> LENGTH: 1194
<212> TYPE: DNA
<213> ORGANISM: Nicotiana tabacum

<400> SEQUENCE: 11
atggagaaca aagcaggatg tttaagtagt tttttccaaa gggcaaagcc ttatatagca    60
atgatctcat tgcaatttgg ttatgcagga atgaatgtta ttactaaagt ttcccttaat   120
ggaggaatga gtcattatgt tttggttgtt tatagacatg cctttgctac tgcagctatt   180
gctccttttg ctcttgttct tgaaagaaaa ctcagaccaa agatgacttt catgatgttc   240
ttgcaaattt ttgtattggg ccttctaggg ccagtgattg atcaaaactt ctactatatg   300
ggacttaagt ttacatctcc aacattctca tgtgccatga gcaacatgct tcctgcaatg   360
```

| | |
|---|---|
| acatttgtca tggctgtcct ctgcagaatg gagaaggtgc atataaagaa gttgagatgc | 420 |
| caagcaaaag ttgtgggtac tatagtgaca gtggctggag ccatgttgat gacattgtac | 480 |
| aaaggacatg ttattaattt ggtttggtca ataatatcc atacaaatac ttctaatgtt | 540 |
| cctgaatcca atgaacctac tgataaagat tggcttaaag gttcaatcct tctaattctt | 600 |
| gccactttg catgggcttc tttctttata cttcagaatg ttacaatgag gaaatacact | 660 |
| gctccacttt ctctaactgc acttgtttgc tttatgggaa ctctgcaatc aattgctgtc | 720 |
| accttagtga tggaacataa agcttctgct tgggctattg gttttgacat gaatcttctt | 780 |
| gctgctgcct atgctggtat tgtatcatca agtcttgcat actatgttca aggtcttgta | 840 |
| atggagaaaa gaggacctgt cttttgtcact gctttcagtc ccttgatgat gatcattgtt | 900 |
| gctattatgg gctctttcat tcttgctgaa aaaatctatc ttggaggtgt gctaggagca | 960 |
| gtgctaattg tggctggact atactcagtt ttatggggaa aatacaagga atacaaggag | 1020 |
| aaagaaattg aggctgcaat tcctgaacca gtgaaaggaa ttacagagaa caaccaaatg | 1080 |
| atgaggttag aagatagaga agtaaatgac atagaaatgc aaagcagtgc agtagcgatt | 1140 |
| agtgttccaa tgtcacagcc tccaatgttg gctaaggaag caccaaaagc ttga | 1194 |

<210> SEQ ID NO 12
<211> LENGTH: 2708
<212> TYPE: DNA
<213> ORGANISM: Nicotiana tabacum

<400> SEQUENCE: 12

| | |
|---|---|
| atcctctaag agtacttcaa gtgttctcct ttgaattctt cttaattctc ctctctttga | 60 |
| gaatacaata tatatatatt tagctgaaag aaaacataac aaaacaaaga tggagaacaa | 120 |
| agcaggatgt ttaagtagtt ttttccaaag ggcaaagcct tatatagcaa tgatctcatt | 180 |
| gcaatttggt tatgcaggaa tgaatgttat tactaaagtt tcccttaatg gaggaatgag | 240 |
| tcattatgtt ttggttgttt atagacatgc ctttgctact gcagctattg ctccttttgc | 300 |
| tcttgttctt gaaaggtata atataattgc ccacaagaaa atagttaaaa cttctattac | 360 |
| cattcttgat ttatcttgct gtaaaatgaa ataatgcta agtctttaaa ttttctttgt | 420 |
| tttgtacaga aaactcagac caaagatgac tttcatgatg ttcttgcaaa tttttgtatt | 480 |
| gggccttcta gggtgagtgt ctctctctct atgtcctatt tatgaaactc aaatctcaga | 540 |
| ttttctacat aagtttaagt tttatacact gacttgaata acaatatat ttatacgatc | 600 |
| aagtcacttc caaagtagtt actgataaca tgataaaaat gataattaat gtgttatcgc | 660 |
| atgttaaact atactgataa cggaaagaaa tcttaaacga ttagtttata tagcttaaat | 720 |
| ctttttttta cttatttaaa aaaatttaaa cctatgattt gattcaatca ggccagtgat | 780 |
| tgatcaaaac ttctactata tgggacttaa gtttacatct ccaacattct catgtgccat | 840 |
| gagcaacatg cttcctgcaa tgacatttgt catggctgtc ctctgcaggt acatatatac | 900 |
| aaatatcttc aatttaatat tccttaatta ttattctact ctttttccaa aatttttgaac | 960 |
| taataaacaa agaatgaatt cagaatggag aaggtgcata taagaagtt gagatgccaa | 1020 |
| gcaaaagttg tgggtactat agtgacagtg gctggagcca tgttgatgac attgtacaaa | 1080 |
| ggacatgtta ttaatttggt ttggtcaaat aatatccata caaatacttc taatgttcct | 1140 |
| gaatccaatg aacctactga taaagattgg cttaaaggtt caatccttct aattcttgcc | 1200 |
| acttttgcat gggcttcttt ctttatactt caggtatgta atatatatac actaattatt | 1260 |

```
atttttaaat agttgtggaa tagttgttgt taatgtattt ttgtctgatg ttttgtgaca    1320
gaatgttaca atgaggaaat acactgctcc actttctcta actgcacttg tttgctttat    1380
gggaactctg caatcaattg ctgtcacctt agtgatggaa cataaagctt ctgcttgggc    1440
tattggtttt gacatgaatc ttcttgctgc tgcctatgct gtatgttcct ttctttattc    1500
ctcatccctc gtataaattc taataaaaag gacatctcgg tacacgaagt atcccgcttt    1560
cacgcagggt tcgaaggacc ctcatcccaa gacgtgtgat gtagacagcc tgctctgatg    1620
caaacattga atccatgagt cgaccccatg acctatagga cacggagaca actttactgt    1680
tgctccaaga atccccttc cgtaaataag ggattcaaaa aattgcaaga atattacacc      1740
ttagtagtag agccaccttg ccacttcact agaatattct cttatgtcaa gggaattcaa    1800
caattcatat atatatatat atatataaa gaattgtctt aaccctattt ggacagtata      1860
accattcgac aaaggcgatt caattgaacc tccttcggat catgtgtctc tgccccttct    1920
catcctaaaa ccaacaacca ttgagaatga caaaatataa ttatggatat tgttttacca    1980
aatttcaggg tattgtatca tcaagtcttg catactatgt tcaaggtctt gtaatggaga    2040
aaagaggacc tgtctttgtc actgctttca gtcccttgat gatgatcatt gttgctatta    2100
tgggctcttt cattcttgct gaaaaaatct atcttggagg gtaagtttaa ctttctatgt    2160
catactctct ctggtccatt ttacatgtcc gtatttattt ttcagtctgt tctaaaagga    2220
atgacatgtt ttatattttt gggtttcagt gtgctaggag cagtgctaat tgtggctgga    2280
ctatactcag ttttatgggg aaaatacaag gaatacaagg agaaagaaat tgaggctgca    2340
attcctgaac cagtgaaagg aattacagag aacaaccaaa tgatgaggtt agaagataga    2400
gaagtaaatg acatagaaat gcaaagcagt gcagtagcga ttagtgttcc aatgtcacag    2460
cctccaatgt tggctaagga agcaccaaaa gcttgagtta agttgtgaaa aagaaagac    2520
gaaaaaaaa acacaataaa aacagagttt atgaggtggt ttaaggaaga attagaagag    2580
ggtattttgc tttattcccc ttttctgtta tgggccgggt aaataatgga ggtgctatgt    2640
aattttcgg cgttatcttt atactaattc cagagtattt gatgggaaaa tgtagtctta    2700
ctaccaat                                                            2708

<210> SEQ ID NO 13
<211> LENGTH: 389
<212> TYPE: PRT
<213> ORGANISM: Nicotiana tabacum

<400> SEQUENCE: 13

Met Glu Gly Lys Gly Glu Cys Gly Cys Ser Phe Phe Gln Arg Ala Lys
1               5                   10                  15

Pro Tyr Ile Ala Met Ile Ser Leu Gln Phe Gly Tyr Ala Gly Met Asn
                20                  25                  30

Ile Ile Thr Lys Val Ser Leu Asn Arg Gly Met Ser His Tyr Val Leu
        35                  40                  45

Val Val Tyr Arg His Ala Phe Ala Thr Ala Val Ile Ala Pro Phe Ala
    50                  55                  60

Leu Ile Leu Glu Arg Lys Ile Arg Pro Lys Met Ser Leu Met Met Phe
65                  70                  75                  80

Leu Gln Ile Phe Val Leu Gly Leu Leu Gly Pro Val Ile Asp Gln Asn
                85                  90                  95

Phe Tyr Tyr Ala Gly Leu Lys Tyr Thr Pro Pro Thr Phe Ser Cys Ala
                100                 105                 110
```

```
Met Ser Asn Met Leu Pro Ala Met Thr Phe Val Met Ala Val Ile Cys
            115                 120                 125
Arg Met Glu Lys Val Asp Ile Lys Lys Val Arg Cys Gln Ala Lys Val
    130                 135                 140
Leu Gly Thr Ile Val Thr Val Ala Gly Ala Met Leu Met Thr Leu Tyr
145                 150                 155                 160
Lys Gly His Val Val Asn Leu Leu Trp Ser Asn His Thr Thr Ile Asn
                165                 170                 175
Ser Ser Val Gln Glu Thr Ser Gly Ala Asn Ser Asp Lys Asp Trp Phe
            180                 185                 190
Lys Gly Ser Ile Leu Leu Ile Phe Ala Thr Leu Ala Trp Ala Ser Phe
        195                 200                 205
Phe Ile Leu Gln Asn Ile Ala Met Arg Lys Tyr Thr Ala Pro Leu Ser
    210                 215                 220
Leu Thr Ala Leu Val Cys Phe Met Gly Thr Leu Gln Ser Ile Ala Val
225                 230                 235                 240
Thr Phe Val Met Glu His Lys Pro Ser Val Trp Thr Ile Gly Phe Asp
                245                 250                 255
Met Asn Leu Leu Ala Ala Ala Tyr Ala Gly Ile Val Ser Ser Ser Ile
            260                 265                 270
Ala Tyr Tyr Val Gln Gly Val Val Met Glu Lys Arg Gly Pro Val Phe
        275                 280                 285
Val Thr Ala Phe Ser Pro Leu Met Met Ile Ile Val Ala Thr Met Gly
    290                 295                 300
Ser Phe Ile Leu Ala Glu Lys Ile Tyr Ile Gly Gly Ile Leu Gly Ala
305                 310                 315                 320
Val Leu Ile Val Ala Gly Leu Tyr Ser Val Leu Trp Gly Lys Tyr Lys
                325                 330                 335
Glu Tyr Lys Glu Lys Glu Ile Glu Glu Ala Ile Ile Pro Glu Ala Val
            340                 345                 350
Lys Gly Val Asn Gly Asn Asn Gln Met Met Ile Leu Pro Asp Asn Glu
        355                 360                 365
Ala Ile Asn Asp Ile Glu Met Gln Lys Asn Ser Asp Ala Asn Lys Ile
    370                 375                 380
Gln Thr Pro Ile Asn
385

<210> SEQ ID NO 14
<211> LENGTH: 1170
<212> TYPE: DNA
<213> ORGANISM: Nicotiana tabacum

<400> SEQUENCE: 14
atggaaggaa aaggagaatg tggttgcagt ttttttcaaa gggctaagcc ttatatagcc      60
atgatttcct tgcaatttgg gtatgcagga atgaatatta ttacaaaagt ttctcttaat     120
aggggaatga gtcattatgt tctggttgtc tataggcatg cttttgctac tgcagttatt     180
gctccctttg ctcttattct tgaaagaaaa attaggccaa agatgtcact catgatgttc     240
ttgcaaatat ttgtattggg tcttttggga ccagtgattg atcaaaattt ttactacgct     300
ggactcaaat atacaccccc aacattttca tgtgctatga gcaacatgct acctgctatg     360
acatttgtca tggcagtgat ctgcaggatg gagaaagttg acataaagaa agttagatgc     420
caagcaaaag tgttgggaac aatagtaaca gtagctggag ccatgttaat gacattgtac     480
aaaggccatg ttgttaactt gttatggtca aatcacacta ctattaattc tagtgtacaa     540
```

```
gaaaccagtg gagctaattc tgataaagat tggtttaaag gttcaattct cctcattttt    600
gcaactcttg cttgggcttc tttcttcatt cttcagaata tcgcaatgag gaaatacaca    660
gctccacttt ctctaactgc acttgtttgc tttatgggaa ccttacaatc tatagcagtc    720
acatttgtaa tggagcacaa gccttctgtt tggactattg gatttgacat gaatctatta    780
gctgctgcct atgcaggaat agtatcatca agtatagcat actatgtaca aggtgttgta    840
atggagaaaa gaggacctgt ttttgtgact gcttttagtc ctttaatgat gattattgtt    900
gcaactatgg gctctttcat tcttgctgaa aaaatctata ttggaggaat tcttggggca    960
gtgctcatag tggcagggct atactcagtt ctatggggaa aatacaagga gtacaaagag   1020
aaggaaattg aggaggcaat aattcctgaa gcagtgaagg gagttaacgg aaataatcaa   1080
atgatgattc ttccagataa tgaagcaatt aatgatatag aaatgcaaaa aaatagtgat   1140
gcaaacaaaa tccaaactcc aattaattag                                    1170
```

<210> SEQ ID NO 15
<211> LENGTH: 1861
<212> TYPE: DNA
<213> ORGANISM: Nicotiana tabacum

<400> SEQUENCE: 15

```
caaatctcct cttattagag tgttttcttc gcttttcact tgatcagttc tttattctct     60
tctcttaaat aattaaaaat aaaataatgg aaggaaaagg agaatgtggt tgcagttttt    120
ttcaaagggc taagccttat atagccatga tttccttgca atttgggtat gcaggaatga    180
atattattac aaaagtttct cttaataggg gaatgagtca ttatgttctg gttgtctata    240
ggcatgcttt tgctactgca gttattgctc cctttgctct tattcttgaa aggtaaaatt    300
acgcacaaaa ataagaattt tgaagctttt tgttacaagt cttgaaagag tagcaaaaac    360
tgacaagtct ttaaatttgt tgacagaaaa attaggccaa agatgtcact catgatgttc    420
ttgcaaatat ttgtattggg tcttttggga ccagtgattg atcaaaattt ttactacgct    480
ggactcaaat atacaccccc aacattttca tgtgctatga gcaacatgct acctgctatg    540
acatttgtca tggcagtgat ctgcaggtat acataattaa tactatatat tatttttttct    600 tctttcttta cttcttcaag tttttggactt attgataagg tttatttttta ggatggagaa    660 agttgacata aagaaagtta gatgccaagc aaaagtgttg gaacaatag taacagtagc    720 tggagccatg ttaatgacat tgtacaaagg ccatgttgtt aacttgttat ggtcaaatca    780
cactactatt aattctagtg tacaagaaac cagtggagct aattctgata agattggtt    840 taaaggttca attctcctca ttttttgcaac tcttgcttgg gcttctttct tcattcttca    900
ggtgtgtaat agtacactta tgtatactta attcccattt ttttcatttt ctcttttcaa    960
caatttccag aaaaaatctt tttattttt ggtttcctaa atggtgattt aatatttgtg   1020
cagaatatcg caatgaggaa atacacagct ccactttctc taactgcact tgtttgcttt   1080
atgggaacct tacaatctat agcagtcaca tttgtaatgg agcacaagcc ttctgtttgg   1140
actattggat ttgacatgaa tctattagct gctgcctatg cagtaagttt aatttctttc   1200
ctttcaattt ggactactat tgattttgtc aaaataatat ataagaatta atgatgaata   1260 acaaatatatt taattttcag ggaatagtat catcaagtat agcatactat gtacaaggtg   1320
ttgtaatgga gaaagagga cctgttttttg tgactgcttt tagtccttta atgatgatta   1380
ttgttgcaac tatgggctct ttcattcttg ctgaaaaat ctatattgga gggtaatttc   1440
```

```
aatatctctc aacattttat cttttctggt tttattttca tttagtaaac tgaatattaa    1500
ttattttctc ttttgggttc agaattcttg gggcagtgct catagtggca gggctatact    1560
cagttctatg gggaaaatac aaggagtaca aagagaagga aattgaggag gcaataattc    1620
ctgaagcagt gaagggagtt aacggaaata atcaaatgat gattcttcca gataatgaag    1680
caattaatga tatagaaatg caaaaaaata gtgatgcaaa caaaatccaa actccaatta    1740
attagtgtac caatgccaca gccccccatg ttagctaggg aagcaccaaa agcttaattt    1800
ttggttgagg aattattaga agcaaaaaag aacagacgaa agatgggaat ttttgccttt    1860
t                                                                    1861
```

<210> SEQ ID NO 16
<211> LENGTH: 379
<212> TYPE: PRT
<213> ORGANISM: Nicotiana tabacum

<400> SEQUENCE: 16

```
Met Lys Ala Val Ser Glu Leu Phe Ile Arg Ser Lys Pro Phe Ile Ala
1               5                   10                  15

Val Ile Phe Leu Gln Phe Gly Leu Ala Gly Met Asp Ile Leu Thr Lys
            20                  25                  30

Met Ala Leu Asn Glu Gly Met Ser Asn Tyr Val Phe Val Tyr Arg
        35                  40                  45

His Ala Val Ala Thr Leu Ala Ile Ala Pro Phe Ala Ile Ile Leu Asp
    50                  55                  60

Lys Lys Ile Arg Pro Lys Met Thr Leu Ser Ile Phe Thr Lys Leu Val
65                  70                  75                  80

Leu Leu Ser Ile Leu Glu Pro Val Ile Asp Gln Asn Leu Tyr Ser Ile
                85                  90                  95

Gly Leu Lys Tyr Thr Thr Ala Thr Phe Ala Ala Ala Met Cys Asn Ile
            100                 105                 110

Leu Pro Ala Ile Thr Phe Ile Met Ala Trp Ile Phe Arg Leu Glu Arg
        115                 120                 125

Val Lys Leu Thr Ser Ile Arg Ser Gln Ala Lys Ile Ile Gly Thr Val
    130                 135                 140

Ala Thr Val Ala Gly Ala Met Ile Met Thr Leu Val Arg Gly Pro Val
145                 150                 155                 160

Ile Glu Leu Phe Trp Thr Lys Gly Asn Ser Ser His Glu Ser Gln Ser
                165                 170                 175

Gly Gly Leu Asn Leu Ser His Ala Ile Lys Gly Ser Leu Met Ile Thr
            180                 185                 190

Ile Gly Cys Phe Ser Trp Ala Ala Phe Met Ile Leu Gln Ala Ile Thr
        195                 200                 205

Leu Arg Thr Tyr Pro Ala Glu Leu Ser Leu Thr Ala Trp Ile Cys Leu
    210                 215                 220

Leu Gly Thr Ala Glu Gly Ala Ile Val Ala Met Val Met Glu Arg Gly
225                 230                 235                 240

Lys Ala Ala Val Trp Ala Ile Lys Trp Asp Thr Lys Phe Leu Ala Ala
                245                 250                 255

Val Tyr Ser Gly Ile Phe Cys Ser Gly Leu Ala Tyr Tyr Ile Gln Gly
            260                 265                 270

Val Ile Met Lys Asp Arg Gly Pro Val Phe Val Thr Ala Phe Asn Pro
        275                 280                 285

Leu Ser Met Val Ile Val Ala Ile Leu Ser Ser Phe Ile Leu Arg Glu
```

```
                290                 295                 300
Gln Met Asn Leu Gly Arg Val Leu Gly Ala Val Ile Val Leu Gly
305                 310                 315                 320

Leu Tyr Ile Val Leu Trp Gly Lys Ser Lys Asp Gln Lys Ser Pro Ser
                325                 330                 335

Ala Asp Glu Gln Ala Ile Pro Thr Gln Glu Thr Thr His Glu Asn Lys
            340                 345                 350

Ile Asp Lys Glu Asn Leu Ser Gln Thr Ile Ile His Ile Ser Pro Ser
        355                 360                 365

Arg Gly Thr Thr Val Thr Lys Asp Glu Arg Ile
    370                 375
```

<210> SEQ ID NO 17
<211> LENGTH: 1140
<212> TYPE: DNA
<213> ORGANISM: Nicotiana tabacum

<400> SEQUENCE: 17

```
atgaaggcag taagtgaact attcattaga tcaaaaccct ttattgctgt cattttctt      60 caatttgggc tagcaggcat ggatatcctc accaaaatgg cattgaatga agggatgagc    120
aactatgtat tgttgtgta ccgccacgca gtagccactc tggctattgc cctttttgca    180
ataattctag acaagaaaat aagaccaaag atgactctct caatattcac taagttggta    240
cttcttagca tactggagcc agtcatcgac cagaatctct actctattgg cctgaaatac    300
acaacagcaa cttttgcagc tgcaatgtgc aacatacttc ccgccattac ttttataatg    360
gcctggatat tcaggcttga gagggtgaag cttacaagca ttcgcagcca agccaaaata    420
atcgggactg tcgccacagt tgcaggagcc atgatcatga cgctggtacg aggtccagtc    480
attgaactat tttggacaaa aggaaattcc agtcatgaat ctcaaagtgg tgggttaaat    540
ctaagccatg ctatcaaagg ttccctcatg ataacaattg ggtgcttcag ttgggcagca    600
ttcatgattt tgcaggcaat cacactgcgg acctaccctg cagagctctc actcactgct    660
tggatatgct tgttgggaac agctgaggga gctatagtag cgatggtaat ggagagagga    720
aaagctgcag tgtgggccat aaaatgggac actaagtttc ttgcagctgt atacagtgga    780
atattctgtt cagggctcgc gtattacatc caaggagtaa taatgaaaga taggggccct    840 gtttcgtca cagcttttcaa tccattaagc atggttattg tagctatact gagttcattc    900
attctacgtg aacaaatgaa cctgggaagg gtacttggtg ctgttgtgat cgttttaggc    960 cttttacattg tcctgtgggg taaaagcaag gatcaaaaat ctccatcagc cgatgaacaa    1020
gcaataccaa cacaggaaac gacacatgaa acaaaattg acaaggaaaa tttaagtcag    1080
acaattatcc acatcagtcc atcaagagga acaactgtta ccaaagatga agaatataa     1140
```

<210> SEQ ID NO 18
<211> LENGTH: 2420
<212> TYPE: DNA
<213> ORGANISM: Nicotiana tabacum

<400> SEQUENCE: 18

```
gtgcacactt tgacttaca atagaagtgc tctcaaagag gttgagtttg tgcaaataaa      60
caatgaaggc agtaagtgaa ctattcatta gatcaaaacc ctttattgct gtcatttttc    120
ttcaatttgg gctagcaggc atggatatcc tcaccaaaat ggcattgaat gaagggatga    180
gcaactatgt atttgttgtg taccgccacg cagtagccac tctggctatt gctcctttg     240
```

```
caataattct agacaagtat atatctctct ctcttcctcc ctccctatgt tcaattgacg      300
tgtttgcaac ctcaattcta gtctagttac cagtaggaca aagacataca aaaagtgtct      360 ttcttttat tcccataatt ctagcgagaa tgaatgacaa gctaaatgtt tcttaacagg       420
aaaataagac caaagatgac tctctcaata ttcactaagt tggtacttct tagcatactg      480
gagtaagtct ccaacactca aaatttattt ttttccatgg agtcagtatc taacataaac      540
atgtttctct tgaccaatag gccagtcatc gaccagaatc tctactctat tggcctgaaa      600
tacacaacag caacttttgc agctgcaatg tgcaacatac ttcccgccat tacttttata      660
atggcctgga tattcaggta aattatatgc ttttttcatt ctacagatat aatcacatat      720
gaacaccagc aaagataaac tgacaaggaa accaacatg gattctccaa aacaaccaaa       780
tgacgatatt aaatgtgttt gcacataatc tctttatcct aggcttgaga gggtgaagct      840
tacaagcatt cgcagccaag ccaaaataat cgggactgtc gccacagttg caggagccat      900
gatcatgacg ctggtacgag gtccagtcat tgaactattt tggacaaaag gaaattccag      960
tcatgaatct caaagtggtg ggtaaatct aagccatgct atcaaaggtt ccctcatgat      1020
aacaattggg tgcttcagtt gggcagcatt catgattttg caggtaacga tagaacttag     1080
ttagagataa gttactagga aataagccac atatctgact ctagtatgat atgcataggc     1140
aatcacactg cggacctacc ctgcagagct ctcactcact gcttggatat gcttgttggg     1200
aacagctgag ggagctatag tagcgatggt aatggagaga ggaaaagctg cagtgtgggc     1260
cataaaatgg gacactaagt ttcttgcagc tgtatacagt gtaagtcaaa cttatgagca     1320
agactgagtc gattaagtct tcttagaaca caagcataca agaaaaatta aaagtaacca    1380
ttctttaaat gtttatccat cctatgtacc atattctcca attctgtacc atattgttta     1440
tccattgtat gcaccatatc gcccagctct gtgctactct atgtgacaaa acttgttaac     1500
tagatgctct acagcttatg cacatcaatg ttcctaacta ctgtagcatg aaactttact    1560
tctgcaacat gagagaaatg agaaaacaaa tgtagacgca tagcttttcc aatcactcat    1620
gaagttaagc ctctgccaaa agcttctcac tttccatgtc acaatacagg gaatattctg    1680
ttcagggctc gcgtattaca tccaaggagt aataatgaaa gatagggcc  ctgttttcgt    1740 cacagctttc aatccattaa gcatggttat tgtagctata ctgagttcat tcattctacg   1800
tgaacaaatg aacctgggaa ggtaattctt aatttcttat aacacctaaa gctcttataa   1860
gttacgacca acacaaaact aatgtaacac tttctacagg gtacttggtg ctgttgtgat   1920
cgttttaggc ctttacattg tcctgtgggg taaaagcaag gatcaaaaat ctccatcagc   1980
cgatgaacaa gcaataccaa cacaggaaac gacacatgaa aacaaaattg acaaggaaaa   2040
tttaagtcag acaattatcc acatcagtcc atcaagagga acaactgtta ccaaagatga   2100
aagaatataa tgattttctc gtcggggcta tatcttccaa attccaaaag gaagtcgggc   2160
tacagagcaa ccttttatc ttaagaaatg agctcctctt cagcttcatc taagaattaa    2220
tagttattag ttaaagatgg tttatgtatg aagaggagtt tctttctgct ttaaggcaag   2280 gaaaagaat ctcaagtcat gtgcccaaaa tttgggccag ctaaacaacc gttttttgca    2340
aacttctgtc agtactatag aatataacca aactatgtta agccaatagg cttttctta   2400 tggtttgtta aacagatatt                                                2420
```

<210> SEQ ID NO 19
<211> LENGTH: 407
<212> TYPE: PRT
<213> ORGANISM: Nicotiana tabacum

<400> SEQUENCE: 19

```
Met Glu Gly Glu Cys Ser Cys Ser Phe Tyr Gln Arg Ala Lys Pro Tyr
1               5                   10                  15

Ile Ala Met Ile Ser Leu Gln Phe Gly Tyr Ala Gly Met Asn Ile Ile
                20                  25                  30

Thr Lys Val Ser Leu Asn Arg Gly Met Ser His Tyr Val Leu Val Val
                35                  40                  45

Tyr Arg His Ala Phe Ala Thr Ala Val Ile Ala Pro Phe Ala Leu Ile
            50                  55                  60

Leu Glu Arg Lys Ile Arg Pro Lys Met Ser Leu Met Met Phe Leu Gln
65                  70                  75                  80

Ile Phe Val Leu Gly Leu Gly Pro Val Ile Asp Gln Asn Phe Tyr
                85                  90                  95

Tyr Ala Gly Leu Lys Tyr Thr Ser Pro Thr Phe Ser Cys Ala Met Ser
                100                 105                 110

Asn Met Leu Pro Ala Met Thr Phe Val Met Ala Val Leu Cys Arg Met
                115                 120                 125

Glu Lys Val Asp Leu Lys Lys Phe Arg Cys Gln Ala Lys Val Leu Gly
                130                 135                 140

Thr Ile Val Thr Val Ala Gly Ala Met Leu Met Thr Leu Tyr Lys Gly
145                 150                 155                 160

His Val Val Asn Leu Leu Trp Ser Thr Asn Ser Asn Val Pro Glu Val
                165                 170                 175

Ser Gly Ala Asn Ser Asp Lys Asp Trp Val Lys Gly Ser Ile Leu Leu
                180                 185                 190

Ile Phe Ala Thr Leu Ala Trp Ala Ser Phe Phe Ile Leu Gln Ala Ile
                195                 200                 205

Thr Met Arg Lys Tyr Thr Ala Pro Leu Ser Leu Thr Ala Leu Val Cys
                210                 215                 220

Phe Leu Gly Thr Leu Gln Ser Ile Ala Val Thr Phe Val Met Glu His
225                 230                 235                 240

Glu Pro Ser Val Trp Thr Ile Gly Phe Asp Met Asn Leu Leu Ala Ala
                245                 250                 255

Ala Tyr Ala Gly Ile Val Ser Ser Ile Ala Tyr Tyr Val Gln Gly
                260                 265                 270

Leu Val Met Glu Lys Arg Gly Pro Val Phe Val Thr Ala Phe Ser Pro
                275                 280                 285

Leu Met Met Ile Ile Val Ala Ile Met Gly Ser Phe Ile Leu Ala Glu
                290                 295                 300

Lys Ile Tyr Ile Gly Gly Ile Leu Gly Ala Val Leu Ile Val Ala Gly
305                 310                 315                 320

Leu Tyr Ser Val Leu Trp Gly Lys Tyr Lys Glu Tyr Lys Glu Lys Glu
                325                 330                 335

Ile Glu Glu Ser Ile Ile Pro Glu Ala Val Lys Gly Val Ile Lys Gly
                340                 345                 350

Asn Asn Gln Met Val Ile Leu Ala Asn Ile Glu Gly Ile Asn Asp Ile
                355                 360                 365

Glu Met Gln Lys Ser Ser Glu Gly Lys Arg Ile Glu Ala Thr Ser Ala
                370                 375                 380

Ser Val Ala Ile Ser Phe Pro Met Pro His Pro Gln Met Leu Ala Arg
385                 390                 395                 400

Glu Ala Pro Lys Gly Leu Ile
```

```
                         405

<210> SEQ ID NO 20
<211> LENGTH: 1224
<212> TYPE: DNA
<213> ORGANISM: Nicotiana tabacum

<400> SEQUENCE: 20
atggagggcg aatgtagttg cagttttttac caaagggcta agccttatat agccatgatt      60
tccttgcaat ttggctatgc aggaatgaat attattacaa aagtttctct taatagggga     120
atgagtcatt atgttcttgt tgtgtataga catgcttttg ctactgcagt tattgctccc     180
tttgctctta ttcttgaaag aaaaattagg ccaaagatgt cactcatgat gttcttgcaa     240
atatttgtat tgggtctttt ggggccagtt attgatcaaa attttttacta tgctggactc     300 aaatatacat ctccaacatt ttcatgtgct atgagcaaca tgctacctgc tatgacattt     360
gtcatggcag tcctctgcag gatggagaag gtggacttga agaaatttag atgccaagca     420
aaagtgttgg gaacaatagt aactgtagct ggagccatgt aatgacatt gtacaaaggc      480 catgttgtta acttgttatg gtcaactaat tctaatgtcc ctgaagtcag tggagctaat     540
tctgataaag attgggttaa aggctcaatt ctcctcattt ttgcaactct tgcttgggct     600
tctttcttca ttcttcaggc tatcacaatg aggaaatata cagctccatt atctttaact     660
gcacttgttt gcttcctggg aaccttgcaa tctattgctg tcacatttgt aatggagcac     720
gagccttctg tttggactat tggttttgac atgaatctac tagctgctgc ctatgctgga     780
atagtatcat caagtatagc atactatgta caaggtcttg taatggagaa aagaggacca     840 gttttgtga ctgcttttag tcctttaatg atgattattg ttgcaatcat gggctctttt      900
attcttgctg aaaaaatcta tattggagga attcttggtg cagtgctcat agtggcaggg     960
ctatactcag ttctgtgggg aaaatacaag gagtataagg agaaggaaat tgaggagtca    1020
ataattcctg aagcagtgaa gggagtaatt aaaggaaaca atcaaatggt tattcttgca    1080
aacattgaag gaattaatga tatagaaatg cagaaaagta gtgaaggaaa agaattgaa    1140 gcaacttcag catcagtggc tatcagtttt cccatgccac acccccaaat gttggctagg    1200
gaagcaccaa aaggcttgat ataa                                           1224

<210> SEQ ID NO 21
<211> LENGTH: 2356
<212> TYPE: DNA
<213> ORGANISM: Nicotiana tabacum

<400> SEQUENCE: 21
attacttaca tatatggttt aataatttgc ttgtctataa atatgttgca tgtctcattt      60
cttctcccta ggaaaaacac aaatctactc taagactcga gtgttttcct cccttttca     120 tttcatcaac tctttatact acttctctgt ataattaaga cttcaagatt taactgaaga     180
aaaacaaaga aagaaaaatg gagggcgaat gtagttgcag ttttttaccaa agggctaagc     240 cttatatagc catgatttcc ttgcaatttg gctatgcagg aatgaatatt attacaaaag     300
tttctcttaa taggggaatg agtcattatg ttcttgttgt gtatagacat gcttttgcta     360
ctgcagttat tgctcccttt gctcttattc ttgaaaggta aattacccca caaaaataag     420 aaatttgaa gcttttgtta caattcttga aagagtagca aaaactgata agtctttaaa     480
tttgttgaca gaaaaattag gccaaagatg tcactcatga tgttcttgca atatttgta     540 ttgggtcttt tggggccagt gattgatcaa aattttttact atgctggact caaatataca     600
```

```
tctccaacat tttcatgtgc tatgagcaac atgctacctg ctatgacatt tgtcatggca      660
gtcctctgca ggtacatata ttgttcaaca tttttatctt ataacggtat tgtccggacc      720
ggaaggggag aaccttagcg tacctgataa tgttgttaca atgtgaccag gaggtcacgg      780
gtttaatata agccgtgaaa acagcctctt gcagaaatgc agggtaaagc tgcgtactat      840
agacccttgt ggttccggac ctcgtatata gcggaaactt agtgcaccag gcgtcccttt      900
ttactgtccg aaccagtttg ttcttttcg gaagttttgg actaattata aggattgttt       960
ttaggatgga gaaggtggac ttgaagaaat ttagatgcca agcaaaagtg ttgggaacaa     1020
tagtaactgt agctggagcc atgttaatga cattgtacaa aggccatgtt gttaacttgt     1080
tatggtcaac taattctaat gtccctgaag tcagtggagc taattctgat aaagattggg     1140
ttaaaggctc aattctcctc attttttgcaa ctcttgcttg ggcttctttc ttcattcttc    1200
aggtatatat gctgtacatt acaagttaca aaaccttcct ttttctttc ccccttttca      1260
gggaattttt gttttttgtat attttttgtat gatggttaaa agtagtttaa tactattggt   1320
tacaggctat cacaatgagg aaatatacag ctccattatc tttaactgca cttgtttgct    1380
tcctgggaac cttgcaatct attgctgtca catttgtaat ggagcacgag ccttctgttt    1440
ggactattgg ttttgacatg aatctactag ctgctgccta tgctgtaagt ttaatttctt    1500
cctttcaatt tggactattg gttttgccaa aataagtata taagaaatga tgaataacaa    1560
attattttaa ttttcaggga atagtatcat caagtatagc atactatgta caaggtcttg    1620
taatggagaa aagaggacca gtttttgtga ctgcttttag tcctttaatg atgattattg    1680
ttgcaatcat gggctctttt attcttgctg aaaaaatcta tattggaggg taatttcaaa   1740
tcttttctgg ttttattttc atttagtaaa ctgaatatta attattttct cttttgggtt   1800
cagaattctt ggtgcagtgc tcatagtggc agggctatac tcagttctgt ggggaaaata    1860
caaggagtat aaggagaagg aaattgagga gtcaataatt cctgaagcag tgaagggagt    1920
aattaaagga aacaatcaaa tggttattct tgcaaacatt gaaggaatta atgatataga    1980
aatgcagaaa agtagtgaag gaaaaagaat tgaagcaact tcagcatcag tggctatcag    2040
ttttcccatg ccacaccccc aaatgttggc tagggaagca ccaaaaggct tgatataata    2100
aattacatat gaggagatga tgggaaaaaa gaaatagaag gaagaggcaa cagacctgcc    2160
atttttgtcct acttttttact ttttttcctt tctcttaatt ttgatattac aaatatgttt   2220
agagtaattt actcttctcc taaccttaag cttgtaaaaa ataacaagtg ctctctctat    2280
tgaaagatat agattttgaa agctttgata ttgccatatt gatatccagt tatccgatac    2340
aggttataaa tacgtt                                                   2356
```

<210> SEQ ID NO 22
<211> LENGTH: 379
<212> TYPE: PRT
<213> ORGANISM: Nicotiana tabacum

<400> SEQUENCE: 22

Met Lys Ala Val Arg Glu Leu Phe Ile Arg Ser Lys Pro Phe Ile Ala
1               5                   10                  15

Val Ile Phe Leu Gln Phe Gly Leu Ala Gly Met Asp Ile Leu Thr Lys
            20                  25                  30

Met Ala Leu Asn Glu Gly Met Ser Asn Tyr Val Phe Val Val Tyr Arg
        35                  40                  45

His Ala Val Ala Thr Leu Ala Ile Ala Pro Phe Ala Met Ile Leu Asp

```
                        50                    55                    60
Lys Ile Arg Pro Lys Met Thr Leu Ser Ile Phe Thr Lys Leu Val
 65                     70                    75                    80
Leu Leu Ser Ile Leu Glu Pro Val Ile Asp Gln Asn Leu Tyr Ser Ile
                        85                    90                    95
Gly Leu Lys Tyr Thr Thr Ala Thr Phe Ala Ala Met Cys Asn Ile
            100                   105                   110
Leu Pro Ala Ile Thr Phe Ile Met Ala Trp Ile Phe Arg Leu Glu Arg
            115                   120                   125
Val Lys Leu Thr Ser Ile Arg Ser Gln Ala Lys Ile Ile Gly Thr Ile
            130                   135                   140
Ala Thr Val Ala Gly Ala Met Ile Met Thr Leu Val Arg Gly Pro Val
145                   150                   155                   160
Ile Glu Leu Phe Trp Thr Lys Gly Asn Ser Ser His Glu Ser Gln Ser
                        165                   170                   175
Gly Gly Leu Asn Leu Ser His Ala Ile Lys Gly Ser Leu Leu Ile Thr
                180                   185                   190
Ile Gly Cys Phe Ser Trp Ala Ala Phe Met Ile Leu Gln Ala Ile Thr
            195                   200                   205
Leu Arg Thr Tyr Pro Ala Glu Leu Ser Leu Thr Ala Trp Ile Cys Leu
            210                   215                   220
Leu Gly Thr Ala Glu Gly Ala Ile Val Ala Met Val Met Glu Arg Gly
225                   230                   235                   240
Lys Ala Ala Val Trp Ala Ile Lys Trp Asp Thr Lys Phe Leu Ala Ala
                    245                   250                   255
Val Tyr Ser Gly Ile Phe Cys Ser Gly Leu Ala Tyr Tyr Ile Gln Gly
                    260                   265                   270
Val Ile Met Lys Asp Arg Gly Pro Val Phe Val Thr Ala Phe Asn Pro
            275                   280                   285
Leu Ser Met Val Ile Val Ala Ile Leu Ser Ser Phe Ile Leu Arg Glu
            290                   295                   300
Gln Met Asn Leu Gly Arg Val Leu Gly Ala Val Val Ile Val Leu Gly
305                   310                   315                   320
Leu Tyr Ile Val Leu Trp Gly Lys Ser Lys Asp Gln Lys Ser Pro Ser
                    325                   330                   335
Thr Asp Glu Gln Ala Ile Pro Thr Gln Glu Thr Thr His Glu Asn Lys
            340                   345                   350
Ile Asp Lys Glu Asn Leu Ser Gln Thr Ile Ile His Ile Ser Pro Ser
            355                   360                   365
Arg Gly Thr Thr Val Thr Lys Asp Glu Arg Ile
            370                   375

<210> SEQ ID NO 23
<211> LENGTH: 1140
<212> TYPE: DNA
<213> ORGANISM: Nicotiana tabacum

<400> SEQUENCE: 23
atgaaggcag tacgtgaatt attcattaga tcaaaaccct ttatcgctgt catttttctc      60
caatttgggc tagcaggcat ggatatcctc accaaaatgg cattgaatga agggatgagc     120
aactatgtat tgttgtgta ccgccatgca gtagccactc tggctattgc tccttttgca     180
atgattctag acaagaaaat aagaccaaag atgactctct caatatttac taagttggta     240
cttcttagca tactggagcc agtcatagac cagaatctct actctattgg cctgaaatac     300
```

```
acaacagcaa cttttgcagc tgcaatgtgc aacatacttc ccgccattac ttttataatg    360
gcatggatat tcaggcttga gagggtgaag cttacaagca ttcgcagcca agccaaaata    420
attgggacta tcgccacagt tgcaggagcc atgatcatga cgctggtacg aggtccagtc    480
attgaactat tttggacaaa aggaaattcc agtcatgaat ctcaaagtgg tgggttaaat    540
ctaagccatg ctatcaaagg ttccctcttg ataacaattg ggtgcttcag ttgggcagca    600
tttatgattt tgcaggcaat cacactgcgg acctaccctg cagagctctc actcactgct    660
tggatatgct tgttgggaac agctgaggga gctatagtag cgatggtaat ggagagagga    720
aaagctgcag tgtgggccat aaaatgggac actaagtttc ttgcagctgt atacagtgga    780
atattctgtt caggactcgc gtattacatc caaggagtca atgaaaaga tagggggccct    840 gtttttgtca cagcttttcaa tccattaagc atggttattg tagctatact gagttcattc    900
attctacgtg aacaaatgaa cctgggaagg gtacttggtg ctgttgtaat cgttttaggc    960
ctttacattg tcctgtgggg taaaagcaag gatcaaaaat ctccatcaac cgatgaacaa   1020
gcaataccaa cacaggaaac aacacatgaa aacaaaattg acaaggaaaa tttaagtcag   1080
acaattatcc acatcagtcc atcaagagga acaactgtta ccaaagatga agaatataa   1140
```

<210> SEQ ID NO 24
<211> LENGTH: 4067
<212> TYPE: DNA
<213> ORGANISM: Nicotiana tabacum

<400> SEQUENCE: 24

```
aaaacataga ttctcattga attaaccagc gcgcaaaaac ttatgtactt ctaatttaca     60
tacatctgtt aacaaaatgt acaaccaaac gaaagatata atatacagcc ataatttctc    120
tgacaagaat tattaccaag gatcacggcg ataacagagt catcaactat aagaggcgaa    180
tagcaaaagg agaaatacag tctctttgaa ccggccaagt gttcactttg gttgtcaatc    240
tgtcatatgc ataaacatag atgttttttgc aaggaattag tatccatgaa tatgagcatt    300
gatggggaac aagtattatc tcaaagaata acgatacatt ttttgaatat tccaaaatat    360
taagatatat cagattatat taaaccaatt caagaacatt tgagctcatc aaaagcagac    420
aactaacaga aagtagcaac aaataaaagg ggactcagtc ctggtttact tttcctagaa    480
gcaagtgatg agtaggtcca ggtgactagg ccatttcatc taaaaagtgg aaggcttat     540 gagtaattaa ttaacaaatt ctgcacacag atgaaatcca acagattttg tccccatctg    600
ctgatcagaa aatgggtaga gaacgaaaat tgtgtgaaag gatttgtcta tatatacaga    660
aaagcagcag ttacttgtgc acacttgtga ccttacaata gtagtgctct caaagaggtt    720
gagtttgtgc aagtaaacaa tgaaggcagt acgtgaatta tcattagat caaacccctt    780 tatcgctgtc atttttctcc aatttgggct agcaggcatg gatatcctca ccaaaatggc    840
attgaatgaa gggatgagca actatgtatt tgttgtgtac cgccatgcag tagccactct    900
ggctattgct ccttttgcaa tgattctaga caagtatgtc tctctctctc ttcctccctc    960
ccaatgttca atgacgtgtt tgcaacctca attctagtct agttaccagt aggacaaaga   1020
catacaaaaa aagtgtcttc ttcttatttc cataattcaa gcgagaataa atgacaagct   1080
aaatgtttct taacaggaaa ataagaccaa agatgactct ctcaatattt actaagttgg   1140
tacttcttag catactggag taagtctcca acactcaaat ttattttttc ccatggacta   1200
agtatctaac ataaacatgt ttctcttgac caataggcca gtcatagacc agaatctcta   1260
```

```
ctctattggc ctgaaataca caacagcaac ttttgcagct gcaatgtgca acatacttcc    1320
cgccattact tttataatgg catggatatt caggtaaatt atatgctttt ttcattctat    1380
agatatagaa cccgtttgga ttggcttaaa ataagtggct tttaagttaa gtgcttaaaa    1440
gcatttaata aatgctggaa cttgttttat aaataagcag ttacgtgatt ggataaaagt    1500
gctgaaactg aaaaaaagct gatgaagtgt ttggtaaaga agtgctcaaa cggatgattg    1560
ttacattttt gtcttgtgtg tttgctattt ttttctgggt tggtaaatgg aagaaaagat    1620
gagctattga gccaattatt tgtaaaaact ttcctctttc tcattccaat aaatcgacct    1680
tttctttaaa ctaataaacc gaccacccaa aaataaaaaa tttaaaaaca gatcgcaact    1740
aattcatctg cccttttaatt ttttacccac ttagattgat aaaagttatt cgaatatgta    1800
aaagtgtttt actgaaaaat atgagggtg cgtaaagaaa gaaatgaaag gaaagaaaa     1860 ggagggaaa ataatgaatg aaagtgtaaa gaaagaaatg aaaggaaaag agaggaaagt    1920
tacggaagaa gacgaagaag aaagcagagg ctgctgtaac aagaatggag aaaagaaaaa    1980
gatagtatgt tgtagggttt tctactgagg ggtaatttcg ggattaagaa aaattataag    2040
ggataaaaat gtaatatact tggtcaaagc aatatggctt ttaagccaat tttgaaaaag    2100
ttgggttttc caacttattg gttttggctt tttttaagca gattttaact ttttttaagct    2160 ctttttttg gttgccaaac atttccacaa attaaaaagt gcccatccaa acaggctcat    2220
aatcacacat atgaacacca gcaaagataa actaacaagg aaaacccaac atggattctc    2280
caaaacaacc aaatgacgat gttaactgtg tttgcacata atttctttat cctaggcttg    2340
agagggtgaa gcttacaagc attcgcagcc aagccaaaat aattgggact atcgccacag    2400
ttgcaggagc catgatcatg acgctggtac gaggtccagt cattgaacta ttttggacaa    2460
aaggaaattc cagtcatgaa tctcaaagtg gtgggttaaa tctaagccat gctatcaaag    2520
gttccctctt gataacaatt gggtgcttca gttgggcagc atttatgatt ttgcaggtaa    2580
cgatagaact tagttagaga taagttatta ggaaataagc agacatatct gactctagta    2640
cgatatgcat aggcaatcac actgcggacc taccctgcag agctctcact cactgcttgg    2700
atatgcttgt tgggaacagc tgaggagct atagtagcga tggtaatgga gagaggaaaa    2760
gctgcagtgt gggccataaa atgggacact aagtttcttg cagctgtata cagtgtaagt    2820
caaacttatg agcaagagta gattaaattt tcttagaaca caagcataca agaaaaatta    2880
aaagtatcca ttctttaaat gtttatccat cctatgtacc atattgtcca attctgtacc    2940
atattgttta tccattgtat gcaccatatt gccccgttct gtactactct atgtgacaga    3000
acttgttaac tagacgttct acagcttatg cacatcatgt ttctgccagc agtatctctg    3060 tattttaca gtatcagctt gatactgttt ttaataaaat cttcatctta taaaaaaaaa    3120
caatatgttt ctaactactg tagcatgaaa ctttacttct gcaacatgag agaaatgaga    3180
aaacaaatgt agacgcatag cttttccaat cactcatgaa gttaagcctg ccaaaagctt    3240
ctcactttcc atgtcacaat acagggaata ttctgttcag gactcgcgta ttacatccaa    3300
ggagtcataa tgaaagatag gggccctgtt tttgtcacag ctttcaatcc attaagcatg    3360
gttattgtag ctatactgag ttcattcatt ctacgtgaac aaatgaacct gggaaggtaa    3420
ttcttaattt cttataacac ctaaagctct tataagttac gaccaacaca aaactaatgt    3480
aatactttct acagggtact tggtgctgtt gtaatcgttt taggcccttta cattgtcctg    3540 tggggtaaaa gcaaggatca aaaatctcca tcaaccgatg aacaagcaat accaacacag    3600
gaaacaacac atgaaaacaa aattgacaag gaaaatttaa gtcagacaat tatccacatc    3660
```

```
agtccatcaa gaggaacaac tgttaccaaa gatgaaagaa tataatgatt ttctcttcgg    3720
ggctatatct tccaaattcc aaaaggaaat cgggctacag agtaacctct ttatctaaga    3780
aatgagctct tcttcagctt catctaagaa ttaatagtta ttagttaaag atggtttatg    3840
tatgaaaagg agtttctttc tggcataagg caaggaaaaa gaatctcaag tcatgtgccc    3900
aaaatttggg ccagttaaac aaccatttttt tgcaaacttc tgtcagaact atagaatgac    3960
caaactatgt taagccaaca ggcttttttct tatggtttgt taaacagata ttaacagcaa    4020
taatcatgcc cagatatgaa ataaggtgg atcctgaact taagatc                    4067
```

<210> SEQ ID NO 25
<211> LENGTH: 411
<212> TYPE: PRT
<213> ORGANISM: Nicotiana tabacum

<400> SEQUENCE: 25

```
Met Glu Gly Lys Gly Glu Cys Gly Cys Ser Phe Phe Gln Arg Ala Lys
1               5                   10                  15

Pro Tyr Ile Ala Met Ile Ser Leu Gln Phe Gly Tyr Ala Gly Met Asn
                20                  25                  30

Ile Ile Thr Lys Val Ser Leu Asn Arg Gly Met Ser His Tyr Val Leu
            35                  40                  45

Val Val Tyr Arg His Ala Phe Ala Thr Ala Val Ile Ala Pro Phe Ala
        50                  55                  60

Leu Ile Leu Glu Arg Lys Ile Arg Pro Lys Met Ser Leu Met Met Phe
65                  70                  75                  80

Leu Gln Ile Phe Val Leu Gly Leu Leu Gly Pro Val Ile Asp Gln Asn
                85                  90                  95

Phe Tyr Tyr Ala Gly Leu Lys Phe Thr Ser Pro Thr Phe Ser Cys Ala
            100                 105                 110

Met Ser Asn Met Leu Pro Ala Met Thr Phe Val Met Ala Val Ile Cys
        115                 120                 125

Arg Met Glu Lys Val Asp Ile Lys Lys Val Arg Cys Gln Ala Lys Val
    130                 135                 140

Leu Gly Thr Ile Val Thr Val Ala Gly Ala Met Leu Met Thr Leu Tyr
145                 150                 155                 160

Lys Gly His Val Val Asn Leu Leu Trp Ser Asn His Ile Asn Ser Thr
                165                 170                 175

Thr Asn Ser Ser Ile Ser Glu Thr Ser Gly Ala Thr Asn Ser Asp Lys
            180                 185                 190

Asp Trp Phe Lys Gly Ser Ile Leu Leu Ile Phe Ala Thr Phe Ala Trp
        195                 200                 205

Ala Ser Phe Phe Ile Leu Gln Asn Ile Thr Met Arg Lys Tyr Thr Ala
    210                 215                 220

Pro Leu Ser Leu Thr Ala Leu Val Cys Phe Met Gly Thr Leu Gln Ser
225                 230                 235                 240

Ile Ala Val Thr Phe Val Met Glu His Lys Pro Ser Val Trp Thr Ile
                245                 250                 255

Gly Phe Asp Met Asn Leu Leu Ala Ala Tyr Ala Gly Ile Val Ser
            260                 265                 270

Ser Ser Ile Ala Tyr Tyr Val Gln Gly Leu Val Met Glu Lys Arg Gly
        275                 280                 285

Pro Val Phe Val Thr Ala Phe Ser Pro Leu Met Met Ile Ile Val Ala
    290                 295                 300
```

Ile Met Gly Ser Phe Ile Leu Ala Glu Lys Ile Tyr Ile Gly Gly Ile
305                 310                 315                 320

Leu Gly Ala Val Leu Ile Val Ala Gly Leu Tyr Ser Val Leu Trp Gly
            325                 330                 335

Lys Tyr Lys Glu Tyr Lys Glu Lys Glu Ile Glu Glu Ser Ile Ile Pro
            340                 345                 350

Glu Ala Val Lys Gly Val Ile Lys Gly Asn Asn Gln Val Met Ile Leu
            355                 360                 365

Ala Asn Asn Glu Ala Ile Asn Asp Ile Glu Met Gln Lys Thr Asp Ala
        370                 375                 380

Asn Lys Ile Gln Thr Pro Val Val Ala Ile Gly Ile Pro Met Pro Gln
385                 390                 395                 400

Pro Pro Met Leu Ala Arg Glu Glu Pro Lys Ala
                405                 410

<210> SEQ ID NO 26
<211> LENGTH: 1236
<212> TYPE: DNA
<213> ORGANISM: Nicotiana tabacum

<400> SEQUENCE: 26
atggaaggaa aaggagaatg tggttgcagc tttttcaaa gggctaagcc ttatatagcc      60
atgatttcct tgcaatttgg gtatgcaggg atgaatatta ttacaaaagt ttctcttaat    120
agggaatga gtcattatgt tcttgttgtg tatagacatg cttttgctac tgcagttatt    180
gctccctttg ctcttattct tgaaagaaaa attaggccaa agatgtcgct catgatgttc    240
ttgcaaatat tcgtattggg tcttcttggg ccggtgattg atcaaaattt ttactatgct    300
ggactgaaat tcacatcccc aacattttca tgtgctatga gcaacatgct acctgctatg    360
acatttgtca tggcagtgat ctgcaggatg gagaaagttg acataaagaa gttagatgc    420
caagcaaaag tgttgggaac aatagtgaca gtagctggag ccatgttaat gacattgtac    480
aaaggccatg ttgttaactt gttatggtca aatcacatca attctactac taattctagt    540
atctcagaaa ctagtggagc tactaattct gataaagatt ggtttaaagg ttccattctc    600
ctaattttg caacttttgc ttgggcttct ttcttcattc ttcagaatat cacaatgagg    660
aaatacacag ctccactttc tttaactgca cttgtttgct tatgggaac cttgcaatct    720
atagcagtca catttgtaat ggagcacaaa ccttctgttt ggactattgg ttttgacatg    780
aatctactag ctgctgccta tgctggaata gtatcatcaa gtatagcata ctatgtacaa    840
ggtcttgtaa tggagaaaag aggacctgtt tttgtgactg cttttagtcc tttaatgatg    900
attattgttg caatcatggg ctctttttatt cttgctgaaa aaatctatat tggaggaatt    960
cttggtgcag tgctcatagt ggcagggcta tactcagttc tgtggggaaa atacaaggag   1020
tataaggaga aggaaattga ggagtcaata attcctgaag cagtgaaggg agtaattaaa   1080
ggaaacaatc aagtgatgat tcttgcaaat aatgaagcaa ttaatgatat agaaatgcaa   1140
aaaactgatg caaacaaaat ccaaactcca gtagtagcca tcggtatacc aatgccacag   1200
cccccccatgt tagctaggga agaaccaaaa gcttaa                             1236

<210> SEQ ID NO 27
<211> LENGTH: 2083
<212> TYPE: DNA
<213> ORGANISM: Nicotiana tabacum

<400> SEQUENCE: 27

```
tctataaata tgttgcatgt ctcacttctt ttccttagga aaaacacaaa tctcctctta      60
ttagagtttt ttcctcgctt ttcacttgat cacttcttta atctcttctc ttaaagactt     120
taacattcag ctaaaagaat tacaaaaaaa aaaaaaaaaa aatggaagga aaaggagaat     180
gtggttgcag cttttttcaa agggctaagc cttatatagc catgatttcc ttgcaatttg     240
ggtatgcagg gatgaatatt attacaaaag tttctcttaa taggggaatg agtcattatg     300
ttcttgttgt gtatagacat gcttttgcta ctgcagttat tgctcccttt gctcttattc     360
ttgaaaggta aattacccca caaaaataag aaattttgaa gctttagtta caattcttga     420
aagatcagca aaagcagata aatctttaaa tttttgaca gaaaaattag gccaaagatg      480
tcgctcatga tgttcttgca aatattcgta ttgggtcttc ttgggtgagt ctcttttttct    540
atatatatcc tataagtata actttatact ttttccacaa attggaaaag tgaaaaattg     600
tactaataat catttcaatt taaacaggcc ggtgattgat caaaattttt actatgctgg     660
actgaaattc acatccccaa cattttcatg tgctatgagc aacatgctac ctgctatgac     720
atttgtcatg gcagtgatct gcaggtatac atatttaata ctatatatta ttttcttct     780
ttctctactt cttcaagttt tggactaatt tataaagggt taattttagg atggagaaag    840
ttgacataaa gaaagttaga tgccaagcaa aagtgttggg aacaatagtg acagtagctg     900
gagccatgtt aatgacattg tacaaaggcc atgttgttaa cttgttatgg tcaaatcaca    960
tcaattctac tactaattct agtatctcag aaactagtgg agctactaat tctgataaag    1020
attggtttaa aggttccatt ctcctaattt ttgcaacttt tgcttgggct tctttcttca    1080
ttcttcaggt gtgtaatagt acacttatac ttccctttttt tttttcattc tcttttcaag   1140
aatatccaag aaaaaatctt cttttttgtt tttgttttgt ttcctaaatg gtgatgtaat    1200
atttgtgcag aatatcacaa tgaggaaata cacagctcca ctttctttaa ctgcacttgt    1260
ttgctttatg ggaaccttgc aatctatagc agtcacattt gtaatggagc acaaaccttc    1320
tgtttggact attggttttg acatgaatct actagctgct gcctatgctg taagtttaat    1380
ttcttctttt caatttgggt tattggtttt gccaagatga tatatacgaa ataatgatt    1440
aacaaattat ttaattttca gggaatagta tcatcaagta tagcatacta tgtacaaggt    1500
cttgtaatgg agaaaagagg acctgttttt gtgactgctt ttagtccttt aatgatgatt    1560
attgttgcaa tcatgggctc tttattctt gctgaaaaaa tctatattgg agggtaattt     1620
caaatctttt ctggttttat tttcatttag taaactgaat attaattatt ttctcttttg    1680
ggttcagaat tcttggtgca gtgctcatag tggcagggct atactcagtt ctgtggggaa    1740
aatacaagga gtataaggag aaggaaattg aggagtcaat aattcctgaa gcagtgaagg    1800
gagtaattaa aggaaacaat caagtgatga ttccttgcaaa taatgaagca attaatgata   1860
tagaaatgca aaaaactgat gcaaacaaaa tccaaactcc agtagtagcc atcggtatac    1920
caatgccaca gcccccatg ttagctaggg aagaaccaaa agcttaattt ttggttgata    1980
aattagtagc aaattaaaaa agagcagaag aaagagaggc attttttgcct tttacattta   2040
aatttctttt tcctgttctt cttcttcttc ttccttttt ttt                       2083
```

<210> SEQ ID NO 28
<211> LENGTH: 372
<212> TYPE: PRT
<213> ORGANISM: Nicotiana tabacum

<400> SEQUENCE: 28

```
Met Ser Thr Arg Glu Arg Leu Leu Lys Phe Val Lys Glu Ala Gln Pro
1               5                   10                  15

Tyr Leu Ala Val Ile Leu Leu Gln Phe Gly Tyr Ala Gly Ser Ala Ile
            20                  25                  30

Ile Ala Lys Ser Ala Leu Asn His Gly Met Ser His Phe Thr Phe Ala
                35                  40                  45

Val Tyr Arg Asn Ala Phe Ala Thr Leu Val Phe Ala Pro Phe Ala Ile
    50                  55                  60

Val Leu Glu Arg Lys Ile Arg Pro Asn Met Thr Val Ser Ile Phe Leu
65                  70                  75                  80

Lys Ile Met Leu Leu Gly Leu Leu Glu Pro Val Ile Asp Gln Asn Leu
                85                  90                  95

Tyr Tyr Thr Gly Leu Arg Tyr Thr Thr Ala Thr Phe Ala Thr Ala Met
            100                 105                 110

Cys Asn Val Leu Pro Ala Leu Thr Phe Met Leu Ala Trp Ile Leu Arg
                115                 120                 125

Leu Glu Lys Val Asn Val Arg Arg Leu Ser Ser Gln Ala Lys Ile Val
    130                 135                 140

Gly Thr Thr Val Thr Phe Gly Gly Ala Met Ile Met Thr Leu Ile Gly
145                 150                 155                 160

Gly Pro Thr Ile Gly Leu Pro Trp Thr Arg His Leu Leu Ser Thr Thr
                165                 170                 175

Thr Ala Thr Ser Thr Ser Leu Thr Glu Leu Gln Pro Ile Lys Gly Ala
            180                 185                 190

Leu Phe Ile Ala Ala Gly Cys Ile Cys Trp Ala Cys Phe Tyr Asn Leu
    195                 200                 205

Gln Ala Ile Thr Leu Lys Thr Tyr Pro Ala Ala Leu Ser Leu Thr Cys
210                 215                 220

Leu Ile Cys Ser Ala Gly Ala Val Gln Gly Thr Ala Leu Thr Leu Val
225                 230                 235                 240

Ala Glu Arg Gly Asn Thr Ser Ile Trp Ser Ile His Phe Asp Thr Lys
                245                 250                 255

Leu Leu Ser Tyr Val Tyr Ser Gly Met Val Thr Ser Gly Val Gly Tyr
            260                 265                 270

Tyr Val Ser Gly Leu Ile Met Lys Asp Lys Gly Pro Val Phe Val Thr
    275                 280                 285

Ala Phe Asn Pro Leu Asn Met Val Ile Val Ala Ile Leu Gly Ser Phe
290                 295                 300

Ile Leu Ser Glu Gln Leu Asn Leu Gly Arg Val Leu Gly Gly Ala Ile
305                 310                 315                 320

Ile Val Ile Gly Leu Tyr Leu Ile Ile Trp Gly Lys Ser Lys Asp Gln
                325                 330                 335

Lys Leu Ser Lys Tyr Ser Ser Thr Asp Val Glu Val Glu Pro Val
            340                 345                 350

Gly Lys Glu Thr Ser Thr Thr Lys Ser Leu Asn Gln Thr Lys Ala Gly
    355                 360                 365

Asp Glu Ala Val
    370

<210> SEQ ID NO 29
<211> LENGTH: 1119
<212> TYPE: DNA
<213> ORGANISM: Nicotiana tabacum

<400> SEQUENCE: 29
```

```
atgtcaacaa gggaaaggct attgaagttt gtgaaggaag cacagccata tttggcagtg      60
atattgttgc agtttggata tgcaggatca gctataatag ctaagtctgc tctaaatcat     120
ggcatgagcc atttcacctt tgccgtctac agaaatgctt ttgccactct tgtctttgct     180
ccttttgcca tagtcttgga aaggaaaata aggccaaaca tgactgtatc cattttcttg     240
aagattatgt tgctgggctt actggagcca gtcatcgacc agaacttgta ctacacaggg     300
ttgagataca ctactgcaac ttttgcaacg gcaatgtgca atgtgcttcc tgccctcacc     360
tttatgttgg cttggatcct aaggcttgag aaggtgaacg taaggagatt atcaagccaa     420
gcaaaaatag tgggaacaac agtgacattt ggtggtgcca tgattatgac actaattgga     480
ggacctacaa ttggattgcc ctggaccaga catctccttt ctactacaac tgctactagc     540
acttctctga ctgagctaca acccattaag ggtgctctct tcatcgcagc aggttgtatc     600
tgttgggcct gcttttacaa ccttcaggca attaccttga agacataccc tgcggcatta     660
tcgctcactt gtttgatttg ctcggcggga gcggtgcaag gcacagctct gacccttgtg     720
gctgaaaggg gaaatacatc aatctggtcc atccacttcg acactaaact cttatcttac     780
gtttatagtg gaatggtcac ttctggagtg ggctattatg tttctggatt gataatgaag     840
gataaagggc ctgttttcgt cactgctttt aatcctctaa acatggtaat agtcgcaatt     900
ttgggttcat tcattttatc cgagcagcta aacttgggaa gggttttggg aggggcaatc     960
attgtaattg gactgtattt aataatatgg ggcaagagca aggaccaaaa attgtctaag    1020
tacagcagca ctgacgatgt tgaagtcgaa cctgttggta agaaacatc tacaacgaag     1080
tctttaaatc agacaaaagc tggagacgaa gctgtttaa                           1119

<210> SEQ ID NO 30
<211> LENGTH: 3957
<212> TYPE: DNA
<213> ORGANISM: Nicotiana tabacum

<400> SEQUENCE: 30
cgcaagatgg ggtttgtgag ttacaaagca ttgcttaccc aatactttat ctagctagtt      60
gtaatattaa aaaaggaaaa gaaagctact gttcagtaaa gaaaaaagaa gcatgtcaac     120
aagggaaagg ctattgaagt ttgtgaagga agcacagcca tatttggcag tgatattgtt     180
gcagtttgga tatgcaggat cagctataat agctaagtct gctctaaatc atggcatgag     240
ccatttcacc tttgccgtct acagaaatgc ttttgccact cttgtctttg ctccttttgc     300
catagtcttg aaaggtcttt aacatattc atgctgtgca actctctttt ttacttagat     360
gaagttatt tggttttta aaaaaatga ttctctggtt tctctggttg tttaacacac       420
aggaaaataa ggccaaacat gactgtatcc attttcttga agattatgtt gctgggctta     480
ctggagtaaa catctctgac attaataaat tagcaatttt ttccactgaa acaaaagct     540
gcctttttg cagattgtct gatattacac tgaaaacata agctgccttt tttttattgc     600
aggccagtca tcgaccagaa cttgtactac acaggttga gatacactac tgcaactttt     660
gcaacggcaa tgtgcaatgt gcttcctgcc ctcaccttta tgttggcttg gatcctaagg     720
tattattac ctatcttgtc tgcaacttat tttgtcacat gcacgttcat attcaacgtt     780
taaaaggag aaaaaaaatt gataactacg atcgatgtat ttaactcaac tattggatca     840
gcaaaaagaa ccaaaaaaag tatcagcaaa tatgggtgtc gtgtaacaaa agagtccatg     900
ggagttttga gccgtcttat cgtccaaaat gttcccttta tttagtaatg actagaaagt     960
```

```
acgggttgat ataaacccct gtacagctta aaatacaatt attaatgcat caactcaaca    1020
aaataagtac tccctcaatt tctatatata tgatactctt tcttgtttaa tttgttctaa    1080
aaaatatgac aattctcaat atttggaaac ttttaatttt aaacattcat tttatcataa    1140
ctaacatgct cttatatcca aagaattatg ctagatattt ttaagaaaat agttactccc    1200
tcattttaa tttatgtgaa cctatatcct ttttaatccg tacaaaaaag aatgacatct    1260
tttcctattt ggaaacaatt tacctttatg caatgtttta tagccacaca aaatatatgt    1320
ctcattttat acaagttcaa aagttttctc tcttttctta aatttcgtgc ccagtcaaat    1380
aggttcgcat aaattgaaac agagagagta tatcaaatag tatcatatga aataaatgag    1440
gtaatacgat ttaaagttcg gatattcaaa tagtatattt aatttctact attagaaatt    1500
atttaaaatt accctctgtt atattatttg atcaaaacaa tctctgccat cttactattc    1560
aaacaacaga tatatcccta acttgacgga ctggacactt ggcacgcatc caagggtgtt    1620
agtccatttg gtcttaaatt agacccgact tatcccatta cccagtaccc gatccattaa    1680
atttgacccg ccaaatacag attactcttt tcattcaaaa aatcagagag gcccattttg    1740
tcttcttcaa agttctcaaa atcctcataa tggtgttttc tagtttcctt agcaaatcaa    1800
tatttcaatg ttgtaatcac aattatagac tcaaaacagt aacaataaat gaattttacc    1860
aatatatttc gacttctttt ttagatctag attcaaaacc aaagattcaa catatcatat    1920
atggtgagtt tcgactttta ccatcaactt cttccaacaa acaacaatat aatttagatc    1980
taagcacaag aaacaataca aaatcagatt tcaataatat aaaccccaag tcagtcattg    2040
aaccaaagga cccatttgaa cccatacttg gaaatgagct tcgaaaccct tcaatggagg    2100
tgcagctttc caattcttca aatcaagaca ctgatgtacc atttcaaaaa ggtttaagct    2160
ctgttccatt agcttcaatt gatttcaaca caaaatgcat tagatttatt ttctactgaa    2220
tgagagatag agaaagaaca acagattata gtgcttatct gaactcagtc tcttctgggt    2280
accgggtaat agggcgggtc gggtcgggtc taatttatga ccaagtggac caacaacctt    2340
agatgcgtgc catgtgtcca gtccgtcaag ttaggggtat atgtgtttga atagtaagac    2400
ggcaggggtt cttttgatcc aatagtataa cagaggataa ttttatacaa tttctaataa    2460
ttcggtttaa agttggttac atgagtaggt aaatgtgggg aataataggt aactccaacg    2520
tgtaggcttg agaaggtgaa cgtaaggaga ttatcaagcc aagcaaaaat agtgggaaca    2580
acagtgacat ttggtggtgc catgattatg acactaattg gaggacctac aattggattg    2640
ccctggacca gacatctcct ttctactaca actgctacta gcacttctct gactgagcta    2700
caacccatta agggtgctct cttcatcgca gcaggttgta tctgttgggc ctgcttttac    2760
aaccttcagg tactatcctt aatcattctt aaaaacttaa gttattaaat gattcactat    2820
agatgacaat gttgagacca gcaggataat ctacgtagtt tttattttcg ttaacattgt    2880
tatttttttc ttattttatg tttgtttgtt ctacaaacag gcaattacct tgaagacata    2940
ccctgcggca ttatcgctca cttgtttgat ttgctcggcg ggagcggtgc aaggcacagc    3000
tctgacccct gtggctgaaa ggggaaatac atcaatctgg tccatccact tcgacactaa    3060
actcttatct tacgttatta gtgtaagcat gaacattgtc tagtatgtgc cattattcat    3120
ctttatattt atcacctatt agtcacgact ttcctagagc ttactttagt tcgcgcaaaa    3180
caaattttca cggatgcagg gaatggtcac ttctggagtg ggctatatatg tttctggatt    3240
gataatgaag gataaagggc ctgttttcgt cactgctttt aatcctctaa acatggtaat    3300
agtcgcaatt ttgggttcat tcattttatc cgagcagcta aacttgggaa ggtatgtaca    3360
```

```
tgcttattta ctttattaat attattatta ttattattat tattattatt attattatta   3420
ttattattta tttttatttt tatttttatt ttttgggaa tgaacaattg attatcgcga    3480
tatcattaat gattttatt tcaagtagta acgttgcgtg cagaggaggt tgtctaatat    3540
ggtgccggat gaatatatag ggttttggga ggggcaatca ttgtaattgg actgtattta   3600
ataatatggg gcaagagcaa ggaccaaaaa ttgtctaagt acagcagcac tgacgatgtt   3660
gaagtcgaac ctgttggtaa agaaacatct acaacgaagt ctttaaatca gacaaaagct   3720
ggagacgaag ctgtttaaga agaaatggcg aggatttaag ttaggggat atgtagaaat    3780 aataactcct ttttaatggt tgggttttag ataatgctca agttccccgc acagagggat   3840
gttgcttttg catttcttat taagagaat tggaaaaatg acaaagtgcg tttagcatcc    3900
gcgaagcatt tgtcaattta gtcttctgat gaaatggacg tccgatttat tgcaaat     3957
```

<210> SEQ ID NO 31
<211> LENGTH: 389
<212> TYPE: PRT
<213> ORGANISM: Arabidopsis thaliana

<400> SEQUENCE: 31

```
Met Ala Asp Asn Thr Asp Asn Arg Arg Ser Leu Trp Gly Val Pro Glu
1               5                   10                  15

Lys Leu Gln Leu His Ile Ala Met Leu Thr Leu Gln Phe Gly Tyr Ala
            20                  25                  30

Gly Phe His Val Val Ser Arg Ala Ala Leu Asn Met Gly Ile Ser Lys
        35                  40                  45

Leu Val Phe Pro Val Tyr Arg Asn Ile Ile Ala Leu Leu Leu Leu Leu
    50                  55                  60

Pro Phe Ala Tyr Phe Leu Glu Lys Lys Glu Arg Pro Ala Ile Thr Leu
65                  70                  75                  80

Asn Phe Leu Ile Gln Phe Phe Leu Ala Leu Ile Gly Ile Thr Ala
            85                  90                  95

Asn Gln Gly Phe Tyr Leu Leu Gly Leu Asp Asn Thr Ser Pro Thr Phe
        100                 105                 110

Ala Ser Ser Met Gln Asn Ser Val Pro Ala Ile Thr Phe Leu Met Ala
    115                 120                 125

Ala Leu Leu Arg Ile Glu Lys Val Arg Ile Asn Arg Arg Asp Gly Ile
130                 135                 140

Ser Lys Ile Leu Gly Thr Ala Leu Cys Val Ala Gly Ala Ser Val Ile
145                 150                 155                 160

Thr Leu Tyr Lys Gly Pro Thr Ile Tyr Thr Pro Ala Ser His Leu His
                165                 170                 175

Ala His Leu Leu Thr Thr Asn Ser Ala Val Leu Ala Pro Leu Gly Asn
            180                 185                 190

Ala Ala Pro Lys Asn Trp Thr Leu Gly Cys Ile Tyr Leu Ile Gly His
        195                 200                 205

Cys Leu Ser Trp Ser Gly Trp Leu Val Phe Gln Ala Pro Val Leu Lys
    210                 215                 220

Ser Tyr Pro Ala Arg Leu Ser Val Thr Ser Tyr Thr Cys Phe Gly
225                 230                 235                 240

Ile Ile Gln Phe Leu Ile Ile Ala Ala Phe Cys Glu Arg Asp Ser Gln
                245                 250                 255

Ala Trp Val Phe His Ser Gly Trp Glu Leu Phe Thr Ile Leu Tyr Ala
            260                 265                 270
```

```
Gly Ile Val Ala Ser Gly Ile Ala Phe Ala Val Gln Ile Trp Cys Ile
        275                 280                 285

Asp Arg Gly Gly Pro Val Phe Val Ala Val Tyr Gln Pro Val Gln Thr
290                 295                 300

Leu Val Val Ala Ile Met Ala Ser Ile Ala Leu Gly Glu Glu Phe Tyr
305                 310                 315                 320

Leu Gly Gly Ile Ile Gly Ala Val Leu Ile Ile Ala Gly Leu Tyr Phe
                325                 330                 335

Val Leu Tyr Gly Lys Ser Glu Arg Lys Phe Ala Ala Leu Glu Lys
                340                 345                 350

Ala Ala Ile Gln Ser Ser Ala Glu His Gly Ile Glu Arg Ala Pro Val
                355                 360                 365

Ser Arg Asn Ser Ile Lys Ser Ser Ile Thr Thr Pro Leu Leu His Gln
370                 375                 380

Ser Thr Asp Asn Val
385

<210> SEQ ID NO 32
<211> LENGTH: 130
<212> TYPE: PRT
<213> ORGANISM: Arabidopsis thaliana

<400> SEQUENCE: 32

Ala Gly Phe His Val Val Ser Arg Ala Ala Leu Asn Met Gly Ile Ser
1               5                   10                  15

Lys Leu Val Phe Pro Val Tyr Arg Asn Ile Ile Ala Leu Leu Leu Leu
                20                  25                  30

Leu Pro Phe Ala Tyr Phe Leu Glu Lys Lys Glu Arg Pro Ala Ile Thr
            35                  40                  45

Leu Asn Phe Leu Ile Gln Phe Phe Leu Ala Leu Ile Gly Ile Thr
    50                  55                  60

Ala Asn Gln Gly Phe Tyr Leu Leu Gly Leu Asp Asn Thr Ser Pro Thr
65                  70                  75                  80

Phe Ala Ser Ser Met Gln Asn Ser Val Pro Ala Ile Thr Phe Leu Met
                85                  90                  95

Ala Ala Leu Leu Arg Ile Glu Lys Val Arg Ile Asn Arg Arg Asp Gly
                100                 105                 110

Ile Ser Lys Ile Leu Gly Thr Ala Leu Cys Val Ala Gly Ala Ser Val
                115                 120                 125

Ile Thr
    130

<210> SEQ ID NO 33
<211> LENGTH: 130
<212> TYPE: PRT
<213> ORGANISM: Arabidopsis thaliana

<400> SEQUENCE: 33

Leu Ser Trp Ser Gly Trp Leu Val Phe Gln Ala Pro Val Leu Lys Ser
1               5                   10                  15

Tyr Pro Ala Arg Leu Ser Val Thr Ser Tyr Thr Cys Phe Phe Gly Ile
                20                  25                  30

Ile Gln Phe Leu Ile Ile Ala Ala Phe Cys Glu Arg Asp Ser Gln Ala
            35                  40                  45

Trp Val Phe His Ser Gly Trp Glu Leu Phe Thr Ile Leu Tyr Ala Gly
        50                  55                  60
```

-continued

```
Ile Val Ala Ser Gly Ile Ala Phe Ala Val Gln Ile Trp Cys Ile Asp
 65                  70                  75                  80

Arg Gly Gly Pro Val Phe Val Ala Val Tyr Gln Pro Val Gln Thr Leu
                 85                  90                  95

Val Val Ala Ile Met Ala Ser Ile Ala Leu Gly Glu Glu Phe Tyr Leu
                100                 105                 110

Gly Gly Ile Ile Gly Ala Val Leu Ile Ala Gly Leu Tyr Phe Val
            115                 120                 125

Leu Tyr
    130

<210> SEQ ID NO 34
<211> LENGTH: 130
<212> TYPE: PRT
<213> ORGANISM: Nicotiana tabacum

<400> SEQUENCE: 34

Ala Gly Met Tyr Ile Val Thr Met Met Cys Phe Lys Arg Gly Met Ser
  1               5                  10                  15

His Trp Ile Leu Val Val Tyr Arg His Ala Phe Ala Thr Leu Ala Val
                 20                  25                  30

Ala Pro Phe Ala Ile Val Leu Glu Arg Lys Ile Arg Pro Lys Met Thr
                 35                  40                  45

Leu Arg Val Phe Ile Lys Ile Leu Ala Leu Gly Phe Leu Glu Pro Val
     50                  55                  60

Ile Asp Gln Asn Leu Tyr Tyr Val Gly Leu Lys Ser Thr Thr Ala Thr
 65                  70                  75                  80

Tyr Ala Ser Ala Phe Val Asn Leu Leu Pro Ala Val Thr Phe Ile Leu
                 85                  90                  95

Ala Val Ile Phe Arg Ile Glu Lys Val Asn Leu Lys Lys Lys Ser Ser
                100                 105                 110

Met Ala Lys Val Ile Gly Thr Ala Ile Thr Val Ala Gly Ala Met Val
            115                 120                 125

Met Thr
    130

<210> SEQ ID NO 35
<211> LENGTH: 134
<212> TYPE: PRT
<213> ORGANISM: Nicotiana tabacum

<400> SEQUENCE: 35

Leu Ile Ser Cys Ile Val Gly Trp Ser Gly Phe Phe Ile Val Gln Ser
  1               5                  10                  15

Met Thr Leu Lys Glu Tyr Pro Ala Glu Leu Ser Leu Ala Ala Trp Val
                 20                  25                  30

Cys Val Met Gly Ile Val Glu Gly Gly Ile Val Ala Leu Ile Met Glu
                 35                  40                  45

Arg Asp Trp Asn Ala Trp Lys Ile Gly Phe Asp Ala Arg Leu Leu Ala
     50                  55                  60

Ala Ala Tyr Ser Gly Ile Val Cys Ser Gly Ile Ala Tyr Tyr Val Gln
 65                  70                  75                  80

Ser Ile Val Asn Lys Val Lys Gly Pro Val Phe Val Thr Ala Phe Ser
                 85                  90                  95

Pro Leu Ser Met Val Ile Thr Ser Val Leu Ala Ala Ile Ile Leu Ala
                100                 105                 110
```

```
Glu Ser Val His Leu Gly Ser Cys Ile Gly Ala Val Ile Ile Val Met
        115                 120                 125
Gly Leu Tyr Ser Val Val
    130

<210> SEQ ID NO 36
<211> LENGTH: 410
<212> TYPE: DNA
<213> ORGANISM: Artificial Sequence
<220> FEATURE:
<223> OTHER INFORMATION: artificial miRNA sequence targeting
      Nitab4.5_0010919g0010.2

<400> SEQUENCE: 36
acaaacacac gctcggacgc atattacaca tgttcataca cttaatactc gctgttttga      60
attgatgttt taggaatata tatgtagata atattttaat aaagacccat tcacaggtcg     120
tgatatgatt caattagctt ccgactcatt catccaaata ccgagtcgcc aaaattcaaa     180
ctagactcgt taaatgaatg aatgatgcgg tagacaaatt ggatcattga ttctctttga     240
tggtctttag taaaatatta cactctctct tttgtattcc aattttcttg attaatcttt     300
cctgcacaaa aacatgcttg atccactaag tgacatatat gctgccttcg tatatatagt     360
tctggtaaaa ttaacatttt gggtttatct ttatttaagg catcgccatg                410
```